United States Patent
Yamamoto et al.

(10) Patent No.: US 11,390,811 B2
(45) Date of Patent: Jul. 19, 2022

(54) LIQUID CRYSTAL COMPOSITION AND LIQUID CRYSTAL DISPLAY ELEMENT

(71) Applicant: DIC CORPORATION (TOKYO), Tokyo (JP)

(72) Inventors: Junko Yamamoto, Kita-adachi-gun (JP); Junichi Mamiya, Kita-adachi-gun (JP); Yuichi Inoue, Kita-adachi-gun (JP); Masaomi Kimura, Kita-adachi-gun (JP)

(73) Assignee: DIC CORPORATION, Tokyo (JP)

(*) Notice: Subject to any disclaimer, the term of this patent is extended or adjusted under 35 U.S.C. 154(b) by 156 days.

(21) Appl. No.: 16/622,508

(22) PCT Filed: Jun. 14, 2018

(86) PCT No.: PCT/JP2018/022689
§ 371 (c)(1),
(2) Date: Dec. 13, 2019

(87) PCT Pub. No.: WO2019/003935
PCT Pub. Date: Jan. 3, 2019

(65) Prior Publication Data
US 2020/0208054 A1    Jul. 2, 2020

(30) Foreign Application Priority Data
Jun. 29, 2017    (JP) .............................. JP2017-127451

(51) Int. Cl.
| G02F 1/1333 | (2006.01) |
| C09K 19/30 | (2006.01) |
| C09K 19/34 | (2006.01) |
| C09K 19/54 | (2006.01) |
| C09K 19/12 | (2006.01) |

(52) U.S. Cl.
CPC ...... *C09K 19/3003* (2013.01); *C09K 19/3402* (2013.01); *C09K 19/54* (2013.01); *C09K 2019/122* (2013.01); *C09K 2019/123* (2013.01); *C09K 2019/3004* (2013.01); *C09K 2019/3009* (2013.01); *C09K 2019/3016* (2013.01); *C09K 2019/3025* (2013.01); *C09K 2019/3422* (2013.01)

(58) Field of Classification Search
CPC ............ C09K 19/3003; C09K 19/3402; C09K 19/54; C09K 19/3491; C09K 19/32; C09K 19/3405; C09K 19/3411; C09K 19/3066; C09K 19/062; C09K 19/04; C09K 2019/122; C09K 2019/123; C09K 2019/3004; C09K 2019/3009; C09K 2019/3016; C09K 2019/3025; C09K 2019/3422; C09K 2019/3425; C09K 2019/3413; C09K 2019/3408; G02F 1/13; G02F 1/1333
See application file for complete search history.

(56) References Cited

U.S. PATENT DOCUMENTS

| 10,273,409 B2 | 4/2019 | Graziano et al. |
| 10,294,426 B2 | 5/2019 | Archetti et al. |
| 10,344,215 B2 | 7/2019 | Tong et al. |
| 2011/0272631 A1 | 11/2011 | Saito |
| 2015/0252265 A1 | 9/2015 | Archetti et al. |
| 2016/0046863 A1 | 2/2016 | Archetti et al. |
| 2016/0053178 A1 | 2/2016 | Hirschmann et al. |
| 2016/0170269 A1 | 6/2016 | Noma et al. |
| 2016/0264865 A1 | 9/2016 | Hirschmann et al. |
| 2016/0264866 A1 | 9/2016 | Hirschmann et al. |
| 2017/0045765 A1 | 2/2017 | Fujisawa et al. |
| 2017/0123275 A1 | 5/2017 | Noma et al. |
| 2017/0158793 A1 | 6/2017 | Endo et al. |
| 2017/0362506 A1 | 12/2017 | Hirschmann et al. |
| 2017/0369418 A1 | 12/2017 | Tanaka et al. |
| 2018/0023001 A1 | 1/2018 | Tanaka et al. |
| 2018/0057743 A1 | 3/2018 | Archetti et al. |
| 2018/0057747 A1 | 3/2018 | Matsuda et al. |

(Continued)

FOREIGN PATENT DOCUMENTS

| CN | 103626660 A | 3/2014 |
| CN | 104737068 A | 6/2015 |

(Continued)

OTHER PUBLICATIONS

Translation of JP2015-004856.*
International Search Report dated Sep. 4, 2018, issued in counterpart International Application No. PCT/JP2018/022689 (2 pages).
JP Office Action, Notice of Reasons for Refusal dated Dec. 4, 2019, issued in counterpart JP application No. 2018-555994, with English translation (6 pages).
JP Office Action, Decision to Grant a Patent dated Feb. 7, 2019, issued in counterpart JP application No. 2018-555994, with English translation (5 pages).
Non-Final Office Action dated Aug. 5, 2021, issued in U.S. Appl. No. 16/611,753. (21 pages).

(Continued)

*Primary Examiner* — Geraldina Visconti
(74) *Attorney, Agent, or Firm* — WHDA, LLP

(57) ABSTRACT

The present invention provides a liquid crystal composition, containing: one kind or two or more kinds of a first monomer having a first mesogenic skeleton, at least one polymerizable group represented by the general formula (PG1) linked to the first mesogenic skeleton, and at least one polar group linked to the mesogenic skeleton or the polymerizable group; and one kind or two or more kinds of a second monomer having a second mesogenic skeleton and a polymerizable group represented by the general formula (PG2) linked to the second mesogenic skeleton, and having a chemical structure different from that of the first monomer, in an amount of more than 0.4% by mass, which is excellent in vertical alignment, burn-in characteristics (change with time of pretilt angle), and compatibility, and provides a liquid crystal display element using the liquid crystal composition.

10 Claims, No Drawings

(56) References Cited

U.S. PATENT DOCUMENTS

| | | |
|---|---|---|
| 2018/0187079 A1 | 7/2018 | Sudou et al. |
| 2018/0208848 A1 | 7/2018 | Archetti et al. |
| 2020/0208054 A1* | 7/2020 | Yamamoto ................ G02F 1/13 |
| 2020/0224098 A1* | 7/2020 | Mamiya ................ C09K 19/56 |

FOREIGN PATENT DOCUMENTS

| | | | |
|---|---|---|---|
| CN | 105916900 A | 8/2016 | |
| EP | 3 553 595 A1 | 10/2019 | |
| JP | 2013-543526 A | 12/2013 | |
| JP | 5565316 B2 | 8/2014 | |
| JP | 2015-004856 * | 1/2015 | ........... C09K 19/542 |
| JP | 2015-168826 A | 9/2015 | |
| JP | 2016-501938 A | 1/2016 | |
| JP | 2016-041804 A | 3/2016 | |
| JP | 2016-047918 A | 4/2016 | |
| JP | 2016-169377 A | 9/2016 | |
| JP | 2016-186070 A | 10/2016 | |
| JP | 2017-014486 A | 1/2017 | |
| JP | 6624305 B2 | 12/2019 | |
| TW | 201632589 A | 9/2016 | |
| TW | 201716549 A | 5/2017 | |
| WO | 2014/061755 A1 | 4/2014 | |
| WO | 2015/122457 A1 | 8/2015 | |
| WO | 2015/198915 A1 | 12/2015 | |
| WO | 2016/015803 A1 | 2/2016 | |
| WO | 2016/082922 A1 | 6/2016 | |
| WO | 2016/114093 A1 | 7/2016 | |
| WO | 2016/117271 A1 | 7/2016 | |
| WO | 2016/146245 A1 | 9/2016 | |
| WO | 2016/152340 A1 | 9/2016 | |
| WO | 2017/041893 A1 | 3/2017 | |
| WO | 2018/105726 A1 | 6/2018 | |

OTHER PUBLICATIONS

Final Office Action dated May 19, 2021, issued in U.S. Appl. No. 16/611,753. (17 pages).

International Search Report dated Jun. 26, 2018, issued in International Application No. PCT/JP2018/019055 (counterpart to U.S. Appl. No. 16/611,753). (2 pages).

Notice of Reasons for Refusal dated Dec. 6, 2018, issued in JP Application No. 2018-552896 (counterpart to U.S. Appl. No. 16/611,753), with English translation. (6 pages).

Notice of Reasons for Refusal dated Jan. 31, 2019, issued in JP Application No. 2018-552896 (counterpart to U.S. Appl. No. 16/611,753), with English translation. (6 pages).

* cited by examiner

LIQUID CRYSTAL COMPOSITION AND LIQUID CRYSTAL DISPLAY ELEMENT

TECHNICAL FIELD

The present invention relates to a liquid crystal composition containing a spontaneous orientation monomer and a liquid crystal display element using the same.

BACKGROUND ART

In general, liquid crystal display elements such as liquid crystal panels and liquid crystal displays change the alignment state of liquid crystal molecules by an external stimulus such as an electric field, and utilize changes in the optical characteristics associated therewith for display. Such a liquid crystal display element has a structure in which liquid crystal molecules are filled in a gap between two transparent substrates, and in general, an alignment film for aligning liquid crystal molecules in a specific direction in advance is formed on the surface of the substrate which comes into contact with the liquid crystal molecules.

However, there is a problem in that alignment defects are generated due to scratches or dust generated in the surface of the alignment film in the manufacturing process of the liquid crystal display element, and that as the size of the substrate increases, the design and management of an alignment film for obtaining uniform alignment over the entire surface of the substrate and for a long period of time becomes difficult.

Therefore, in recent years, there has been a demand for the development of a liquid crystal display element which does not require an alignment film by using a liquid crystal composition containing a spontaneous orientation material for controlling the alignment of liquid crystal molecules in a liquid crystal layer.

For example, PTL 1 describes a liquid crystal composition containing a spontaneous orientation material for suppressing a decrease in voltage holding ratio by a liquid crystal composition containing a monofunctional biphenyl monomer having an octyl group and showing a high linearity and a bifunctional biphenyl monomer having a stearyl group and showing a low linearity, instead of lauryl acrylate having a relatively weak interaction with the liquid crystal molecule. Further, PTL 2 discloses various liquid crystal compositions containing a self-alignment additive for controlling alignment of liquid crystal molecules in place of an alignment layer, and states that when a liquid crystal composition containing a nematic LC medium, a self-alignment additive and, if necessary, a polymerizable compound is filled into a test cell without a pre-alignment layer, a spontaneous homeotropic (vertical) alignment with respect to the substrate surface and the vertical alignment are stable to a clearing point, and that the formed VA cell can be reversibly switched by application of a voltage.

CITATION LIST

Patent Literature

PTL 1: US Patent Publication No. 2017/0123275
PTL 2: JP-A-2016-501938

SUMMARY OF INVENTION

Technical Problem

However, a composition containing two kinds of hydrophobic monomers having a long alkyl chain and a biphenyl skeleton as shown in PTL 1 described above is considered to have a stronger interaction, than lauryl acrylate, with liquid crystal molecules of a liquid crystal layer filled between a pair of substrates, but there is a problem that the alignment direction of liquid crystal molecules cannot be regulated due to low suction force applied to the substrate.

In PTL 2, the initial pretilt angle (pretilt) is taken into consideration, but in the case of a liquid crystal display element in which the voltage is repeatedly turned on and off, the change with time of the pretilt angle is not taken into consideration. Therefore, even if a passivation layer is constructed by the self-alignment additive having a hydroxyl group as the polar group of PTL 2 and the initial pretilt angle (pretilt) can be controlled to a desired value, there arises a new problem that the display unevenness occurs due to the change in the pretilt angle with time. In particular, the relationship between the combination of the self-alignment additive and the polymerizable compound to be added and the content thereof and the relationship between the content of the self-alignment additive and the polymerizable compound and the change with time of the pretilt angle are not studied.

Accordingly, the problem to be solved by the present invention is to provide a liquid crystal composition which is excellent in vertical alignment, burn-in characteristics (change with time of pretilt angle), and compatibility, and to provide a liquid crystal display element using the liquid crystal composition.

Solution to Problem

As a result of intensive studies by the present inventors, it has been found that the above problems can be solved by a liquid crystal composition including one kind or two or more kinds of self-alignment polymerizable compounds and one kind or two or more kinds of polymerizable compounds in a specific amount and a liquid crystal display element using the same, and the present invention has been completed.

Advantageous Effects of Invention

The liquid crystal composition according to the present invention exhibits high compatibility and excellent vertical alignment with respect to liquid crystal molecules.

The liquid crystal composition according to the present invention has one kind or two or more kinds of self-alignment polymerizable compounds and a specific amount of one kind or two or more kinds of polymerizable compounds, and thus exhibits no or little change with time in the pretilt angle.

The liquid crystal composition according to the present invention has one kind or two or more kinds of self-alignment polymerizable compounds (first monomer) and a specific amount of one kind or two or more kinds of polymerizable compounds, so that alignment unevenness can be prevented or alignment unevenness can be reduced.

The liquid crystal display element according to the present invention exhibits no alignment unevenness or reduced alignment unevenness.

The liquid crystal composition according to the present invention and the liquid crystal display element provided with the liquid crystal composition exhibit high reliability.

DESCRIPTION OF EMBODIMENTS

According to the first aspect of the present invention, provided is a liquid crystal composition, including:

one kind or two or more kinds of a first monomer having a first mesogenic skeleton, at least one polymerizable group represented by the general formula (PG1) linked to the first mesogenic skeleton, and at least one polar group linked to the mesogenic skeleton or the polymerizable group; and one kind or two or more kinds of a second monomer having a second mesogenic skeleton and a polymerizable group represented by the general formula (PG2) linked to the second mesogenic skeleton, and having a chemical structure different from that of the first monomer, in an amount of more than 0.4% by mass:

[Chem. 1]

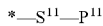 (PG1)

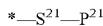 (PG2)

wherein $P^{11}$ and $P^{21}$ each independently represent a group represented by any of the following formulae (R-I) to (R-IX):

[Chem. 2]

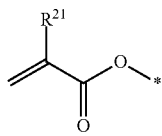 (R-I)

(R-II)

(R-III)

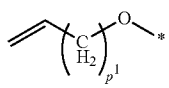 (R-IV)

(R-V)

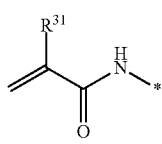 (R-VI)

(R-VII)

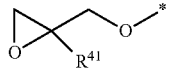

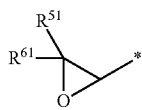

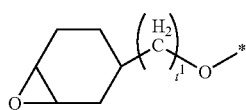

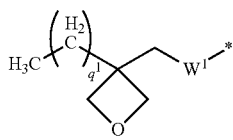

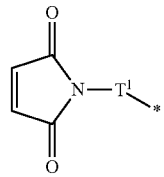 (R-VIII)

(R-IX)

wherein $R^{21}$, $R^{31}$, $R^{41}$, $R^{51}$, and $R^{61}$ each independently represent a hydrogen atom, an alkyl group having 1 to 5 carbon atoms, or a halogenated alkyl group having 1 to 5 carbon atoms; $W^1$ is a single bond, —O—, or a methylene group; $T^1$ is a single bond or —COO—; $p^1$, $t^1$, and $q^1$ are each independently 0, 1, or 2; and one or more hydrogen atoms of the polymerizable group $p^{11}$ may be substituted with the polar group, or the polar group may have a polymerizable group represented by the general formula (PG1) as a substituent; * in the above chemical formulae represents a bonding site; and $S^{11}$ and $S^{21}$ each independently represent a single bond or an alkylene group having 1 to 15 carbon atoms, and one —CH$_2$— or two or more —CH$_2$— that are not adjacent to each other in the alkylene group each may be substituted with the polar group, —O—, —COO—, or —COO— so long as oxygen atoms are not directly adjacent to each other.

As a result, a liquid crystal composition having excellent vertical alignment, burn-in characteristics (pretilt angle change with time), and compatibility can be obtained.

The alkyl group in the present specification may be either linear or branched, and is preferably a linear alkyl group, and specific examples thereof include, a methyl group, an ethyl group, a propyl group, a butyl group, a pentyl group, a hexyl group, a heptyl group, an octyl group, a nonyl group, a decyl group, an isopropyl group, and an isobutyl group.

The alkylene group in the present specification may be either linear or branched, and is preferably a linear alkylene group, and specific examples thereof include a methylene group, an ethylene group, a propylene group, a butylene group, a hexylene group, and an octylene group. The alkoxy group in the present specification may be either linear or branched, and is preferably a linear alkoxy group, and examples thereof include a methoxy group, an ethoxy group, a propoxy group, a butoxy group, and a pentoxy group.

The first mesogenic skeleton according to the present invention preferably has the general formula (Me1):

[Chem. 3]

$$\bullet\!-\!(A^{Me1}\!-\!Z^{Me1})_{mMe1}\!\!-\!\bullet \qquad (Me1)$$

wherein in the general formula (Me1), $Z^{Me1}$ represents a single bond, —CH=CH—, —CF=CF—, —C≡C—, —COO—, —OCO—, —OCOO—, —OOCO—, —CF$_2$O—, —OCF$_2$—, —CH=CHCOO—, —OCOCH=CH—, —CH$_2$—CH$_2$COO—, —OCOCH$_2$—CH$_2$—, —CH=C(CH$_3$)OCO—, —OCOC(CH$_3$)=CH—, —CH$_2$—CH(CH$_3$)OCO—, —OCOCH(CH$_3$)—CH$_2$—, —OCH$_2$CH$_2$O—, or an alkylene group having 2 to 20 carbon atoms, and one —CH$_2$— or two or more —CH$_2$— that are not adjacent to each other in the alkylene group may be substituted with —O—, —COO—, or —OCO—; $A^{Me1}$ represents a divalent 6-membered ring aromatic group, a divalent 6-membered ring heteroaromatic group, a divalent 6-membered ring aliphatic group, or a divalent 6-membered heteroaliphatic group, and the hydrogen atom in these cyclic structures may be substituted with a halogen atom or $P^{11}$-$Sp^{11}$- and a polar group, and in the case where a plurality of each of $Z^{Me1}$ and $A^{Me1}$ are present, these may be the same as or different from each other, $m^{Me1}$ represents an integer of 1 to 5, and in the formula (Me1), the black dot at the left end and the black dot at the right end represent a bonding site.

The mesogenic skeleton represented by the formula (Me1) according to the present invention is preferably any one of the following formulae (Me1-1) to (Me1-16).

[Chem. 4]

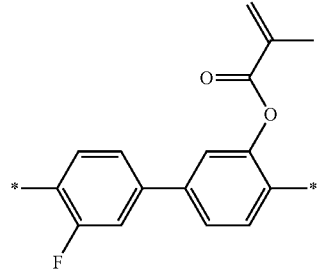

(Me1-1)

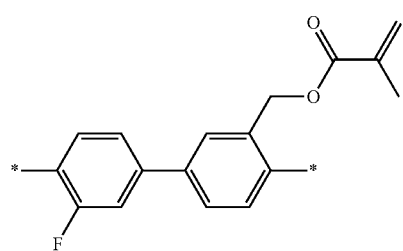

(Me1-2)

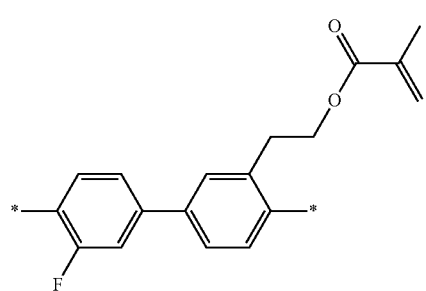

(Me1-3)

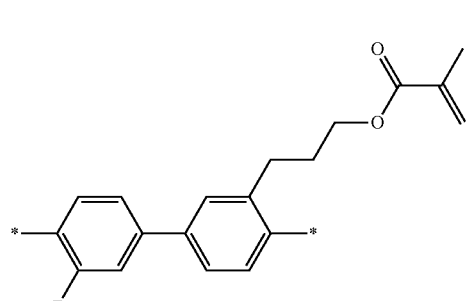

(Me1-4)

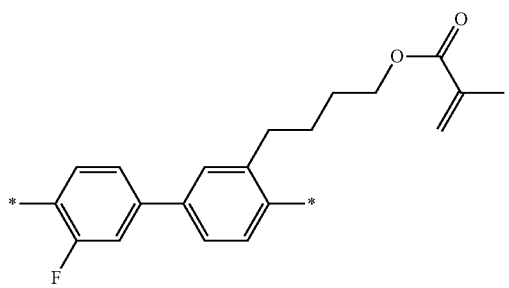

(Me1-5)

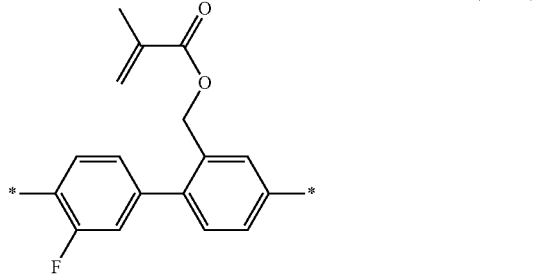

(Me1-6)

[Chem. 5]

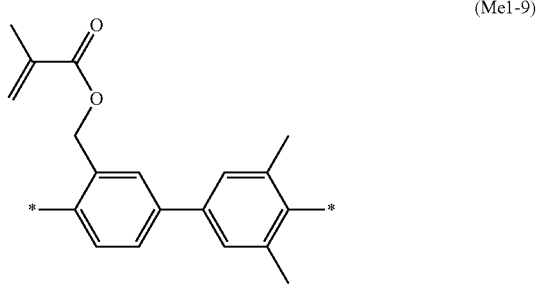

(Me1-7)

(Me1-8)

(Me1-9)

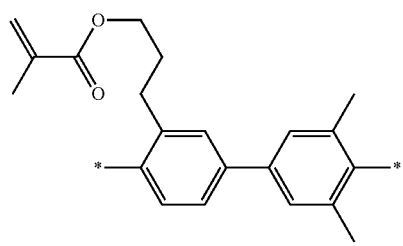
(Me1-10)
[Chem. 6]
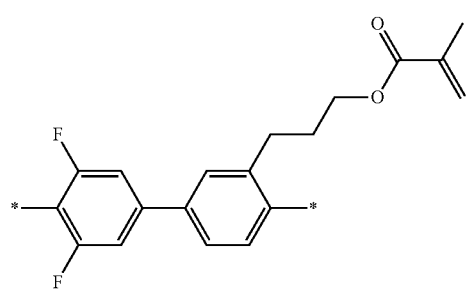
(Me1-11)
(Me1-12)
(Me1-13)
(Me1-14)
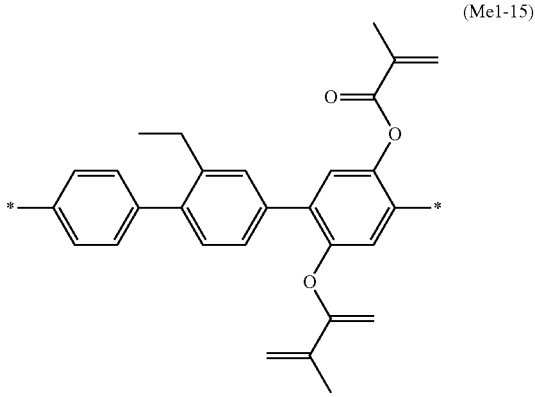
(Me1-15)
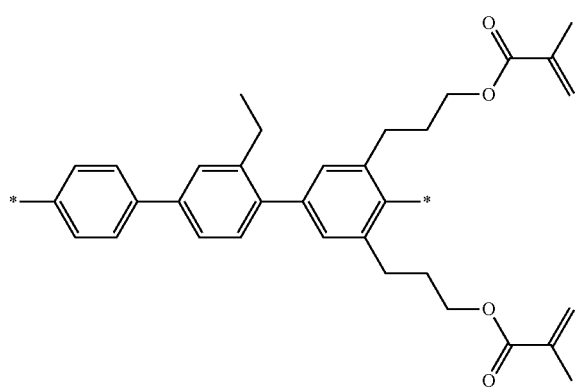
(Me1-16)
The polymerizable group represented by the general formula (PG 1) according to the present invention is any one of the following formulae (R-I) to (R-IX).
[Chem. 7]
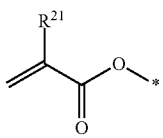
(R-I)
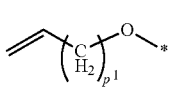
(R-II)
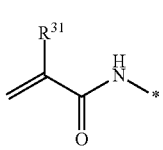
(R-III)
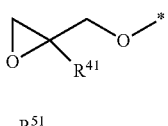
(R-IV)
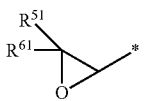
(R-V)
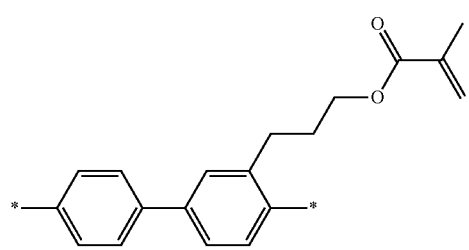
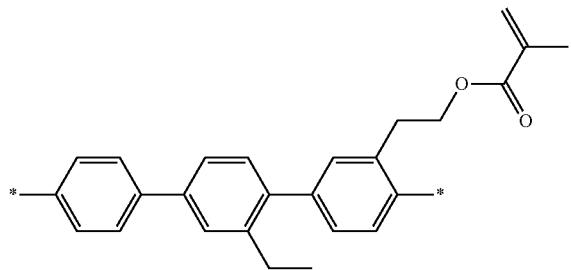

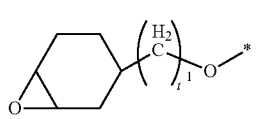
(R-VI)

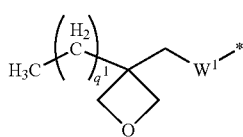
(R-VII)

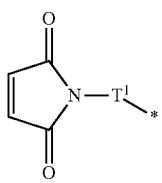
(R-VIII)

HS—*  (R-IX)

In the formulae (R-I) to (R-IX), $R^{21}$, $R^{31}$, $R^{41}$, $R^{51}$, and $R^{61}$ are each independently a hydrogen atom, an alkyl group having 1 to 5 carbon atoms, or a halogenated alkyl group having 1 to 5 carbon atoms, $W^1$ is a single bond, —O—, or a methylene group, $T^1$ is a single bond or —COO—, and $p^1$, $t^1$, and $q^1$ are each independently 0, 1, or 2, and one or more hydrogen atoms of the above formulae (R-I) to (R-IX) may be substituted with the polar group, * in the above chemical formulae represents a bonding site.

Among these, in the above (PG1) and (PG2), each of $P^{11}$ is independently preferably formula (R-I), formula (R-II), formula (R-III), formula (R-IV), formula (R-V), or formula (R-VII), more preferably formula (R-I), formula (R-II), formula (R-III), or formula (R-IV), and still more preferably formula (RI), and yet still more preferably an acryl group or a methacryl group, further still more preferably a methacryl group, and one or more hydrogen atoms may be substituted with the polar group.

In the above general formula (PG1), $S^{11}$ is preferably an alkylene group having 1 to 5 carbon atoms which may be substituted with a single bond or a polar group, and more preferably an alkylene group having 2 to 5 carbon atoms which may be substituted with a polar group, and it is preferable that at least one hydrogen atom of $S^{11}$ is substituted with a polar group represented by the following general formula (K).

The number of polymerizable groups represented by the general formula (PG1) according to the present invention is preferably 1 to 5, more preferably 1 to 4, and still more preferably 1 to 3.

The polar group according to the present invention preferably has a role of an interaction site interacting with (for example, suction) a substrate, a film, an electrode, or the like, and is more preferably a group that has a non-covalent interaction with a member (including a substrate (including a glass or a metal oxide), a film, or an electrode) that is different from the first monomer. It is preferable that the polar group is an atomic group of a polar element having a hetero atom selected from the group consisting of N, O, S, P and Si, and it is more preferable that the polar group is an atomic group of a polar element having a hetero atom selected from the group consisting of N, O, S, P and Si, and that it exhibits an interaction with a member other than the first monomer, and is preferably represented by the following formula (K). The polar group according to the present invention may be linked to the polymerizable group represented by the general formula (PG1) (the polar group may include a polymerizable group represented by the general formula (PG1) as a substituent).

[Chem. 8]

$$*—S^{ik}—K^{ik} \quad (K)$$

In the above general formula (K), $S^{ik}$ represents a single bond or an alkylene group having 1 to 15 carbon atoms, and one —$CH_2$— or two or more —$CH_2$— that are not adjacent to each other in the alkylene group may be substituted with —O—, —OCO—, or —COO— so long as oxygen atoms are not directly adjacent to each other, and $K^{ik}$ is represented by the following formulae (K-1) to (K-28).

[Chem. 9]

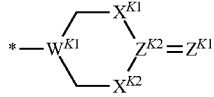
(K-1)

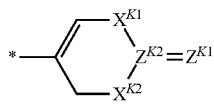
(K-2)

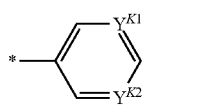
(K-3)

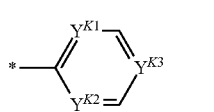
(K-4)

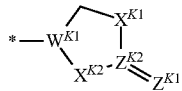
(K-5)

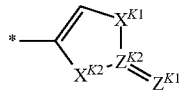
(K-6)

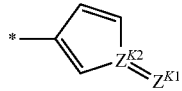
(K-7)

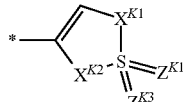
(K-8)

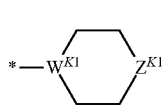
(K-9)

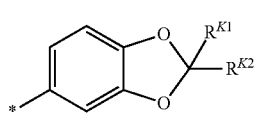
(K-10)

-continued (K-11) 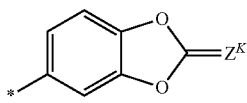

(K-12) 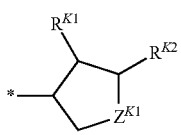

(K-13) 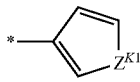

(K-14) 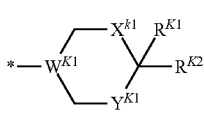

(K-15) 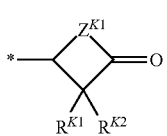

(K-16) 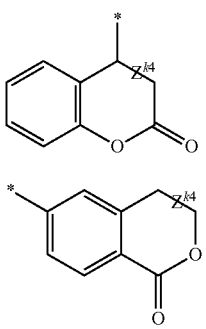

(K-17)

(K-18) 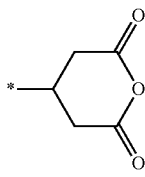

(K-19) 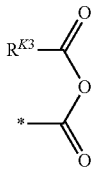

(K-20) 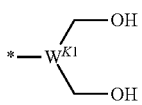

(K-21) 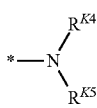

(K-22) 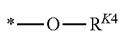

(K-23) 

In the above formulae (K-1) to (K-23), $R^{K1}$ and $R^{K2}$ each independently represent a hydrogen atom or a linear or branched alkyl group or alkyloxy group having 1 to 5 carbon atoms; $R^{K3}$ represents a hydrogen atom or a linear or branched alkyl group having 1 to 20 carbon atoms and one —CH$_2$— or two or more —CH$_2$— that are not adjacent to each other in the alkyl group may be substituted with —O—, —COO—, or —OCO—; $R^{K4}$ and $R^{K5}$ each independently represent a hydrogen atom or an alkyl group having 1 to 8 carbon atoms;

$W^{K1}$ represents a methine group, ≡C—CH$_3$, ≡C—C$_2$H$_5$, ≡C—C$_3$H$_7$, ≡C—C$_4$H$_9$, ≡C—C$_5$H$_{11}$, ≡C—C$_6$H$_{13}$, or a nitrogen atom;

$X^{K1}$ and $X^{K2}$ each independently represent —CH$_2$—, an oxygen atom, —C(=O)—, or a sulfur atom;

$Y^{K1}$ $Y^{K2}$ and $Y^{K3}$ each independently represent a methine group or a nitrogen atom;

$Z^{K1}$ represents an oxygen atom or a sulfur atom; $Z^{K2}$ represents a carbon atom, a sulfur atom, or a silicon atom; $Z^{K3}$ represents an oxygen atom; $Z^{K4}$ represents a single bond or a double bond.

One or more hydrogen atoms of the above-mentioned $S^{ik}$ or the above-mentioned $K^{ik}$ may be substituted with a polymerizable group represented by the general formula (PG1); * in the above chemical formulae represents a bonding site.

[Chem. 10]

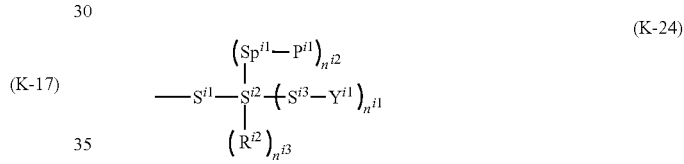

(K-24)

In the formula, $Y^{i1}$ represents a linear or branched alkyl group having 3 to 20 carbon atoms, a halogenated alkyl group, or a cyanated alkyl group, and at least two or more secondary carbon atoms in these alkyl groups are substituted with —(C=X$^{i1}$)— and/or —(CH—CN)—, and the secondary carbon atom in the alkyl group may be substituted with —CH=CH—, —C≡C—, —O—, —NH—, —COO—, or —OCO— so long as oxygen atoms are not directly adjacent to each other; $X^{i1}$ represents an oxygen atom, a sulfur atom, NH, or NR$^{i1}$;

$S^{i1}$ and $S^{i3}$ each independently represent an alkylene group having 1 to 6 carbon atoms or a single bond, and —CH$_2$— in the alkylene group may be substituted with —CH=CH—, —C≡C—, —C(=CH$_2$)—, —C(=CHR$^{i3}$)—, —C(=CR$^{i3}$$_2$)—, —O—, —NH—, —C=O—, —COO—, or —OCO— so long as oxygen atoms are not directly adjacent to each other;

$S^{i2}$ represents a carbon atom, a nitrogen atom, or a silicon atom;

$R^{i2}$ represents a hydrogen atom, a linear or branched alkyl group having 1 to 20 carbon atoms, and the secondary carbon atom in these groups may be substituted with —O—, —CH=CH—, or —C≡C— so long as oxygen atoms are not directly adjacent to each other;

$P^{i1}$ represents a polymerizable group;

$Sp^{i1}$ represents a spacer group or a single bond;

$n^{i1}$ represents an integer of 1 to 3; $n^{i2}$ and $n^{i3}$ each independently represent an integer of 0 to 2, but when $S^{i2}$ represents a carbon atom or a silicon atom, $n^{i1}+n^{i2}+n^{i3}$ is 3, and when $S^{i2}$ represents a nitrogen atom, $n^{i1}+n^{i2}+n^{i3}$ is 2. $R^{i3}$ has the same meaning as $R^{i3}$ in the general formula (i), and in the case where a plurality of each of $R^{i2}$, $X^{i1}$, $Y^{i1}$, $S^{i1}$, $S^{i3}$, $P^{i1}$, and $Sp^{i1}$ are present in the general formula (K-1), these may be the same as or different from each other.

[Chem. 11]

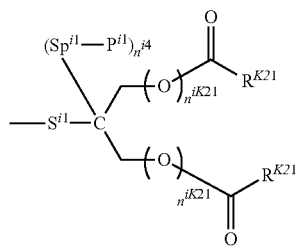
(K-25)

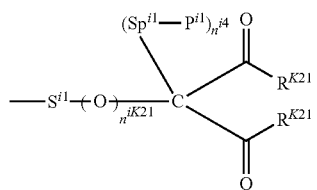
(K-26)

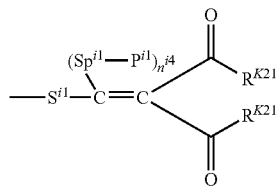
(K-27)

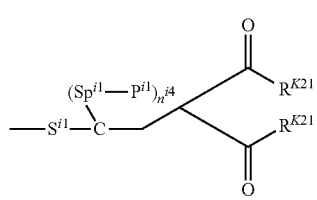
(K-28)

In the formulae, $S^{i1}$, $P^{i1}$ and $Sp^{i1}$ have the same meaning as $S^{i1}$, $P^{i1}$ and $Sp^{i1}$ in the general formula (K-1), respectively; $R^{K21}$ represents a linear or branched alkyl group having 1 to 10 carbon atoms, a halogenated alkyl group, or a cyanated alkyl group, and at least two or more secondary carbon atoms in these alkyl groups may be substituted with —CH=CH—, —C≡C—, —O—, or —NH— so long as oxygen atoms are not directly adjacent to each other; and $n^{i4}$ and $n^{1K21}$ each independently represent 0 or 1.

The spontaneous orientation monomer according to the present invention has at least one polar group, a mesogenic group, and at least one polymerizable group, and has a chemical structure different from that of the second monomer according to the present invention. The polar group may be bonded to a mesogenic group or a polymerizable group via a spacer.

The first monomer according to the present invention has a first mesogenic skeleton, at least one polymerizable group represented by the general formula (PG1) linked to the first mesogenic skeleton, and at least one polar group linked to the mesogenic skeleton or the polymerizable group, and preferably has a first mesogenic skeleton, at least one polymerizable group represented by the general formula (PG1) linked to the first mesogenic skeleton, and at least one of the polar groups represented by the general formula (K) linked to the mesogenic skeleton or the polymerizable group. The polar group may be bonded to a mesogenic group or a polymerizable group via the spacer $S^{ik}$.

$S^{ik}$ preferably represents a single bond or an alkylene group having 1 to 8 carbon atoms, and one or two or more —CH$_2$— in the alkylene group may be substituted with —O—, —OCO—, or —COO— so long as oxygen atoms are not directly adjacent to each other. Moreover, the —CH$_2$— may be substituted with the polymerizable group represented by the general formula (PG1).

In the polar group according to the present invention, $K^{ik}$ is preferably at least one selected from the group consisting of compounds represented by the following formulae (K-1-1) to (K-23-1)

[Chem. 12]

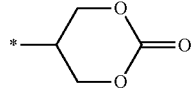
(K-1-1)

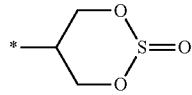
(K-1-2)

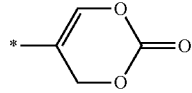
(K-2-1)

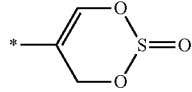
(K-2-2)

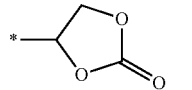
(K-5-1)

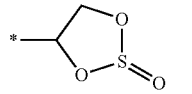
(K-5-2)

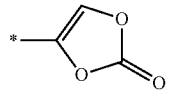
(K-6-1)

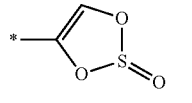
(K-6-2)

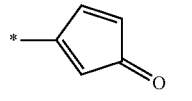
(K-7-1)

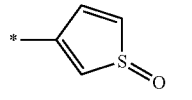
(K-7-2)

-continued (K-7-3) 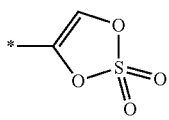

(K-8-1) 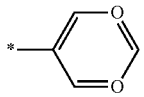

(K-8-2) 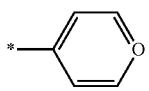

(K-9-1) 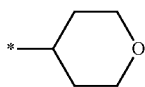

(K-10-1) 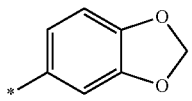

(K-11-1) 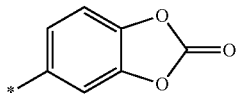

(K-12-1) 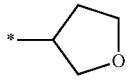

(K-12-2) 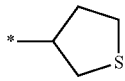

(K-13-1) 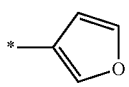

(K-13-2) 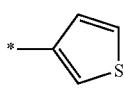

(K-20-1) 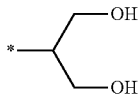

(K-21-1) 

(K-21-2) 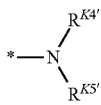

(K-22-1) *—OH (K-22-2) *—O—R$^{K4'}$ (K-23-1) *—COOH

In the above formulae, R$^{K4'}$ and R$^{K5'}$ each independently represent an alkyl group having 1 to 5 carbon atoms.

The group may be substituted with a polymerizable group represented by the general formula (PG1). * in the above chemical formulae represents a bonding site.

Among the above, the polar group according to the present invention is preferably the formula (K-1-1), (K-2-1), (K-7-1), (K-20-1), or (K-22-1).

In the first monomer according to the present invention, the polar group may be directly linked to the first mesogenic skeleton or may be linked to a polymerizable group represented by the general formula (PG1). As a preferable form in a case in which the polar group is linked to a polymerizable group represented by the general formula (PG1) (the polar group has a polymerizable group represented by the general formula (PG1) as a substituent), when the polar group is represented by the general formula (K), one or more hydrogen atoms of the above S$^{ik}$ or the above K$^{ik}$ may be substituted with a polymerizable group represented by the general formula (PG1).

In the first monomer according to the present invention, one or more hydrogen atoms of the polymerizable group represented by the general formula (PG1) may be substituted with a polar group. A preferable form in this case includes a form in which one or more hydrogen atoms in the polymerizable group p$^{11}$ or S$^{11}$ are substituted with a polar group, and a more preferable form includes a form in which one or more hydrogen atoms in the polymerizable group p$^{11}$ or S$^{11}$ are substituted with the polar group represented by the general formula (K). For example, the form in which the polar group is directly linked to the polymerizable group represented by the general formula (PG1) includes the structure such as the following formula (P-K-1), (P-K-2), (P-K-3), or (P-K-4).

[Chem. 13]

(P-K-1) 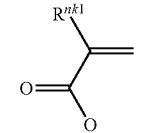

(P-K-2) 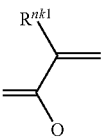

(P-K-3) 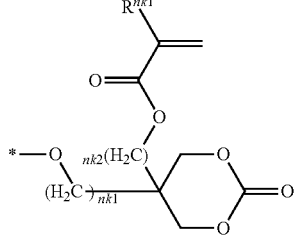

-continued

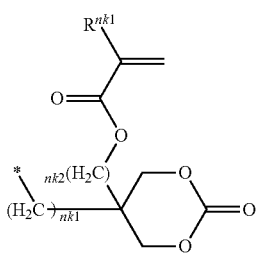

(P-K-4)

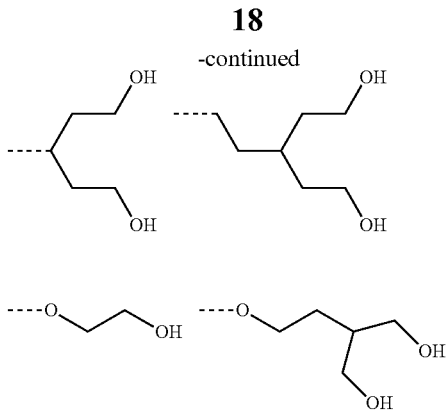

In the above formulae, $R^{nk1}$ represents a hydrogen atom or an alkyl group having 1 to 5 carbon atoms, and nk1 and nk2 each independently represent an integer of 0 to 8.

The first monomer according to the present invention is preferably a monomer that exhibits spontaneous orientation property for controlling the alignment of liquid crystal molecules, and more preferably one kind or two or more kinds of compounds selected from the group consisting of compounds represented by the general formula (i), the general formula (ii) the general formula (iii) and the general formula (iv).

[Chem. 14]

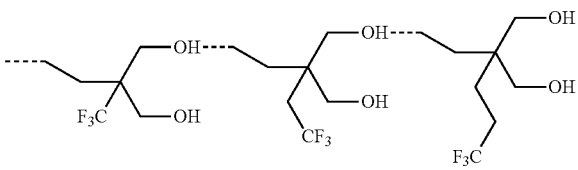

(i)

In the above general formula (i), $R^{a l 1}$, $R^{a l 2}$, $Z^{a l 1}$, $Z^{a l 2}$, $L^{a l 1}$, $L^{a l 2}$, $L^{a l 3}$, $Sp^{a l 1}$, $Sp^{a l 2}$, $Sp^{a l 3}$, $X^{a l 1}$, $X^{a l 2}$, $X^{a l 3}$, $m^{a l 1}$, $m^{a l 2}$, $m^{a l 3}$, $n^{a l 1}$, $n^{a l 2}$, $n^{a l 3}$, $p^{a l 1}$, and $p^{a l 2}$ are independent of each other;

$R^{a l 1}$ represents a hydrogen atom, a halogen atom, a linear, branched or cyclic alkyl group having 1 to 20 carbon atoms, wherein in the alkyl group, one or two or more non-adjacent CH$_2$ groups may be substituted with —O—, —S—, —CO—, —CO—O—, —O—CO—, or —O—CO—O— so that the O and/or S atoms are not directly bonded to each other, and in addition, one or two or more hydrogen atoms may be replaced by F or Cl;

$R^{a l 2}$ represents a polar group having any of the following partial structures:

[Chem. 15]

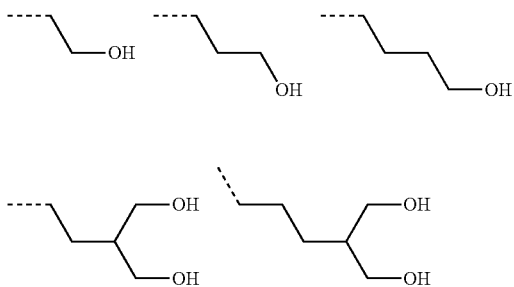

-continued

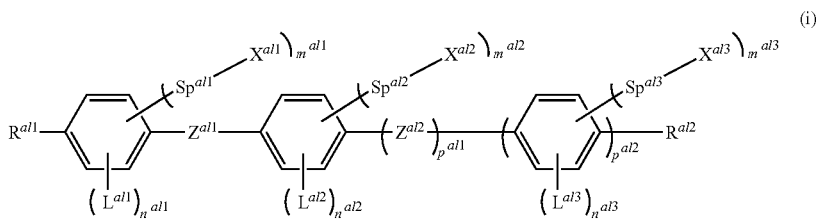

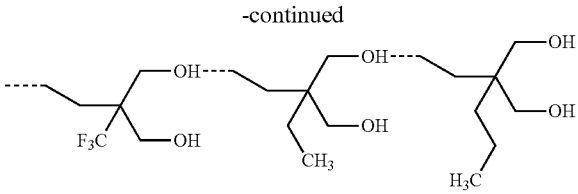

-continued

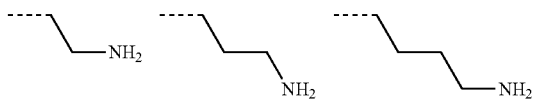

[Chem. 16]

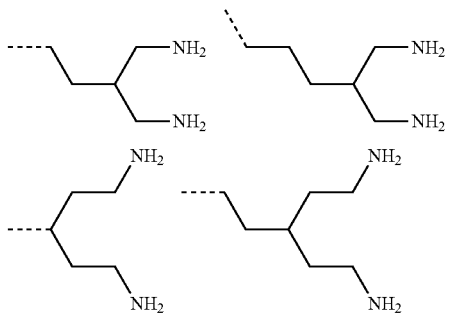

-continued

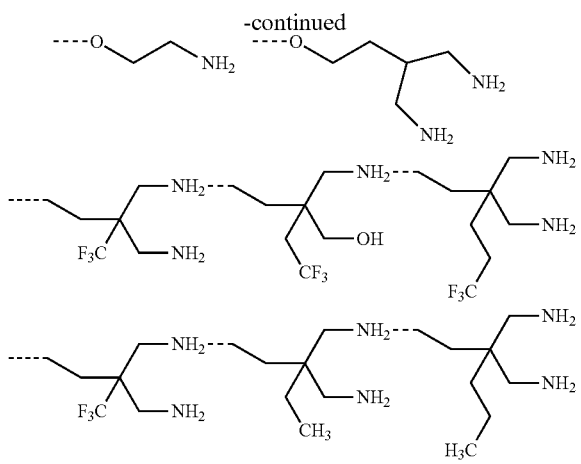

Sp$^{a l1}$, Sp$^{a l2}$, and Sp$^{a l3}$ each independently represent an alkyl group having 1 to 12 carbon atoms or a single bond;

X$^{a l1}$, X$^{a l2}$, and X$^{a l3}$ each independently represent an alkyl group, an acrylic group, a methacryl group, or a vinyl group;

Z$^{a l1}$ represents —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_n^{a l}$—, —CF$_2$CH$_2$—, —CH$_2$CF$_2$—, —(CF$_2$)$_n^{a l}$—, —CH=CH—, —CF=CF—, —C≡C—, —CH=CH—COO—, —OCO—CH=CH—, —(CR$^{a l3}$R$^{a l4}$)$_n^{a l}$—, —CH(-Sp$^{a l1}$-X$^{a l1}$)—, —CH$_2$CH(-Sp$^{a l1}$-X$^{a l1}$)—, or —CH(-Sp$^{a l1}$-X$^{a l1}$)CH(-Sp$^{a l1}$-X$^{a l1}$);

Z$^{a l2}$ represents a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)n1-, —CF$_2$CH$_2$—, —CH$_2$CF$_2$—, —(CF$_2$)$_n^{a l}$—, —CH=CH—, —CF=CF—, —C≡C—, —CH=CH—COO—, —OCO—CH=CH—, —(CR$^{a l3}$R$^{a l4}$)$_n^{a l}$—, —CH(-Sp$^{a l1}$-X$^{a l1}$)—, —CH$_2$CH(-Sp$^{a l1}$-X$^{a l1}$)—, or —CH(-Sp$^{a l1}$-X$^{a l1}$)CH(-Sp$^{a l1}$-X$^{a l1}$);

L$^{a l1}$, L$^{a l2}$, and L$^{a l3}$ each independently represent a hydrogen atom, a fluorine atom, a chlorine atom, a bromine atom, an iodine atom, —CN, —NO$_2$, —NCO, —NCS, —OCN, —SCN, —C(=O)N(R$^{a l3}$)$_2$, —C(=O)R$^{a l3}$, an optionally substituted silyl group having 3 to 15 carbon atoms, an optionally substituted aryl or cycloalkyl group or 1 to 25 carbon atoms, wherein one or two or more hydrogen atoms may be replaced by a halogen atom (fluorine atom, chlorine atom);

R$^{a l3}$ represents an alkyl group having 1 to 12 carbon atoms; R$^{a l4}$ represents a hydrogen atom or an alkyl group having 1 to 12 carbon atoms; n$^{a l}$ represents an integer of 1 to 4;

p$^{a l1}$ and p$^{a l2}$ each independently represent 0 or 1; m$^{a l1}$, m$^{a l2}$ and m$^{a l3}$ each independently represent an integer of 0 to 3; and n$^{a l1}$, n$^{a l2}$ and n$^{a l3}$ each independently represent an integer of 0 to 3.

General Formula (ii):

[Chem. 17]

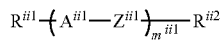

(ii)

In the formula, Z$^{ii1}$ represents a single bond, —CH=CH—, —CF=CF—, —C≡C—, —COO—, —OCO—, —OCOO—, —OOCO—, —CF$_2$O—, —OCF$_2$—, —CH=CHCOO—, —OCOCH=CH—, —CH$_2$—CH$_2$COO—, —OCOCH$_2$—CH$_2$—, —CH=C(CH$_3$)COO—, —OCOC(CH$_3$)=CH—, —CH$_2$—CH(CH$_3$)COO—, —OCOCH(CH$_3$)—CH$_2$—, —OCH$_2$CH$_2$O—, or an alkylene group having 2 to 20 carbon atoms, and one or two or more non-adjacent —CH$_2$— in the alkylene group may be substituted with —O—, —COO—, or —OCO—;

A$^{ii1}$ represents a divalent 6-membered ring aromatic group, a divalent 6-membered ring heteroaromatic group, a divalent 6-membered ring aliphatic group, or a divalent 6-membered heteroaliphatic group, wherein a hydrogen atom in these cyclic structures may be substituted with a halogen atom, P$^{11}$—S$^{11}$—, a monovalent organic group having a polar group represented by the general formula (K), or R$^{i1}$, but at least one is substituted with P$^{11}$—S$^{11}$—; in the case where a plurality of each of Z$^{ii1}$ and A$^{ii1}$ are present, these may be the same as or different from each other;

m$^{ii1}$ represents an integer of 1 to 5;

R$^{ii1}$ and R$^{ii2}$ each independently represent a hydrogen atom, a linear or branched alkyl group having 1 to 40 carbon atoms, a halogenated alkyl group, or P$^{i1}$-Sp$^{i1}$-, and —CH$_2$— in the alkyl group may be substituted with —CH=CH—, —C≡C—, —O—, —NH—, —COO—, or —OCO—, but —O— is not continuous, at least one of R$^{ii1}$ and R$^{ii2}$ represents a monovalent organic group having a polar group represented by the general formula (K), and one or two or more P$^{11}$—S12 in the general formula (ii), one or two or more monovalent organic groups having a polar group represented by the general formulae (K), and one or two or more R$^{ii1}$.

The above P$^{11}$—S12- (wherein P$^{11}$ represents a polymerizable group, and represents a substituent selected from the group represented by the general formulae (R-I) to (R-IX)), a monovalent organic group having a polar group represented by the general formula (K) (wherein the general formula (K) has a partial structure represented by any of the general formulae (K-1) to (K-23)), and R$^{i1}$ (wherein R$^{i1}$ represents a hydrogen atom, a linear or branched alkyl group having 1 to 40 carbon atoms, a halogenated alkyl group, or P$^{i1}$-Sp$^{i1}$-, and —CH$_2$— in the alkyl group may be substituted with —CH=CH—, —C≡C—, —O—, —NH—, —COO—, or —OCO—, but —O— is not continuous.

In the general formula (ii), Z$^{ii1}$ preferably represents a single bond, —CH=CH—, —C≡C—, —COO—, —OCO—, —OCOO—, —OOCO—, —CH=CHCOO—, —OCOCH=CH—, —CH$_2$—CH$_2$COO—, —OCOCH$_2$—CH$_2$—, —CH=C(CH$_3$)COO—, —OCOC(CH$_3$)=CH—, —CH$_2$—CH(CH$_3$)COO—, —OCOCH(CH$_3$)—CH$_2$—, —OCH$_2$CH$_2$O—, or a linear or branched alkylene group having 1 to 40 carbon atoms, or a group in which one or two or more non-adjacent —CH$_2$— in the alkylene group are substituted with —O—, more preferably represents a single bond, —COO—, —OCO—, —CH=CHCOO—, —OCOCH=CH—, —CH$_2$—CH$_2$COO—, —OCOCH$_2$—CH$_2$—, —CH=C(CH$_3$)COO—, —OCOC(CH$_3$)=CH—, —CH$_2$—CH(CH$_3$)COO—, —OCOCH(CH$_3$)—CH$_2$—, —OCH$_2$CH$_2$O—, or a linear or branched alkylene group having 1 to 40 carbon atoms, or a group in which one or two or more non-adjacent —CH$_2$— in the alkylene group are substituted with —O—, a single bond, a linear or branched alkylene group having 2 to 15 carbon atoms, or a group in which one or two or more non-adjacent —CH$_2$— in the alkylene group are substituted with —O—, and still more preferably represents a single bond, CH$_2$—CH$_2$COO—, —OCOCH$_2$—CH$_2$—, —CH=C(CH$_3$)COO—, —OCOC(CH$_3$)=CH—, —CH$_2$—CH(CH$_3$)COO—, —OCOCH ($CH_3$)—$CH_2$—, —$OCH_2CH_2O$—, or an alkylene group having 2 carbon atoms (ethylene group (—$CH_2CH_2$—)) or a group in which one —$CH_2$— in the ethylene group is substituted with —O— (—$CH_2O$—, —$OCH_2$—), or a linear alkylene group having 3 to 13 carbon atoms or a group in which one or two or more non-adjacent —$CH_2$— in the alkylene group are substituted with —O—.

$A^{ii1}$ preferably represents a divalent 6-membered aromatic group or a divalent 6-membered aliphatic group, but a divalent unsubstituted 6-membered aromatic group or a divalent unsubstituted 6-membered aliphatic group is preferable, and a hydrogen atom in these cyclic structures is preferably not substituted or substituted with an alkyl group having 1 to 6 carbon atoms, an alkoxy group having 1 to 6 carbon atoms, or a halogen atom. Preferred is a divalent unsubstituted 6-membered aromatic group or a group in which a hydrogen atom in this cyclic structure is substituted with a fluorine atom, or a divalent unsubstituted 6-membered cyclic aliphatic group, and preferred is a 1,4-phenylene group, a 2,6-naphthalene group or a 1,4-cyclohexyl group in which a hydrogen atom on the substituent may be substituted with a halogen atom, an alkyl group or an alkoxy group, but at least one substituent is substituted with $P^{i1}$-$Sp^{i1}$-.

$m^{ii1}$ preferably represents an integer of 2 to 5, and more preferably represents an integer of 2 to 4.

General Formula (iii):

[Chem. 18]

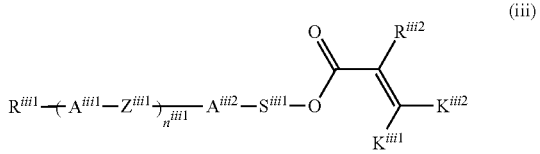
(iii)

In the general formula (iii), $R^{iii1}$ is an alkyl group having 1 to 15 carbon atoms, in which at least one —$CH_2$— in the alkyl group may be substituted with —O— or —S— and has at least one —$(CH_2)_2$— may be substituted with —CH=CH— or —C≡C—, and in these groups, at least one hydrogen atom may be substituted with a halogen atom;

$A^{iii1}$ and $A^{iii4}$ are each independently 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl, anthracene-2,6-diyl, perhydrocyclopenta [a] phenanthrene-3,17-diyl, or 2,3,4,7,8,9,10,11,12,13,14,15,16,17-tetradecahydrocyclopent a [a] phenanthrene-3,17-diyl, and in these rings, at least one hydrogen atom may be substituted with a fluorine atom, a chlorine atom, an alkyl group having 1 to 12 carbon atoms, an alkenyl group having 2 to 12 carbon atoms, an alkoxy group having 1 to 11 carbon atoms, or an alkenyloxy group having 2 to 11 carbon atoms, and at least one hydrogen atom in these groups may be substituted with a fluorine atom or a chlorine atom;

$Z^{iii1}$ is a single bond or alkylene having 1 to 10 carbon atoms, and in the alkylene, at least one —$CH_2$— may be substituted with —O—, —CO—, —COO—, —OCO—, or —OCOO—, at least one —$(CH_2)_2$— may be substituted with —CH=CH— or —C≡C—, and in these groups, at least one hydrogen atom may be substituted with a halogen atom;

$S^{iii1}$ is a single bond or an alkylene group having 1 to 10 carbon atoms, and in the alkylene group, at least one —$CH_2$— may be substituted with —O—, —CO—, —COO—, —OCO—, or —OCOO—, at least one —$(CH_2)_2$— may be substituted with —CH=CH— or —C≡C—, and in these groups, at least one hydrogen may be substituted with a halogen atom;

$K^{iii1}$ and $K^{iii2}$ are each independently a hydrogen atom, a halogen atom, an alkyl group having 1 to 5 carbon atoms, or an alkyl group having 1 to 5 carbon atoms in which at least one hydrogen atom is substituted with a halogen atom (for example, a fluorine atom);

$n^{iii1}$ is 0, 1, 2, 3, or 4;

$R^{iii2}$ is a group represented by formula (iii-1) or formula (iii-2).

[Chem. 19]

(iii-1)

(iii-2)

In formula (iii-1) and formula (iii-2), $S^{iii2}$ and $S^{iii3}$ are each independently a single bond or an alkylene group having 1 to 10 carbon atoms, and in the alkylene group, at least one —$CH_2$— may be substituted with —O—, —NH—, —CO—, —COO—, —OCO—, or —OCOO—, and at least one —$(CH_2)_2$— may be substituted with —CH=CH— or —C≡C—, and in these groups, at least one hydrogen atom may be substituted with a halogen atom;

$S^{iii1}$ is =CH— or =N—;

$X^{iii1}$ is a group represented by —OH, —$NH_2$, —$OR^3$, —$N(R^3)_2$, Formula ($X^{iii1}$), —COOH, —SH, —$B(OH)_2$, or —Si $(R^3)_3$, wherein $R^3$ is a hydrogen atom or an alkyl group having 1 to 10 carbon atoms, and in the alkyl group, at least one —$CH_2$— may be substituted with —O— or —CH=CH—, and in these groups, at least one hydrogen atom may be substituted with a halogen atom; Formula ($X^{iii1}$):

[Chem. 20]

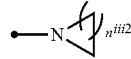

(wherein $n^{iii2}$ is an integer of 1 to 5.)

General Formula (iv):

[Chem. 21]

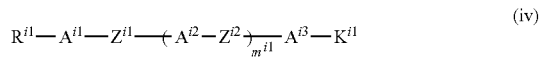
(iv)

Since the compound represented by the general formula (iv) has a partial structure represented by $K^{i1}$, when used in a liquid crystal composition, it is possible to align the compound on a substrate holding the liquid crystal composition (liquid crystal layer) and liquid crystal molecules can be held in a state of being aligned in the vertical direction. Since the compound represented by the general formula (iv)

has a polar partial structure represented by $K^{i1}$, it is considered that the compound is adsorbed to the substrate holding the liquid crystal composition (liquid crystal layer) and that the compound has a partial structure represented by $K^{i1}$ at the end of the compound, so that liquid crystal molecules are held in a state of being aligned in the vertical direction. Therefore, according to the liquid crystal composition using the polymerizable compound of the present embodiment, it is possible to align liquid crystal molecules without providing the PI layer (vertical alignment of liquid crystal molecules is induced when no voltage is applied, and horizontal alignment of liquid crystal molecules can be achieved when voltage is applied). Therefore, the liquid crystal composition containing the compound (iv) is suitably used to aid in the vertical alignment of liquid crystal molecules.

In addition, the present inventors have found that a liquid crystal composition containing the compound (iv) in the present embodiment has a partial structure represented by $K^{i1}$, whereby not only the alignment of liquid crystal molecules but also the storage stability of the liquid crystal composition can be secured.

Further, since the liquid crystal composition containing the compound (iv) represented by the general formula (iv) has a polymerizable group at a specific position as a substituent of $A^{i2}$ or $A^{i3}$ or a substituent of $K^{i1}$, it is possible to maintain a better orientation.

In view of the above, the compound (iv) in the liquid crystal composition of the present embodiment may have a partial structure represented by $K^{i1}$ at the terminal of the molecule, preferably at the end of the main chain of the molecule, and the chemical structure of the binding target to which the partial structure represented by $K^{i1}$ is bonded is not particularly limited as long as it does not inhibit the function of the liquid crystal composition.

Specific examples of the compound represented by the general formula (iv) will be described below.

$K^{i1}$ in the general formula (iv) is preferably a linear or branched alkyl group having 3 to 40 carbon atoms, a linear or branched halogenated alkyl group having 3 to 40 carbon atoms, or a linear or branched cyanated alkyl group having 3 to 40 carbon atoms, wherein at least two or more secondary carbon atoms in $K^{i1}$ are substituted with —(C=$X^{i1}$)— and/or —(CH—CN)—, at least two or more secondary carbon atoms in $K^{i1}$ are preferably substituted with —(C=$X^{i1}$)—, at least three or more secondary carbon atoms are preferably substituted with —(C=$X^{i1}$)—, and at least four or more secondary carbon atoms are preferably substituted with —(C=$X^{i1}$)—. $X^{i1}$ is preferably an oxygen atom from the viewpoint of improving the voltage holding ratio (VHR). $K^{i1}$ preferably represents a linear or branched alkyl group having 3 to 30 carbon atoms, a linear or branched halogenated alkyl group, or a linear or branched cyanated alkyl group, and a secondary carbon atom in the alkyl group may be substituted with —(C=$CH_2$)—, —(C=CHR$^{i3}$)—, —(C=CR$^{i3}{}_2$)—, —CH=CH—, —C≡C—, or —O— so long as oxygen atoms are not directly adjacent to each other, more preferably represents a linear or branched alkyl group having 3 to 20 carbon atoms or a linear or branched cyanated alkyl group, and a secondary carbon atom in the alkyl group may be substituted with —(C=$CH_2$)—, —(C=CHR$^{i3}$)—, —(C=CR$^{i3}{}_2$)—, or —O— so long as oxygen atoms are not directly adjacent to each other, and more preferably represents a branched alkyl group having 3 to 20 carbon atoms or a branched cyanated alkyl group, and a secondary carbon atom in the alkyl group may be substituted with —(C=$CH_2$)—, or —O— so long as oxygen atoms are not directly adjacent to each other. $R^{i3}$ is preferably a linear or branched alkyl group having 1 to 10 carbon atoms, preferably an alkyl group having 1 to 7 carbon atoms, preferably an alkyl group having 1 to 3 carbon atoms, and a secondary carbon atom in the alkyl group may be substituted with —O—, —CH=CH—, or —C≡C— so long as oxygen atoms are not directly adjacent to each other.

It is also preferred that the hydrogen atom in $K^{i1}$ is substituted with a polymerizable group, i.e., $P^{i1}$-$Sp^{i1}$-. When a polar group and a polymerizable group are present in the $K^{i1}$, a better orientation is obtained.

$K^{i1}$ preferably represents the general formula (K-24).

[Chem. 22]

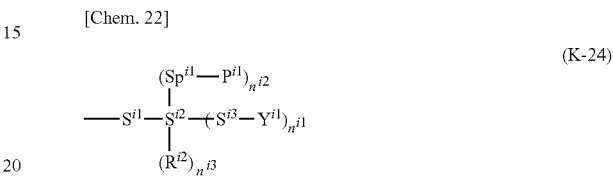

(K-24)

In the formula, $Y^{i1}$ represents a linear or branched alkyl group having 3 to 20 carbon atoms, a halogenated alkyl group, or a cyanated alkyl group, and at least two or more secondary carbon atoms in these alkyl groups are substituted with —(C=$X^{i1}$)— and/or —(CH—CN)—, and the secondary carbon atom in the alkyl groups may be substituted with —CH=CH—, —C≡C—, —O—, —NH—, —COO—, or —OCO— so long as oxygen atoms are not directly adjacent to each other, and the hydrogen atom in these alkyl groups may be substituted with $P^{i1}$-$Sp^{i1}$-, wherein $X^{i1}$ represents an oxygen atom, a sulfur atom, NH, or $NR^{i3}$;

$S^{i1}$ and $S^{i3}$ each independently represent an alkylene group having 1 to 6 carbon atoms or a single bond, and —$CH_2$— in the alkylene group may be substituted with —CH=CH—, —C≡C—, —(C=$CH_2$)—, —(C=CHR$^{i3}$)—, —(C=CR$^{i3}{}_2$)—, —O—, —NH—, —(C=O)—, —COO—, or —OCO— so long as oxygen atoms are not directly adjacent to each other;

$S^{i2}$ represents a carbon atom, a nitrogen atom, or a silicon atom;

$R^{i2}$ represents a hydrogen atom, a linear or branched alkyl group having 1 to 20 carbon atoms, a halogenated alkyl group, or a cyanated alkyl group, and a secondary carbon atom in these groups may be substituted with —O—, —CH=CH—, —C≡C—, —C(=$X^{i1}$)—, or —CH(—CN)— so long as oxygen atoms are not directly adjacent to each other;

$P^{i1}$ represents a polymerizable group;

$Sp^{i1}$ represents a spacer group or a single bond;

$n^{i1}$ represents an integer of 1 to 3; $n^{i2}$ and $n^{i3}$ each independently represent an integer of 0 to 2, but when $S^{i2}$ represents a carbon atom or a silicon atom, $n^{i1}+n^{i2}+n^{i3}$ is 3, and when $S^{i2}$ represents a nitrogen atom, $n^{i1}+n^{i2}+n^{i3}$ is 2. $R^{i3}$ has the same meaning as $R^{i3}$ in the general formula (i), and in the case where a plurality of each of $R^{i2}$, $X^{i1}$, $Y^{i1}$, $S^{i1}$, $S^{i3}$, $P^{i1}$, and $Sp^{i1}$ are present in the general formula (K-1), these may be the same as or different from each other.

$S^{i1}$ and $S^{i3}$ in the general formula (K-1) are preferably a linear or branched alkylene group having 1 to 6 carbon atoms or a single bond, and —$CH_2$— in the alkylene group may be substituted with —CH=CH—, —(C=$CH_2$)—, —O—, —(C=O)—, —COO—, or —OCO— so long as oxygen atoms are not directly adjacent to each other, and more preferably a single bond, a linear alkylene group having 1 to 6 carbon atoms, or a group in which —$CH_2$— in the alkylene group is substituted with —O— so long as oxygen atoms are not directly adjacent to each other. $S^{i1}$ and $S^{i3}$ specifically and preferably represent —(CH$_2$)n-, —O—(CH$_2$)n-, —(CH$_2$)n-O—, —(CH$_2$)n-O—(CH$_2$)m-, —COO— (CH$_2$)n-, or —OCO— (CH$_2$)n- (n and m represent an integer of 1 to 6).

$S^{i2}$ is preferably a carbon atom. $R^{i2}$ preferably represents a hydrogen atom or a linear or branched alkyl group having 1 to 10 carbon atoms, and —CH$_2$— in the alkyl group may be substituted with —O—, —C(=X$^{i1}$)—, or —CH(—CN)— (wherein —O— is not continuous), preferably represents a hydrogen atom or a linear or branched alkyl group having 1 to 7 carbon atoms. And —CH$_2$— in the alkyl group may be substituted with —O—, —C(=X$^{i1}$)—, or —CH(—CN)— (wherein —O— is not continuous), and more preferably a hydrogen atom or a linear alkyl group having 1 to 3 carbon atoms.

$Y^{i1}$ is an alkyl group having 3 to 20 carbon atoms, a linear or branched halogenated alkyl group having 3 to 20 carbon atoms, or a linear or branched cyanated alkyl group having 3 to 20 carbon atoms, wherein at least two or more secondary carbon atoms in $Y^{i1}$ are substituted with —(C=X$^{i1}$)— and/or —(CH—CN)—, and at least two or more secondary carbon atoms in $Y^{i1}$ are preferably substituted with —(C=X$^1$)—. $X^{i1}$ is preferably an oxygen atom from the viewpoint of improving the voltage holding ratio (VHR). $Y^{i1}$ preferably represents a linear or branched alkyl group having 3 to 10 carbon atoms, a halogenated alkyl group, or a cyanated alkyl group, and a secondary carbon atom in the alkyl group may be substituted with —(C=CH$_2$)—, —(C=CHR$^{i3}$)—, —(C=CR$^{i3}_2$)—, —CH=CH—, —C≡C—, or —O— so long as oxygen atoms are not directly adjacent to each other, more preferably represents a linear or branched alkyl group having 3 to 7 carbon atoms or a cyanated alkyl group, and a secondary carbon atom in the alkyl group may be substituted with —(C=CH$_2$)—, —(C=CHR$^{i3}$)—, —(C=CR$^{i3}_2$)—, or —O— so long as oxygen atoms are not directly adjacent to each other, and more preferably represents a linear or branched alkyl group having 3 to 7 carbon atoms, and a secondary carbon atom in the alkyl group may be substituted with —O— so long as oxygen atoms are not directly adjacent to each other. In addition, the hydrogen atom in the alkyl group may be substituted with $p^{i1}$-Sp$^{i1}$-.

It is preferable that $Y^{i1}$ represents a group selected from the general formula (Y-1) from the viewpoint of improving the alignment property of the liquid crystal.

[Chem. 23]

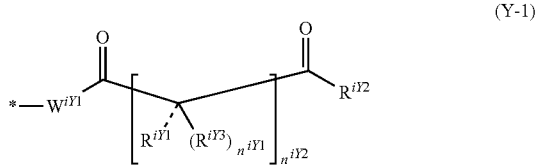

(Y-1)

In the formula, $W^{iY1}$ represents a single bond or an oxygen atom; a broken line represents a single bond or a double bond; $R^{iY1}$ represents a hydrogen atom, a linear or branched alkyl group having 1 to 20 carbon atoms, or $P^{i1}$-Sp$^{i1}$-, and a secondary carbon atom in the alkyl group may be substituted with —O—, —CH=CH—, —C≡C—, or —CO— so long as oxygen atoms are not directly adjacent to each other, when the broken line represents a single bond, and $R^{iY1}$ represents =CH$_2$, =CHR$^{iY4}$, or =CR$^{iY4}_2$ when the broken line represents a double bond, and $R^{iY4}$ represents a hydrogen atom or a linear or branched alkyl group having 1 to 20 carbon atoms, and a secondary carbon atom in the alkyl group may be substituted with —O—, —CH=CH—, or —C≡C— so long as oxygen atoms are not directly adjacent to each other; $R^{iY3}$ represents the same meaning as $R^{iY1}$ when the broken line represents a single bond; $R^{iY2}$ represents a hydrogen atom, a linear or branched alkyl group having 1 to 20 carbon atoms, a halogenated alkyl group, or a cyanated alkyl group, and the secondary carbon atom in these alkyl groups may be substituted with —CH=CH—, —C≡C—, —O—, —NH—, —COO—, —OCO—, —C(=O)—, or —CH$_2$(—CN)— so long as oxygen atoms are not directly adjacent to each other and $R^{iY2}$ represents $P^{i1}$-Sp$^{i1}$-; $n^{iY1}$ is 0 when the broken line represents a double bond, and $n^{iY1}$ is 1 when the broken line represents a single bond; $n^{iY2}$ represents an integer of 0 to 5; $P^{i1}$ represents a polymerizable group; $Sp^{i1}$ represents a spacer group or a single bond; and in the case where a plurality of $R^{iY1}$, $R^{iY3}$, $R^{iY4}$, $P^{i1}$, and $Sp^{i1}$ are present, these may be the same as or different from each other; and the structure of the formula binds to $S^{i3}$ at *.

$R^{iY1}$ is preferably a hydrogen atom or a linear or branched alkyl group having 1 to 10 carbon atoms, preferably a hydrogen atom or an alkyl group having 1 to 7 carbon atoms, preferably a hydrogen atom or an alkyl group having 1 to 3 carbon atom when the broken line represents a single bond, and a secondary carbon atom in the alkyl group may be substituted with —O—, —CH=CH— or —C≡C— so long as oxygen atoms are not directly adjacent to each other. Specifically, $R^{iY1}$ preferably represents a hydrogen atom, and from the viewpoint of improving heat resistance, $R^{iY1}$ preferably represents an alkyl group having 1 to 3 carbon atoms, an alkoxy group having 1 to 3 carbon atoms, —CO—CH$_3$, or —CH$_2$—O—CH$_3$. Further, from the viewpoint of improving heat resistance, $R^{iY1}$ preferably represents $P^{i1}$-Sp$^{i1}$-. When $R^{iY1}$ represents $P^{i1}$-Sp$^{i1}$-, it is considered that the decomposition product generated by the decomposition of the compound represented by the general formula (i) by heat is polymerized, so that the increase in impurities can be prevented and the adverse effect on the liquid crystal composition is reduced. $P^{i1}$ represents a polymerizable group, and preferably represents an acryloyl group, a methacryloyl group, or a substituent selected from the group represented by the general formulae (P-1) to (P-15) described later. $Sp^{i1}$ preferably represents a linear alkylene group having 1 to 18 carbon atoms or a single bond, more preferably represents a linear alkylene group having 2 to 15 carbon atoms or a single bond, and still more preferably represents a linear alkylene group having 2 to 8 carbon atoms or a single bond.

When the broken line represents a double bond, it represents =CH$_2$, =CHR$^{iY4}$, or =CR$^{iY4}_2$, and it preferably represents CH$_2$. $R^{iY4}$ is preferably a linear or branched alkyl group having 1 to 10 carbon atoms, preferably an alkyl group having 1 to 7 carbon atoms, preferably an alkyl group having 1 to 3 carbon atoms, and a secondary carbon atom in the alkyl group may be substituted with —O—, —CH=CH—, or —C≡C— so long as oxygen atoms are not directly adjacent to each other.

A preferred group of $R^{iY3}$ is the same as the preferred group of $R^{iY1}$ in the case where the broken line represents a single bond. $n^{iY1}$ is preferably 0.

Preferable combinations of $R^{iY1}$ and $R^{iY3}$ include both hydrogen atoms, both alkyl groups having 1 to 3 carbon atoms, both alkoxy groups having 1 to 3 carbon atoms, and both —CH$_2$—O—CH$_3$. When one of $R^{iY1}$ and $R^{iY3}$ represents $P^{i1}$-$Sp^{i1}$- or —CO—CH$_3$, it is preferable that the other represents a hydrogen atom. $n^{iY2}$ is preferably an integer of 0 to 3, more preferably 0, 1, or 2, and still more preferably 0 or 1.

$R^{iY2}$ is preferably a hydrogen atom, an alkyl group having 1 to 10 carbon atoms, a halogenated alkyl group, or a cyanated alkyl group, preferably an alkyl group having 1 to 7 carbon atoms, a halogenated alkyl group, or a cyanated alkyl group, and preferably an alkyl groups having 1 to 3 carbon atoms.

In addition, it is preferable that the secondary carbon atom in the alkyl group is substituted with —O—, —(C=$X^{i2}$)—, or —(CH$_2$—CN)— so long as oxygen atoms are not directly adjacent to each other. $X^{i2}$ is preferably an oxygen atom from the viewpoint of improving VHR. $R^{iY2}$ preferably represents $P^{i1}$-$Sp^{i1}$-. When $R^{iY2}$ represents $P^{i1}$-$Sp^{i1}$-, it is considered that the decomposition product generated by the decomposition of the compound represented by the general formula (i) by heat is polymerized, so that the increase in impurities can be prevented and the adverse effect on the liquid crystal composition is reduced.

More specifically, the general formula (Y-1) is preferably a formula (Y-1-1), (Y-1-2), (Y-1-3a), (Y-1-3b), or (Y-1-4).

[Chem. 24]

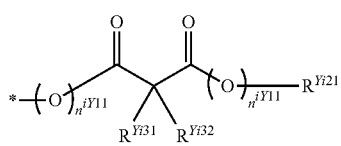
(Y-1-1)

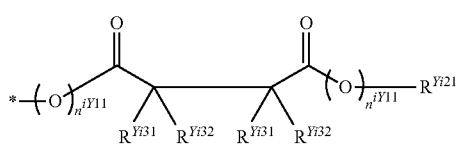
(Y-1-2)

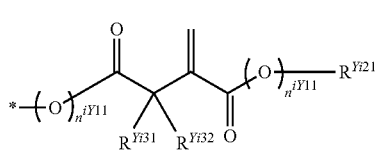
(Y-1-3a)

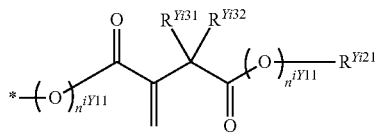
(Y-1-3b)

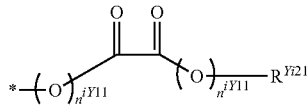
(Y-1-4)

In the formulae, $n^{iY11}$ represents 0 or 1, $R^{iY21}$ represents an alkyl group having 1 to 10 carbon atoms, a halogenated alkyl group, or a cyanated alkyl group, and the secondary carbon atom in these alkyl groups may be substituted with —CH=CH—, —C≡C—, —O—, —NH—, —COO—, —OCO—, —(C=O)—, or —(CH$_2$—CN)— so long as oxygen atoms are not directly adjacent to each other, and $R^{iY21}$ represents $P^{i1}$-$Sp^{i1}$-, $R^{iY31}$ and $R^{iY32}$ each independently represent a hydrogen atom or a linear or branched alkyl group having 1 to 10 carbon atoms, and the secondary carbon atom in the alkyl group may be substituted with —O—, —CH=CH—, —C≡C—, or —CO— so long as oxygen atoms are not directly adjacent to each other, and $R^{iY31}$ and $R^{iY32}$ represent $P^{i1}$-$Sp^{i1}$-.

$R^{iY21}$ is preferably an alkyl group having 1 to 7 carbon atoms, a halogenated alkyl group, or a cyanated alkyl group, and more preferably an alkyl group having 1 to 3 carbon atoms. $R^{iY21}$ preferably represents $P^{i1}$-$Sp^{i1}$-. $R^{iY31}$ and $R^{iY32}$ are preferably a hydrogen atom, an alkyl group having 1 to 5 carbon atoms, or an alkoxy group having 1 to 5 carbon atoms, and preferably represent a hydrogen atom or an alkyl group having 1 to 3 carbon atoms, an alkoxy group having 1 to 3 carbon atoms, —CO—CH$_3$, —CH$_2$—O—CH$_3$. It is preferable that at least one of $R^{iY31}$ and $R^{iY32}$ represents $P^{i1}$-$Sp^{i1}$-.

From the viewpoint of improving compatibility with a liquid crystal compound, it is preferable to have a structure of the formula (Y-1-1). As the formula (Y-1-1), the formulae (Y-1-1a) to (Y-1-1h) are preferable.

[Chem. 25]

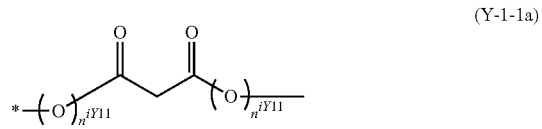
(Y-1-1a)

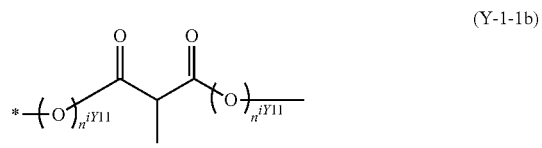
(Y-1-1b)

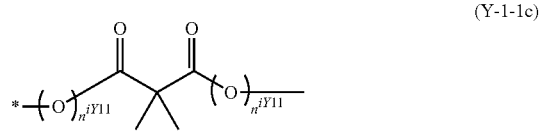
(Y-1-1c)

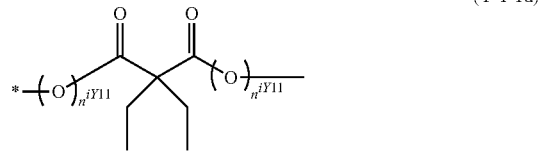
(Y-1-1d)

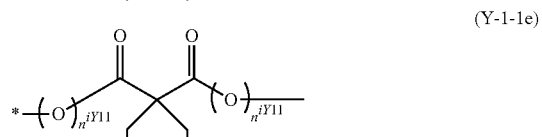
(Y-1-1e)

(Y-1-1f)

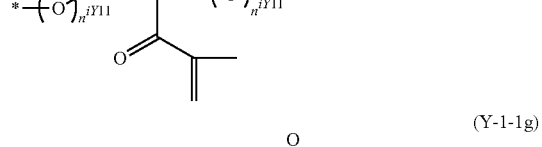
(Y-1-1g)

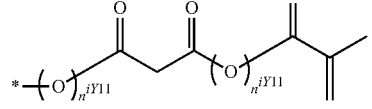

(Y-1-1h)

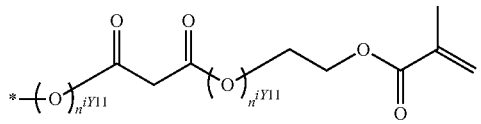

In the formulae, $n^{iY11}$ represents 0 or 1.

From the viewpoint of improving compatibility with the liquid crystal compound and heat resistance, it is preferable to have a structure of the formula (Y-1-2). As the formula (Y-1-2), the formulae (Y-1-2a) to (Y-1-2f) are preferable.

[Chem. 26]

(Y-1-2a)
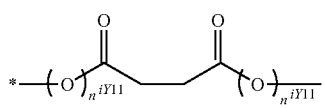

(Y-1-2b)
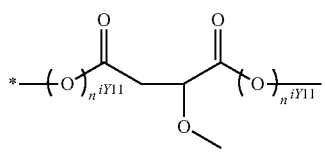

(Y-1-2c)
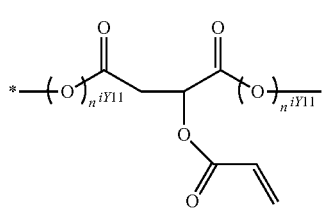

(Y-1-2d)
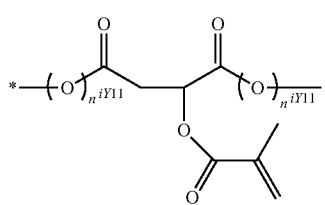

(Y-1-2e)
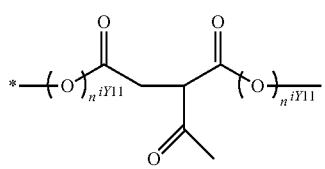

(Y-1-2f)
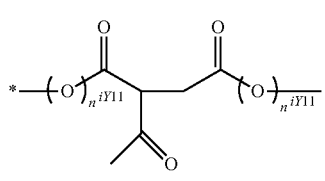

(Y-1-2g)
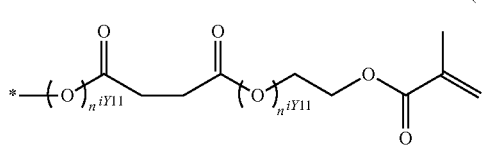

In the formulae, $n^{iY11}$ represents 0 or 1. From the viewpoint of improving heat resistance, it is preferable to have a structure of the formula (Y-1-3a) and the formula (Y-1-3b). As the formula (Y-1-3a), the formula (Y-1-3aa) is preferable and as the formula (Y-1-3b), the formula (Y-1-3ba) is preferable.

[Chem. 27]

(Y-1-3aa)
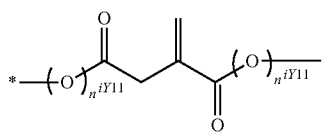

(Y-1-3ba)
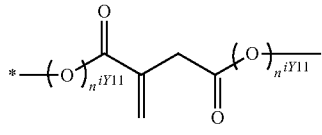

In the formulae, $n^{iY11}$ represents 0 or 1.

From the viewpoint of improving alignment property and voltage holding ratio of the liquid crystal composition, it is preferable to have a structure of the formula (Y-1-4).
As the formula (Y-1-4), the formulae (Y-1-4a) to (Y-1-4f) are preferable. In particular, the structures (Y-1-4a) to (Y-1-4c) are preferable because the balance between the compatibility of the liquid crystal compound and the alignment property of the liquid crystal composition is well-balanced.

[Chem. 28]

(Y-1-4a)
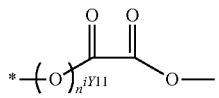

(Y-1-4b)
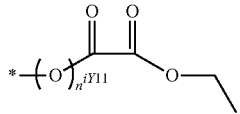

(Y-1-4c)
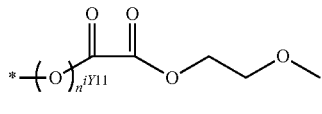

(Y-1-4d)
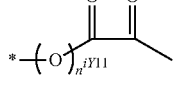

(Y-1-4e)
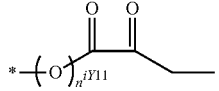

(Y-1-4f)
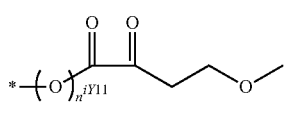

In the formulae, $n^{iY11}$ represents 0 or 1.

$Y^{i1}$ preferably represents a group selected from the general formula (Y-2).

[Chem. 29]

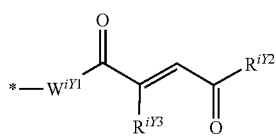 (Y-2)

In the formula, $W^{iY1}$, $R^{iY3}$, and $R^{iY2}$ have the same meanings as $W^{iY1}$, $R^{iY3}$, and $R^{iY2}$ in the general formula (Y-1), respectively.

The general formula (Y-2) preferably represents the general formula (Y-2-1).

[Chem. 30]

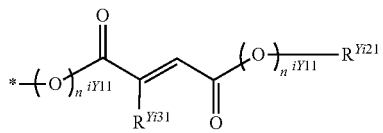 (Y-2-1)

In the formula, $n^{iY11}$, $R^{iY21}$, and $R^{i31}$ have the same meanings as $n^{iY11}$, $R^{iY21}$, and $R^{i31}$ in the general formula (Y-1-1), respectively.

In addition, $Y^{i1}$ preferably represents a group selected from the general formula (Y-3) from the viewpoint of improving heat resistance.

[Chem. 31]

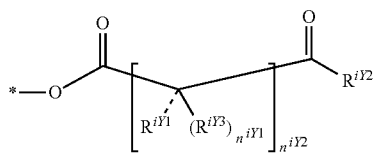 (Y-3)

In the formula, $R^{iY1}$, $R^{iY2}$, $R^{iY3}$, $n^{iY1}$, and $n^{iY1}$ have the same meanings as $R^{iY1}$, $R^{iY2}$, $R^{iY3}$, $n^{iY1}$, and $n^{iY1}$ in the general formula (Y-1), respectively.

The general formula (Y-3) preferably represents the general formula (Y-3-1) to the general formula (Y-3-4).

[Chem. 32]

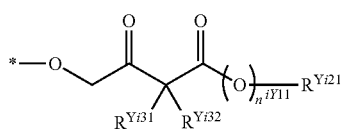 (Y-3-1)

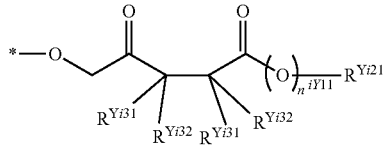 (Y-3-2)

-continued

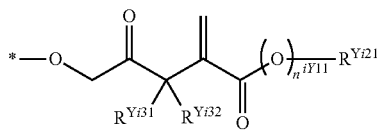 (Y-3-3a)

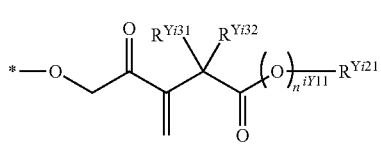 (Y-3-3b)

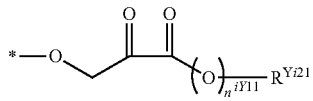 (Y-1-4)

In the formulae, $R^{iY21}$, $R^{iY31}$, $R^{iY32}$, and $n^{iY11}$ have the same meanings as $R^{iY21}$, $R^{iY31}$, $R^{iY32}$, and $n^{iY11}$ in the general formula (Y-1-1), respectively.

More specifically, the general formula (Y-3-1) is preferably the general formula (Y-3-11).

[Chem. 33]

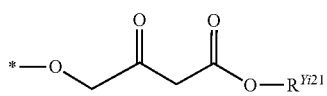 (Y-3-11)

In the formula, $R^{iY21}$ has the same meaning as $R^{iY21}$ in the general formula (Y-3-1).

In addition, $Y^{i1}$ preferably represents a group selected from the general formula (Y-4) from the viewpoint of improving heat resistance.

[Chem. 34]

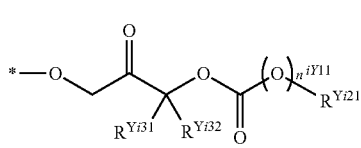 (Y-4)

In the formula, $R^{iY1}$, $R^{iY2}$, $R^{iY3}$, $n^{iY1}$, and $n^{iY1}$ have the same meanings as $R^{iY1}$, $R^{iY2}$, $R^{iY3}$, $n^{iY1}$, and $n^{iY1}$ in the general formula (Y-1), respectively.

The general formula (Y-4) preferably represents the general formula (Y-4-1) to the general formula (Y-4-3b).

[Chem. 35]

(Y-4-1)

(Y-4-2)

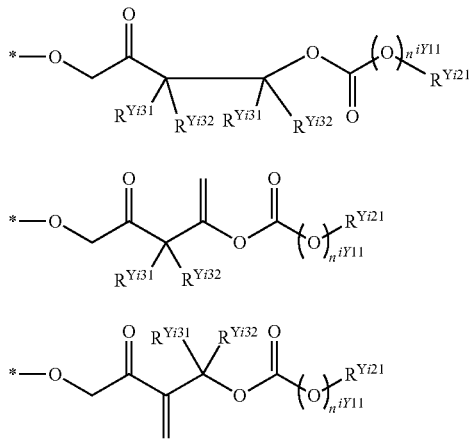

(Y-4-3a)

(Y-4-3b)

In the formulae, $R^{iY21}$, $R^{iY31}$, $R^{iY32}$, and $n^{iY11}$ have the same meanings as $R^{iY21}$, $R^{iY31}$, $R^{iY32}$, and $n^{iY11}$ in the general formula (Y-1-1), respectively.

More specifically, the general formula (Y-4-1) is preferably the general formula (Y-4-11).

[Chem. 36]

(Y-4-1)

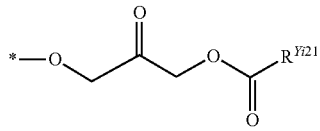

In the formula, $R^{iY21}$ has the same meaning as $R^{iY21}$ in the general formula (Y-4-1).

$P^{i1}$ preferably represents a substituent selected from the group represented by the following formulae (P-1) to (P-15). From the viewpoint of handling convenience and reactivity, any one of the substituents represented by the formulae (P-1) to (P-3) and (P-14), (P-15) is preferred, and the formulae (P-1) and (P-2) are more preferred.

[Chem. 37]

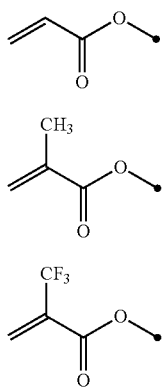

(P-1)

(P-2)

(P-3)

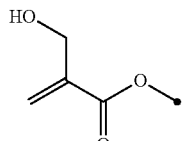

(P-4)

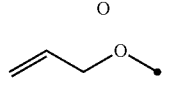

(P-5)

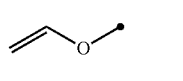

(P-6)

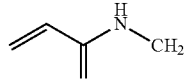

(P-7)

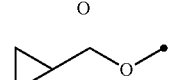

(P-8)

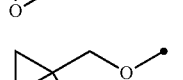

(P-9)

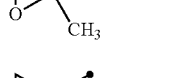

(P-10)

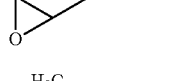

(P-11)

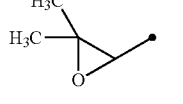

(P-12)

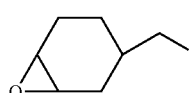

(P-13)

(P-14)

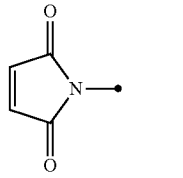

(P-15)

In the formulae, the black dot on the right end represents a bonding site.

$Sp^{i1}$ preferably represents a linear alkylene group having 1 to 18 carbon atoms or a single bond, more preferably represents a linear alkylene group having 2 to 15 carbon atoms or a single bond, and still more preferably represents a linear alkylene group having 2 to 8 carbon atoms or a single bond.

$n^{i1}$ preferably represents 1 or 2 from the viewpoint of improving alignment property of the liquid crystal and solubility in the liquid crystal compound. $n^{i2}$ preferably represents 0 or 1, and more preferably represents 1 from the viewpoint of improving alignment property.

$n^{i3}$ preferably represents 0 or 1.

The general formula (K-24) preferably represents a group selected from the general formula (K-24A) or (K-24B).

[Chem. 38]

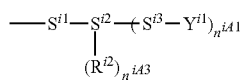
(K-24A)

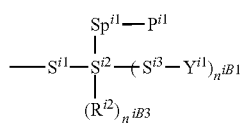
(K-24B)

In the formulae, $S^{i1}$, $S^{i2}$, $S^{i3}$, $Y^{i1}$, $P^{i1}$, and $Sp^{i1}$ have the same meanings as $S^{i1}$, $S^{i2}$, $S^{i3}$, $Y^{i1}$, $P^{i1}$, and $Sp^{i1}$ in the general formula (K-1), $n^{iA1}$ represents an integer of 1 to 3, $n^{iA3}$ represents an integer of 0 to 2, $n^{iB1}$ represents an integer of 1 to 2, and $n^{iB3}$ represents 0 or 1, but when $S^{i2}$ represents a carbon atom or a silicon atom, $n^{iA1}+n^{iA3}$ is 3 and $n^{iB1}+n^{iB3}$ is 2, when $S^{i2}$ represents a nitrogen atom, $n^{iA1}+n^{iA3}$ is 2, $n^{iB1}$ is 1, and $n^{iB3}$ is 0.

$K^{i1}$ in the formula (i) is an important structure for vertically aligning the liquid crystal composition, and since the polar group and the polymerization group are adjacent to each other, better alignment property can be obtained and good solubility in the liquid crystal composition is also exhibited. Therefore, when the alignment property of liquid crystal is important, the general formula (K-24B) is preferable. On the other hand, when the solubility in a liquid crystal compound is important, the general formula (K-24A) is preferable. Preferred examples of the general formulae (K-24A) to (K-24B) include the following formulae (K-24A-1) to (K-24A-4) and formulae (K-24B-1) to (K-24B-6), and from the viewpoint of solubility in the liquid crystal composition, the formulae (K-24A-1) to (K-24A-3) are preferable, and from the viewpoint of alignment property, the formulae (K-24B-2) to (K-24B-4) are preferable, and the formulae (K-24A-1), (K-24B-2), and (K-24B-4) are particularly preferable.

[Chem. 39]

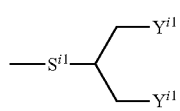
(K-24A-1)

(K-24A-2)

(K-24A-3)

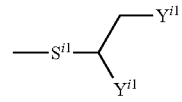
(K-24A-4)

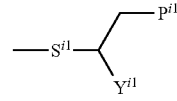
(K-24B-1)

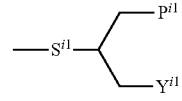
(K-24B-2)

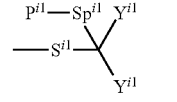
(K-24B-3)

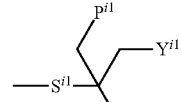
(K-24B-4)

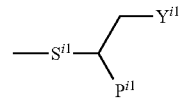
(K-24B-5)

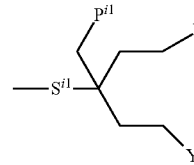
(K-24B-6)

In the formulae, $S^{i1}$, $Y^{i1}$, and $P^{i1}$ independently have the same meanings as $S^{i1}$, $Y^{i1}$, and $P^{i1}$ in the general formula (K-24), respectively.

The general formula (K-24) preferably represents a group selected from the general formulae (K-24-1), (K-24-2), (K-24-3a), (K-24-3b), (K-24-4a), (K-24-4b), (K-24-Y2), (K-24-Y3), and (K-24-Y4).

[Chem. 40]

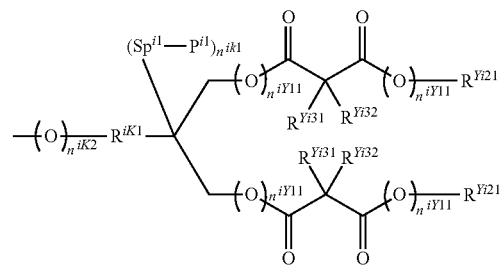
(K-24-1)

(K-24-2)

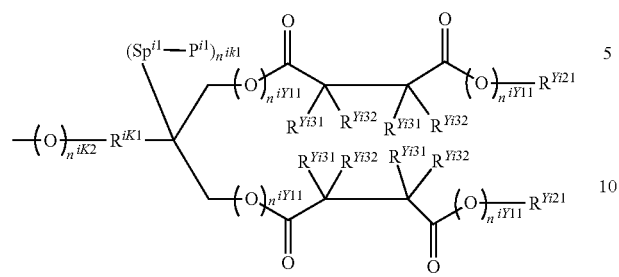

(K-24-Y2)

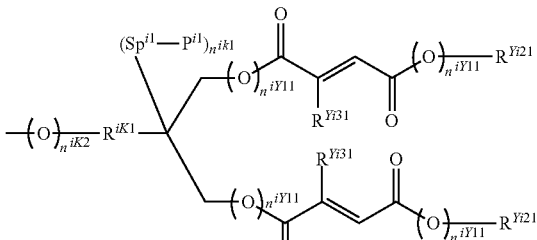

(K-24-3a)

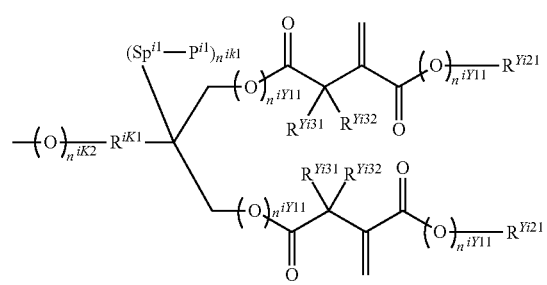

[Chem. 42]

(K-24-Y3)

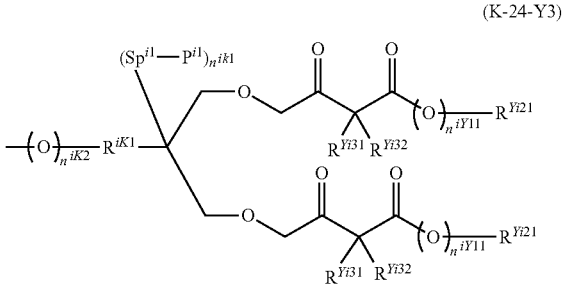

(K-24-3b)

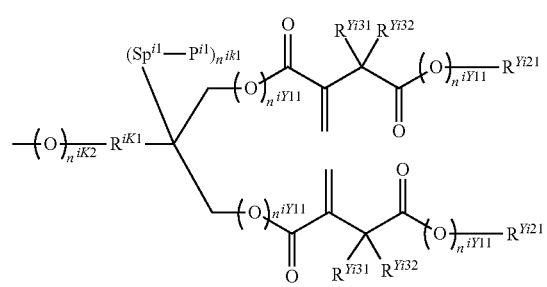

(K-24-Y4)

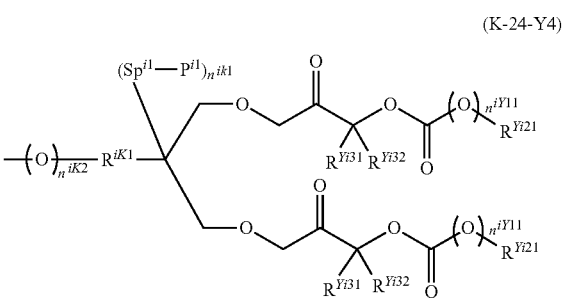

[Chem. 41]

(K-24-4a)

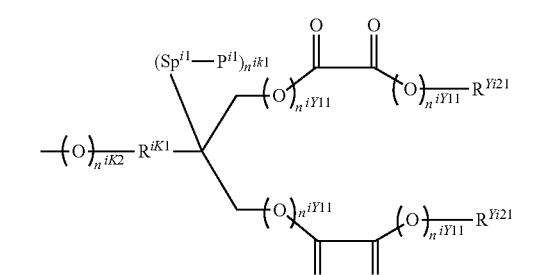

(K-24-4b)

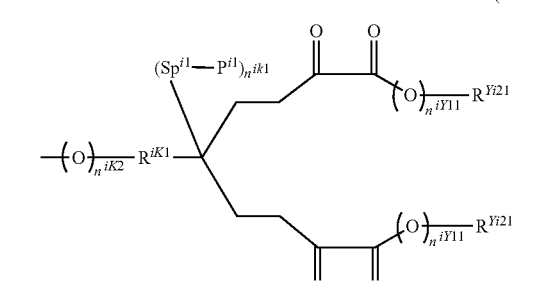

In the formulae, $n^{iY11}$, $R^{iY21}$, $R^{iY31}$, and $R^{iY32}$ independently have the same meanings as $n^{iY11}$, $R^{iY21}$, $R^{iY31}$, and $R^{iY32}$ in the general formulae (Y-1-1) to (Y-4), respectively, $Sp^{i1}$ and $P^{i1}$ have the same meanings as $Sp^{i1}$ and $P^{i1}$ in the general formula (i), respectively, $R^{iK1}$ represents an alkylene group having 1 to 6 carbon atoms or a single bond, and —CH$_2$— in the alkylene group may be substituted with —CH=CH—, —C≡C—, or —O— so long as oxygen atoms are not directly adjacent to each other, and $n^{iK1}$ and $n^{iK2}$ each independently represent 0 or 1.

$R^{iK1}$ is preferably a linear alkylene group having 1 to 6 carbon atoms, and more preferably a linear alkylene group having 1 to 3 carbon atoms. Preferred groups of $R^{iY21}$, $R^{iY31}$, $R^{iY32}$, $Sp^{i1}$, and $P^{i1}$ are the same as $R^{iY21}$, $R^{iY31}$, $R^{iY32}$, $Sp^{i1}$, and $P^{i1}$ of the general formulae (Y-1-1) to (Y-1-4), (Y-2) to (Y-4), and the general formula (i).

Further, $K^{i1}$ preferably represents the general formulae (K-25) to (K-28)

[Chem. 43]

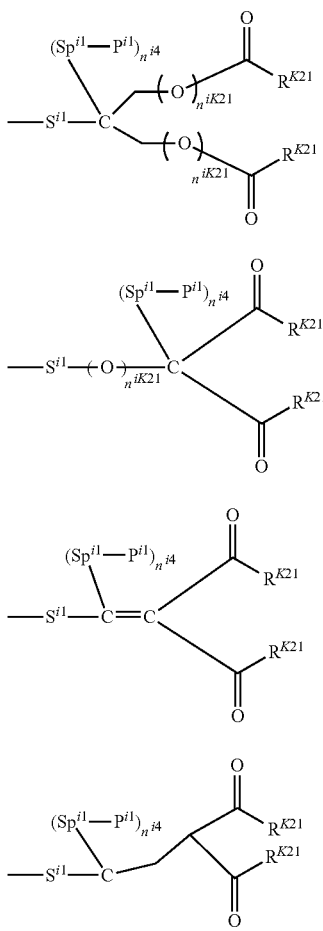

In the formulae, $S^{i1}$, $P^{i1}$, and $Sp^{i1}$ have the same meanings as $S^{i1}$, $p^{i1}$, and $Sp^{i1}$ in the general formula (K-24), respectively, $R^{K21}$ represents a linear or branched alkyl group having 1 to 10 carbon atoms, a halogenated alkyl group, or a cyanated alkyl group, and at least one or more secondary carbon atoms in these alkyl groups may be substituted with —CH=CH—, —C≡C—, —O—, or —NH— so long as oxygen atoms are not directly adjacent to each other, and $n^{i4}$ and $n^{iK21}$ each independently represent 0 or 1.

$R^{K21}$ preferably represents a linear or branched alkyl group having 1 to 5 carbon atoms, a halogenated alkyl group, or a cyanated alkyl group, and more preferably represents a linear alkyl group having 1 to 3 carbon atoms or a cyanated alkyl group. In addition, at least one or more secondary carbon atoms in these alkyl groups are preferably substituted with —O— so long as oxygen atoms are not directly adjacent to each other. Specifically, $R^{K21}$ is preferably an alkyl group having 1 to 3 carbon atoms, an alkoxy group having 1 to 3 carbon atoms, or a cyanated alkyl group having 1 to 3 carbon atoms.

The general formula (K-25) preferably represents the following general formulae (K-25-1) to (K-25-3).

[Chem. 44]

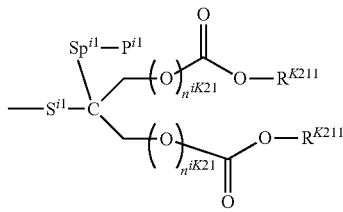

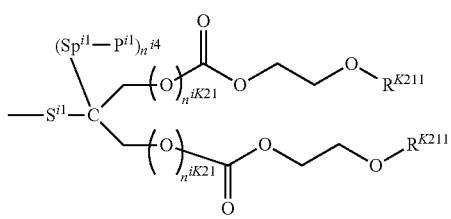

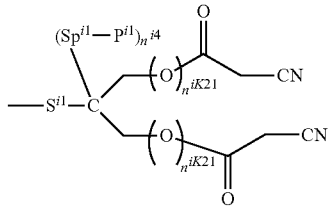

In the formulae, $S^{i1}$, $P^{i1}$, $Sp^{i1}$, $n^{i4}$, and $n^{iK21}$ have the same meanings as $S^{i1}$, $P^{i1}$, $Sp^{i1}$, $n^{i4}$, and $n^{iK21}$ in the general formula (K-25), respectively, $R^{K211}$ represents a linear or branched alkyl group having 1 to 3 carbon atoms, a halogenated alkyl group, or a cyanated alkyl group.

The general formula (K-26) preferably represents the following general formulae (K-26-1) and (K-26-2).

[Chem. 45]

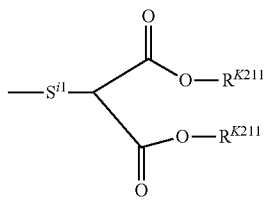

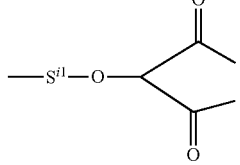

In the formulae, $S^{i1}$ has the same meaning as $S^{i1}$ in the general formula (K-26), $R^{K211}$ represents a linear or branched alkyl group having 1 to 3 carbon atoms, a halogenated alkyl group, or a cyanated alkyl group.

The general formula (K-27) preferably represents the following general formula (K-27-1).

[Chem. 46]

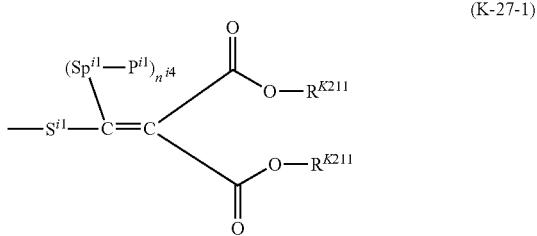

(K-27-1)

In the formula, $S^{i1}$, $P^{i1}$, $Sp^{i1}$, and $n^{i4}$ have the same meanings as $S^{i1}$, $P^{i1}$, $Sp^{i1}$, and $n^{iK21}$ in the general formula (K-27), respectively, $R^{K211}$ represents a linear or branched alkyl group having 1 to 3 carbon atoms, a halogenated alkyl group, or a cyanated alkyl group.

The general formula (K-28) preferably represents the following general formula (K-28-1).

[Chem. 47]

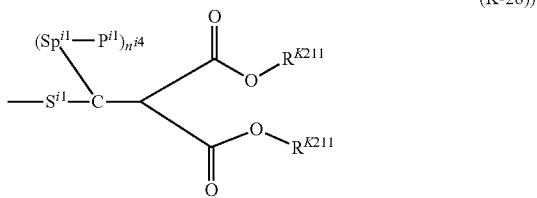

(K-28))

In the formula, $S^{i1}$, $P^{i1}$, $Sp^{i1}$, and $n^{i4}$ have the same meanings as $S^{i1}$, $P^{i1}$, $Sp^{i1}$, and $n^{iK21}$ in the general formula (K-28), respectively, $R^{K211}$ represents a linear or branched alkyl group having 1 to 3 carbon atoms, a halogenated alkyl group, or a cyanated alkyl group.

Preferred groups of $S^{i1}$, $p^{i1}$, and $Sp^{i1}$ are the same as $S^{i1}$, $P^{i1}$, and $Sp^{i1}$ in the general formula (K-24).

In formula (i), $Z^{i1}$ and $Z^{i1}$ preferably represent a single bond, —CH═CH—, —C≡C—, —COO—, —OCO—, —OCOO—, —OOCO—, —CH═CHCOO—, —OCOCH═CH—, —CH═C(CH₃)COO—, —OCOC(CH₃)═CH—, —CH₂—CH(CH₃)COO—, —OCOCH(CH₃)—CH₂—, —OCH₂CH₂O—, a linear or branched alkylene group having 1 to 40 carbon atoms, or a group in which one or two or more non-adjacent —CH₂— in the alkylene group is substituted with —O—; more preferably represent a single bond, —COO—, —OCO—, —CH═CHCOO—, —OCOCH═CH—, —CH═C(CH₃)COO—, —OCOC(CH₃)═CH—, —CH₂—CH(CH₃)COO—, —OCOCH(CH₃)—CH₂—, —OCH₂CH₂O—, a linear or branched alkylene group having 1 to 10 carbon atoms, or a group in which one or two or more non-adjacent —CH₂— in the alkylene group is substituted with —O—; more preferably represent a single bond, a linear alkylene group having 2 to 15 carbon atoms, or a group in which one or two or more non-adjacent —CH₂— in the alkylene group is substituted with —O—; and still more preferably represent a single bond, —COO—, —OCO—, —OCOO—, —OOCO—, —OCH₂CH₂O—, or an alkylene group having 2 carbon atoms (ethylene group (—CH₂CH₂—)), a group in which one of —CH₂— in the ethylene group is substituted with —O— (—CH₂O—, —OCH₂—), or a group in which one of —CH₂— in the ethylene group is substituted with —COO— or —OCO— (—CH₂—CHCOO—, —OCOCH—CH—).

$R^{i1}$ preferably represents a linear or branched alkyl group having 1 to 20 carbon atoms, or a halogenated alkyl group, and the secondary carbon atom in the alkyl group is preferably substituted with —O— so long as oxygen atoms are not directly adjacent to each other, and more preferably represents a linear or branched alkyl group having 3 to 18 carbon atoms, and the secondary carbon atom in the alkyl group may be substituted with —O— so long as oxygen atoms are not directly adjacent to each other. From the viewpoint of improving the alignment property of the liquid crystal compound, the carbon atom number of $R^{i1}$ is preferably 3 or more, preferably 4 or more, and preferably 5 or more.

$A^{i1}$ preferably is a divalent 6-membered aromatic group, a divalent 6-membered heteroaromatic group, a divalent 6-membered aliphatic group, or a divalent 6-membered heteroaliphatic group, a divalent 5-membered aromatic group, a divalent 5-membered heteroaromatic group, a divalent 5-membered aliphatic group, or a divalent 5-membered heteroaliphatic group, and specifically, preferably represents a cyclic structure selected from a 1,4-phenylene group, a 1,4-cyclohexylene group, an anthracene-2,6-diyl group, a phenanthrene-2,7-diyl group, a pyridine-2,5-diyl group, a pyrimidine-2,5-diyl group, a naphthalene-2,6-diyl group, a cyclopentane-1,3-diyl group, an indan-2,5-diyl group, a 1,2,3,4-tetrahydronaphthalene-2,6-diyl group, and a 1,3-dioxane-2,5-diyl group, and the cyclic structure is preferably unsubstituted or substituted with $L^{i1}$.

$L^{i1}$ preferably is an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen atom, a cyano group, or a nitro group. Ail preferably represents a divalent 6-membered aromatic group or a divalent 6-membered aliphatic group, but a divalent unsubstituted 6-membered aromatic group or a divalent unsubstituted 6-membered aliphatic group, or a group in which a hydrogen atom in these cyclic structures is substituted with an alkyl group having 1 to 6 carbon atoms, an alkoxy group having 1 to 6 carbon atoms, or a halogen atom is preferable, a divalent unsubstituted 6-membered aromatic group or a group in which a hydrogen atom in the cyclic structure is substituted with a fluorine atom, or a divalent unsubstituted 6-membered aliphatic group is preferable, and a 1,4-phenylene group, 2,6-naphthalene group, or 1,4-cyclohexyl group in which a hydrogen atom on the substituent may be substituted with a halogen atom, an alkyl group or an alkoxy group is more preferable.

$A^{i2}$ and $A^{i3}$ preferably are each independently a divalent 6-membered aromatic group, a divalent 6-membered heteroaromatic group, a divalent 6-membered aliphatic group, or a divalent 6-membered heteroaliphatic group, a divalent 5-membered aromatic group, a divalent 5-membered heteroaromatic group, a divalent 5-membered aliphatic group, or a divalent 5-membered heteroaliphatic group, and specifically, preferably represent a cyclic structure selected from a 1,4-phenylene group, a 1,4-cyclohexylene group, an anthracene-2,6-diyl group, a phenanthrene-2,7-diyl group, a pyridine-2,5-diyl group, a pyrimidine-2,5-diyl group, a naphthalene-2,6-diyl group, a cyclopentane-1,3-diyl group, an indan-2,5-diyl group, a 1,2,3,4-tetrahydronaphthalene-2,6-diyl group, and a 1,3-dioxane-2,5-diyl group, and the cyclic structure is preferably unsubstituted or substituted with L, $P^{i1}$-$Sp^{i1}$-, or $K^{i1}$. $A^{i3}$ also preferably represents a cyclic structure selected from a 1,3-phenylene group, a 1,3-cyclohexylene group, and a naphthalene 2,5-diyl group.

Preferred groups of $L^{i1}$ are the same as $L^{i1}$ in $A^{i1}$. $A^{i2}$ and $A^{i3}$ preferably represent a divalent 6-membered aromatic group or a divalent 6-membered aliphatic group, but a divalent unsubstituted 6-membered aromatic group or a divalent unsubstituted 6-membered aliphatic group, or a group in which the hydrogen atom in these cyclic structures is substituted with an alkyl group having 1 to 6 carbon atoms, an alkoxy group having 1 to 6 carbon atoms, a halogen atom, or P-Sp- is preferable, a divalent unsubstituted 6-membered aromatic group, a group in which a hydrogen atom in the cyclic structure is substituted with a fluorine atom, or a divalent unsubstituted 6-membered aliphatic group is preferable, and a 1,4-phenylene group, a 2,6-naphthalene group, or a 1,4-cyclohexyl group in which a hydrogen atom on the substituent may be substituted with a halogen atom, an alkyl group, an alkoxy group, or P-Sp- is more preferable.

In addition, $A^{i3}$ is preferably substituted with $K^{i1}$.

Here, the general formula (i) has at least one $P^{i1}$-$Sp^{i1}$- as a substituent of $A^{i2}$ or $A^{i3}$ or as a substituent of $K^{i1}$, but from the viewpoint of further improving reliability, the number of polymerizable groups in the general formula (i) is preferably 2 or more, and more preferably 3 or more. In the case where the reliability is important, polyfunctionalization can be easily achieved by introducing a polymerization group into $A^{i2}$ or $A^{i3}$, so that a strong polymer can be constructed. The substituted position of $P^{i1}$-$Sp^{i1}$- in $A^{i2}$ or $A^{i3}$ is preferably the vicinity of $K^{i1}$, and it is more preferable that $A^{i3}$ is substituted with $P^{i1}$-$Sp^{i1}$-.

$m^{i1}$ preferably represents an integer of 0 to 3, and more preferably represents an integer of 0 to 1.

The compound represented by the general formula (iv) is preferably a compound represented by the following general formula (iv-1).

[Chem. 48]

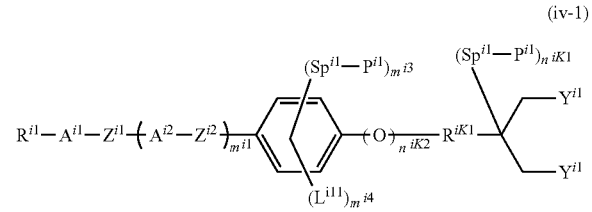

(iv-1)

In the formula, $R^{i1}$, $A^{i1}$, $A^{i2}$, $Z^{i1}$, $Z^{i2}$, $m^{i1}$, $P^{i1}$, and $Sp^{i1}$ independently have the same meanings as $R^{i1}$, $A^{i1}$, $A^{i2}$, $Z^{i1}$, $Z^{i2}$, $m^{i1}$, $P^{i1}$, and $Sp^{i1}$ in the general formula (iv), respectively, $Y^{i1}$ has the same meaning as $Y^{i1}$ in the general formula (K-24), $R^{iK1}$, $n^{iK1}$, and $n^{iK2}$ independently have the same meanings as $R^{iK1}$, $n^{iK1}$, and $n^{iK2}$ in the general formula (K-24-1), respectively, $L^{i11}$ represents an alkyl group having 1 to 3 carbon atoms, $m^{i3}$ represents an integer of 0 to 3, and $m^{i4}$ represents an integer of 0 to 3, but $m^{i3}+m^{i4}$ represents 0 to 4.

The compound represented by the general formula (iv-1) is preferably the following general formulae (iv-1-1), (iv-1-2), (iv-1-3a), (iv-1-3b), (Iv-1-4), (iv-1-Y2), (iv-1-Y3), and (iv-1-Y4).

[Chem. 49]

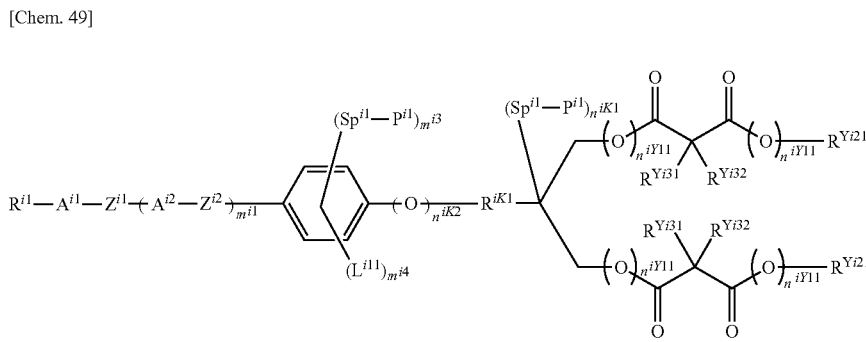

(iv-1-1)

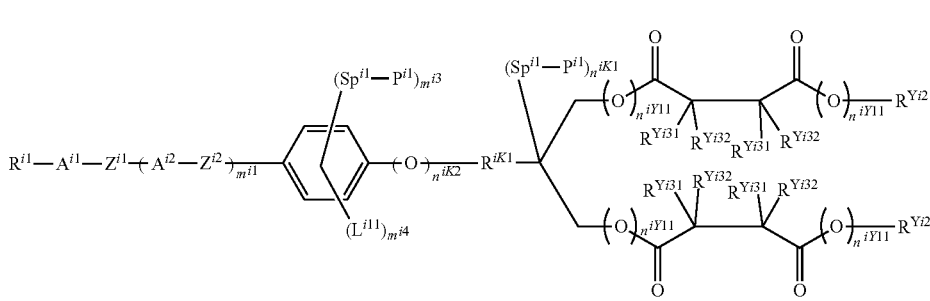

(iv-1-2)

-continued
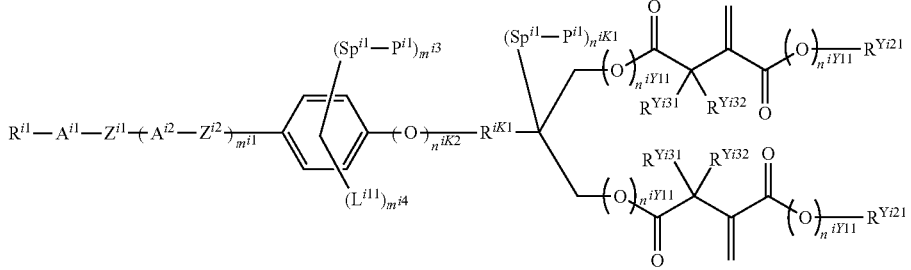
(iv-1-3a)
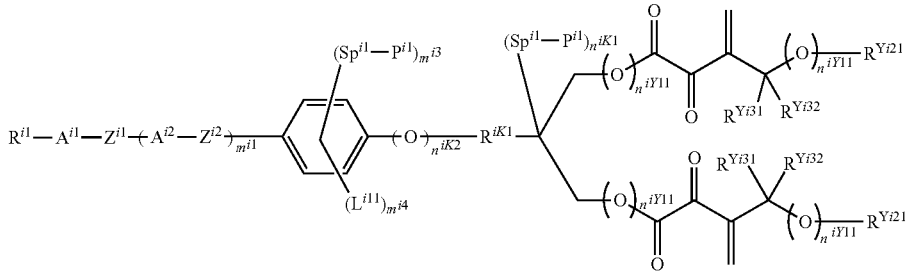
(iv-1-3b)
[Chem. 50]
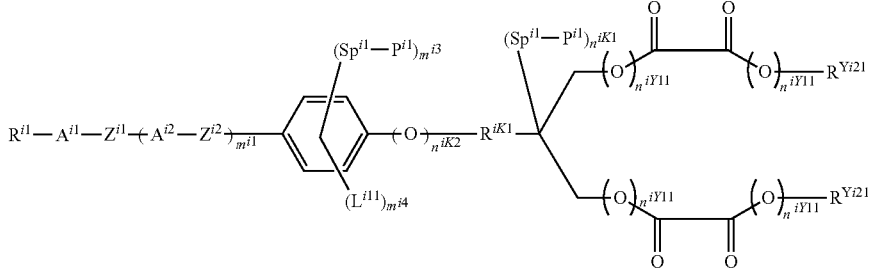
(iv-1-4)
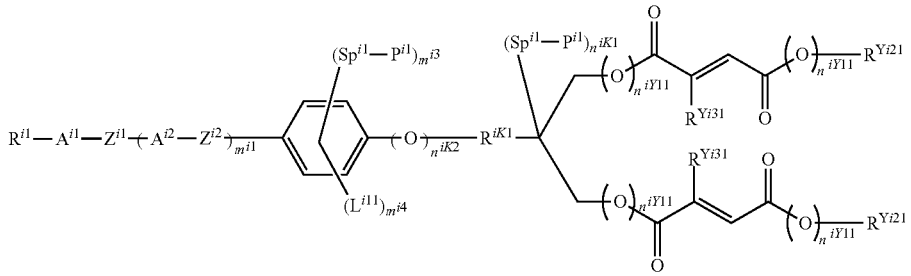
(iv-1-Y2)
[Chem. 51]
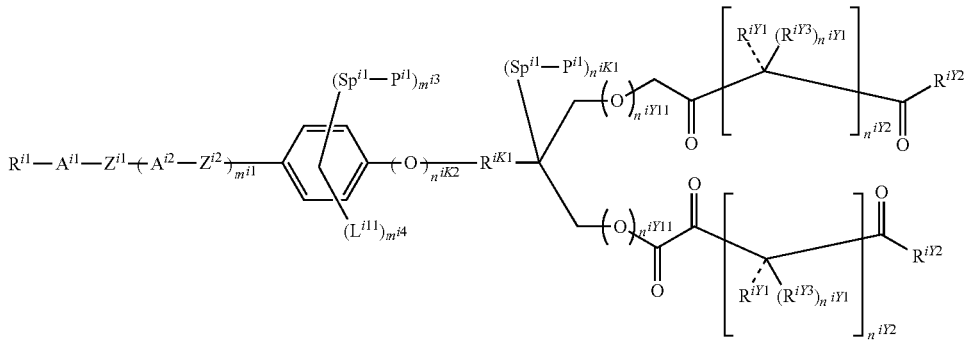
(iv-1-Y3)

-continued

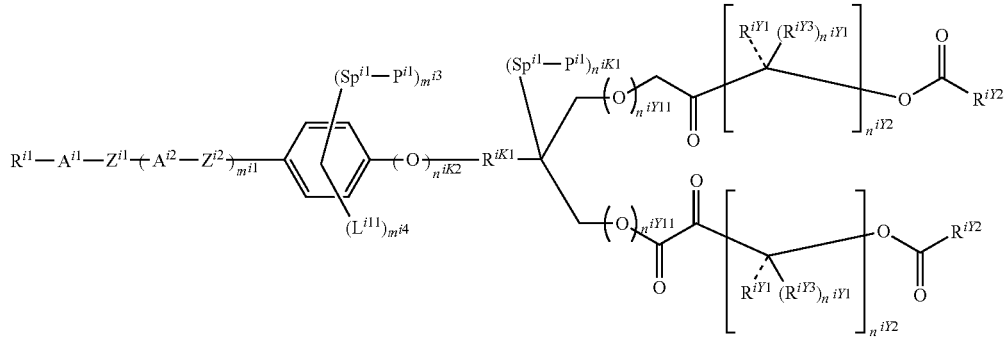

(iv-1-Y4)

In the formula, $R^{i1}$, $A^{i1}$, $A^{i2}$, $Z^{i1}$, $Z^{i2}$, $m^{i1}$, $P^{i1}$, and $Sp^{i1}$ independently have the same meanings as $R^{i1}$, $A^{i1}$, $A^{i2}$, $Z^{i1}$, $Z^{i2}$, $m^{i1}$, $P^{i1}$, and $Sp^{i1}$ in the general formula (iv), respectively, $R^{iK1}$, $R^{iY21}$, $R^{i3Y1}$, $R^{i3Y2}$, $n^{iK1}$, $n^{iK2}$, and $n^{iY11}$ independently have the same meanings as $R^{iK1}$, $R^{iY21}$, $R^{i31}$, $R^{i32}$, $n^{iK1}$, $n^{iK2}$, and $n^{iY11}$ in the general formulae (K-24-1) to (K-24-3), $L^{i11}$ represents an alkyl group having 1 to 3 carbon atoms, $m^{i3}$ represents an integer of 0 to 3, and $m^{i4}$ represents an integer of 0 to 3, but $m^{i3}+m^{i4}$ represents 0 to 4.

The preferred groups of each symbol in the general formula (iv-1), and the general formulae (iv-1-1), (iv-1-2), (iv-1-3) are the same as the preferred groups in the general formula (i), the general formula (K-1), and the general formulae (K-1-1) to (K-1-3).

In addition, the compound represented by the general formula (iv) is preferably a compound represented by the following general formulae (iv-2) to (iv-5).

[Chem. 52]

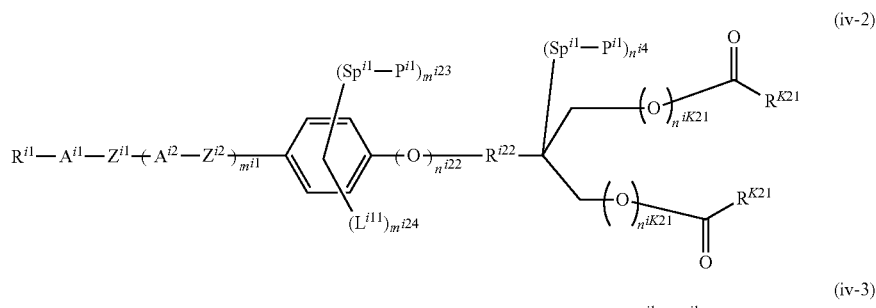

(iv-2)

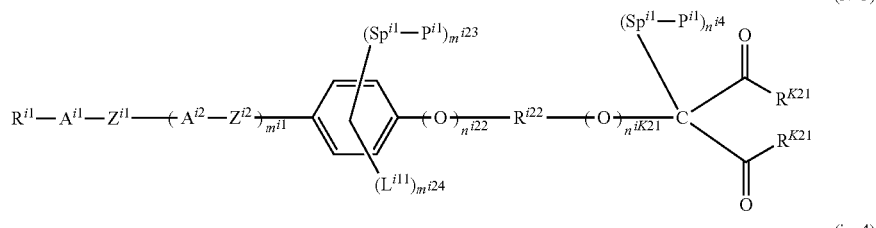

(iv-3)

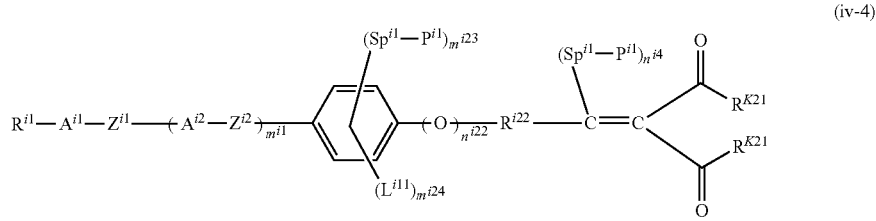

(iv-4)

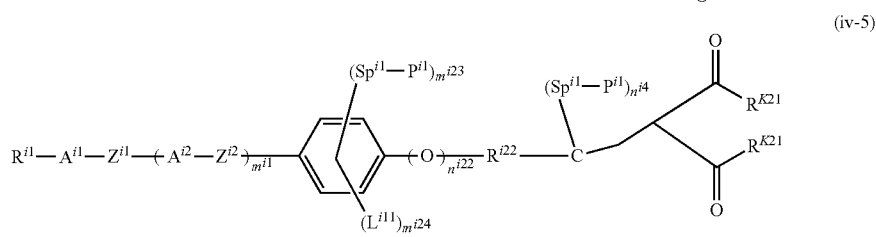

(iv-5)

In the formulae, $R^{i1}$, $A^{i1}$, $A^{i2}$, $Z^{i1}$, $Z^{i2}$, mi1, $P^{i1}$, and $Sp^{i1}$ independently have the same meanings as $R^{i1}$, $A^{i1}$, $A^{i2}$, $Z^{i1}$, $Z^{i2}$, $m^{i1}$, $P^{i1}$, and $Sp^{i1}$, respectively; $n^{i4}$, $n^{iK21}$, and $R^{K21}$ independently have the same meanings as $n^{i4}$, $n^{iK21}$, and $R^{K21}$ in the general formula (K-24); $R^{i22}$ represents an alkylene group having 1 to 6 carbon atoms or a single bond, and —$CH_2$— in the alkylene group may be substituted with —CH=CH—, —C≡C—, or —O— so long as oxygen atoms are not directly adjacent to each other; $L^{i11}$ represents an alkyl group having 1 to 3 carbon atoms; $n^{i22}$ represents 0 or 1; $m^{i23}$ represents an integer of 0 to 3; and $m^{i24}$ represents an integer of 0 to 3, but $m^{i23}+m^{i24}$ represents 0 to 4.

$R^{i22}$ is preferably a linear alkylene group having 1 to 6 carbon atoms, and more preferably a linear alkylene group having 1 to 3 carbon atoms. The preferred groups of $R^{iY21}$, $R^{iY31}$, $R^{iY32}$, $Sp^{i1}$, and $P^{i1}$ are the same as $R^{iY21}$, $R^{iY31}$, $R^{iY32}$, $Sp^{i1}$, and $P^{i1}$ in the general formulae (Y-1-1) to (Y-1-3) and the general formula (i). The preferred groups of each symbol in the general formula (iv-2) are the same as the preferred groups in the general formula (iv) and the general formula (K-24).

The general formula (iv) preferably represents the following general formulae (R-1) to (R-6).

[Chem. 53]

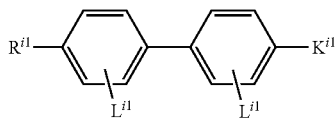
(R-1)

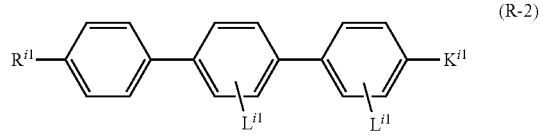
(R-2)

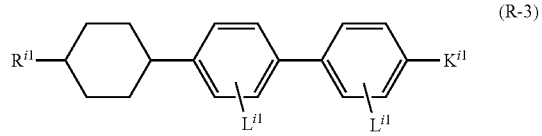
(R-3)

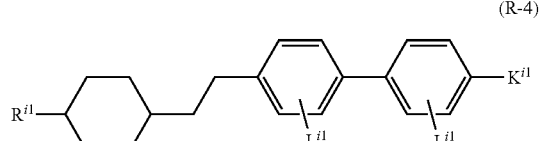
(R-4)

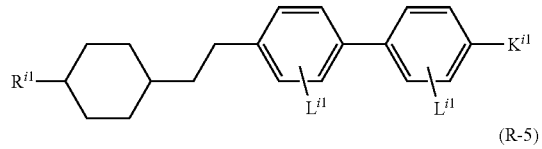
(R-5)

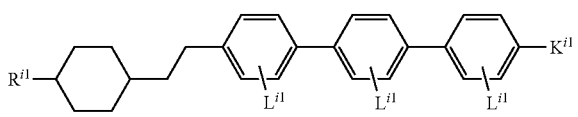
(R-6)

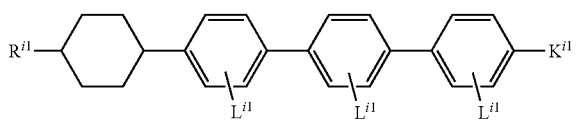

In the formulae, $R^{i1}$, $K^{i1}$, and $L^{i1}$ have the same meanings as $R^{i1}$, $K^{i1}$, and $L^{i1}$ in the general formula (iv), respectively.

More specific examples of the general formula (iv) include, but are not limited to, the following formulae (R-1-1) to (R-6-7)

[Chem. 54]

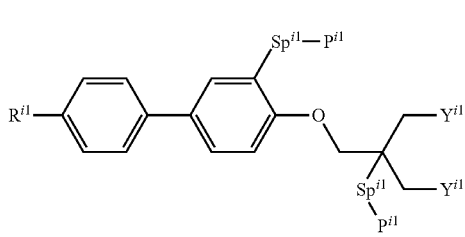
(R-1-1)

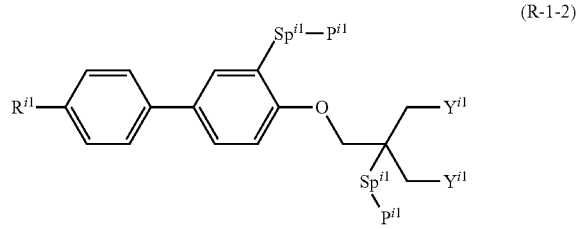
(R-1-2)

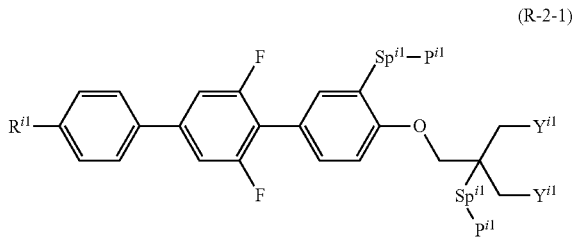
(R-2-1)

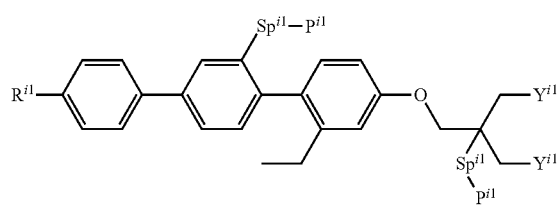
(R-2-2)

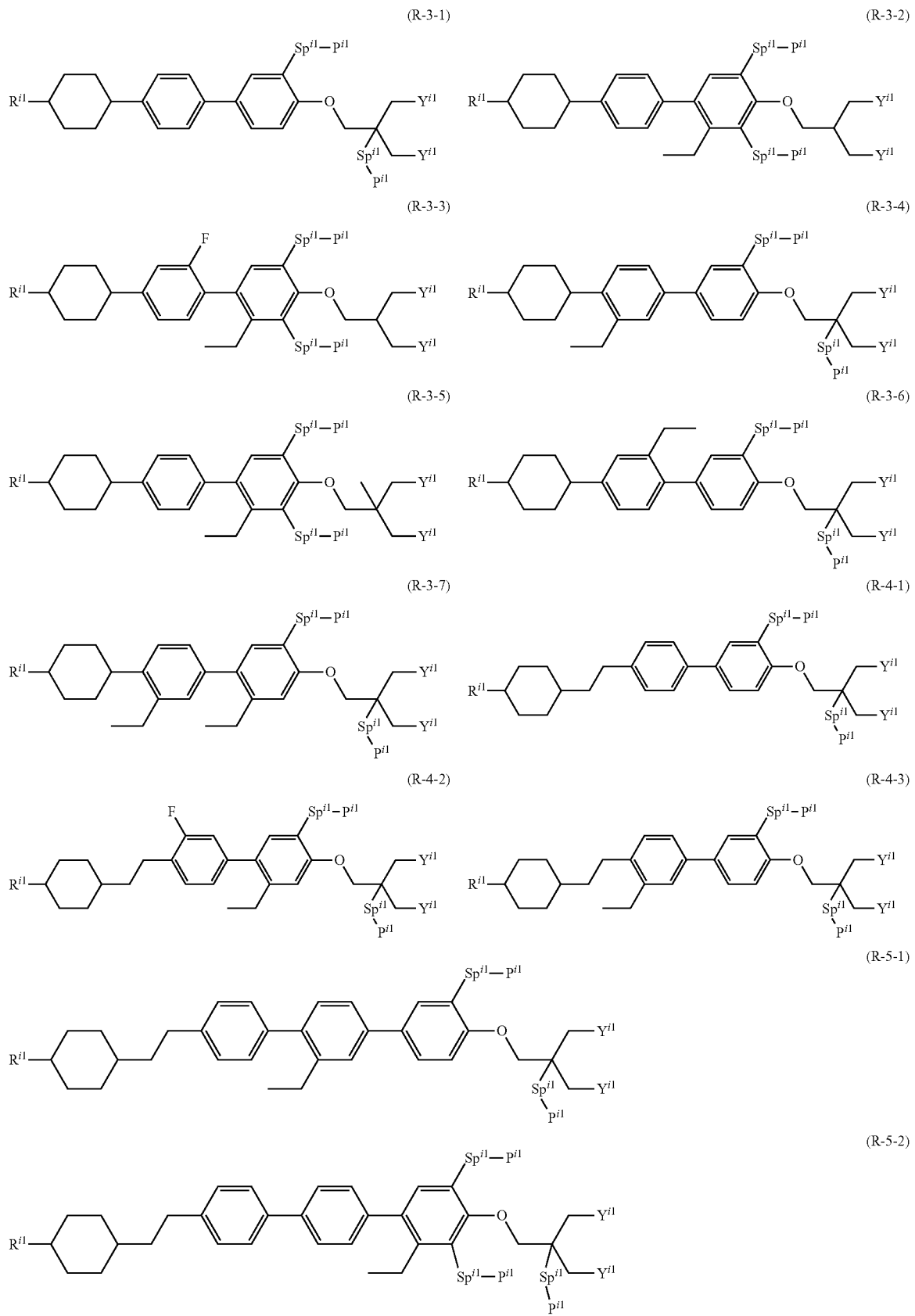

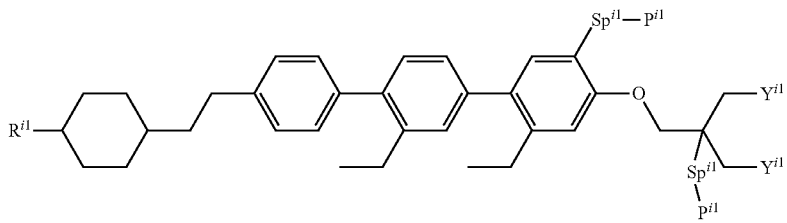
(R-5-3)

[Chem. 56]

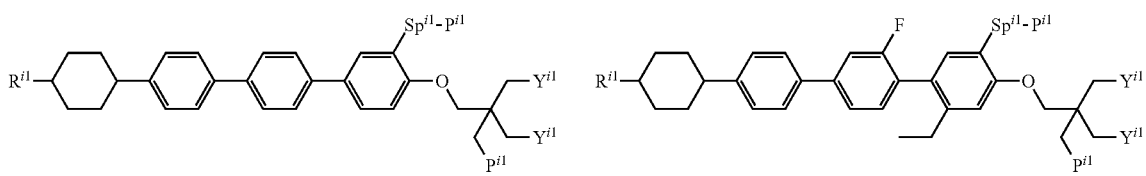
(R-6-1) (R-6-2)

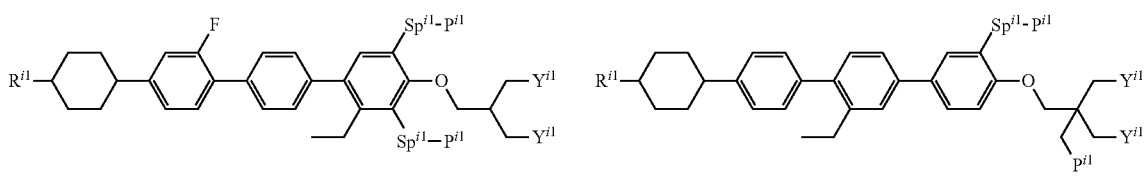
(R-6-3) (R-6-4)

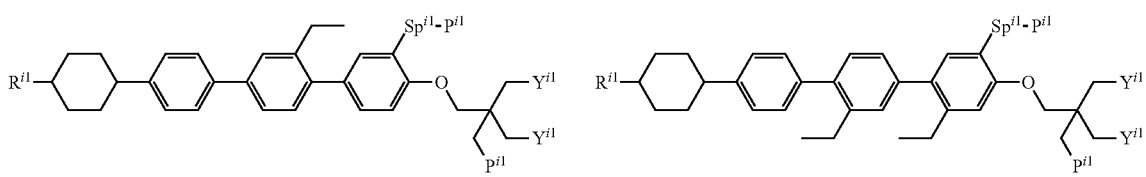
(R-6-5) (R-6-6)

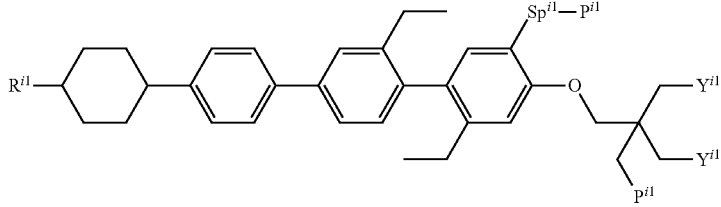
(R-6-7)

In the formulae, $R^{i1}$, $P^{i1}$, $S^{i1}$, and $Y^{i1}$ independently have the same meanings as $R^{i1}$, $P^{i1}$, $S^{i1}$, and $Y^{i1}$ in the general formula (iv) and the general formula (K-1), respectively.

The lower limit of the content of the first monomer in the liquid crystal composition of the present invention is preferably 0.4% by mass, preferably 0.43% by mass, preferably 0.44% by mass, preferably 0.45% by mass, preferably 0.46% by mass, preferably 0.47% by mass, preferably 0.48% by mass, preferably 0.49% by mass, preferably 0.5% by mass, preferably 0.52% by mass, preferably 0.55% by mass, preferably 0.57% by mass, preferably 0.6% by mass, preferably 0.62% by mass, preferably 0.65% by mass, preferably 0.67% by mass, preferably 0.7% by mass, preferably 0.72% by mass, preferably 0.75% by mass, preferably 0.77% by mass, preferably 0.8% by mass, preferably 0.82% by mass, preferably 0.84% by mass, preferably 0.87% by mass, and preferably 0.9% by mass. The upper limit of the content of the first monomer in the liquid crystal composition of the present invention is preferably 6.0% by mass, preferably 5.7% by mass, preferably 5.5% by mass, preferably 5.3% by mass, preferably 5.0% by mass, preferably 4.8% by mass, preferably 4.5% by mass, preferably 4.0% by mass, preferably 3.8% by mass, preferably 3.6% by mass, preferably 3.5% by mass, preferably 3.0% by mass, preferably 2.5% by mass, preferably 2.3% by mass, preferably 2.1% by mass, preferably 2% by mass, preferably 1.8% by mass, preferably 1.6% by mass, preferably 1.5% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, preferably 0.55% by mass, preferably 0.53% by mass, preferably 0.5% by mass, and preferably 0.48% by mass.

Specific examples thereof include compounds represented by the following formulae (P-K-1) to (P-39), which is a first monomer exhibiting a favorable spontaneous orientation.

[Chem. 57]
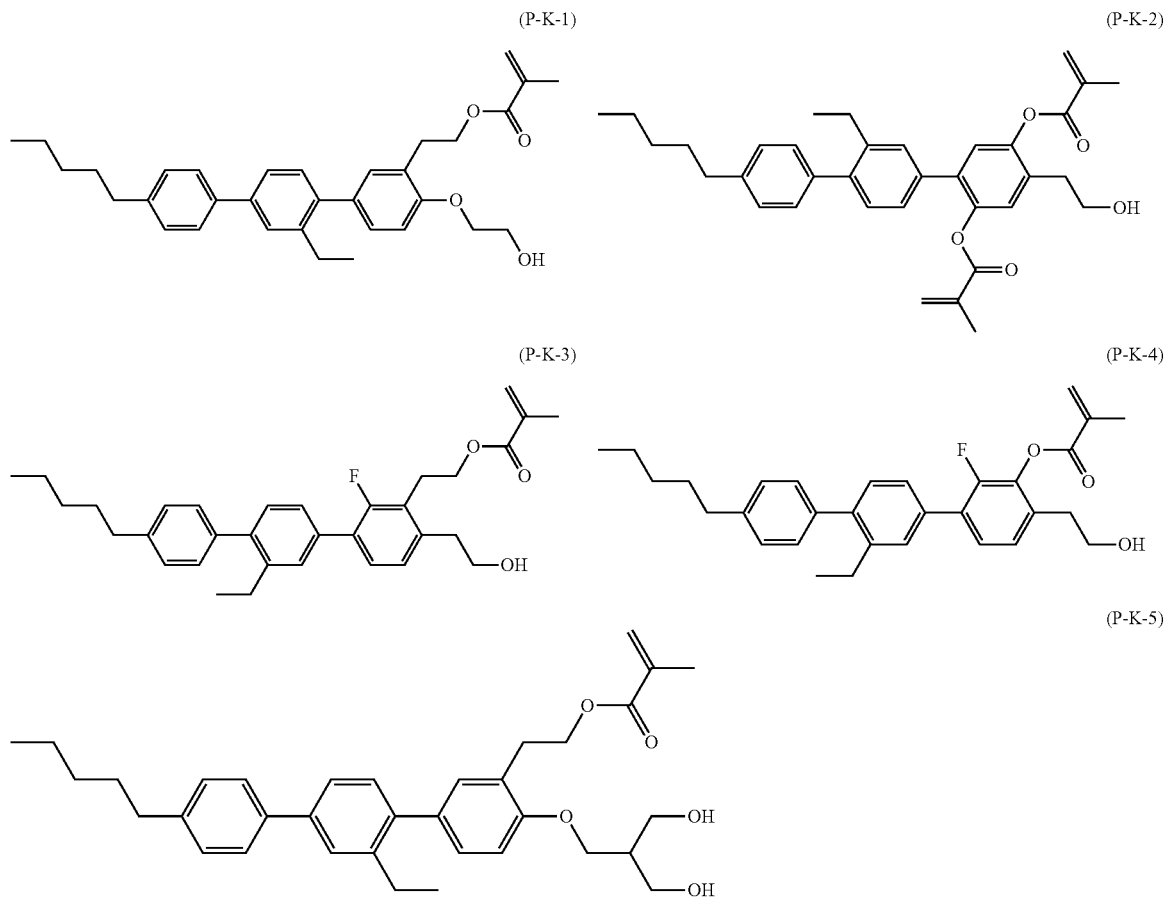
[Chem. 58]
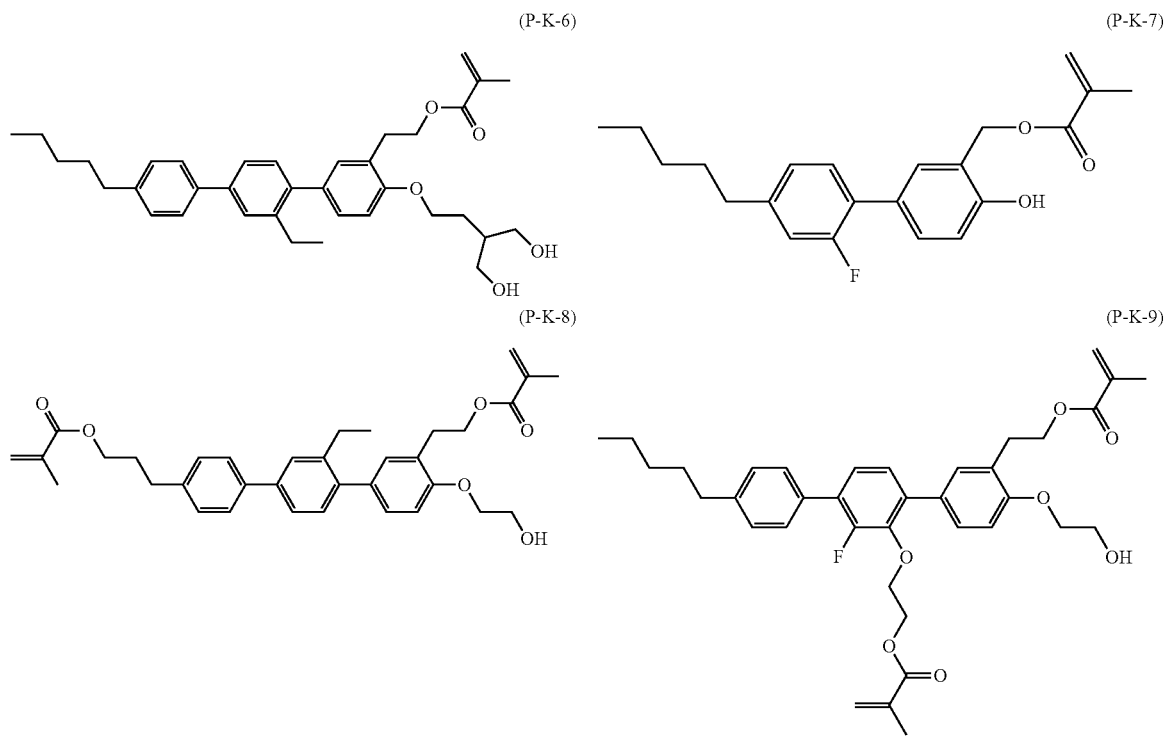

-continued
(P-K-10)
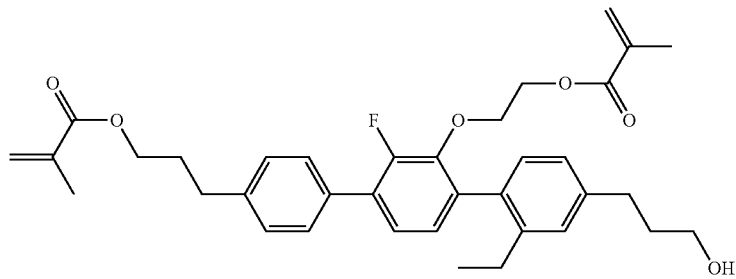
[Chem. 59]
(P-K-11)
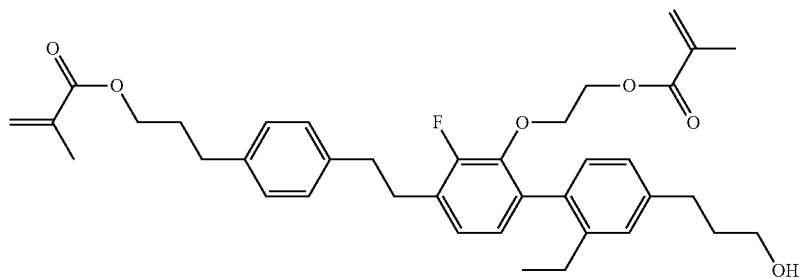
(P-K-12) (P-K-13)
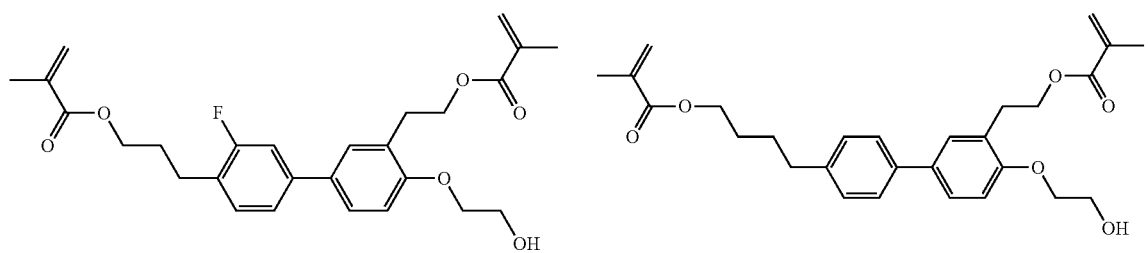
(P-K-14)
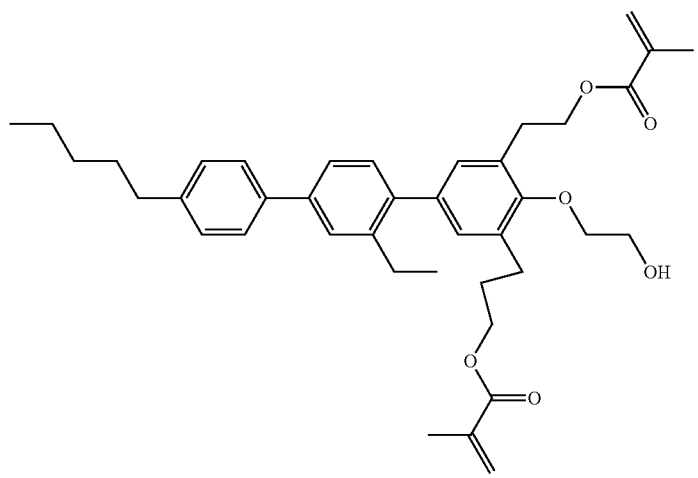

-continued
(P-K-15)
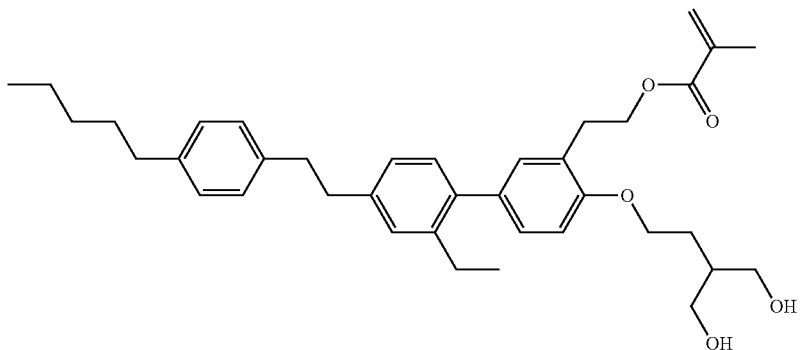
[Chem. 60]
(P-K-16)
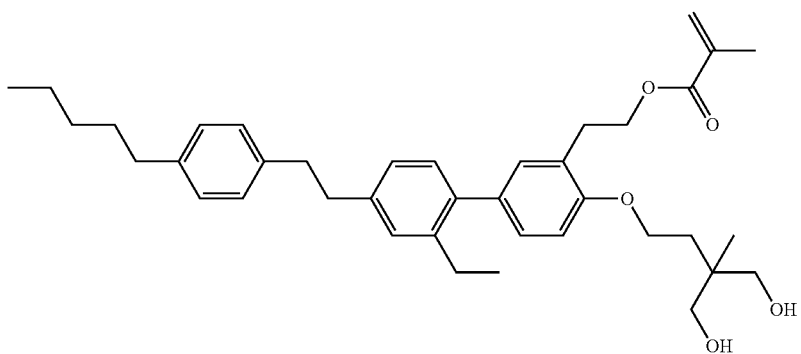
(P-K-17)
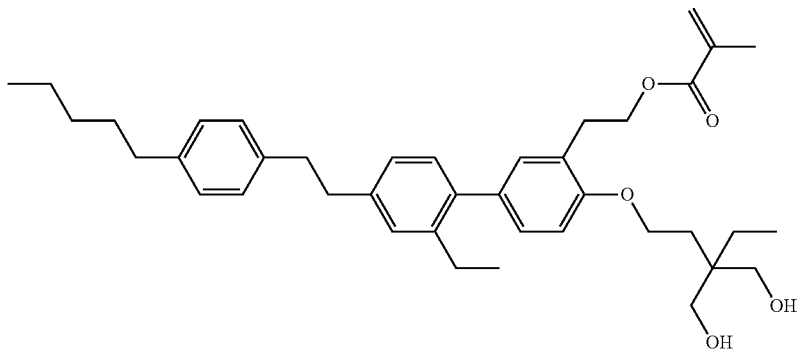
(P-K-18)
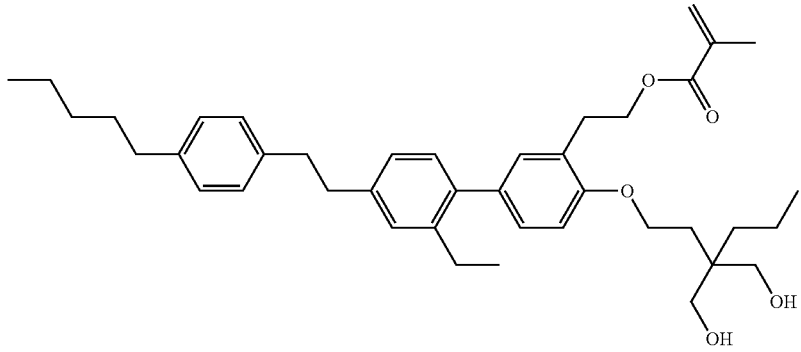

-continued
(P-K-19)
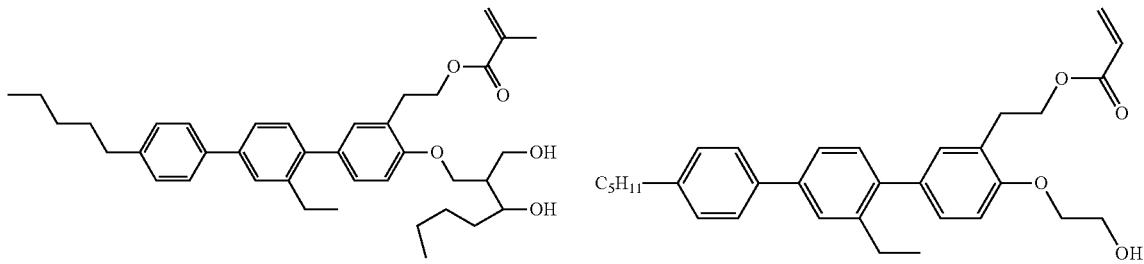
(P-K-20)
[Chem. 61]
(P-1-1)
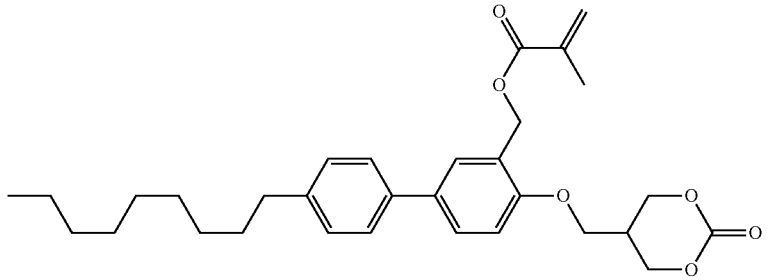
(P-1-2)
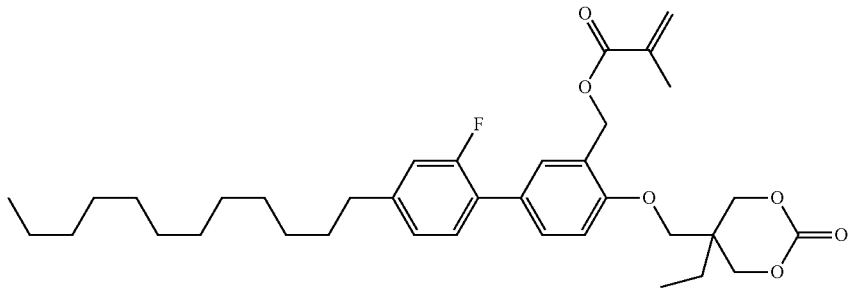
(P-1-3)
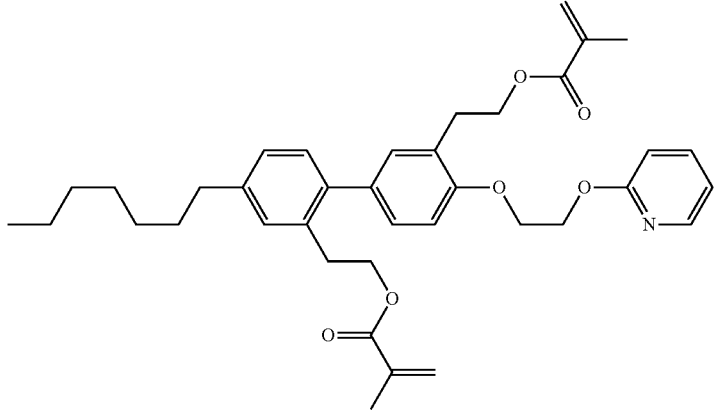
(P-1-4)
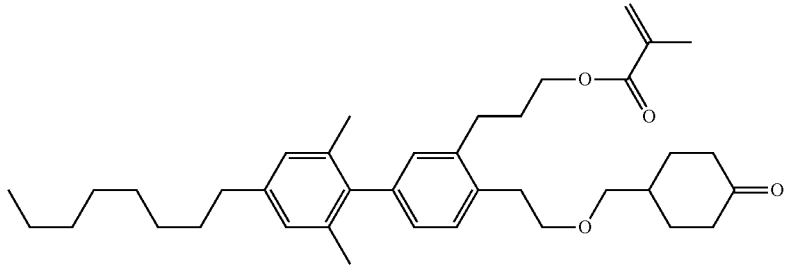

[Chem. 62]
(P-1-5)
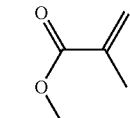
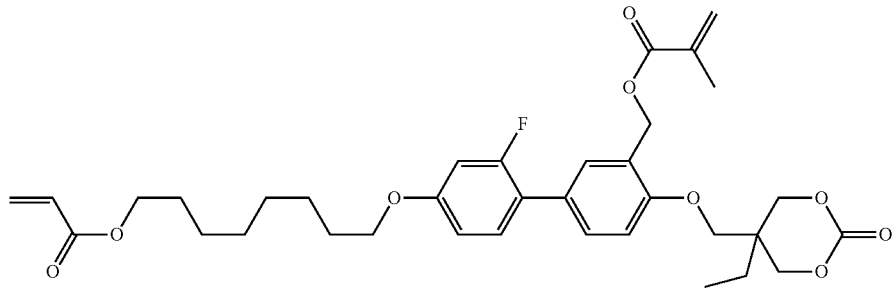
(P-1-6)
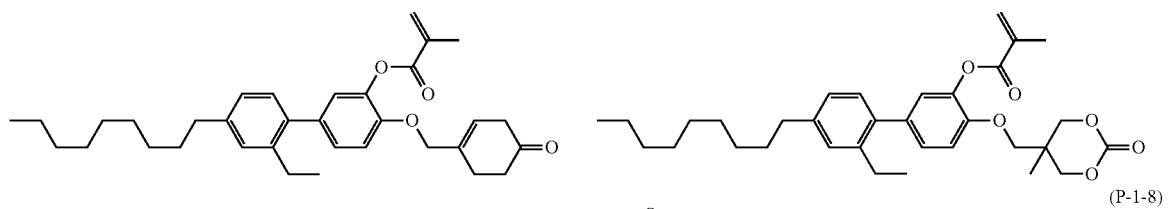
(P-1-7)
(P-1-8)
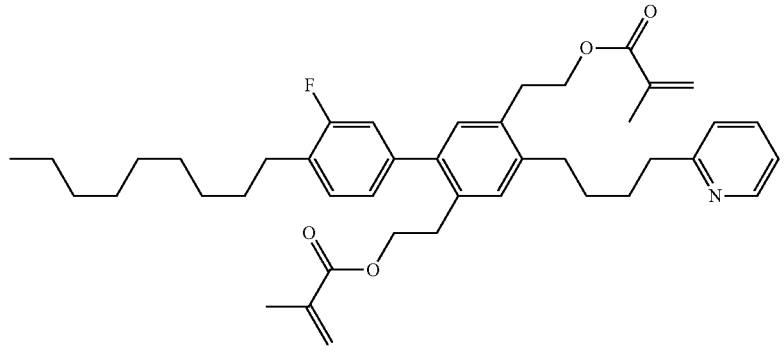
(P-1-9)
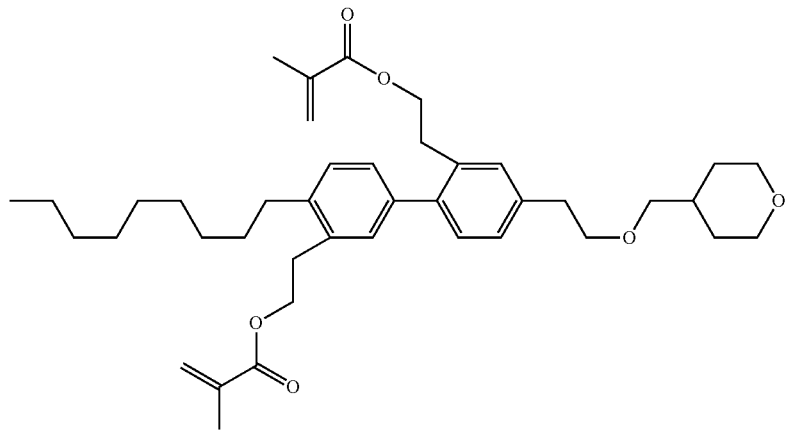
[Chem. 63]
(P-1-10)
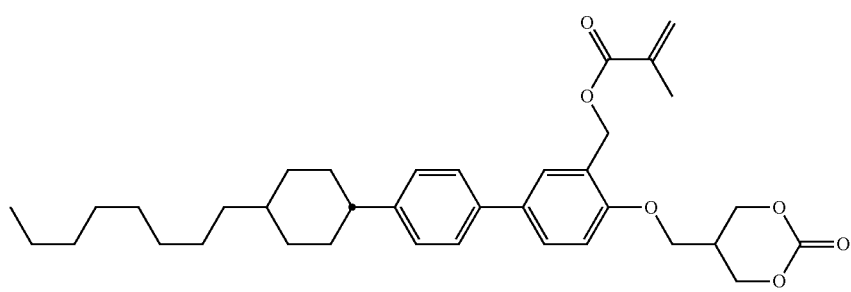

-continued
(P-1-11)
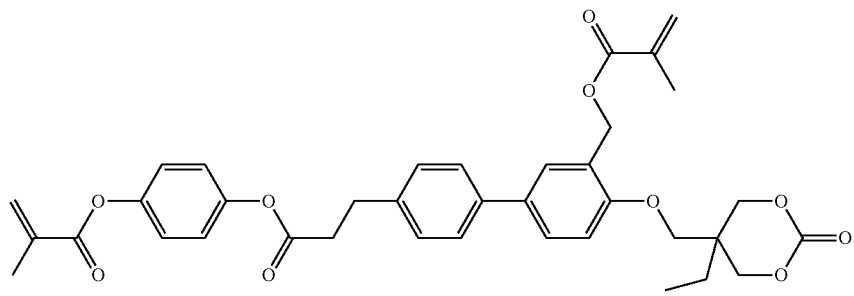
(P-1-12)
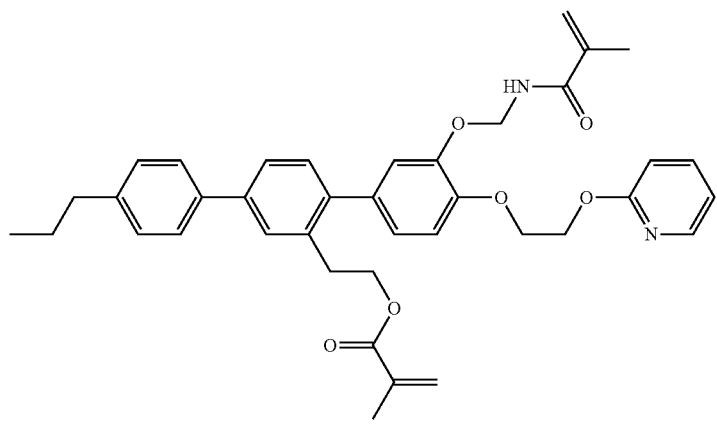
(P-1-13)
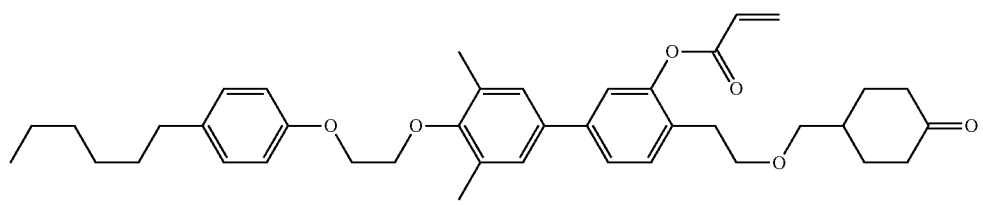
(P-1-14)
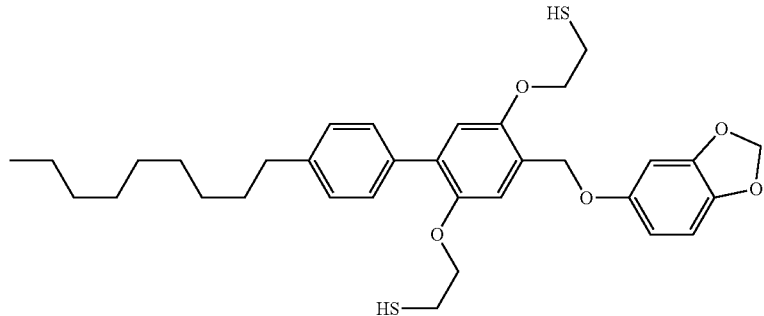
[Chem. 64]
(P-1-15)
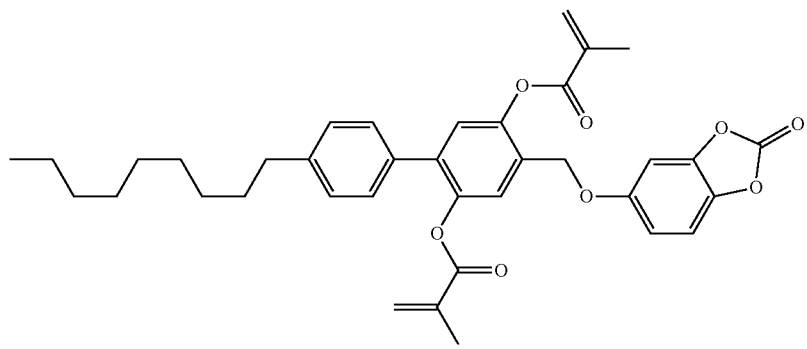

-continued
(P-1-16)
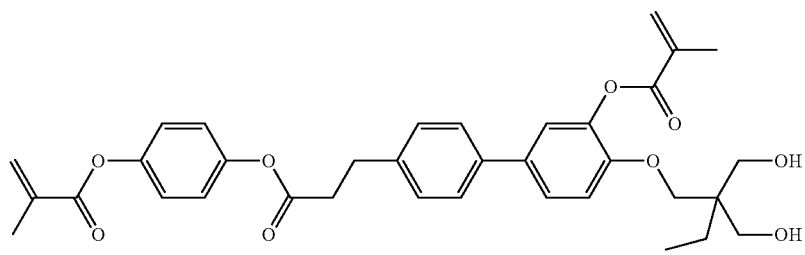
(P-1-17)
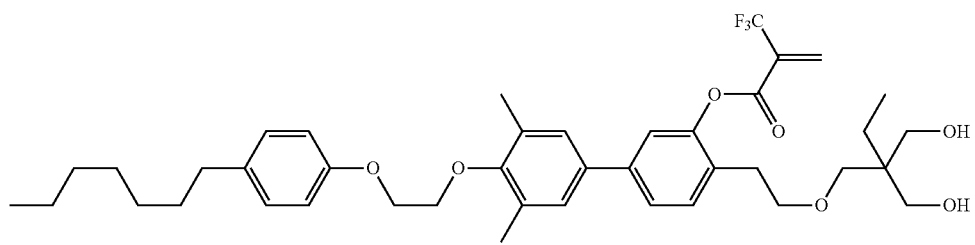
(P-1-18)
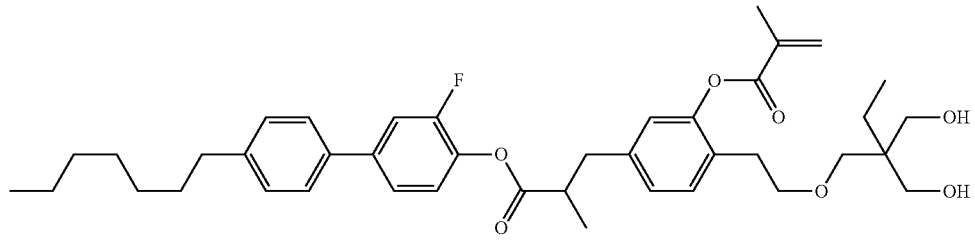
(P-1-19)
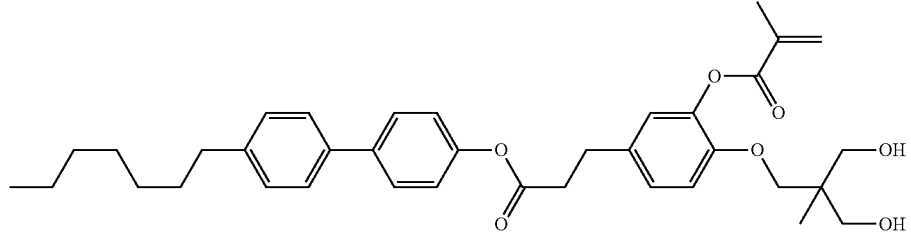
[Chem. 65]
(P-1-20)
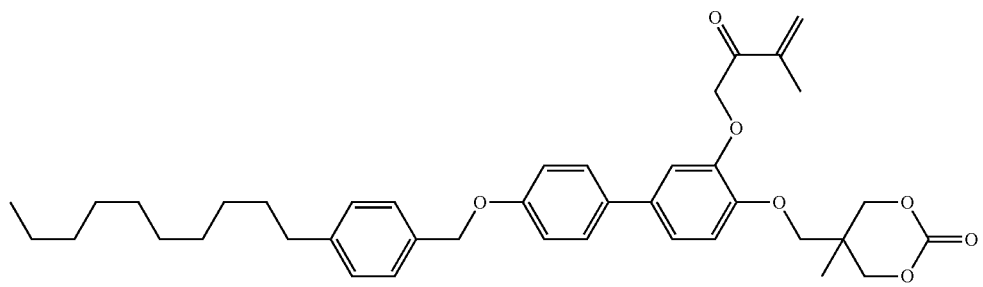
(P-1-21)
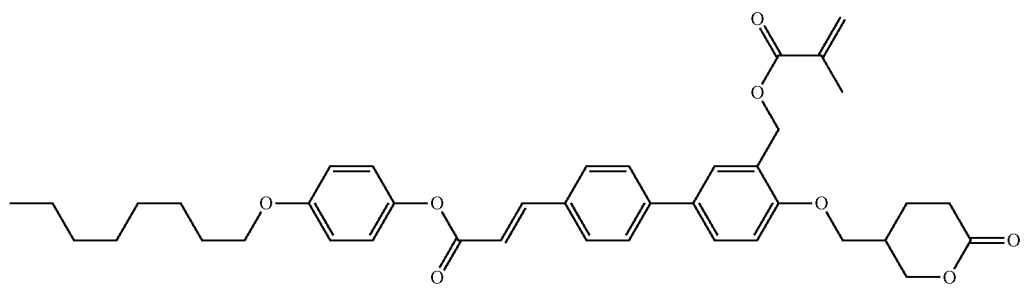

(P-1-22)
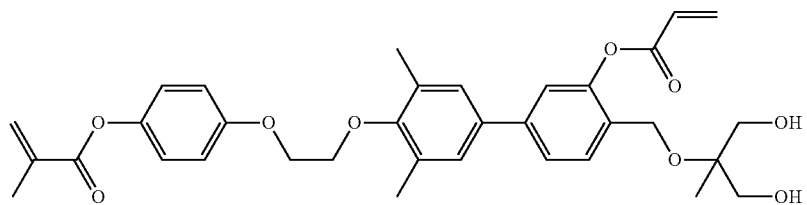
(P-1-23)
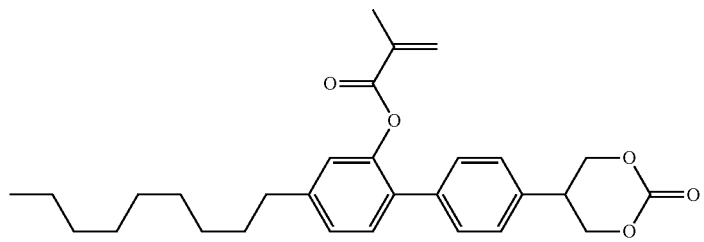
(P-1-24)
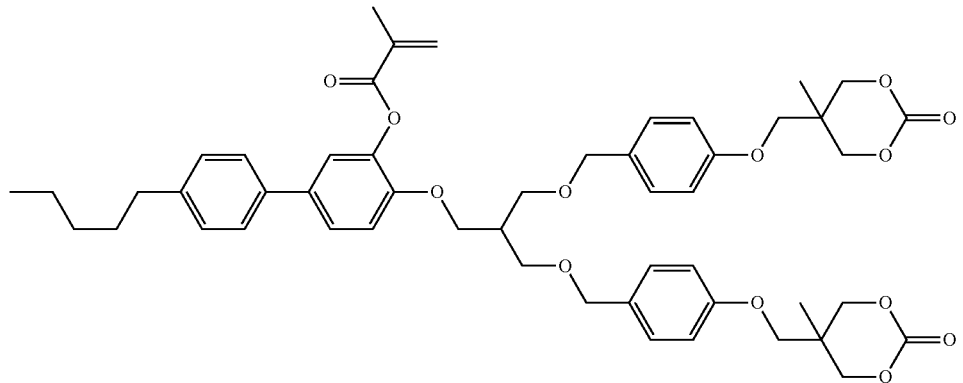
[Chem. 66]
(P-1-25)
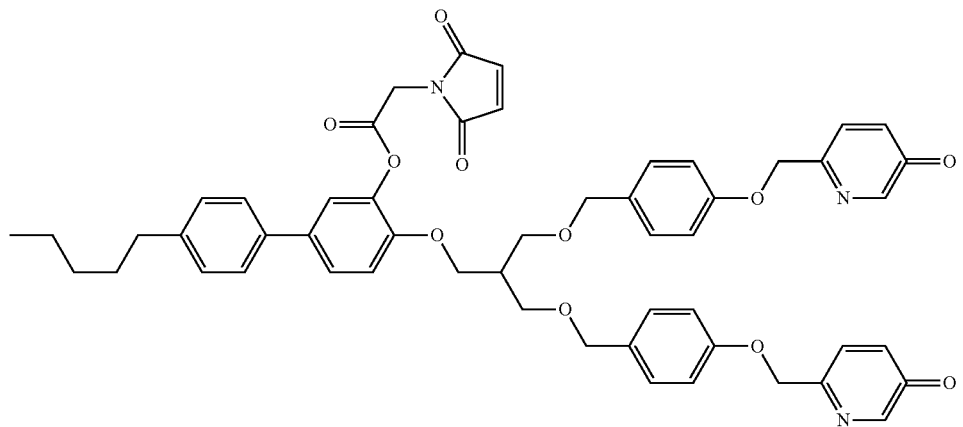

-continued
(P-1-26)
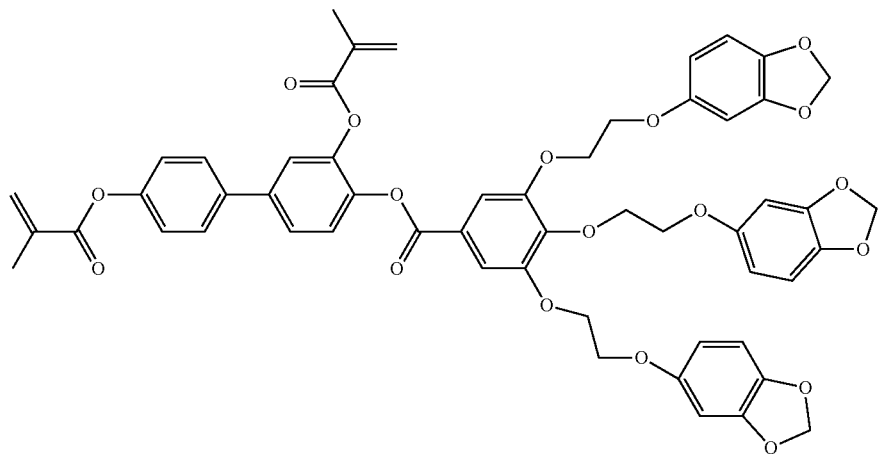
[Chem. 67]
(P-J-10) (P-J-11)
(P-J-12) (P-J-13)
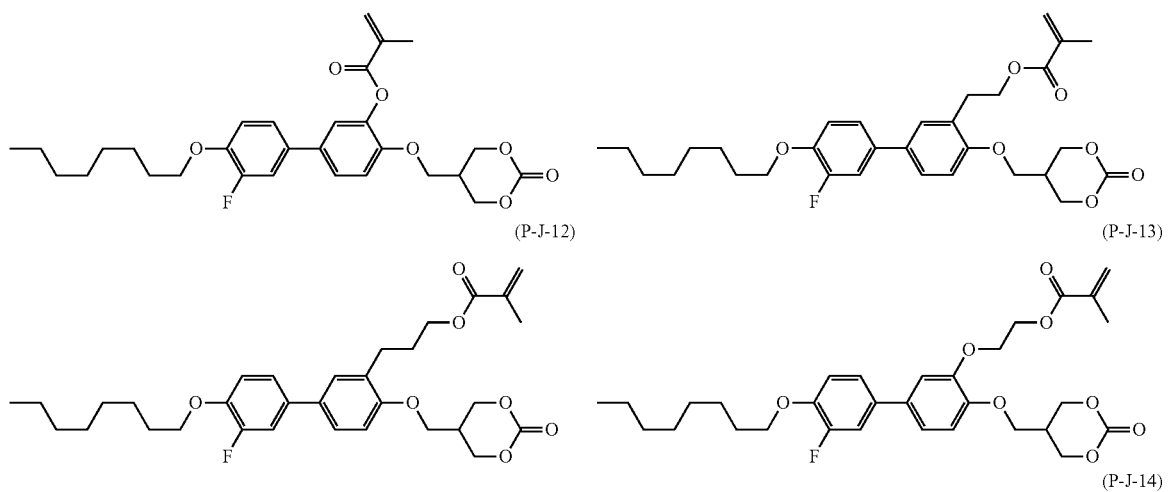
(P-J-14)
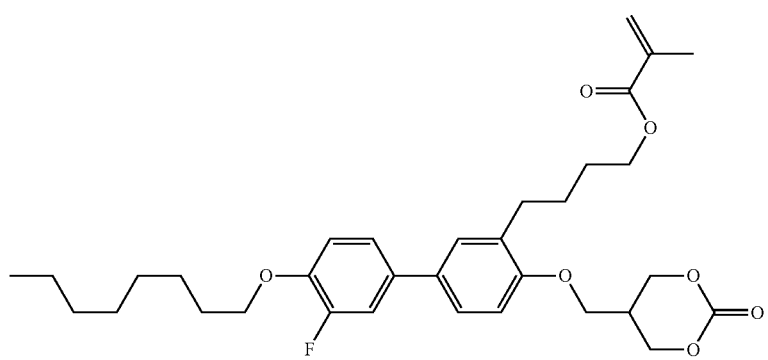
[Chem. 68]
(P-J-15) (P-J-16)
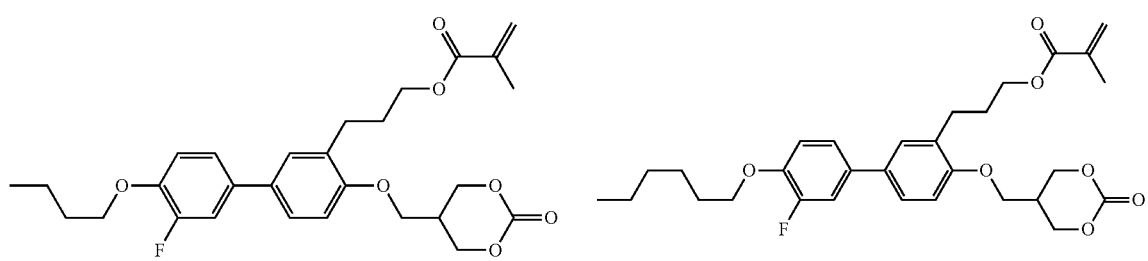

(P-J-17)
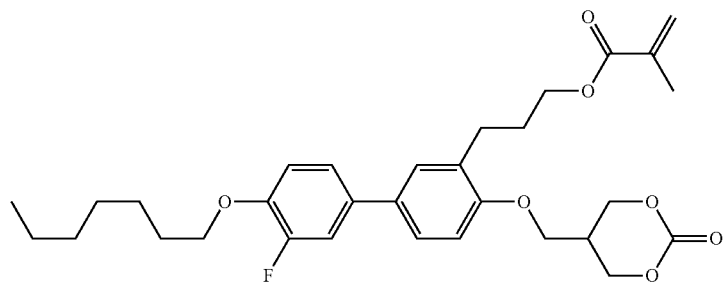
(P-J-18)
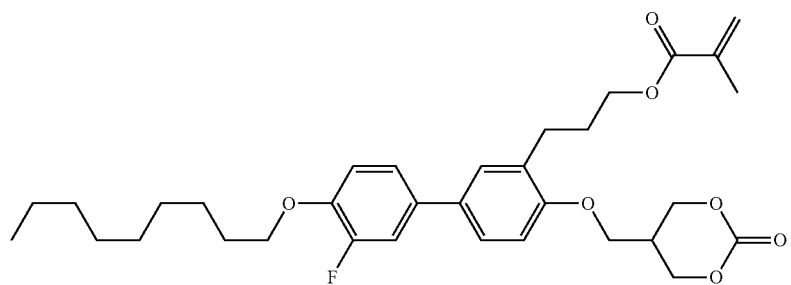
(P-J-19)
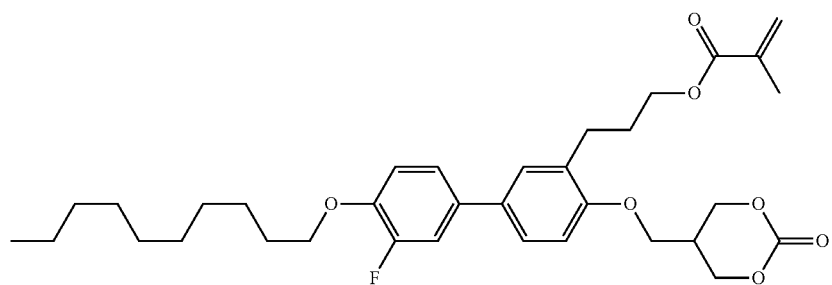
(P-J-20)
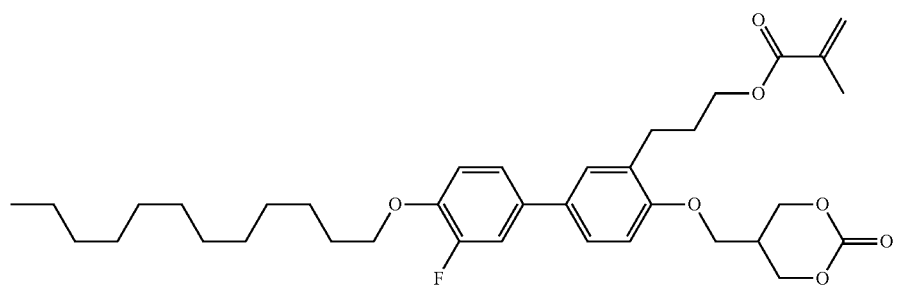
[Chem. 69]
(P-J-21)
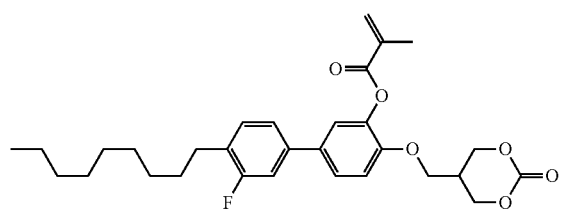
(P-J-22)
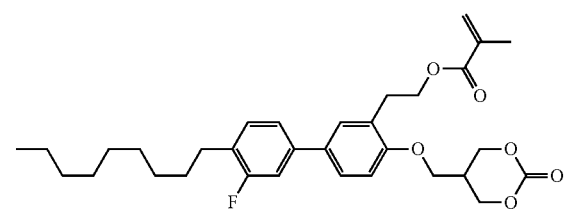

-continued
(P-J-23)
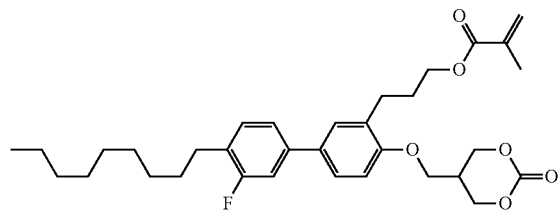
(P-J-24)
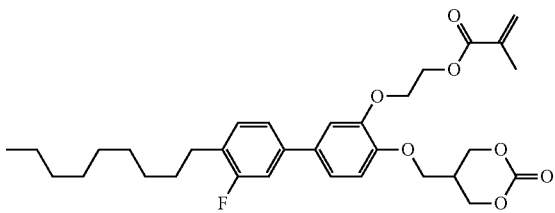
[Chem. 70]
(P-J-25)
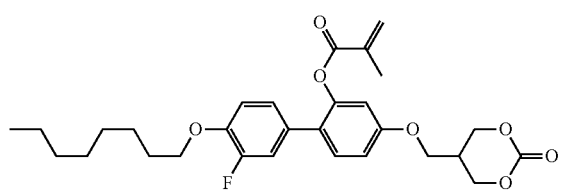
(P-J-26)
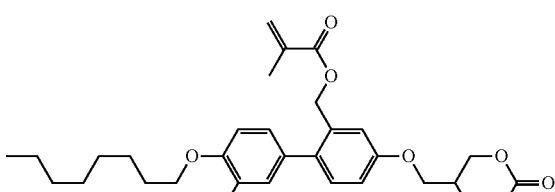
(P-J-27)
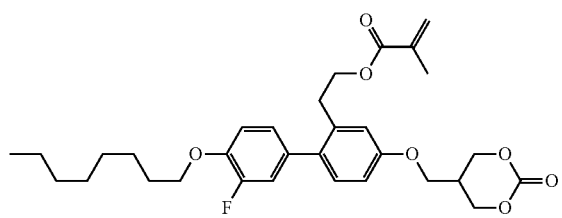
(P-J-28)
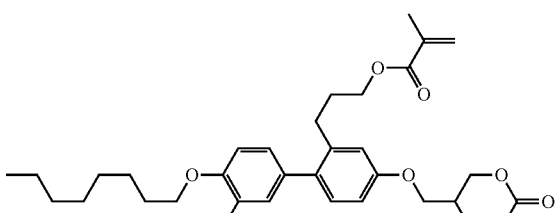
(P-J-29)
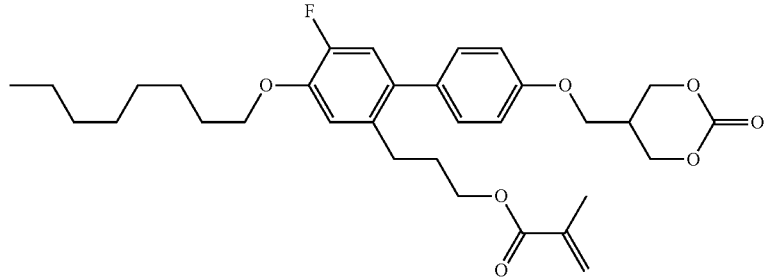
[Chem. 71]
(P-J-30)
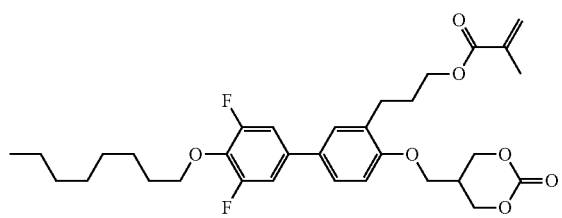
(P-J-31)
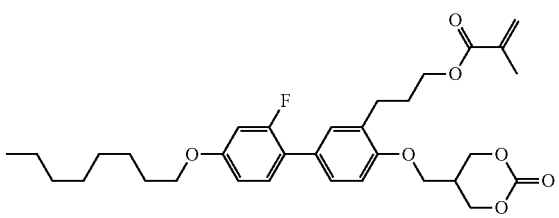
(P-J-32)
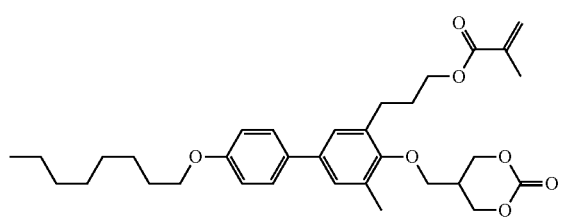
(P-J-33)
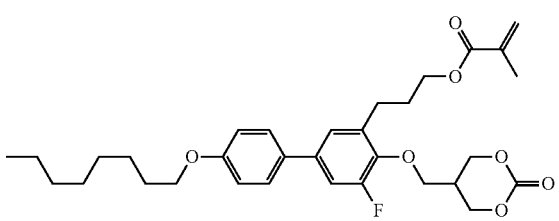

(P-J-34)
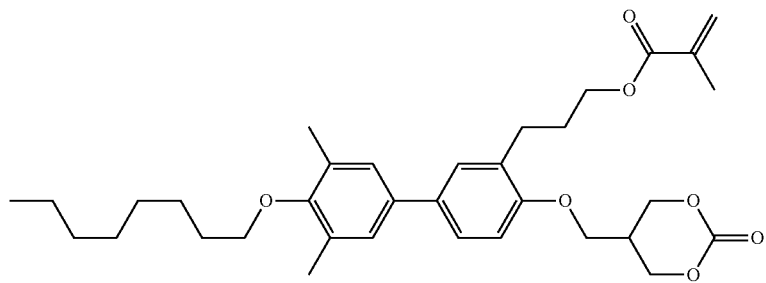
(P-J-35)
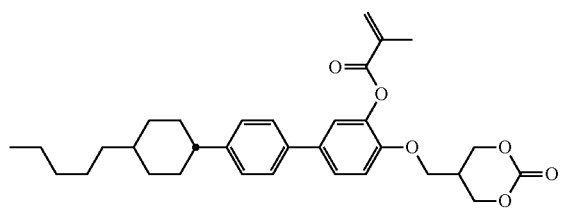
(P-J-36)
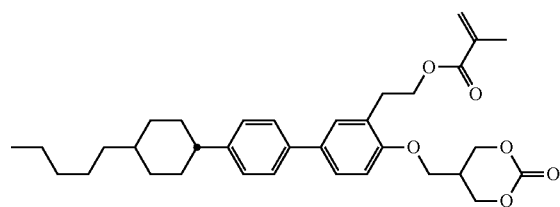
(P-J-37)
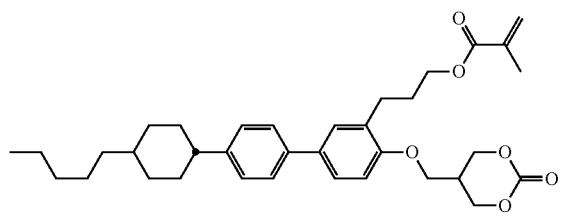
(P-J-38)
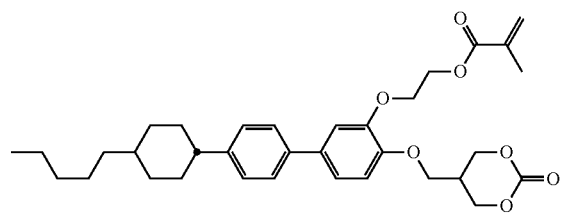
(P-J-39)
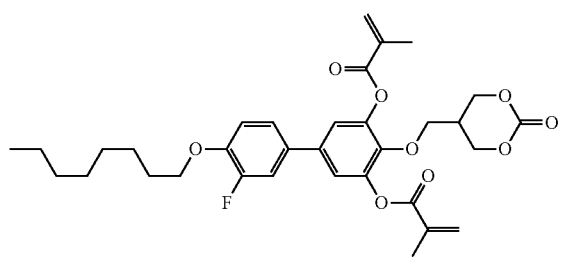
(P-J-40)
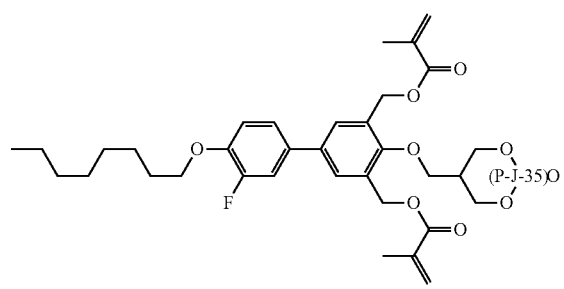
(P-J-41)
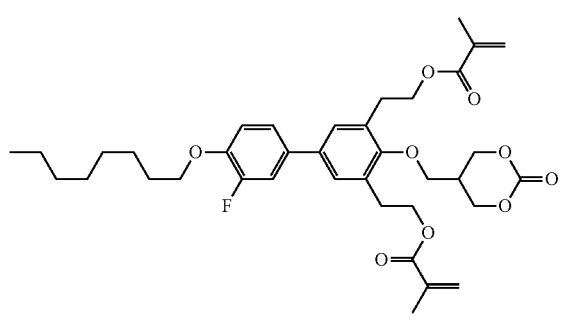
(P-J-42)
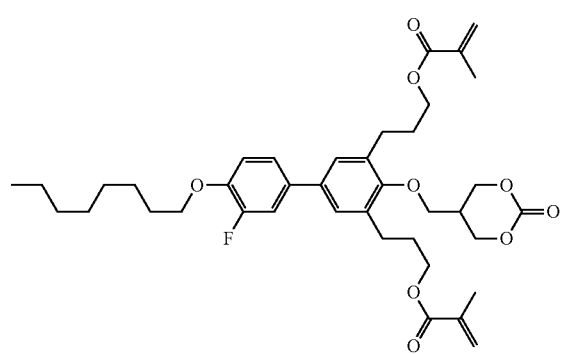

-continued
[Chem. 74]
(P-J-43)
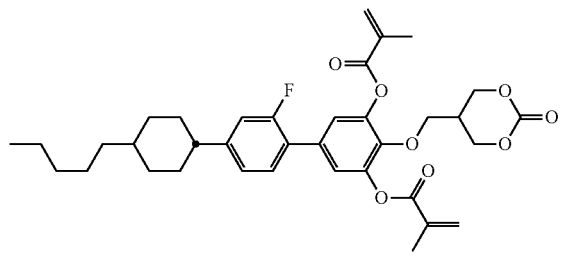
(P-J-44)
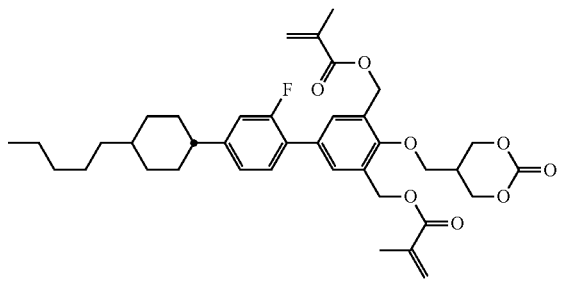
(P-J-45)
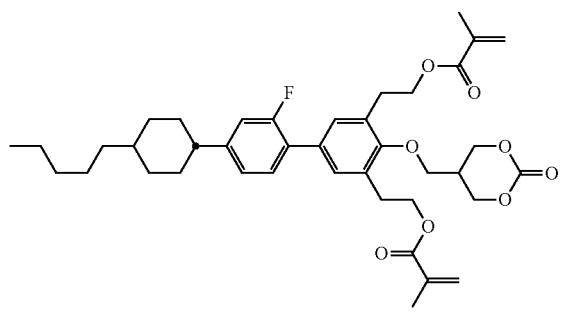
(P-J-46)
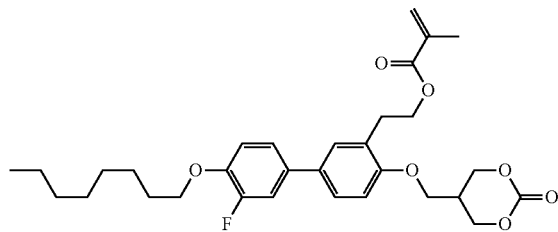
[Chem. 75]
(P-J-47)
(P-J-48)
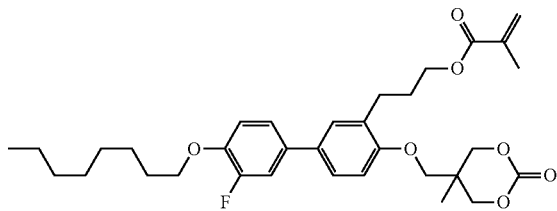
(P-J-49)
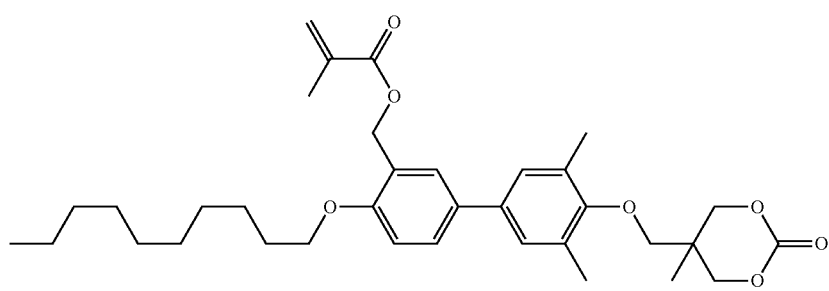
(P-J-50)
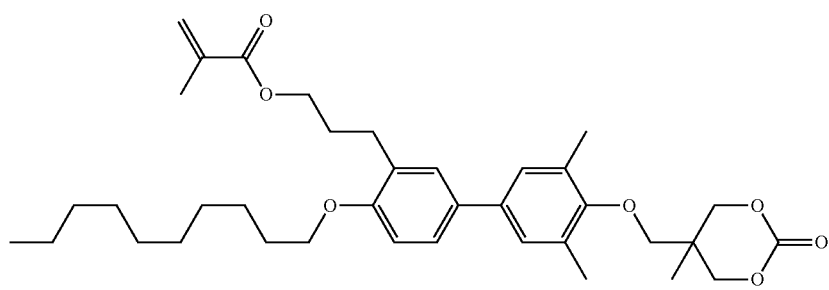

-continued
[Chem. 76]
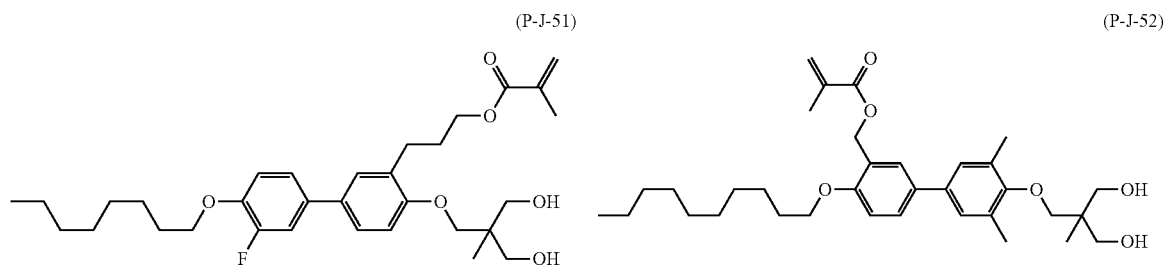
(P-J-51)  (P-J-52)
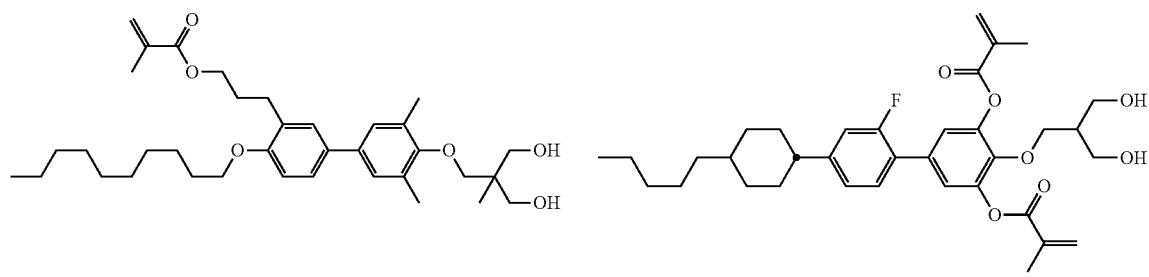
(P-J-54)  (P-J-55)
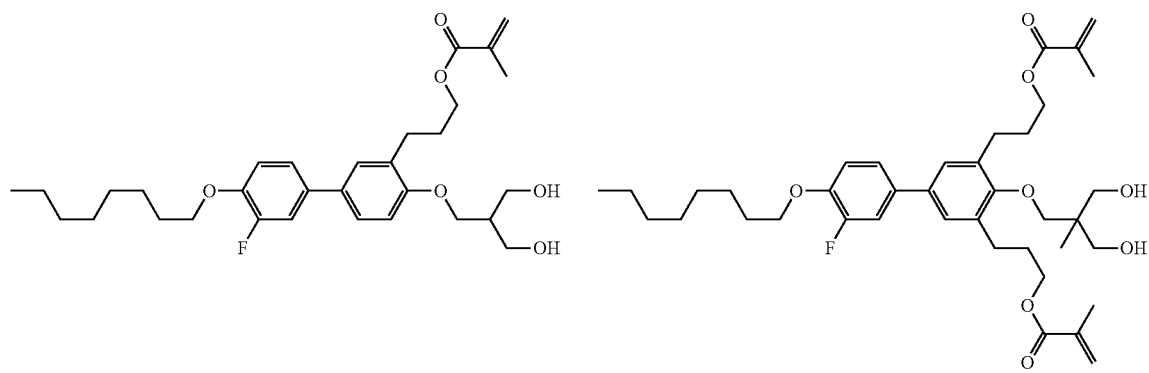
(P-J-56)  (P-J-57)
[Chem. 77]
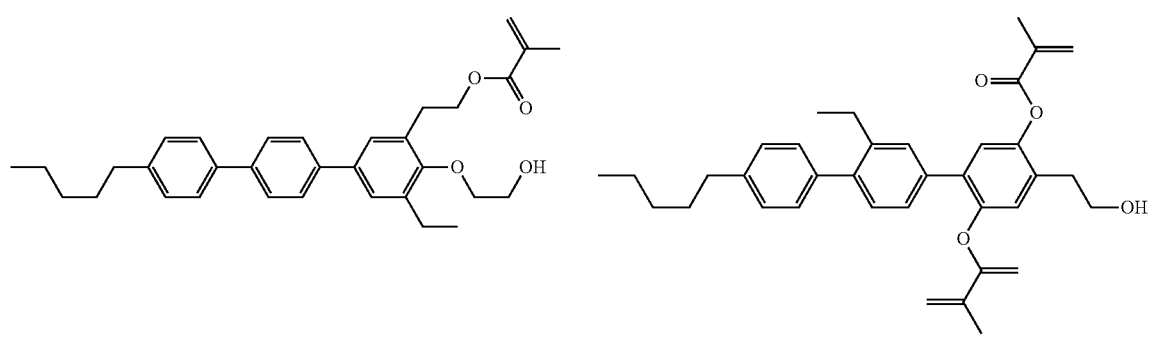
(P-25)  (P-26)

-continued
(P-27)
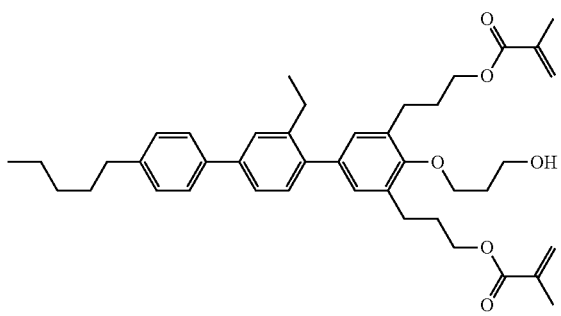
(P-28)
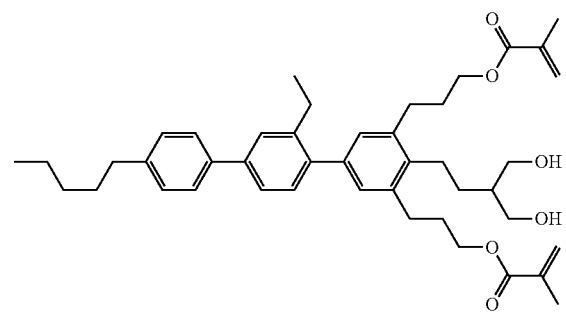
(P-29)
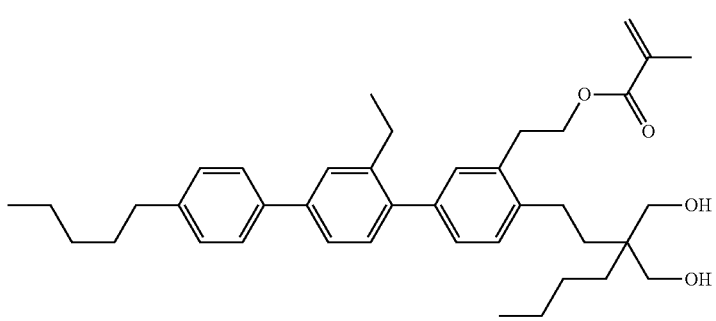
[Chem. 78]
(P-30)
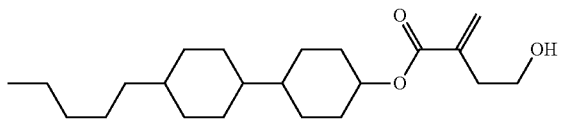
(P-31)
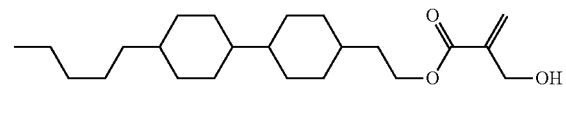
(P-32)
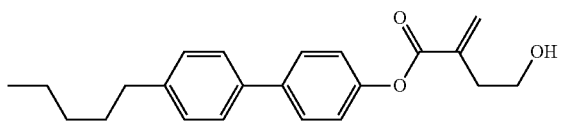
(P-33)
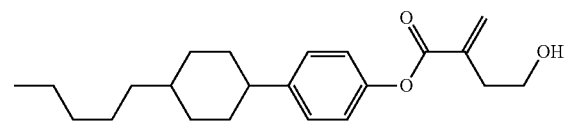
(P-34)
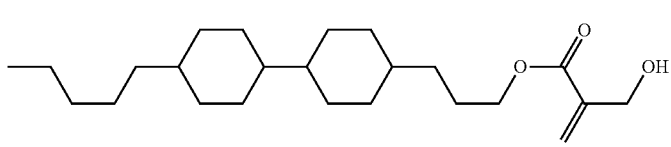
(P-35)
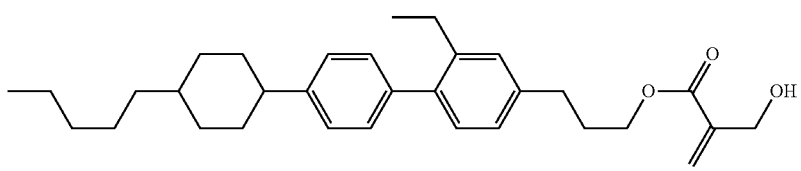

[Chem. 79]
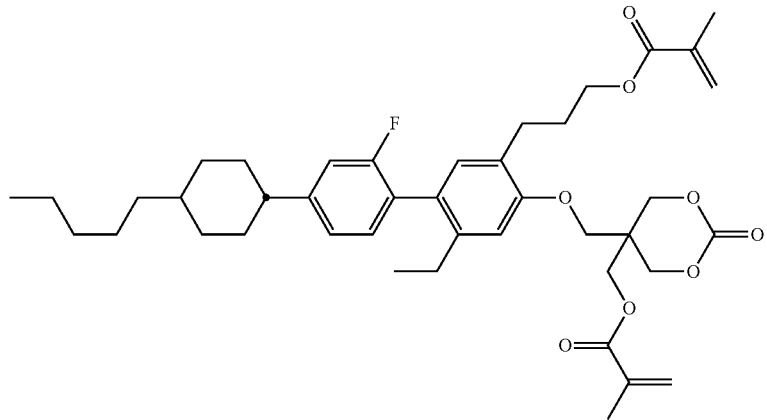
(P-36)
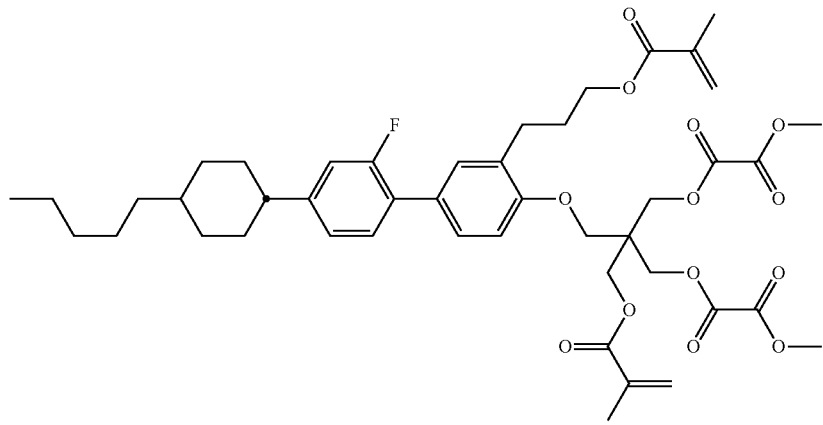
(P-37)
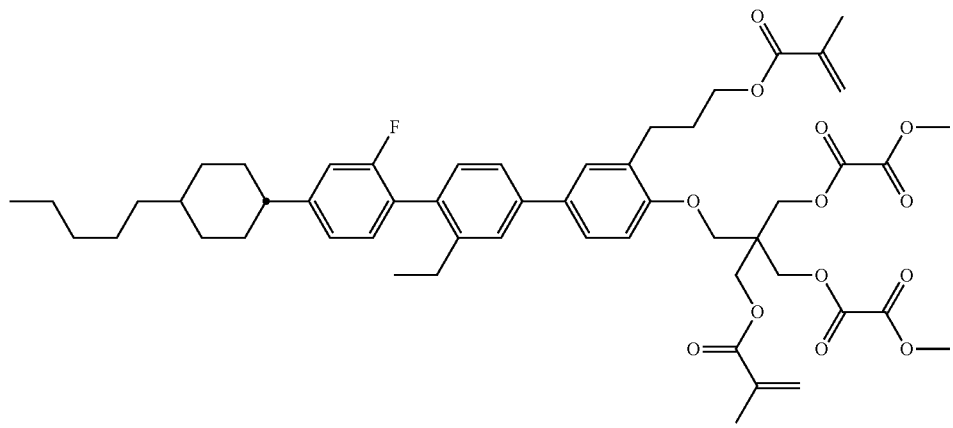
(P-38)

(P-39)

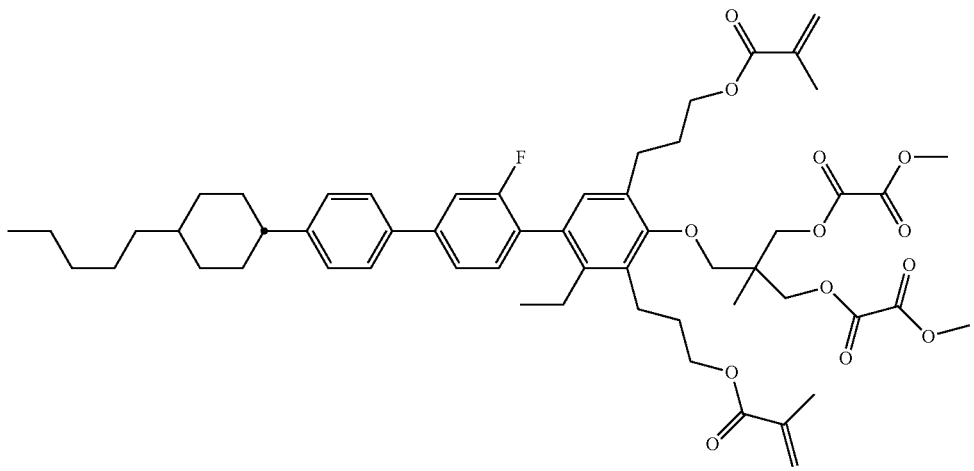

The second monomer according to the present invention has a second mesogenic skeleton and a polymerizable group represented by the general formula (PG2) linked to the second mesogenic skeleton, and has a chemical structure different from the first monomer. It preferably does not contain the polar group represented by the general formula (K).

The second mesogenic skeleton according to the present invention is preferably represented by the general formula (Me2):

[Chem. 80]

(Me2)

In the above general formula (Me2), $Z^{Me2}$ represents a single bond, —CH=CH—, —CF=CF—, —C≡C—, —COO—, —OCO—, —OCOO—, —OOCO—, —CF$_2$O—, —OCF$_2$—, —CH=CHCOO—, —OCOCH=CH—, —CH$_2$—CH$_2$COO—, —OCOCH$_2$—CH$_2$—, —CH=C(CH$_3$)COO—, —OCOC(CH$_3$)=CH—, —CH$_2$—CH(CH$_3$)COO—, —OCOCH(CH$_3$)—CH$_2$—, —OCH$_2$CH$_2$O—, or an alkylene group having 2 to 20 carbon atoms, and one or two or more non-adjacent —CH$_2$— in the alkylene group may be substituted with —O—, —COO—, or —OCO—; $A^{Me2}$ represents a 1,4-phenylene group, a 1,4-cyclohexylene group, a 2,7-phenanthrene group, or a naphthalene-2,6-diyl group, and the hydrogen atom in these cyclic structures may be substituted with a halogen atom, an alkoxy group having 1 to 10 carbon atoms, or P$^{21}$—Sp$^{21}$-, and in the case where a plurality of each of $Z^{Me2}$ and $A^{Me2}$ are present, these may be the same as or different from each other; $m^{Me2}$ represents an integer of 1 to 5, and in the formula (Me2), the black dot at the left end and the black dot at the right end represent a bonding site.

The polymerizable group represented by the general formula (PG2) according to the present invention is any one of the following formulae (R-I) to (R-IX).

[Chem. 81]

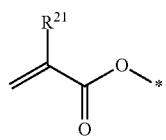
(R-I)

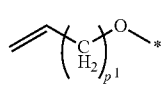
(R-II)

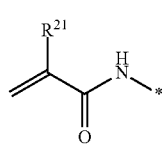
(R-III)

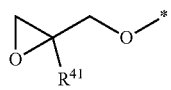
(R-IV)

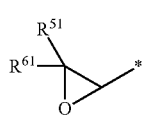
(R-V)

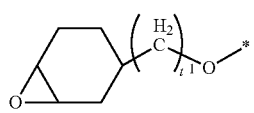
(R-VI)

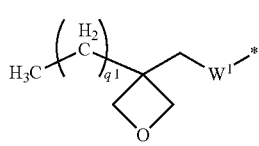
(R-VII)

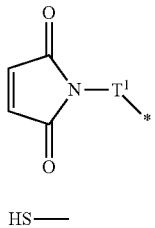

(R-VIII)

(R-IX)

HS—

In the formulae (R-I) to (R-IX), $R^{21}$, $R^{31}$, $R^{41}$, $R^{51}$, and $R^{61}$ are each independently a hydrogen atom, an alkyl group having 1 to 5 carbon atoms, or a halogenated alkyl group having 1 to 5 carbon atoms; $W^1$ is a single bond, —O—, or a methylene group; $T^1$ is a single bond or —COO—; and $p^1$, $t^1$, and $q^1$ are each independently 0, 1, or 2.

Of these, in the above (PG1) and (PG2), $P^{i1}$ is each independently preferably formula (R-I), formula (R-II), formula (R-III), formula (R-IV), formula (R-V), or formula (R-VII), more preferably formula (R-I), formula (R-II), formula (R-III), or formula (R-IV), and more preferably formula (R-I), still more preferably an acryl group or a methacryl group, and even still more preferably a methacryl group.

In the above general formula (PG2), $S^{21}$ is preferably a single bond or an alkylene group having 1 to 3 carbon atoms, and more preferably a single bond.

The number of polymerizable groups represented by the general formula (PG2) in one molecule of the second monomer according to the present invention is preferably 2 to 4, and more preferably 2 to 3.

The role of the first monomer is that a polar group is adsorbed to a substrate, a film, an electrode or the like, and a mesogenic group of the first monomer is further provided with a connection site with another monomer with a polymerizable group while ensuring compatibility with the liquid crystal molecule. On the other hand, the role of the second monomer is considered to be the connection with the first monomer, the provision of the pretilt angle, and the stability of the pretilt angle. Therefore, when the content of the second monomer is not a predetermined amount, it is considered that the degree of crosslinking is low, a stable polymer layer cannot be formed, and the stability (change with time) of the pretilt angle is lowered.

The second monomer according to the present invention is preferably one kind or two or more kinds selected from the group consisting of polymerizable compounds represented by the following general formulae (RM-1) and (RM-2).

[Chem. 82]

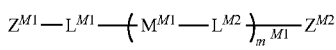

(RM-1)

In the above general formula (RM-1), $Z^{M1}$ and $Z^{M2}$ are represented by the following formulae:

[Chem. 83]

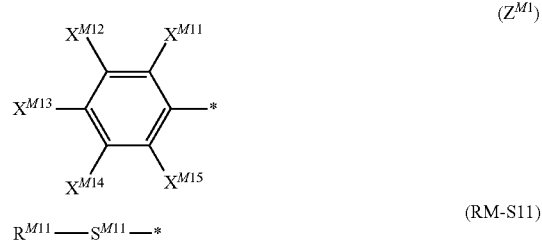

($Z^{M1}$)

(RM-S11)

In the above formula ($Z^{M1}$), $X^{M11}$ to $X^{M15}$ each independently represent one kind or two or more kinds selected from the group consisting of an alkyl group having 1 to 15 carbon atoms, —$CF_3$, a fluorine atom, an alkoxy group having 1 to 15 carbon atoms, and a chlorine atom, or the formula (RM-S11), but at least one of $X^{M11}$ to $X^{M15}$ represents the formula (RM-S11).

[Chem. 84]

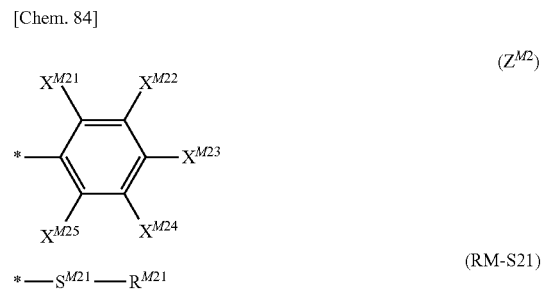

($Z^{M2}$)

(RM-S21)

In the above formula ($Z^{M2}$), $X^{M21}$ to $X^{M25}$ each independently represent one kind or two or more kinds selected from the group consisting of an alkyl group having 1 to 15 carbon atoms, —$CF_3$, a fluorine atom, an alkoxy group having 1 to 15 carbon atoms, and a chlorine atom, or the formula (RM-S21), but at least one of $X^{M21}$ to $X^{M25}$ represents the formula (RM-S21).

In the above formula (RM-S11) and the above formula (RM-S21), $S^{M11}$ and $S^{M21}$ each independently represent an alkylene group having 1 to 12 carbon atoms or a single bond, and —$CH_2$— in the alkylene group may be replaced by —O—, —COO—, —OCO—, or —OCOO—, in which oxygen atoms are not directly bonded to each other, and $R^{M11}$ and $R^{M21}$ each independently represent any one of the above formulae (R-I) to (R-IX);

$L^{M1}$ and $L^{M2}$ each independently represent a single bond, —O—, —$CH_2$—, —$OCH_2$—, —$CH_2O$—, —CO—, —$C_2H_4$—, —COO—, —OCO—, —CH=CH—COO—, —COO—CH=CH—, —OCO—CH=CH—, —CH=CH—OCO—, —$COOC_2H_4$—, —$OCOC_2H_4$—, —$C_2H_4OCO$—, —$C_2H_4COO$—, —$OCOCH_2$—, —$CH_2COO$—, —CH=CH—, —CF=CH—, —CH=CF—, —CF=CF—, —$CF_2$—, —$CF_2O$—, —$OCF_2$—, —$CF_2CH_2$—, —$CH_2CF_2$—, —$CF_2CF_2$—, or —C≡C—, and in the case where a plurality of $L^{M2}$ are present, these may be the same as or different from each other.

$M^{M1}$ represents a 1,4-phenylene group, a 1,4-cyclohexylene group, or a naphthalene-2,6-diyl group, and the hydrogen atom contained in these groups may be substituted with a fluorine atom, a chlorine atom, or an alkyl group having 1 to 8 carbon atoms, a halogenated alkyl group, a halogenated alkoxy group, an alkoxy group, a nitro group, or

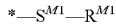  [Chem. 85]

(wherein $S^{M1}$ represents an alkylene group having 1 to 12 carbon atoms or a single bond, and —$CH_2$— in the alkylene group may be replaced by an oxygen atom, —COO—, —OCO—, or —OCOO—, in which oxygen atoms are not directly bonded to each other and $R^{M1}$ represents any one of the above formulae (R-I) to (R-IX)), in the case where a plurality of $M^{M1}$ are present, these may be the same as or different from each other, and $m^{M1}$ represents 0, 1 or 2.

In the case where a plurality of $S^{M11}$, $S^{M21}$, $S^{M1}$, $R^{M11}$, $R^{M21}$, and/or $R^{M1}$ are present, these may be the same as or different from each other.

[Chem. 86]

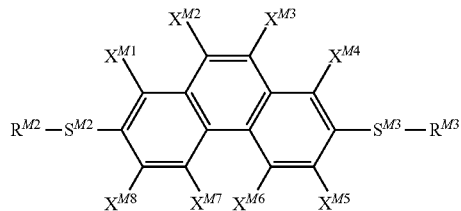

(RM-2)

In the above general formula (RM-2), $X^{M1}$ to $X^{M8}$ each independently represent a hydrogen atom or a fluorine atom; $S^{M2}$ and $S^{M3}$ each independently represent an alkylene group having 1 to 12 carbon atoms or a single bond, and —$CH_2$— in the alkylene group may be replaced by an oxygen atom, —COO—, —OCO—, or —OCOO—, in which oxygen atoms are not directly bonded to each other; and $R^{M2}$ and $R^{M3}$ represents any one of the above formulae (R-I) to (R-IX).

The lower limit of the content of the second monomer in the liquid crystal composition of the present invention is preferably more than 0.4% by mass, preferably 0.43% by mass, preferably 0.44% by mass, preferably 0.45% by mass, preferably 0.46% by mass, preferably 0.47% by mass, preferably 0.48% by mass, preferably 0.49% by mass, preferably 0.5% by mass, preferably 0.52% by mass, preferably 0.55% by mass, preferably 0.57% by mass, preferably 0.6% by mass, preferably 0.62% by mass, preferably 0.65% by mass, preferably 0.67% by mass, preferably 0.7% by mass, preferably 0.72% by mass, preferably 0.75% by mass, preferably 0.77% by mass, preferably 0.8% by mass, preferably 0.82% by mass, preferably 0.84% by mass, preferably 0.87% by mass, and preferably 0.9% by mass. The upper limit of the content of the second monomer in the liquid crystal composition of the present invention is preferably 3% by mass, preferably 2.5% by mass, preferably 2.3% by mass, preferably 2.1% by mass, preferably 2% by mass, preferably 1.8% by mass, preferably 1.6% by mass, preferably 1.5% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, preferably 0.55% by mass, preferably 0.53% by mass, preferably 0.5% by mass, and preferably 0.48% by mass.

In the above general formula (RM-1), $Z^{M1}$ represents the general formula (ZM1):

[Chem. 87]

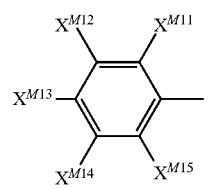

It is preferable that one or two of $X^{M11}$ to $X^{M15}$ represent the general formula (RM-S11), and it is more preferable that $X^{M13}$ represents the general formula (RM-S11).

In the general formula (RM-1), $Z^{M2}$ represents the general formula (ZM2):

[Chem. 88]

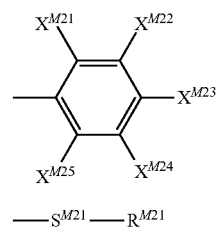

It is preferable that one or two of $X^{M21}$ to $X^{M25}$ represent the general formula (RM-S21), and it is more preferable that $X^{M23}$ represents the general formula (RM-S21).

$R^{M11}$ and $R^{M21}$ each independently preferably represents the formula (R-1) or the formula (R-2).

In the general formula (RM-1), $M^{M1}$ is preferably a 1,4-phenylene group, and the hydrogen atom contained in these groups may be substituted with a fluorine atom, a chlorine atom, or an alkyl group having 1 to 8 carbon atoms, a halogenated alkyl group, a halogenated alkoxy group, an alkoxy group having 1 to 8 carbon atoms, a nitro group, or the general formula (RM-S11).

The polymerizable compound in which $M^{M1}$ is a 1,4-phenylene group has a sufficiently high polymerization rate.

In the general formula (RM-1), $L^{M1}$, $L^{M2}$ each independently preferably represent —$OCH_2$—, —$CH_2O$—, —$C_2H_4$—, —COO—, —OCO—, —CH=CH—COO—, —COO—CH=CH—, —OCO—CH=CH—, —CH=CH—OCO—, —$COOC_2H_4$—, —$OCOC_2H_4$—, —$C_2H_4OCO$—, —$C_2H_4COO$—, —CH=CH—, —CF=CH—, —CH=CF—, —CF=CF—, —$CF_2O$—, —$OCF_2$—, —$CF_2CH_2$—, —$CH_2CF_2$—, —$CF_2CF_2$—, —C≡C—, or a single bond. In addition, in order to improve compatibility with liquid crystal molecules, it is more preferable that the length of the linking group connecting the rings of $L^{M1}$ and $L^{M2}$ is an even number of atoms.

In the above general formula (RM-1), $m^{M1}$ preferably represents 0 or 1. The second monomer, in which $m^{M1}$ represents 0 or 1, exhibits a high compatibility with other liquid crystal compounds.

In the liquid crystal composition according to the present invention, the content of the second monomer represented by the general formula (RM-1) with respect to the entire liquid crystal composition is preferably more than 0.4% by mass, preferably 0.43% by mass, preferably 0.44% by mass, preferably 0.45% by mass, preferably 0.46% by mass, preferably 0.47% by mass, preferably 0.48% by mass, preferably 0.49% by mass, preferably 0.5% by mass, preferably 0.52% by mass, preferably 0.55% by mass, preferably 0.57% by mass, preferably 0.6% by mass, preferably 0.62% by mass, preferably 0.65% by mass, preferably 0.67% by mass, preferably 0.7% by mass, preferably 0.72% by mass, preferably 0.75% by mass, preferably 0.77% by mass, preferably 0.8% by mass, preferably 0.82% by mass, preferably 0.84% by mass, preferably 0.87% by mass, and preferably 0.9% by mass. In the liquid crystal composition of the present invention, the upper limit of the content of the second monomer represented by the general formula (RM-1) is preferably 3% by mass, preferably 2.5% by mass, preferably 2.3% by mass, preferably 2.1% by mass, preferably 2% by mass, preferably 1.8% by mass, preferably 1.6% by mass, preferably 1.5% by mass, preferably 1.4% by mass, preferably 1.2% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, preferably 0.55% by mass, preferably 0.53% by mass, preferably 0.5% by mass, and preferably 0.48% by mass. In addition, a preferred range of the content of the general formula (RM-1) is more than 0.4% by mass to 1.4% by mass, and more preferably more than 0.45% by mass to 1.3% by mass.

As the second monomer represented by the general formula (RM-1) according to the present invention, specifically it is preferable that one kind or two or more kinds selected from the group of polymerizable compounds represented by the following general formula (RM-1-1) and the general formula (RM-1-2).

[Chem. 89]

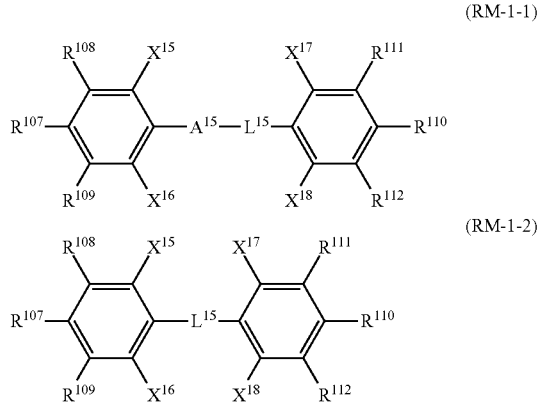

(RM-1-1)

(RM-1-2)

In the above general formula (RM-1-1) and the general formula (RM-1-2), $R^{107}$ represents $P^{107}$—$S^{107}$—; $R^{110}$ represents $P^{110}$—$S^{110}$—; $P^{107}$ and $P^{110}$ each independently represent any one of the above formulae (R-1) to (R-15); $S^{107}$ and $S^{110}$ each independently represent a single bond or an alkylene group having 1 to 15 carbon atoms, and one or two or more —$CH_2$— in the alkylene group may be substituted with —O—, —OCO—, or —COO— so long as oxygen atoms are not directly adjacent to each other;

$R^{108}$, $R^{109}$, $R^{111}$, and $R^{112}$ each independently represent an alkyl group having 1 to 3 carbon atoms, an alkoxy group having 1 to 3 carbon atoms, a fluorine atom, a hydrogen atom, or any one of the above formulae (R-1) to (R-15);

$A^{15}$ represents a 1,4-phenylene group, a 1,4-cyclohexylene group, a pyridine-2,5-diyl group, a pyrimidine-2,5-diyl group, a naphthalene-2,6-diyl group, an indane-2,5-diyl group, a 1,2,3,4-tetrahydronaphthalene-2,6-diyl group, or a 1,3-dioxane-2,5-diyl group, and these groups are unsubstituted or may be substituted with an alkyl group having 1 to 12 carbon atoms, a halogen (fluorine atom, chlorine atom), a cyano group, or a nitro group;

$L^{15}$ represents a single bond, —$OCH_2$—, —$CH_2O$—, —$C_2H_4$—, —COO—, —OCO—, —CH═$CR^a$—COO—, —CH═$CR^a$—OCO—, —COO—$CR^a$═CH—, —OCO—$CR^a$═CH—, —$(CH_2)_Y$—COO—, —$(CH_2)_Y$—OCO—, —OCO—$(CH_2)_Y$—, —COO—$(CH_2)_Y$—, —CH═CH—, —$CF_2O$—, —$OCF_2$—, or —C≡C— (wherein $R^a$ each independently represent a hydrogen atom or an alkyl group having 1 to 3 carbon atoms, and Y represents an integer of 1 to 4); and $X^{15}$, $X^{16}$, $X^{17}$, and $X^{18}$ each independently represent a hydrogen atom, an alkyl group having 1 to 3 carbon atoms, or a fluorine atom.

In the above general formula (RM-1-1) and the general formula (RM-1-2), $S^{107}$ and $S^{110}$ are preferably a single bond or an alkylene group having 1 to 6 carbon atoms (one or two or more —$CH_2$— in the alkylene group may be substituted with —O— so long as oxygen atoms are not directly adjacent to each other), and particularly preferably a single bond.

In the above general formula (RM-1-1), $A^{15}$ is preferably an unsubstituted 1,4-phenylene group or naphthalene-2,6-diyl group, or a 1,4-phenylene group or naphthalene-2,6-diyl group substituted with an alkyl group having 1 to 12 carbon atoms, a halogen (fluorine atom, chlorine atom), a cyano group, or a nitro group, and more preferably an unsubstituted 1,4-phenylene group or naphthalene-2,6-diyl group, or a 1,4-phenylene group or naphthalene-2,6-diyl group substituted with an alkyl group having 1 to 3 carbon atoms or a fluorine atom. In this case, the number of substituents in $A^{15}$ is preferably 0 to 2.

In the above general formula (RM-1-1) and the general formula (RM-1-2), from the viewpoint of compatibility, it is preferable that $L^{15}$ is a single bond or the number of atoms of the linking portion connecting between the rings in $L^{15}$ is an even number (for example, Y is preferably 2 or 4).

In the liquid crystal composition according to the present invention, the content of the second monomer represented by the general formula (RM-1-1) and the general formula (RM-1-2) with respect to the entire liquid crystal composition is preferably more than 0.4% by mass, preferably 0.43% by mass, preferably 0.44% by mass, preferably 0.45% by mass, preferably 0.46% by mass, preferably 0.47% by mass, preferably 0.48% by mass, preferably 0.49% by mass, preferably 0.5% by mass, preferably 0.52% by mass, preferably 0.55% by mass, preferably 0.57% by mass, preferably 0.6% by mass, preferably 0.62% by mass, preferably 0.65% by mass, preferably 0.67% by mass, preferably 0.7% by mass, preferably 0.72% by mass, preferably 0.75% by mass, preferably 0.77% by mass, preferably 0.8% by mass, preferably 0.82% by mass, preferably 0.84% by mass, preferably 0.87% by mass, and preferably 0.9% by mass. In the liquid crystal composition of the present invention, the upper limit of the content of the second monomer represented by the general formula (RM-1-1) and the general formula (RM-1-2) is preferably 3% by mass, preferably 2.5% by mass, preferably 2.3% by mass, preferably 2.1% by mass, preferably 2% by mass, preferably 1.8% by mass, preferably 1.6% by mass, preferably 1.5% by mass, preferably 1.4% by mass, preferably 1.2% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, preferably 0.55% by mass, preferably 0.53% by mass, preferably 0.5% by mass, and preferably 0.48% by mass.

The second monomer represented by the general formula (RM-1-2) according to the present invention is preferably one kind or two or more kinds of polymerizable compounds represented by the general formula (IV).

[Chem. 90]

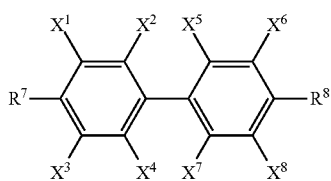

(IV)

In the general formula (IV), $R^7$ and $R^8$ each independently represent any of the above formulae (R-1) to (R-15), and $X^1$ to $X^8$ each independently represent a trifluoromethyl group, a trifluoromethoxy group, a methoxy group, a methyl group, a fluorine atom, or a hydrogen atom.

The structure of the biphenyl skeleton in the general formula (IV) is more preferably the formulae (IV-11) to (IV-21), and particularly preferably the formula (IV-20).

[Chem. 91]

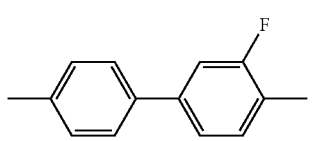

(IV-11)

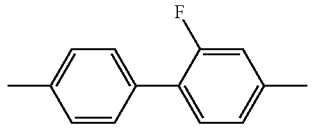

(IV-12)

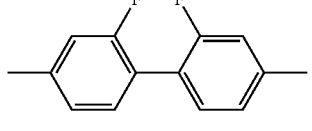

(IV-13)

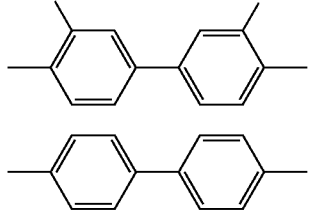

(IV-14)

(IV-15)

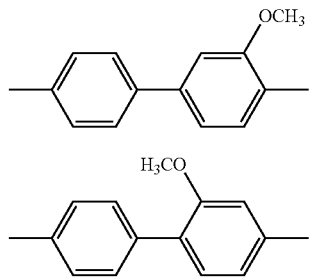

(IV-16)

(IV-17)

(IV-18)

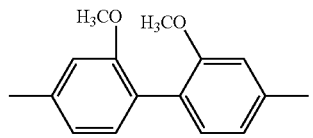

(IV-19)

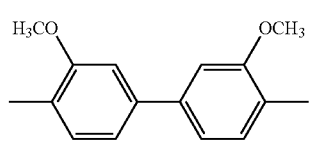

(IV-20)

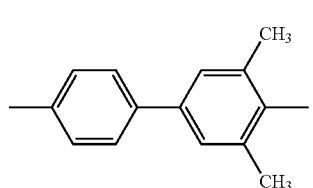

(IV-21)

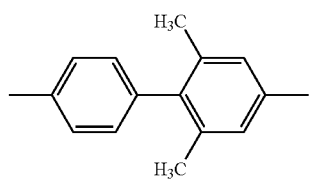

The polymerizable compound containing a skeleton represented by the formulae (IV-11) to (IV-21) has an optimum orientation regulating force after polymerization, and a good orientation state can be obtained.

Specifically, the compound represented by the general formula (RM-1) according to the present invention is preferably any of compounds represented by Formula (XX-1) to the general formula (XX-29), and more preferably any of compounds represented by Formula (XX-1) to Formula (XX-7) and Formula (XX-23).

[Chem. 92]

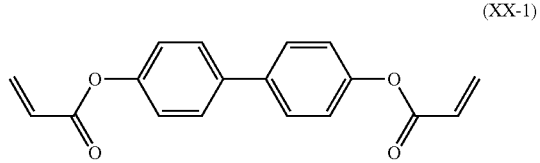

(XX-1)

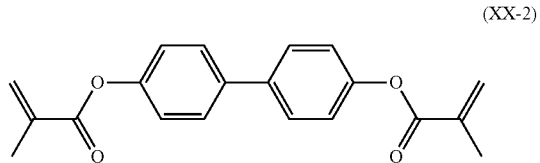

(XX-2)

(XX-3)
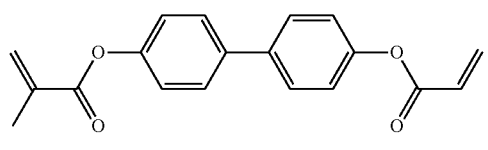
(XX-4)
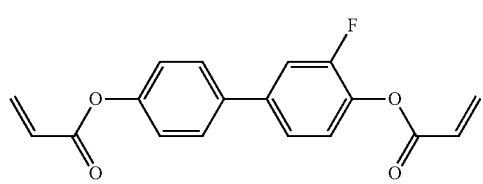
(XX-5)
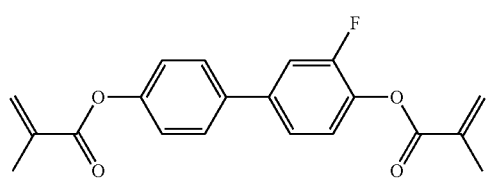
(XX-6)
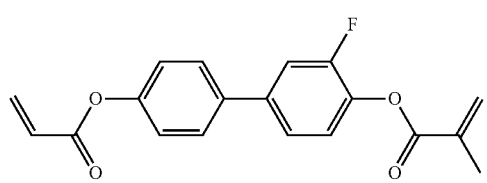
(XX-7)
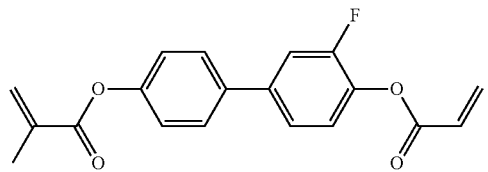
(XX-8)
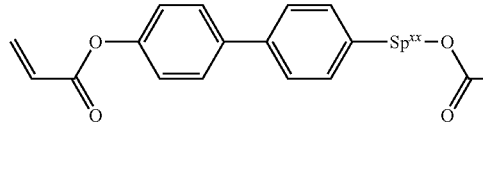
(XX-9)
(XX-10)
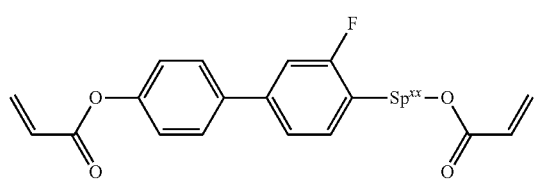
(XX-11)
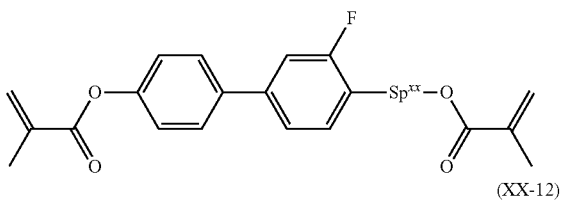
(XX-12)
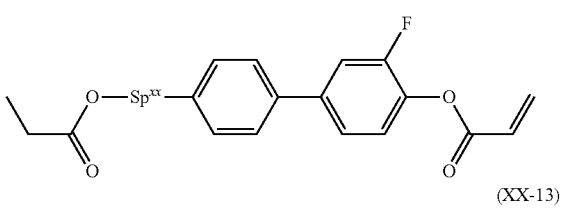
(XX-13)
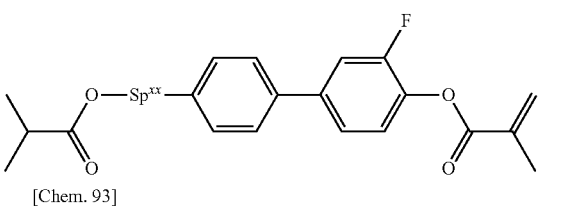
[Chem. 93]
(XX-14)
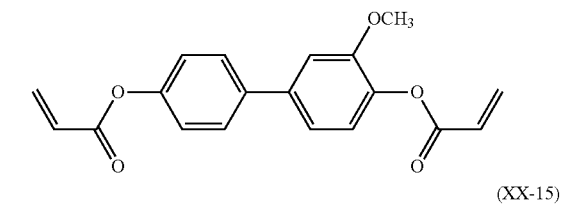
(XX-15)
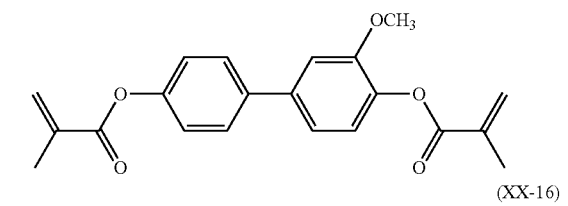
(XX-16)
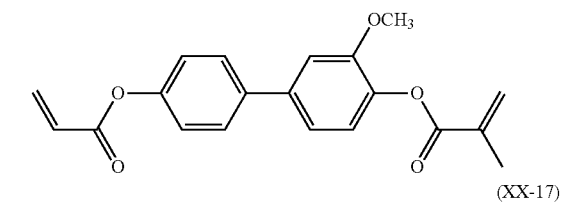
(XX-17)
(XX-18)
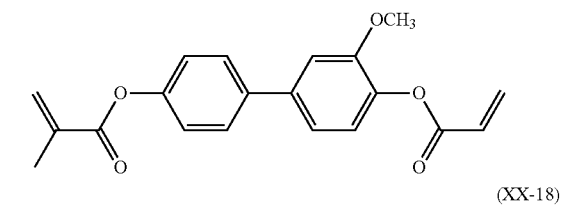

(XX-19)
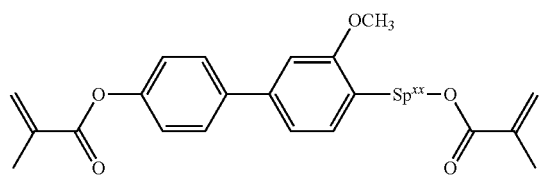

(XX-20)
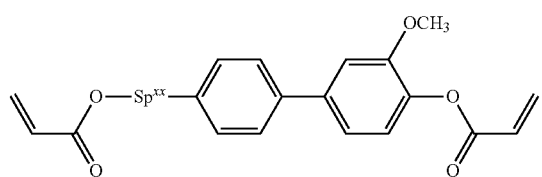

(XX-21)
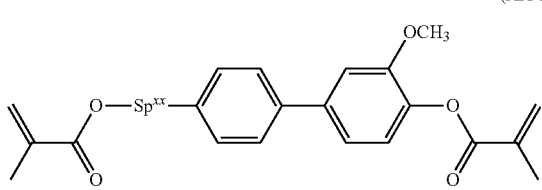

(XX-22)
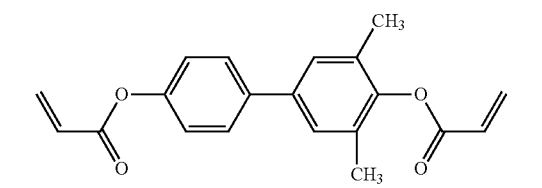

(XX-23)
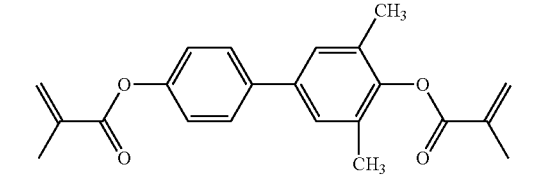

(XX-24)
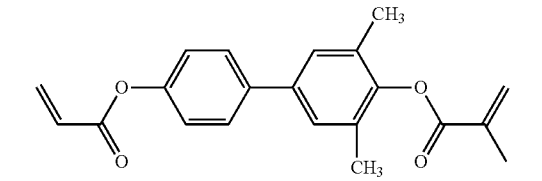

(XX-25)
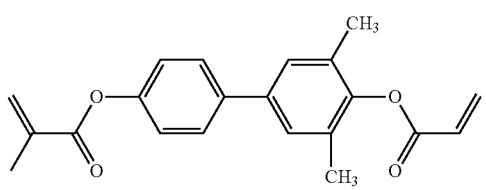

(XX-26)
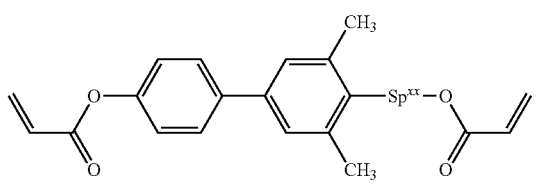

(XX-27)
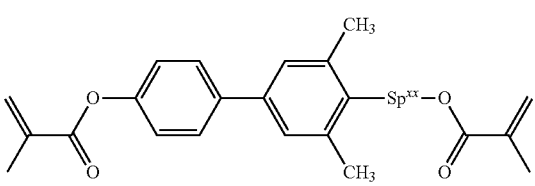

(XX-28)
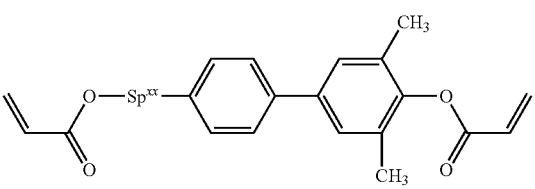

(XX-29)
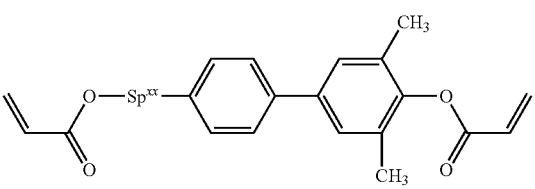

In Formula (XX-1) to the general formula (XX-29), $Sp^{xx}$ represents an alkylene group having 1 to 8 carbon atoms or —O—$(CH_2)_s$— (wherein s represents an integer of 2 to 7, and the oxygen atom is bonded to the ring).

In Formula (XX-1) to the general formula (XX-29), the hydrogen atom in the 1,4-phenylene group may further be substituted with —F, —Cl, —$CF_3$, —$CH_3$, or any one of Formulae (R-1) to (R-15).

Moreover, as the compound represented by the general formula (RM-1), for example, polymerizable compounds such as Formula (M1) to Formula (M18) are preferable.

[Chem. 94]

(M1)
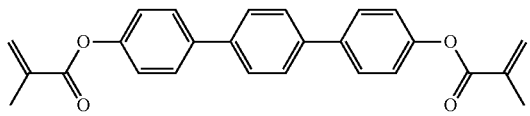

(M2)
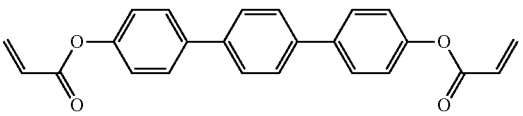

-continued
(M3)
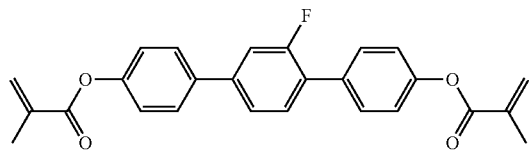
(M4)
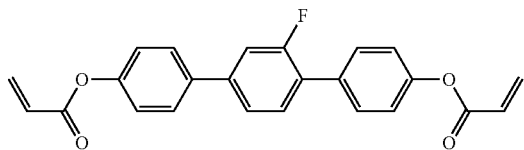
(M5)
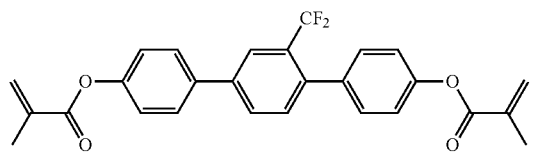
(M6)
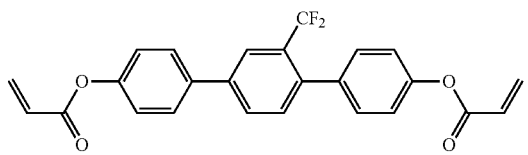
(M7)
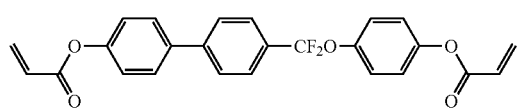
(M8)
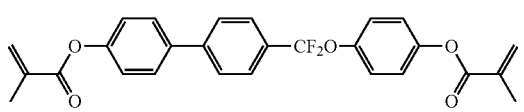
(M9)
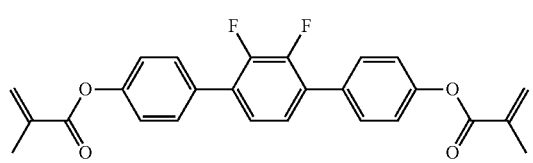
(M10)
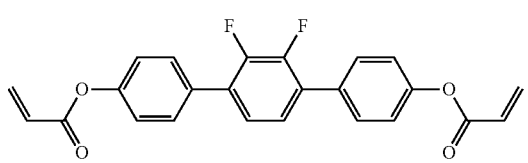
(M11)
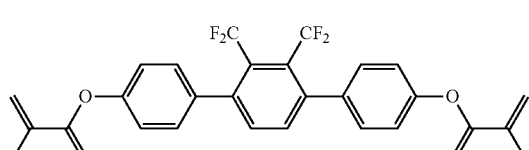
(M12)
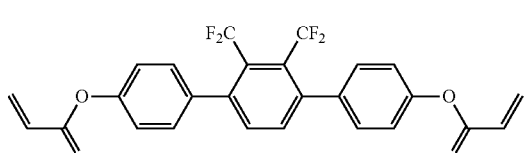
(M13)
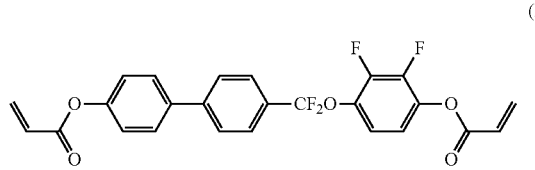
(M14)
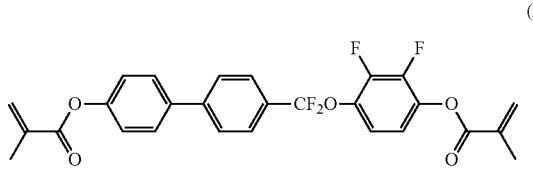
(M15)
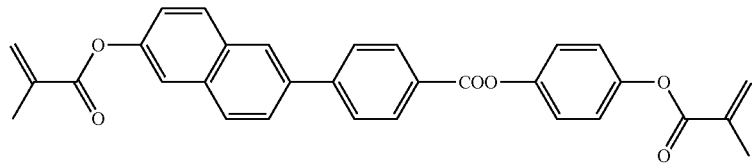
(M16)
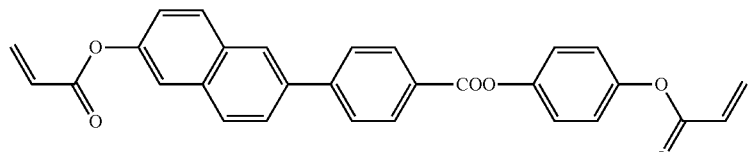
(M17)
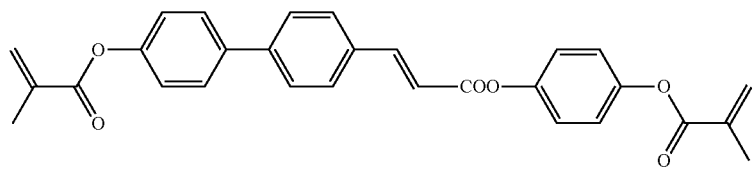

(M18)
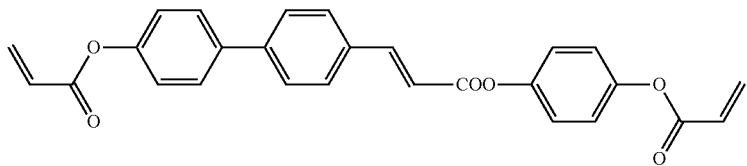
In addition, polymerizable compounds such as Formula (M19) to Formula (M34) are also preferable.
[Chem. 95]
(M19)
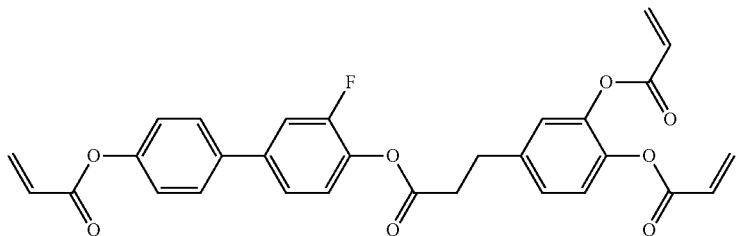
(M20)
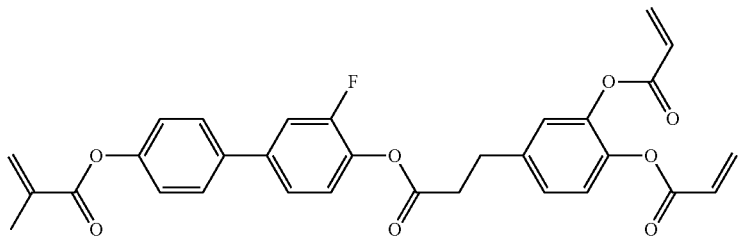
(M21)
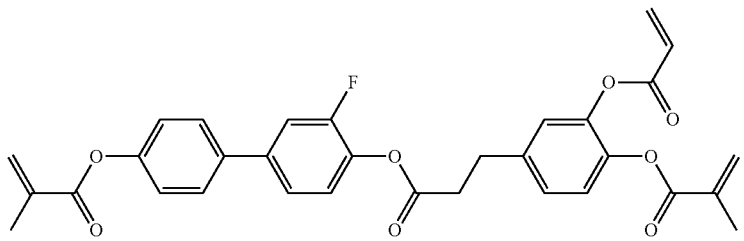
(M22)
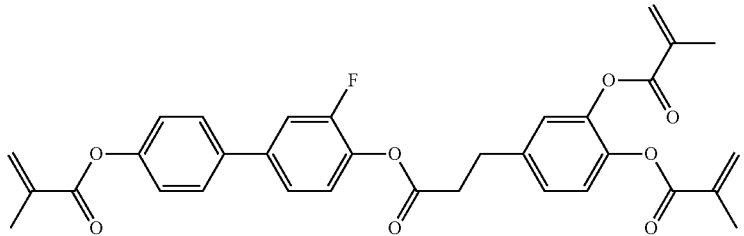
(M23)
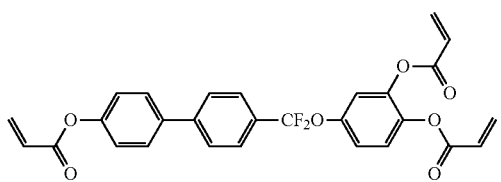
(M24)
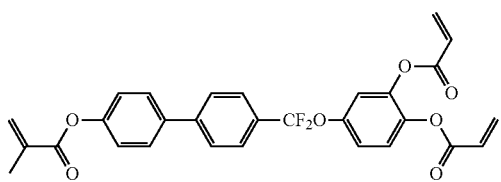

-continued
(M25)
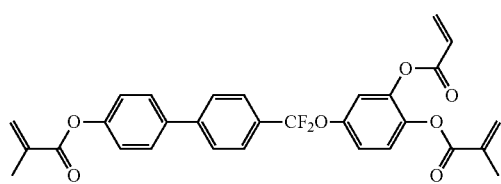
(M26)
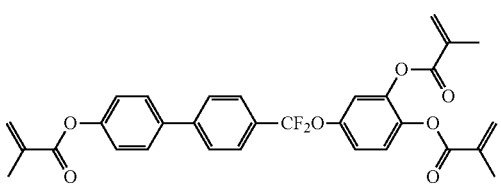
[Chem. 96]
(M27)
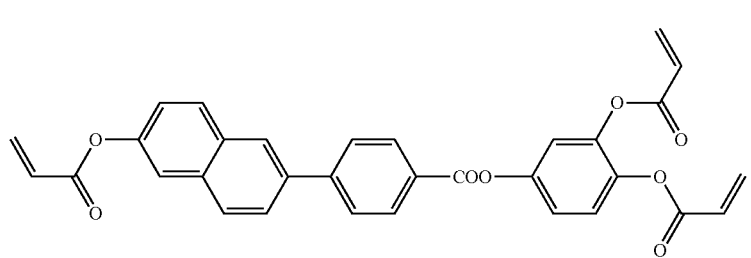
(M28)
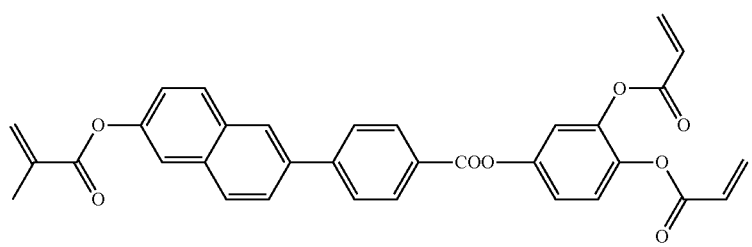
(M29)
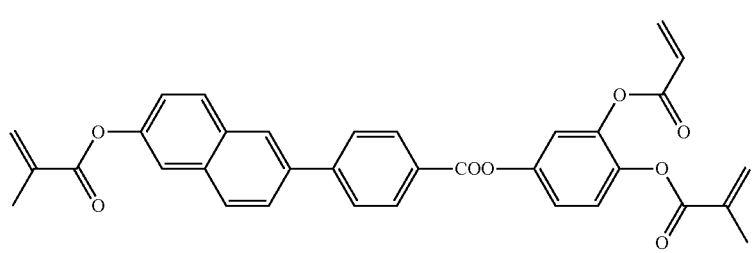
(M30)
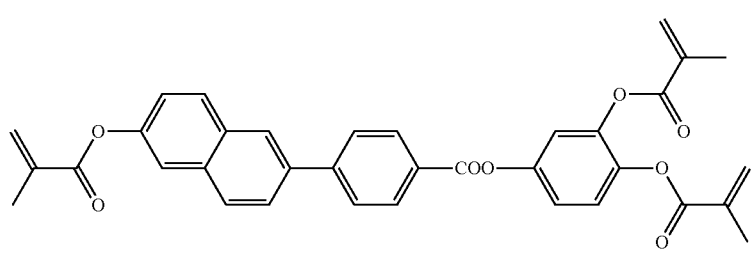
(M31)
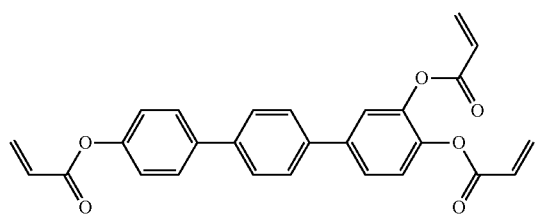
(M32)
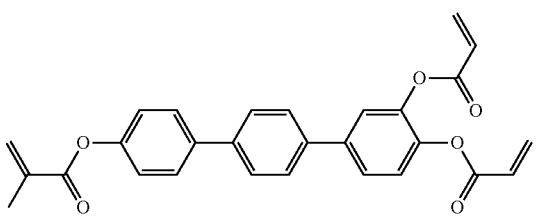

(M33) (M34)
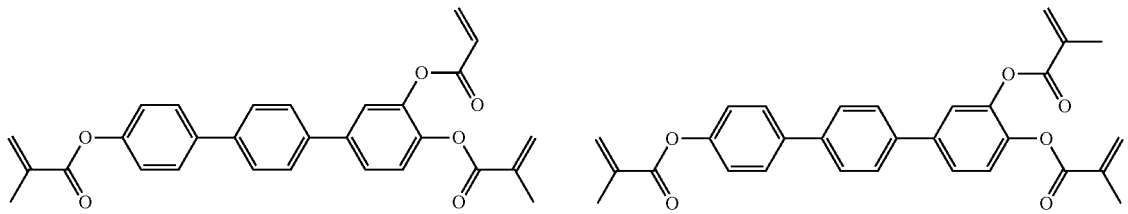
The hydrogen atoms in the 1,496-phenylene group and naphthalene group in Formula (M19) to Formula (M34) may further be substituted with —F, —Cl, —CF$_3$, or —CH$_3$.
In addition, polymerizable compounds such as Formula (M35) to Formula (M65) are also preferable.
[Chem. 97]
(M35)
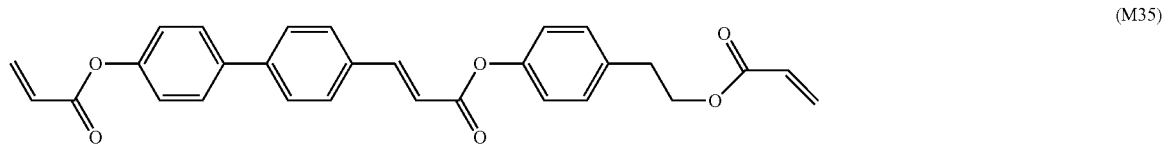
(M36)
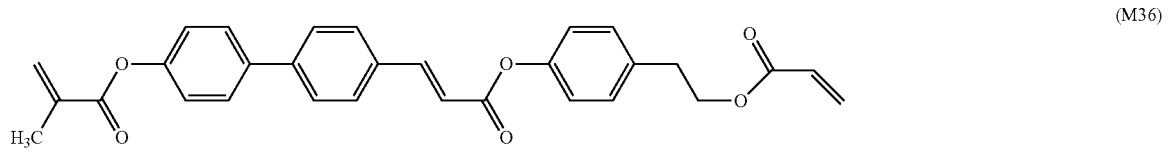
(M37)
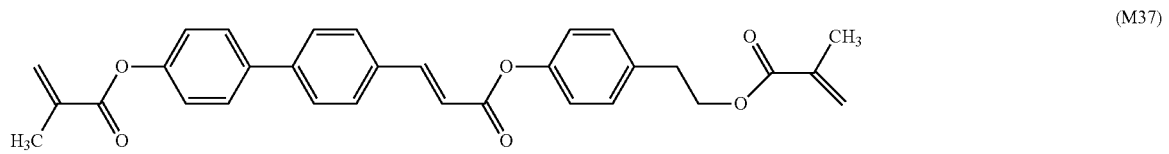
(M38)
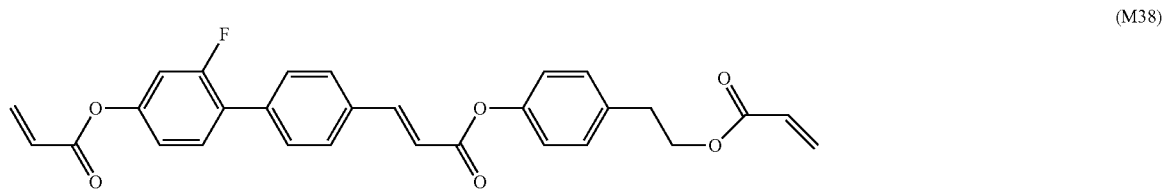
(M39)
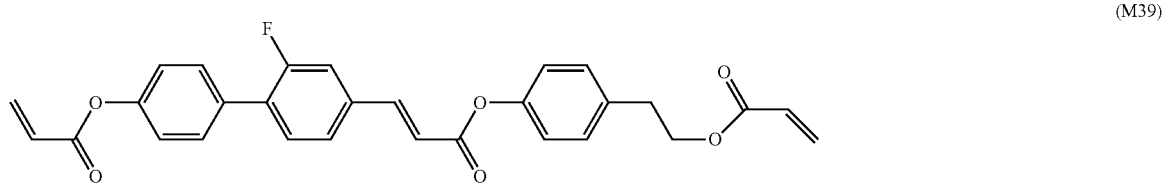
(M40)
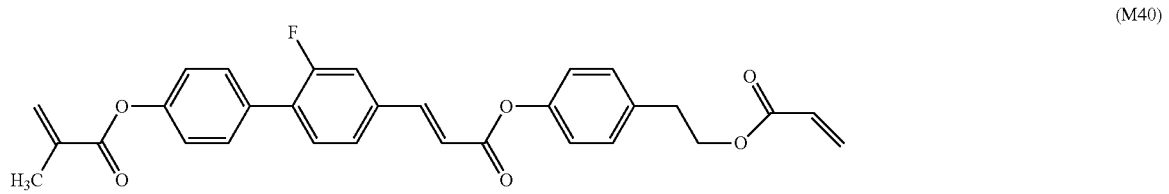

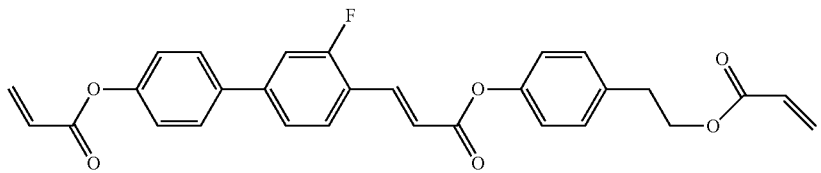
(M41)
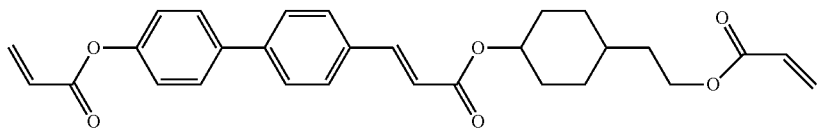
(M42)
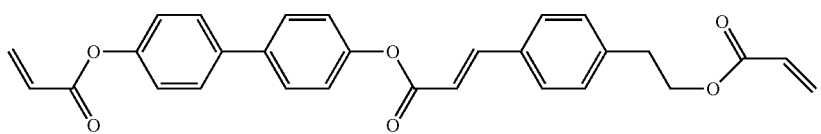
(M43)
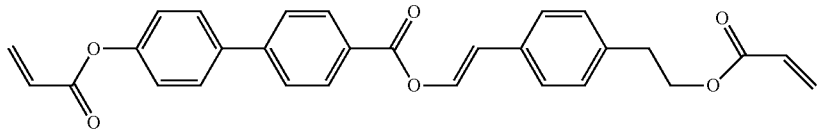
(M44)
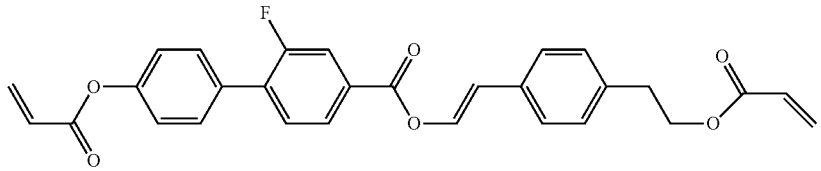
(M45)
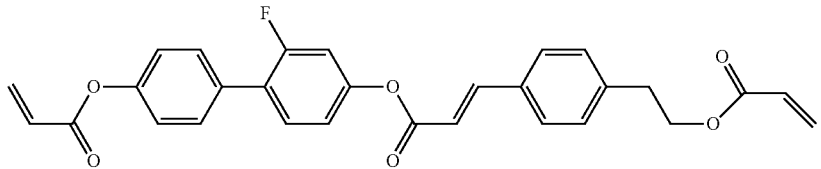
(M46)
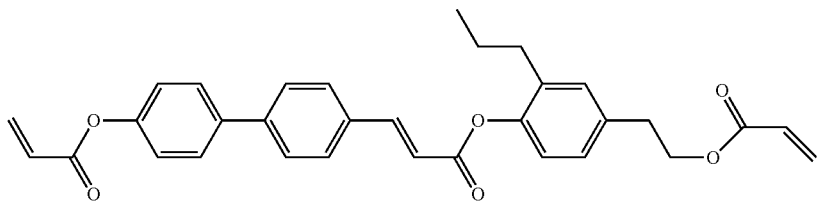
(M47)
[Chem. 98]
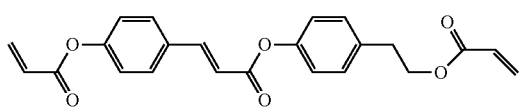
(M48)
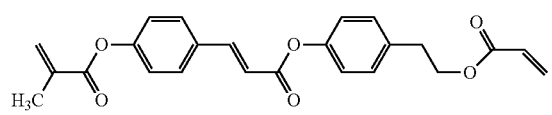
(M49)
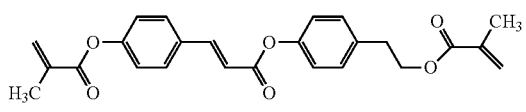
(M50)
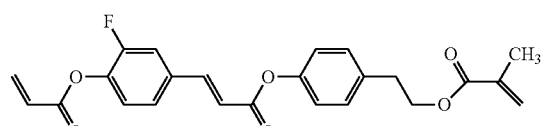
(M51)

(M52)
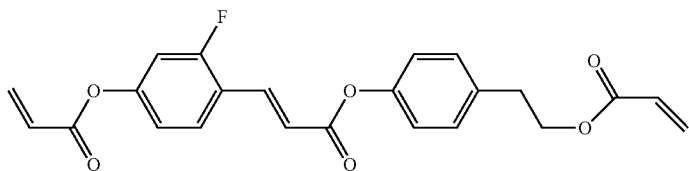
[Chem. 99]
(M53)
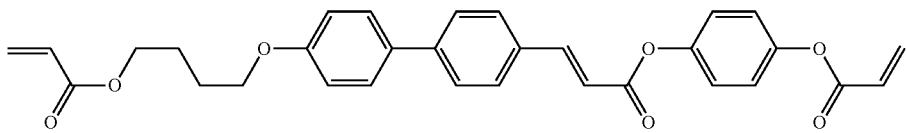
(M54)
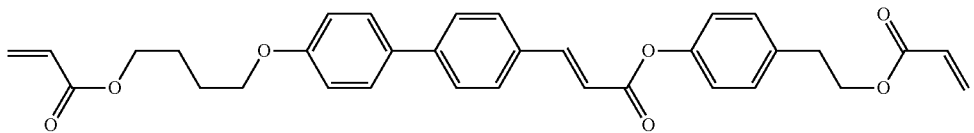
(M55)
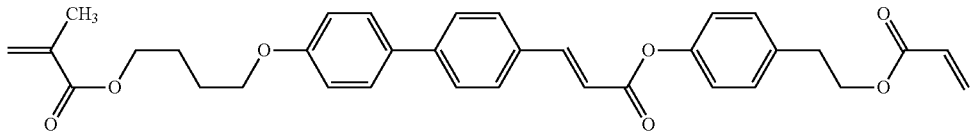
(M56)
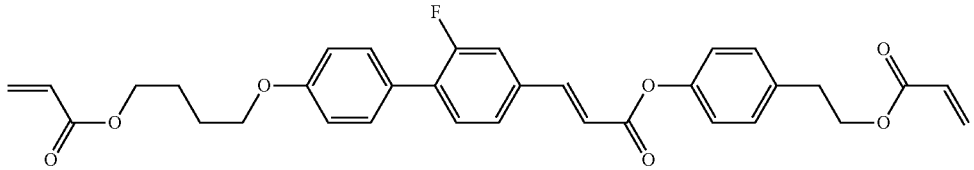
(M57)
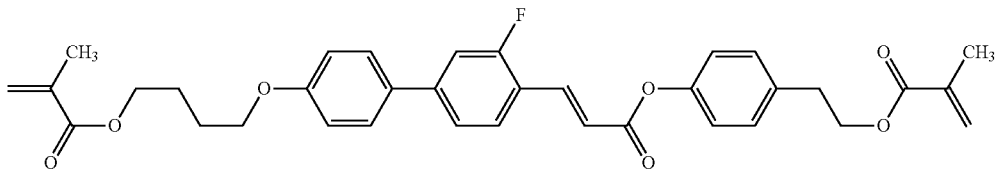
[Chem. 100]
(M58)
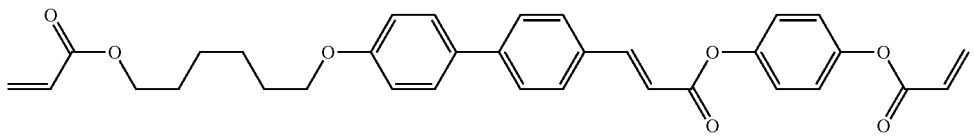
(M59)
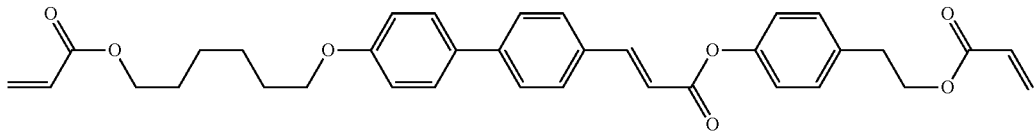
(M60)
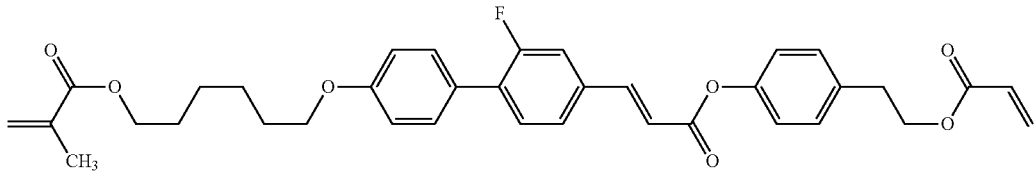

(M61)

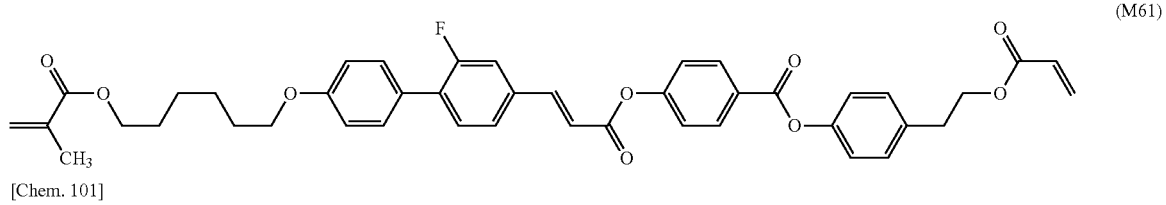

[Chem. 101]

(M62)

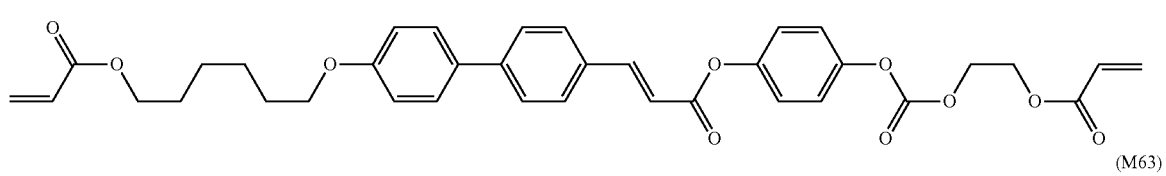

(M63)

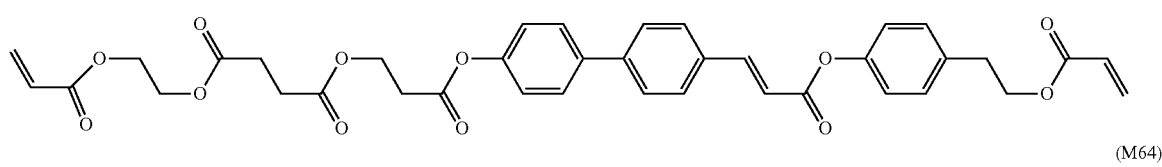

(M64)

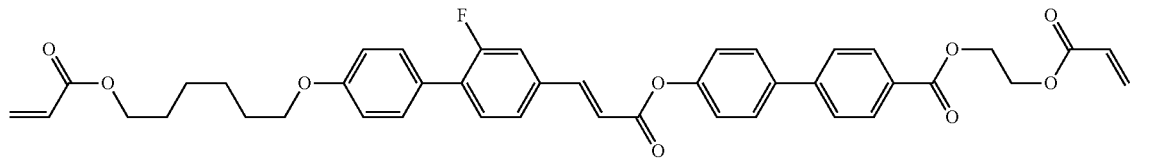

(M65)

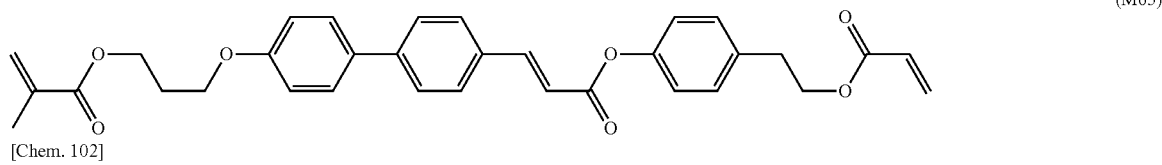

[Chem. 102]

(M66)                                          (M67)

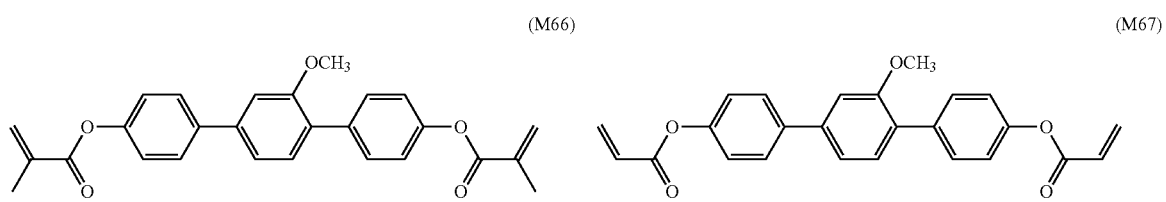

In the liquid crystal composition according to the present invention, the content of the second monomer represented by Formulae (M1) to (M67) with respect to the entire liquid crystal composition is preferably more than 0.4% by mass, preferably 0.43% by mass, preferably 0.44% by mass, preferably 0.45% by mass, preferably 0.46% by mass, preferably 0.47% by mass, preferably 0.48% by mass, preferably 0.49% by mass, preferably 0.5% by mass, preferably 0.52% by mass, preferably 0.55% by mass, preferably 0.57% by mass, preferably 0.6% by mass, preferably 0.62% by mass, preferably 0.65% by mass, preferably 0.67% by mass, preferably 0.7% by mass, preferably 0.72% by mass, preferably 0.75% by mass, preferably 0.77% by mass, preferably 0.8% by mass, preferably 0.82% by mass, preferably 0.84% by mass, preferably 0.87% by mass, and preferably 0.9% by mass. In the liquid crystal composition of the present invention, the upper limit of the content of the second monomer represented by the general formula (RM-1) is preferably 3% by mass, preferably 2.5% by mass, preferably 2.3% by mass, preferably 2.1% by mass, preferably 2% by mass, preferably 1.8% by mass, preferably 1.6% by mass, preferably 1.5% by mass, preferably 1.4% by mass, preferably 1.2% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, preferably 0.55% by mass, preferably 0.53% by mass, preferably 0.5% by mass, and preferably 0.48% by mass. In addition, the preferable range of the content of the second monomer represented by Formula (M1) to Formula (M67) with respect to the entire liquid crystal composition is preferably more than 0.4% by mass to 1.4% by mass, and more preferably more than 0.45% by mass to 1.3% by mass.

In the above general formula (RM-2), $R^{M2}$ and $R^{M3}$ each independently preferably represent any one of the above Formula (R-1) and Formula (R-2).

In the above general formula (RM-2), $S^{M2}$ and $S^{M3}$ each independently preferably represent an alkylene group having 1 to 6 carbon atoms (—$CH_2$— in the alkylene group may be replaced by an oxygen atom, —COO—, —OCO—, or —OCOO—, in which oxygen atoms are not directly bonded to each other) or a single bond.

In the liquid crystal composition according to the present invention, the content of the second monomer represented by the general formula (RM-2) with respect to the entire liquid crystal composition is preferably more than 0.4% by mass, preferably 0.43% by mass, preferably 0.44% by mass, preferably 0.45% by mass, preferably 0.46% by mass, preferably 0.47% by mass, preferably 0.48% by mass, preferably 0.49% by mass, preferably 0.5% by mass, preferably 0.52% by mass, preferably 0.55% by mass, preferably 0.57% by mass, preferably 0.6% by mass, preferably 0.62% by mass, preferably 0.65% by mass, preferably 0.67% by mass, preferably 0.7% by mass, preferably 0.72% by mass, preferably 0.75% by mass, preferably 0.77% by mass, preferably 0.8% by mass, preferably 0.82% by mass, preferably 0.84% by mass, preferably 0.87% by mass, and preferably 0.9% by mass. In the liquid crystal composition of the present invention, the upper limit of the content of the second monomer represented by the general formula (RM-1) is preferably 3% by mass, preferably 2.5% by mass, preferably 2.3% by mass, preferably 2.1% by mass, preferably 2% by mass, preferably 1.8% by mass, preferably 1.6% by mass, preferably 1.5% by mass, preferably 1.4% by mass, preferably 1.2% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, preferably 0.55% by mass, preferably 0.53% by mass, preferably 0.5% by mass, and preferably 0.48% by mass.

Preferred examples of the compound represented by the general formula (RM-2) according to the present invention include polymerizable compounds represented by the following Formula (RM-2-1) to Formula (RM-2-52).

[Chem. 103]

(RM-2-1)

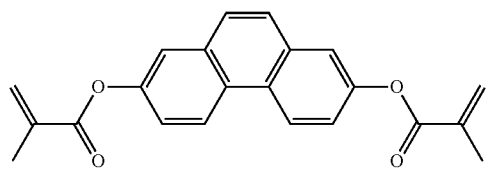

(RM-2-2)

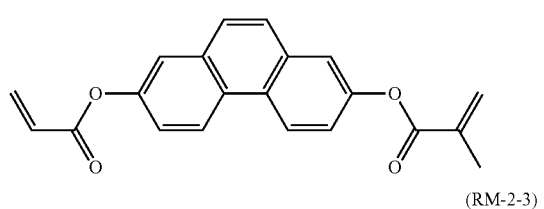

(RM-2-3)

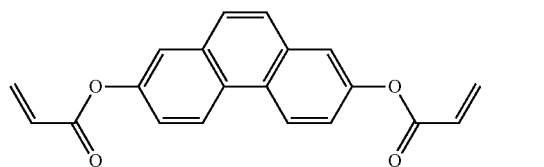

-continued (RM-2-4)

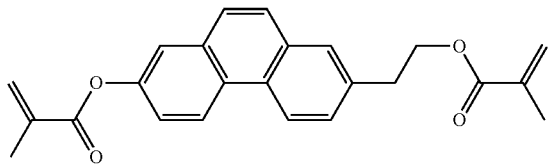

(RM-2-5)

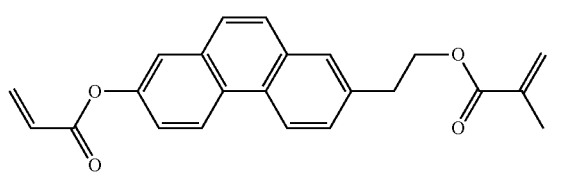

(RM-2-6)

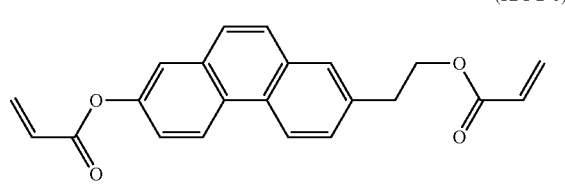

(RM-2-7)

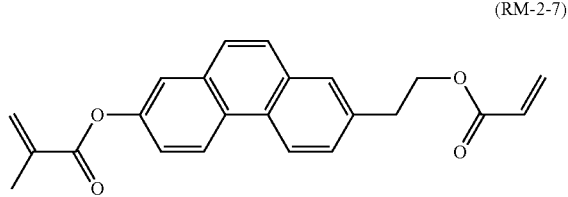

(RM-2-8)

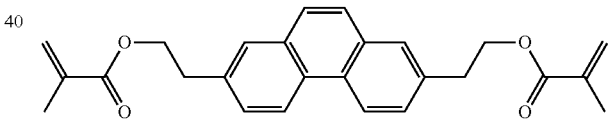

(RM-2-9)

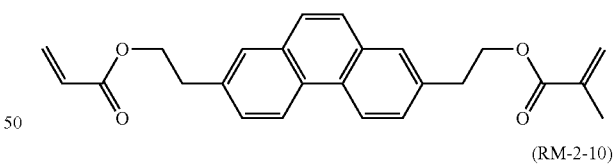

(RM-2-10)

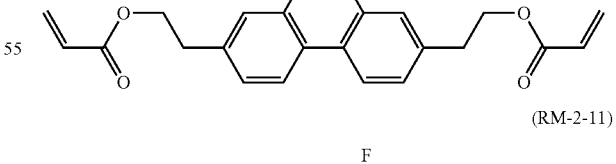

(RM-2-11)

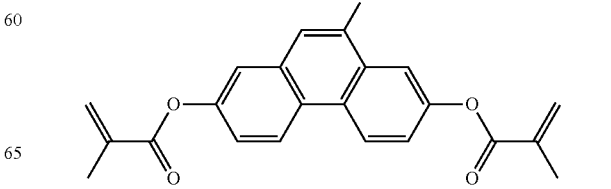

(RM-2-12)
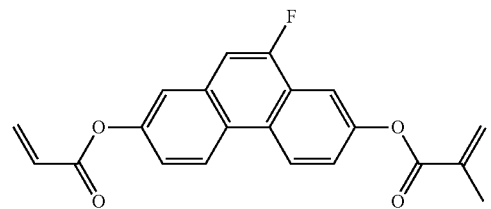
(RM-2-13)
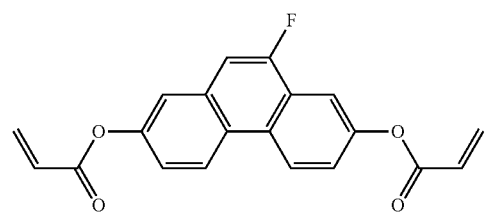
(RM-2-14)
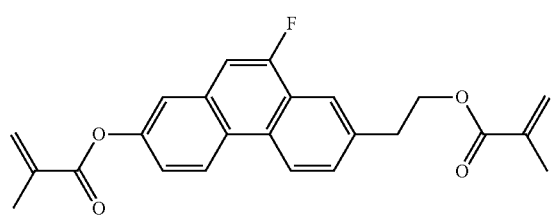
(RM-2-15)
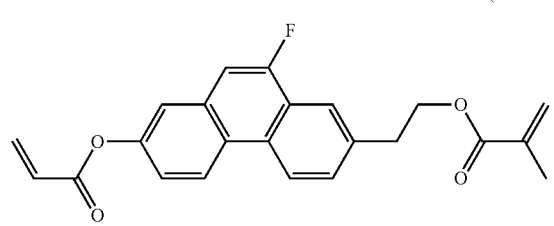
(RM-2-16)
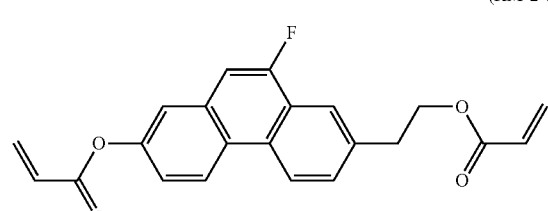
(RM-2-17)
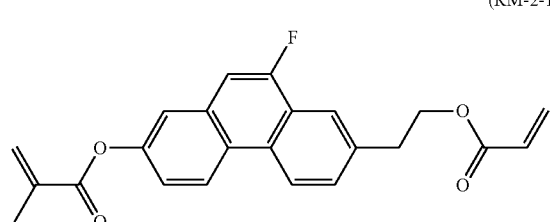
(RM-2-18)
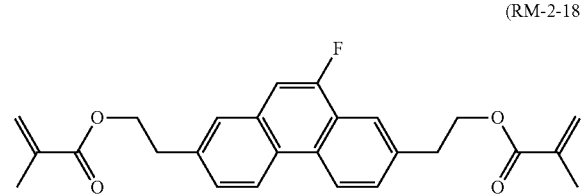
(RM-2-19)
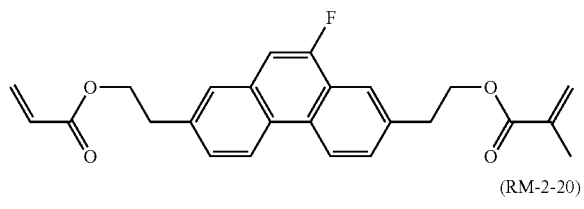
(RM-2-20)
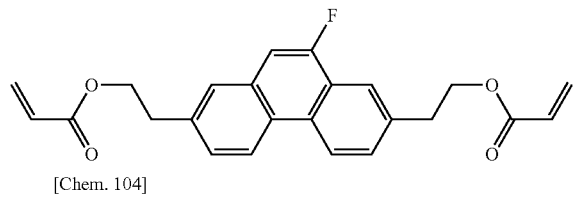
[Chem. 104]
(RM-2-21)
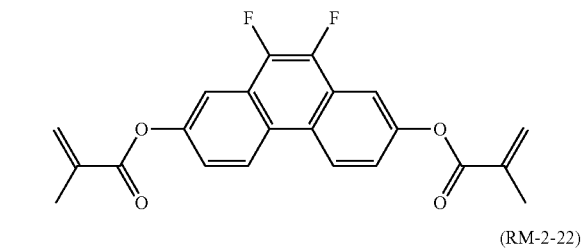
(RM-2-22)
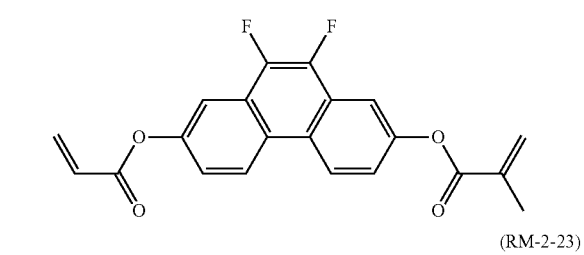
(RM-2-23)
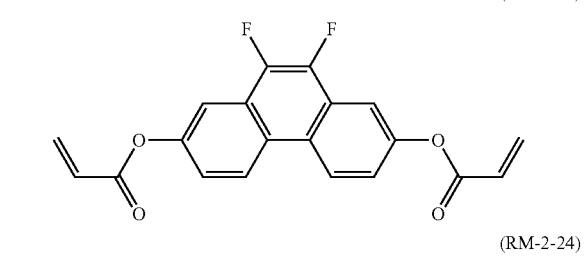
(RM-2-24)
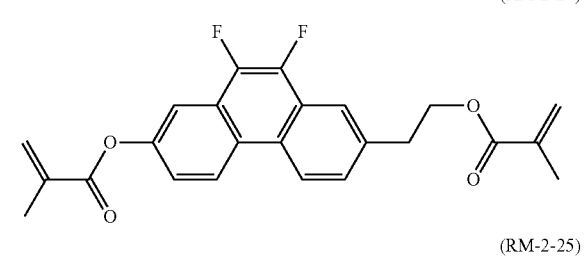
(RM-2-25)
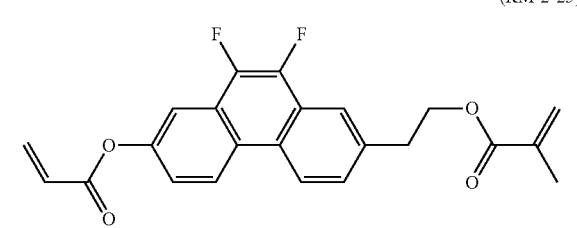

(RM-2-26)
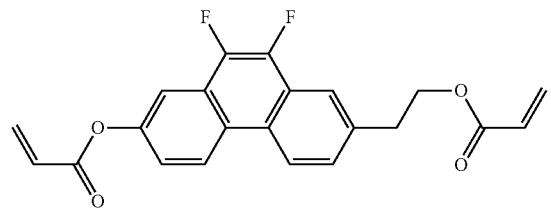
(RM-2-27)
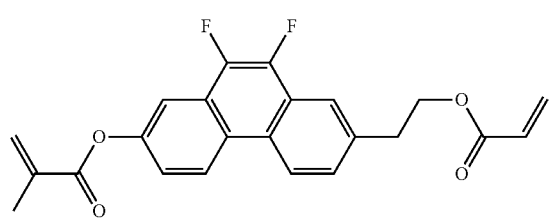
(RM-2-28)
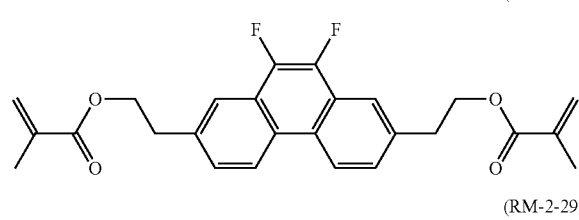
(RM-2-29)
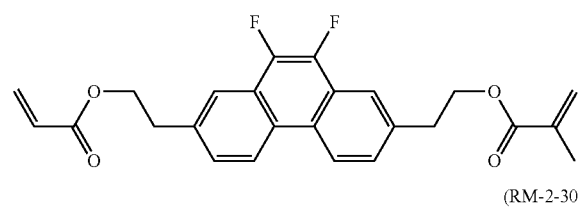
(RM-2-30)
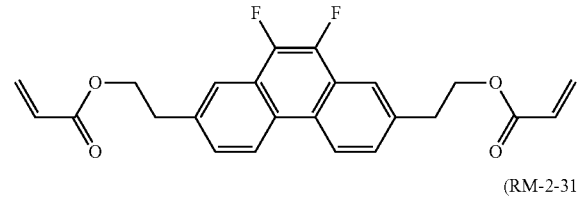
(RM-2-31)
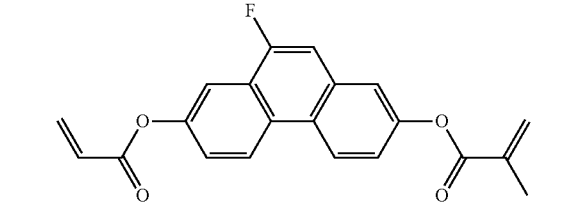
(RM-2-32)
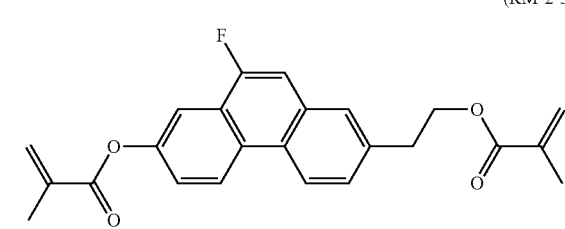
(RM-2-33)
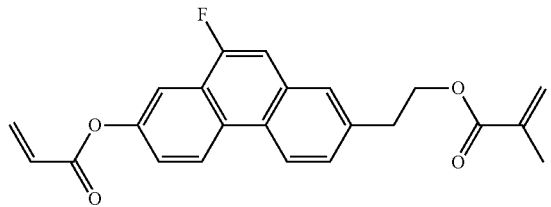
(RM-2-34)
(RM-2-35)
(RM-2-36)
(RM-2-37)
(RM-2-38)
(RM-2-39)
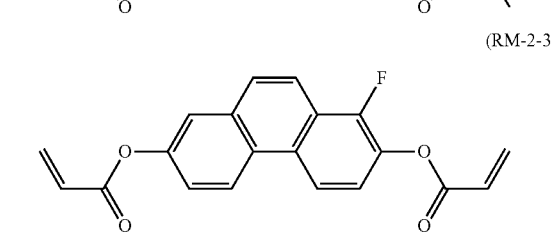

-continued (RM-2-40)
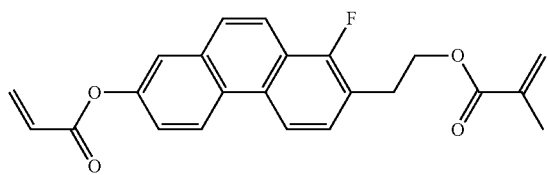

[Chem. 105]

(RM-2-41)

(RM-2-42)

(RM-2-43)

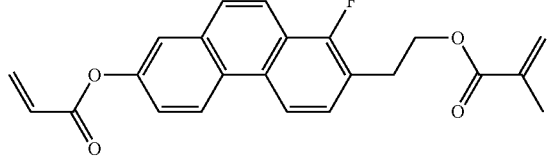

(RM-2-44)
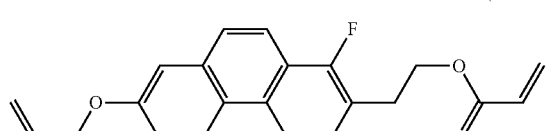

(RM-2-45)
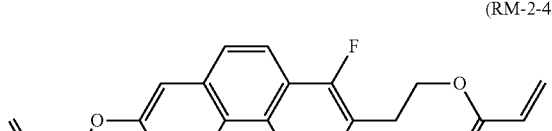

(RM-2-46)
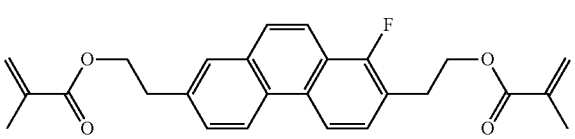

(RM-2-47)
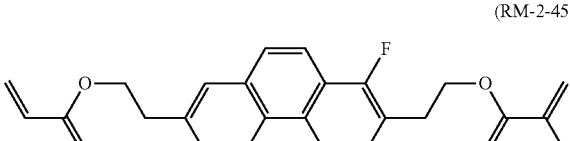

-continued (RM-2-48)
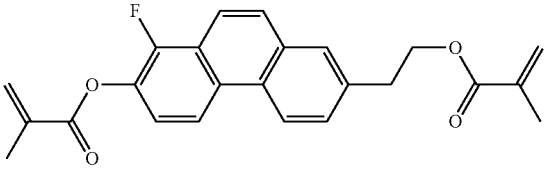

(RM-2-49)

(RM-2-50)

(RM-2-51)

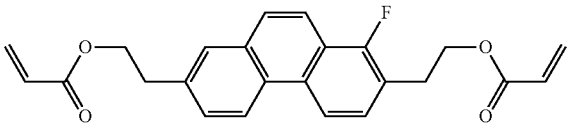

(RM-2-52)
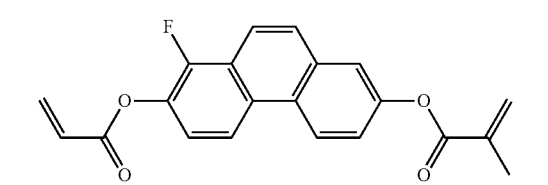

In addition, the specific content of the polymerizable monomer represented by the above Formulae (RM-2-1) to (RM-2-52) is preferably more than 0.4% by mass and 1.4% by mass or less, more preferably 0.42% by mass or more and 1.3% by mass or less, still more preferably 0.43% by mass or more and 1.2% by mass or less, particularly preferably 0.44% by mass or more and 1% by mass or less, and most preferably 0.45% by mass or more and 0.8% by mass or less.

In the liquid crystal composition according to the present invention, the content ratio of the first monomer to the second monomer (first monomer/second monomer) is preferably 0.5 to 10, preferably 0.6 to 8, preferably 0.7 to 6, preferably 0.72 to 5.5, preferably 0.73 to 5.2, preferably 0.74 to 4.5, preferably 0.75 to 4, preferably 0.77 to 3.5, preferably 0.8 to 3.3, and preferably 0.82 to 3.

When the mixing ratio of the first monomer and the second monomer is within the range described above, it is preferable from the viewpoints of stability of the pretilt angle, low temperature stability, and vertical alignment, and in particular, when the lower limit value of the content mass ratio of the first monomer to the second monomer (first monomer/second monomer) is 0.7, three effects of stability of the pretilt angle, low temperature stability, and vertical alignment are obtained.

In the liquid crystal composition according to the present invention, it is preferable to contain one kind or two or more kinds of compounds having a polar group represented by the general formula (K) as the first monomer and one kind or two or more kinds of compounds selected from the general formulae (RM-1) and (RM-2) as the second monomer. The first monomer and the second monomer may be each one kind, but a combination of monomers having different skeletons, such as a combination of one kind of the first monomer and two kinds of the second monomer, a combination of two kinds of the first monomer and one kind of the second monomer, and a combination of two kinds of the first monomer and two kinds of the second monomer, may be used.

The liquid crystal composition according to the present invention preferably exhibits a liquid crystal phase at (25° C.), more preferably exhibits a nematic phase, and is preferably a nematic liquid crystal composition having a negative dielectric anisotropy.

In addition to the first monomer and the second monomer, the liquid crystal composition according to the present invention preferably contains one kind or two or more kinds of compounds selected from compounds represented by the general formulae (N-1), (N-2) and (N-3). These compounds correspond to dielectrically negative compounds (the sign of $\Delta\varepsilon$ is negative and the absolute value thereof is greater than 2).

Moreover, the $\Delta\varepsilon$ of the compound is a value extrapolated from the measured value of the dielectric anisotropy of the composition prepared by adding the compound to a composition having a substantially neutral dielectric property at 25° C. The content is expressed by %, which means % by mass.

[Chem. 106]

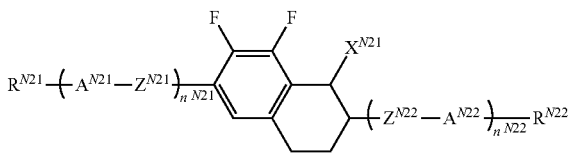

(N-1)

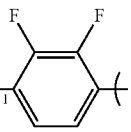

(N-2)

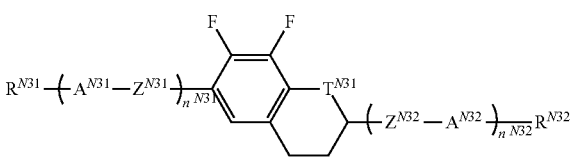

(N-3)

In the formulae, $R^{N11}$, $R^{N12}$, $R^{N21}$, $R^{N22}$, $R^{N31}$, and $R^{N32}$ each independently represent an alkyl group having 1 to 8 carbon atoms, and one or non-adjacent two or more —$CH_2$— in the alkyl group may be each independently substituted with —CH=CH—, —C≡C—, —O—, —CO—, —COO—, or —OCO—;

$A^{N11}$, $A^{N12}$, $A^{N21}$, $A^{N22}$, $A^{N31}$, and $A^{N32}$ each independently represent a group selected from the group consisting of: (a) a 1,4-cyclohexylene group (in which one of —$CH_2$— or two or more of —$CH_2$— that are not adjacent to each other present in the group may be replaced by —O—), (b) a 1,4-phenylene group (in which one of —CH= or two or more of —CH= that are not adjacent to each other present in the group may be replaced by —N=), (c) a naphthalene-2,6-diyl group, a 1,2,3,4-tetrahydronaphthalene-2,6-diyl group, or a decahydronaphthalene-2,6-diyl group (in which one of —CH= or two or more of —CH= that are not adjacent to each other present in the naphthalene-2,6-diyl group or the 1,2,3,4-tetrahydronaphthalene-2,6-diyl group may be replaced by —N=), and (d) a 1,4-cyclohexenylene group, in which the group (a), the group (b), the group (c), and the group (d) each independently may be substituted with a cyano group, a fluorine atom, or a chlorine atom;

$Z^{N11}$, $Z^{N12}$, $Z^{N21}$, $Z^{N22}$, $Z^{N31}$, and $Z^{N32}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—;

$X^{N21}$ represents a hydrogen atom or a fluorine atom;
$T^{N31}$ represents —$CH_2$— or an oxygen atom;
$n^{N11}$, $n^{N12}$, $n^{N21}$, $n^{N22}$, $n^{N31}$ and $n^{N32}$ each independently represent an integer of 0 to 3, provided that $n^{N11}+n^{N12}$, $n^{N21}+n^{N22}$, and $n^{N31}+n^{N32}$ each independently are 1, 2, or 3, and in the case where a plurality of each of $A^{N11}$ to $A^{N32}$ and $Z^{N11}$ to $Z^{N32}$ are present, these may be the same as or different from each other.

The compound represented by any of the general formulae (N-1), (N-2), and (N-3) is preferably a compound having a negative value for $\Delta\varepsilon$, in which the absolute value thereof is greater than 3.

In the general formulae (N-1), (N-2), and (N-3), $R^{N11}$, $R^{N12}$, $R^{N21}$, $R^{N22}$, $R^{N31}$, and $R^{N32}$ each independently preferably represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, and preferably represent an alkyl group having 1 to 5 atoms, an alkoxy group having 1 to 5 carbon atoms, an alkenyl group having 2 to 5 carbon atoms, or an alkenyloxy group having 2 to 5 carbon atoms. $R^{11}$, $R^{21}$, and $R^{31}$ each independently further preferably represent an alkyl group having 1 to 5 carbon atoms or an alkenyl group having 2 to 5 carbon atoms; $R^{12}$, $R^{22}$, and $R^{32}$ each independently more preferably represent an alkyl group having 1 to 5 carbon atoms, an alkoxy group having 1 to 5 carbon atoms, or an alkenyloxy group having 2 to 5 carbon atoms.

Moreover, in the case where the cyclic structure, to which the terminal group ($R^{N11}$, $R^{N12}$, $R^{N21}$, $R^{N22}$, $R^{N31}$, and $R^{N32}$) is bonded, is a phenyl group (aromatic group), the group preferably represents a linear alkyl group having 1 to 5 carbon atoms, a linear alkoxy group having 1 to 4 carbon atoms, or an alkenyl group having 4 to 5 carbon atoms, and in the case where the cyclic structure, to which the terminal group is bonded, is a saturated cyclic structure, such as cyclohexane, pyrane, or dioxane, the group preferably represents a linear alkyl group having 1 to 5 carbon atoms, a linear alkoxy group having 1 to 4 carbon atoms, or a linear alkenyl group having 2 to 5 carbon atoms. For stabilizing the nematic phase, the total number of the carbon atom and the oxygen atom if any is preferably 5 or less, and the group is preferably linear.

The alkenyl group is preferably selected from groups represented by any of the formulae (R1) to (R5). (The black dot in each formula represents a carbon atom in the cyclic structure.)

[Chem. 107]

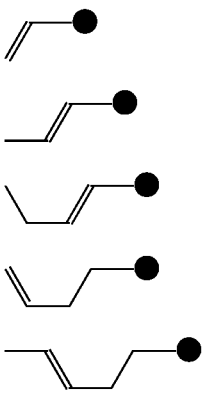

(R1)
(R2)
(R3)
(R4)
(R5)

In the case where Δn is demanded to be increased, $A^{N11}$, $A^{N12}$, $A^{N21}$, $A^{N22}$, $A^{N31}$, and $A^{N32}$ each independently preferably represent an aromatic group, and in the case where the response speed is demanded to be increased, each independently preferably represent an aliphatic group, preferably represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a pyperidin-1,4-diyl group, a naphthalen-2,6-diyl group, a decahydronaphthalen-2,6-diyl group, or a 1,2,3,4-tetrahydronaphthalen-2,6-diyl group, more preferably represent the following structures:

[Chem. 108]

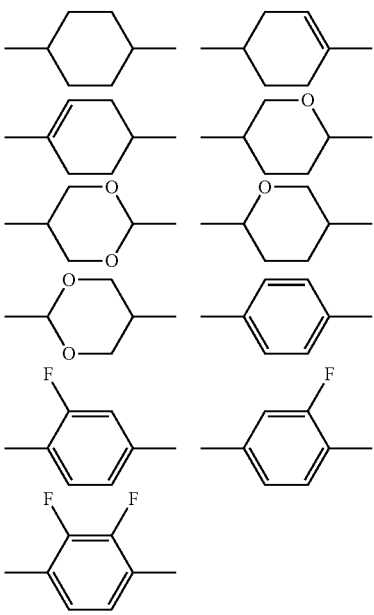

and more preferably represent a trans-1,4-cyclohexylene group, a 1,4-cyclohexenylene group, or a 1,4-phenylene group.

$Z^{N11}$, $Z^{N12}$, $Z^{N21}$, $Z^{N22}$, $Z^{N31}$, and $Z^{N32}$ each independently preferably represent —CH$_2$O—, —CF$_2$O—, —CH$_2$CH$_2$—, —CF$_2$CF$_2$—, or a single bond, more preferably represent —CH$_2$O—, —CH$_2$CH$_2$—, or a single bond, and particularly preferably —CH$_2$O— or a single bond.

$X^{N21}$ preferably represents a fluorine atom.

$T^{N31}$ preferably represents an oxygen atom.

$n^{N11}+n^{N12}$, $n^{N21}+n^{N22}$, and $n^{N31}+n^{N32}$ each independently are preferably 1 or 2, and a combination where $n^{N11}$ is 1, and $n^{N12}$ is 0, a combination where $n^{N11}$ is 2, and $n^{N12}$ is 0, a combination where $n^{N11}$ is 1, and $n^{N12}$ is 1, a combination where $n^{N11}$ is 2, and $n^{N12}$ is 1, a combination where $n^{N21}$ is 1, and $n^{N22}$ is 0, a combination where $n^{N21}$ is 2, and $n^{N22}$ is 0, a combination where $n^{N31}$ is 1, and $n^{N32}$ is 0, and a combination where $n^{N31}$ is 2, and $n^{N32}$ is 0 are preferred.

Based on the total amount of the composition of the present invention, the lower limit of the preferred content of the compound represented by the formula (N-1) may be 1%, 10%, 20%, 30%, 40%, 50%, 55%, 60%, 65%, 70%, 75%, and 80%. The upper limit of the preferred content thereof may be 95%, 85%, 75%, 65%, 55%, 45%, 35%, 25%, and 20%.

Based on the total amount of the composition of the present invention, the lower limit of the preferred content of the compound represented by the formula (N-2) may be 1%, 10%, 20%, 30%, 40%, 50%, 55%, 60%, 65%, 70%, 75%, and 80%. The upper limit of the preferred content thereof may be 95%, 85%, 75%, 65%, 55%, 45%, 35%, 25%, and 20%.

Based on the total amount of the composition of the present invention, the lower limit of the preferred content of the compound represented by the formula (N-3) may be 1%, 10%, 20%, 30%, 40%, 50%, 55%, 60%, 65%, 70%, 75%, and 80%. The upper limit of the preferred content thereof may be 95%, 85%, 75%, 65%, 55%, 45%, 35%, 25%, and 20%.

In the case where it is demanded that the viscosity of the composition of the present invention is kept low, and a composition having a high response speed is provided, it is preferred that the lower limit is low, and the upper limit is low. Moreover, in the case where it is demanded that Tni of the composition of the present invention is kept high, and a composition having good temperature stability is provided, it is preferred that the lower limit is low, and the upper limit is low. Moreover, in the case where it is demanded that the dielectric anisotropy is increased for keeping the driving voltage low, it is preferred that the lower limit is high, and the upper limit is high.

Examples of the compound represented by the general formula (N-1) include the group of compounds represented by the following general formulae (N-1a) to (N-1g):

[Chem. 109]

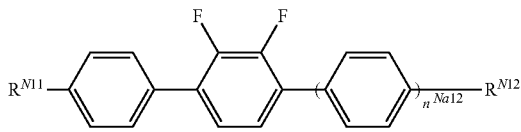
(N-1a)

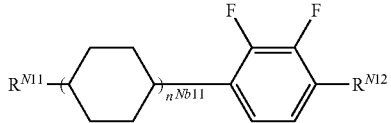
(N-1b)

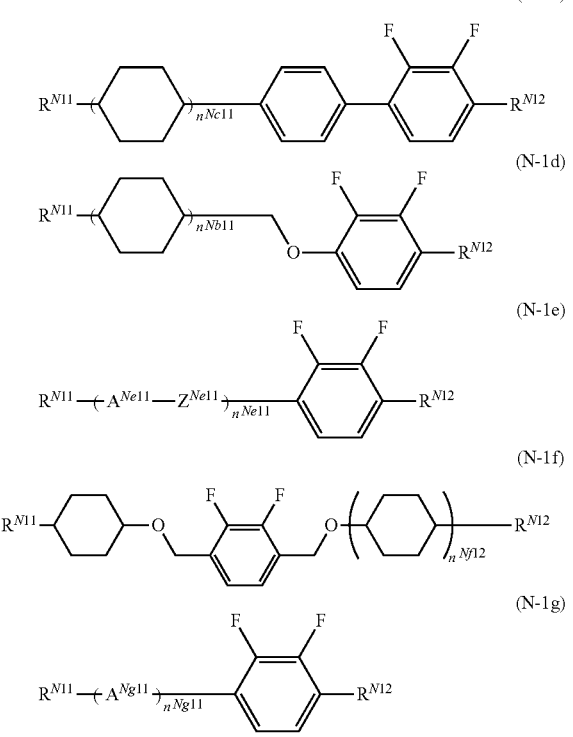

In the formula, $R^{N11}$ and $R^{N12}$ have the same meanings as $R^{N11}$ and $R^{N12}$ in the general formula (N-1); $n^{Na12}$ represents 0 or 1; $n^{Nb11}$ represents 0 or 1; $n^{Nc11}$ represents 0 or 1; $n^{Nd11}$ represents 0 or 1; $n^{Ne11}$ represents 1 or 2; $n^{Nf12}$ represents 1 or 2; $n^{Ng11}$ represents 1 or 2; $A^{Ne11}$ represents a trans-1,4-cyclohexylene group or a 1,4-phenylene group; $A^{Ng11}$ represents a trans-1,4-cyclohexylene group, a 1,4-cyclohexenylene group, or a 1,4-phenylene group, provided that in the case where $n^{Ng11}$ is 1, $A^{Ng11}$ represents a 1,4-cyclohexenylene group and in the case where $n^{Ng11}$ is 2, at least one $A^{Ng11}$ represents a 1,4-cyclohexenylene group; and $Z^{Ne11}$ represents a single bond or an ethylene group, provided that in the case where $n^{Ne11}$ is 1, $Z^{Ne11}$ represents an ethylene group. In the case where $n^{Ne11}$ is 2, at least one $Z^{Ne11}$ represents an ethylene group.

More specifically, the compound represented by the general formula (N-1) is preferably a compound selected from the group of compounds represented by the general formulae (N-1-1) to (N-1-22).

The compound represented by the general formula (N-1-1) is the following compound:

[Chem. 110]

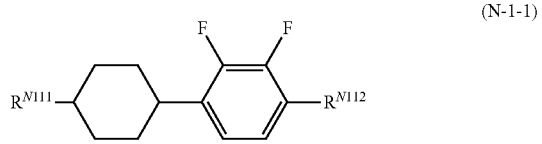

(N-1-1)

In the formula, $R^{N111}$ and $R^{N112}$ each independently have the same meanings as $R^{N11}$ and $R^{N12}$ in the general formula (N-1).

$R^{N111}$ preferably represents an alkyl group having 1 to 5 carbon atoms or an alkenyl group having 2 to 5 carbon atoms, and preferably represents a propyl group, a pentyl group or a vinyl group. $R^{N112}$ preferably represents an alkyl group having 1 to 5 carbon atoms, an alkenyl group having 4 to 5 carbon atoms, or an alkoxy group having 1 to 4 carbon atoms, and preferably represents an ethoxy group or a butoxy group.

The compound represented by the general formula (N-1-1) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of $\alpha\epsilon$ is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a small value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-1) may be 5%, 10%, 13%, 15%, 17%, 20%, 23%, 25%, 27%, 30%, 33%, or 35%.

Based on the total amount of the composition of the present invention, the upper limit of the preferred content thereof may be 50%, 40%, 38%, 35%, 33%, 30%, 28%, 25%, 23%, 20%, 18%, 15%, 13%, 10%, 8%, 7%, 6% %, 5%, or 3%.

Moreover, the compound represented by the general formula (N-1-1) is preferably a compound selected from the group of compounds represented by the formulae (N-1-1.1) to (N-1-1.22), preferably compounds represented by the formulae (N-1-1.1) to (N-1-1.4), and preferably compounds represented by the formulae (N-1-1.1) and (N-1-1.3).

[Chem. 111]

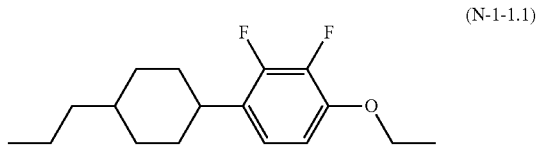

(N-1-1.1)

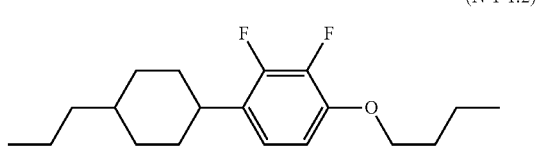

(N-1-1.2)

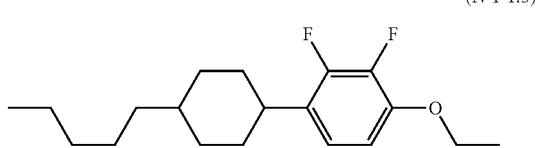

(N-1-1.3)

(N-1-1.4)
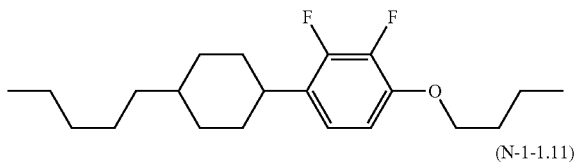

(N-1-1.11)
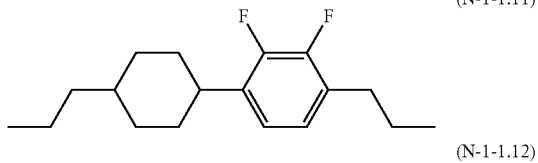

(N-1-1.12)

(N-1-1.13)
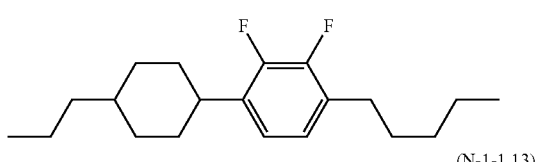

(N-1-1.14)
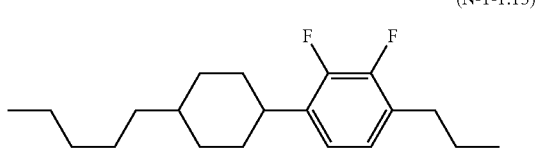

(N-1-1.20)
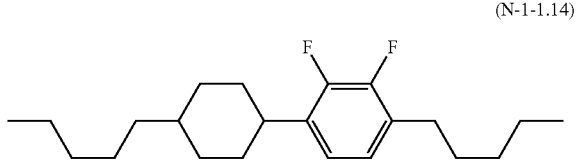

(N-1-1.21)

(N-1-1.22)
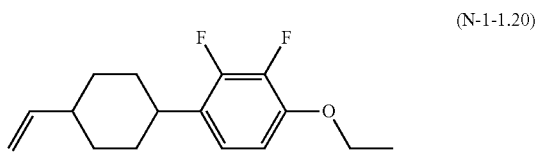

The compounds represented by the formulae (N-1-1.1) to (N-1-1.22) may be used solely or may be used as a combination, and based on the total amount of the composition of the present invention, the lower limit of the preferred content of the sole compound or the combination of the compounds may be 5%, 10%, 13%, 15%, 17%, 20%, 23%, 25%, 27%, 30%, 33%, or 35%. Based on the total amount of the composition of the present invention, the upper limit of the preferred content thereof may be 50%, 40%, 38%, 35%, 33%, 30%, 28%, 25%, 23%, 20%, 18%, 15%, 13%, 10%, 8%, 7%, 6% %, 5%, or 3%.

The compound represented by the general formula (N-1-2) is the following compound:

[Chem. 112]

(N-1-2)
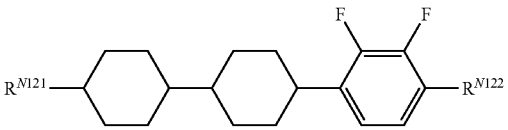

In the formula, $R^{N121}$ and $R^{N122}$ each independently have the same meanings as $R^{N11}$ and $R^{N12}$ in the general formula (N-1).

$R^{N121}$ preferably represents an alkyl group having 1 to 5 carbon atoms or an alkenyl group having 2 to 5 carbon atoms, and preferably represents an ethyl group, a propyl group, a butyl group, or a pentyl group. $R^{N122}$ preferably represents an alkyl group having 1 to 5 carbon atoms, an alkenyl group having 4 to 5 carbon atoms, or an alkoxy group having 1 to 4 carbon atoms, and preferably represents a methyl group, a propyl group, a methoxy group, an ethoxy group or a propoxy group.

The compound represented by the general formula (N-1-2) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of $\Delta\varepsilon$ is important, the content of the compound is preferably large; in the case where the solubility at a low temperature is important, a high effect may be obtained by setting the content thereof to a small value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-2) may be 5%, 7%, 10%, 13%, 15%, 17%, 20%, 23%, 25%, 27%, 30%, 33%, 35%, 37%, 40%, or 42%. Based on the total amount of the composition of the present invention, the upper limit of the preferred content thereof may be 50%, 48%, 45%, 43%, 40%, 38%, 35%, 33%, 30%, 28%, 25%, 23%, 20%, 18%, 15%, 13%, 10%, 8%, 7%, 6%, or 5%.

Moreover, the compound represented by the general formula (N-1-2) is preferably a compound selected from the group of compounds represented by the formulae (N-1-2.1) to (N-1-2.22), and preferably compounds represented by the formulae (N-1-2.3) to (N-1-2.7), (N-1-2.10), (N-1-2.11), (N-1-2.13), and (N-1-2.20); in the case where the improvement of $\Delta\varepsilon$ is important, the compounds represented by the formulae (N-1-2.3) to (N-1-2.7) are preferred; in the case where the improvement of $T_{NI}$ is important, the compounds represented by the formulae (N-1-2.10), (N-1-2.11), and (N-1-2.13) are preferred; and in the case where the improvement of the response speed is important, the compound represented by the formula (N-1-2.20) is preferred.

[Chem. 113]

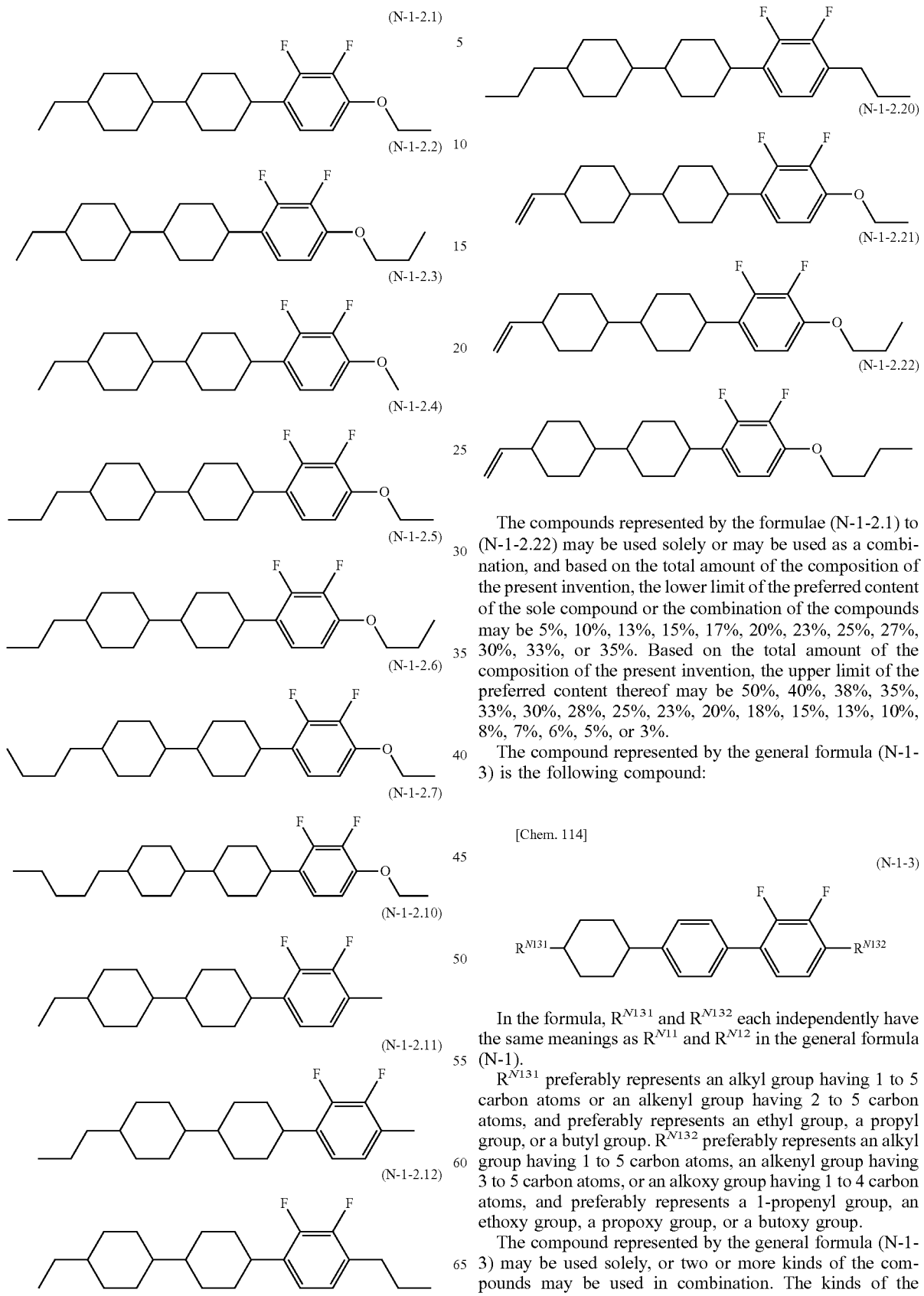

The compounds represented by the formulae (N-1-2.1) to (N-1-2.22) may be used solely or may be used as a combination, and based on the total amount of the composition of the present invention, the lower limit of the preferred content of the sole compound or the combination of the compounds may be 5%, 10%, 13%, 15%, 17%, 20%, 23%, 25%, 27%, 30%, 33%, or 35%. Based on the total amount of the composition of the present invention, the upper limit of the preferred content thereof may be 50%, 40%, 38%, 35%, 33%, 30%, 28%, 25%, 23%, 20%, 18%, 15%, 13%, 10%, 8%, 7%, 6%, 5%, or 3%.

The compound represented by the general formula (N-1-3) is the following compound:

[Chem. 114]

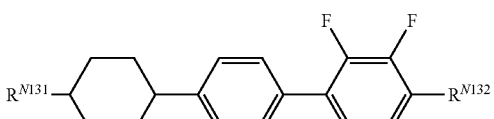

(N-1-3)

In the formula, $R^{N131}$ and $R^{N132}$ each independently have the same meanings as $R^{N11}$ and $R^{N12}$ in the general formula (N-1).

$R^{N131}$ preferably represents an alkyl group having 1 to 5 carbon atoms or an alkenyl group having 2 to 5 carbon atoms, and preferably represents an ethyl group, a propyl group, or a butyl group. $R^{N132}$ preferably represents an alkyl group having 1 to 5 carbon atoms, an alkenyl group having 3 to 5 carbon atoms, or an alkoxy group having 1 to 4 carbon atoms, and preferably represents a 1-propenyl group, an ethoxy group, a propoxy group, or a butoxy group.

The compound represented by the general formula (N-1-3) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of Δε is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-3) may be 5%, 10%, 13%, 15%, 17%, or 20%. Based on the total amount of the composition of the present invention, the upper limit of the preferred content thereof may be 35%, 30%, 28%, 25%, 23%, 20%, 18%, 15%, or 13%.

Moreover, the compound represented by the general formula (N-1-3) is preferably a compound selected from the group of compounds represented by the formulae (N-1-3.1) to (N-1-3.21), preferably compounds represented by the formulae (N-1-3.1) to (N-1-3.7) and (N-1-3.21), and preferably the compounds represented by the formulae (N-1-3.1), (N-1-3.2), (N-1-3.3), (N-1-3.4), and (N-1-3.6).

[Chem. 115]

(N-1-3.1)
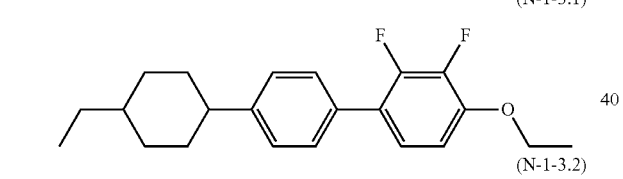

(N-1-3.2)
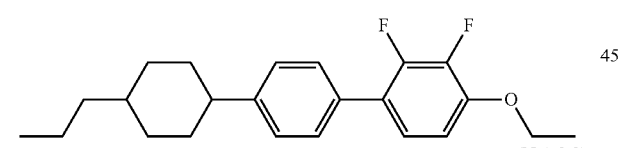

(N-1-3.3)
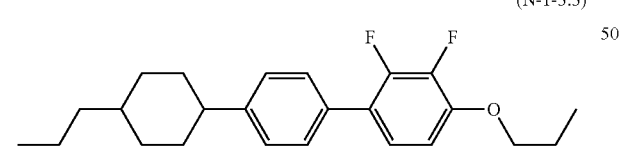

(N-1-3.4)
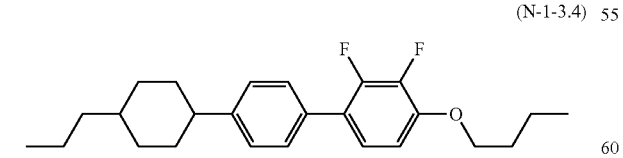

(N-1-3.5)
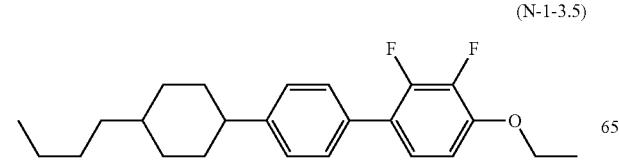

-continued (N-1-3.6)
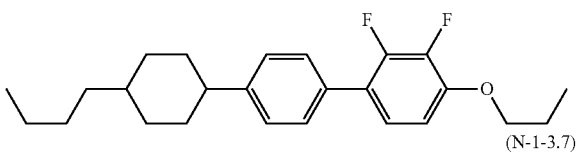

(N-1-3.7)
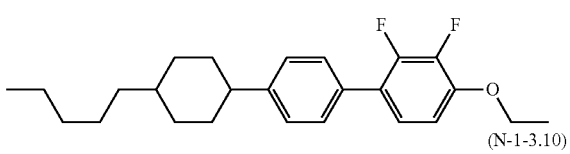

(N-1-3.10)
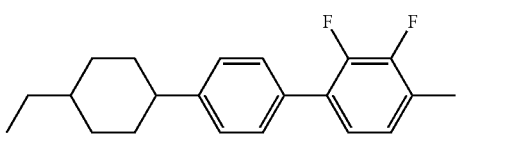

(N-1-3.11)
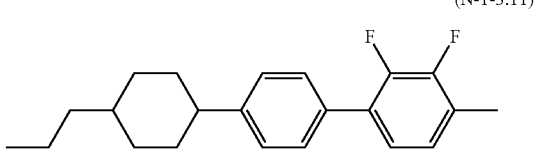

(N-1-3.20)
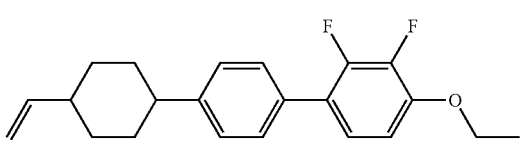

(N-1-3.21)

The compounds represented by the formulae (N-1-3.1) to (N-1-3.4), (N-1-3.6), and (N-1-3.21) may be used solely or may be used as a combination, and a combination of the formulae (N-1-3.1) and (N-1-3.2), and a combination of two kinds or three kinds selected from the formulae (N-1-3.3), (N-1-3.4), and (N-1-3.6) are preferred. Based on the total amount of the composition of the present invention, the lower limit of the preferred content of the sole compound or these compounds may be 5%, 10%, 13%, 15%, 17%, or 20%. Based on the total amount of the composition of the present invention, the upper limit of the preferred content thereof may be 35%, 30%, 28%, 25%, 23%, 20%, 18%, 15%, or 13%.

The compound represented by the general formula (N-1-4) is the following compound:

[Chem. 116]

(N-1-4)

In the formula, $R^{N141}$ and $R^{N142}$ each independently have the same meanings as $R^{N11}$ and $R^{N12}$ in the general formula (N-1).

$R^{N141}$ and $R^{N142}$ each independently preferably represent an alkyl group having 1 to 5 carbon atoms, an alkenyl group having 4 to 5 carbon atoms, or an alkoxy group having 1 to 4 carbon atoms, and preferably represent a methyl group, a propyl group, an ethoxy group, or a butoxy group.

The compound represented by the general formula (N-1-4) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of Δε is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a small value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-4) may be 3%, 5%, 7%, 10%, 13%, 15%, 17%, or 20%. Based on the total amount of the composition of the present invention, the upper limit of the preferred content thereof may be 35%, 30%, 28%, 25%, 23%, 20%, 18%, 15%, 13%, 11%, 10%, or 8%.

Moreover, the compound represented by the general formula (N-1-4) is preferably a compound selected from the group of compounds represented by the formulae (N-1-4.1) to (N-1-4.14), preferably compounds represented by the formulae (N-1-4.1) to (N-1-4.4), and preferably the compounds represented by the formulae (N-1-4.1), (N-1-4.2), and (N-1-4.4).

[Chem. 117]

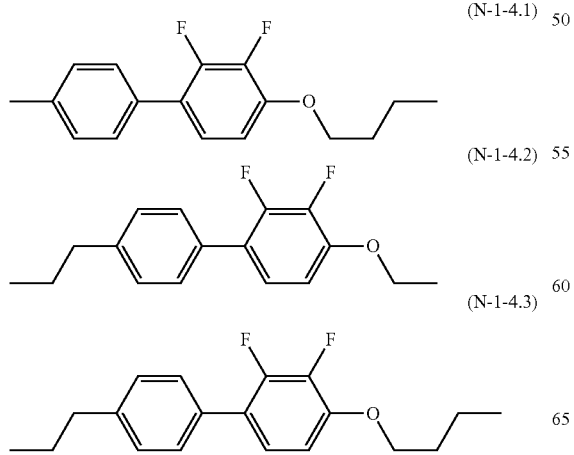

(N-1-4.1)
(N-1-4.2)
(N-1-4.3)

-continued

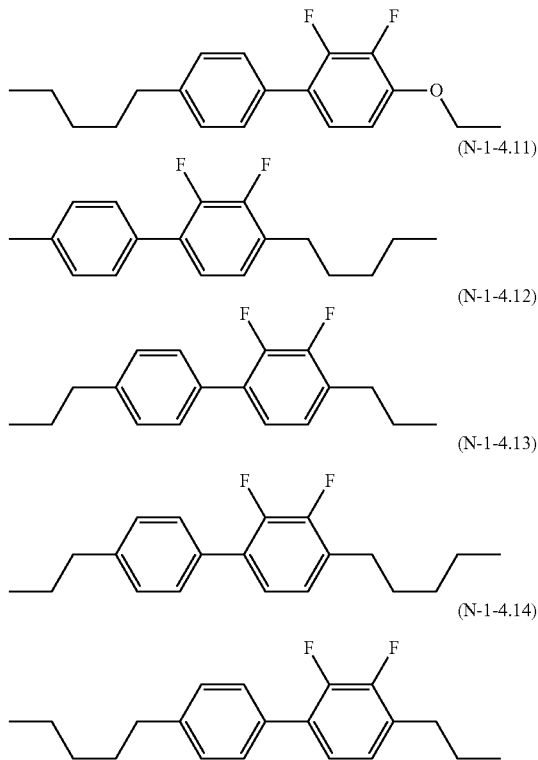

(N-1-4.4)
(N-1-4.11)
(N-1-4.12)
(N-1-4.13)
(N-1-4.14)

The compounds represented by the formulae (N-1-4.1) to (N-1-4.14) may be used solely or may be used as a combination, and based on the total amount of the composition of the present invention, the lower limit of the preferred content of the sole compound or these compounds may be 3%, 5%, 7%, 10%, 13%, 15%, 17%, or 20%. Based on the total amount of the composition of the present invention, the upper limit of the preferred content thereof may be 35%, 30%, 28%, 25%, 23%, 20%, 18%, 15%, 13%, 11%, 10%, or 8%.

The compound represented by the general formula (N-1-5) is the following compound:

[Chem. 118]

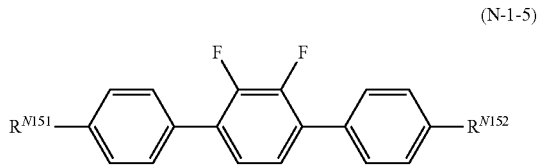

(N-1-5)

In the formula, $R^{N151}$ and $R^{N152}$ each independently have the same meanings as $R^{N11}$ and $R^{N12}$ in the general formula (N-1).

$R^{N151}$ and $R^{N152}$ each independently preferably represent an alkyl group having 1 to 5 carbon atoms, an alkenyl group having 4 to 5 carbon atoms, or an alkoxy group having 1 to 4 carbon atoms, and preferably represent an ethyl group, a propyl group, or a butyl group.

The compound represented by the general formula (N-1-5) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of Δε is important, the content of the compound is preferably large; in the case where the solubility at a low temperature is important, a high effect may be obtained by setting the content thereof to a small value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-5) may be 5%, 8%, 10%, 13%, 15%, 17%, or 20%. Based on the total amount of the composition of the present invention, the upper limit of the preferred content thereof may be 35%, 33%, 30%, 28%, 25%, 23%, 20%, 18%, 15%, or 13%.

Moreover, the compound represented by the general formula (N-1-5) is preferably a compound selected from the group of compounds represented by the formulae (N-1-5.1) to (N-1-5.6), and preferably compounds represented by the formulae (N-1-5.1), (N-1-5.2), and (N-1-5.4).

[Chem. 119]

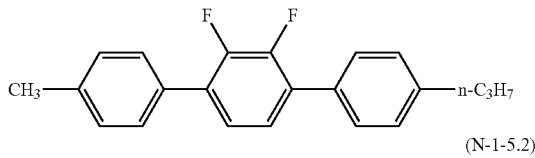
(N-1-5.1)

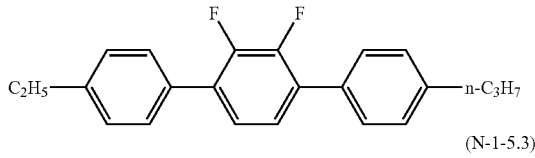
(N-1-5.2)

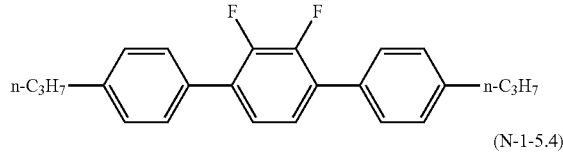
(N-1-5.3)

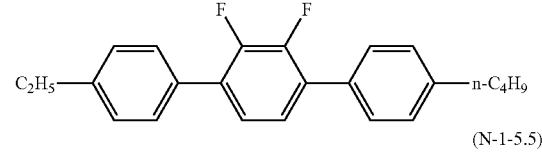
(N-1-5.4)

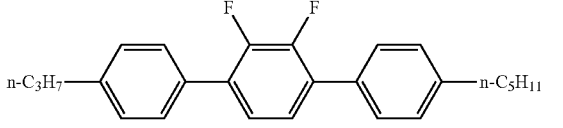
(N-1-5.5)

(N-1-5.6)

The compounds represented by the formulae (N-1-5.1), (N-1-5.2), and (N-5-1.4) may be used solely or may be used as a combination, and based on the total amount of the composition of the present invention, the lower limit of the preferred content of the sole compound or these compounds may be 5%, 8%, 10%, 13%, 15%, 17%, or 20%. Based on the total amount of the composition of the present invention, the upper limit of the preferred content thereof may be 35%, 33%, 30%, 28%, 25%, 23%, 20%, 18%, 15%, or 13%.

The compound represented by the general formula (N-1-10) is the following compound:

[Chem. 120]

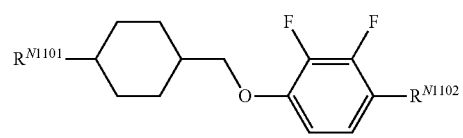
(N-1-10)

In the formula, $R^{N1101}$ and $R^{N1102}$ each independently have the same meanings as $R^{N11}$ and $R^{N12}$ in the general formula (N-1).

$R^{N1101}$ preferably represents an alkyl group having 1 to 5 carbon atoms or an alkenyl group having 2 to 5 carbon atoms, and preferably represents an ethyl group, a propyl group, a butyl group, a vinyl group, or a 1-propenyl group. $R^{N1102}$ preferably represents an alkyl group having 1 to 5 carbon atoms, an alkenyl group having 4 to 5 carbon atoms, or an alkoxy group having 1 to 4 carbon atoms, and preferably represents an ethoxy group, a propoxy group, or a butoxy group.

The compound represented by the general formula (N-1-10) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of Δε is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-10) may be 5%, 10%, 13%, 15% 17%, or 20%. Based on the total amount of the composition of the present invention, the upper limit of the preferred content thereof may be 35%, 30%, 28%, 25%, 23%, 20%, 18%, 15%, or 13%.

Moreover, the compound represented by the general formula (N-1-10) is preferably a compound selected from the group of compounds represented by the formulae (N-1-10.1) to (N-1-10.14), preferably compounds represented by the formulae (N-1-10.1) to (N-1-10.5), (N-1-10.13), and (N-1-10.14), and preferably compounds represented by the formulae (N-1-10.1) (N-1-10.2), (N-1-10.13), and (N-1-10.14).

[Chem. 121]

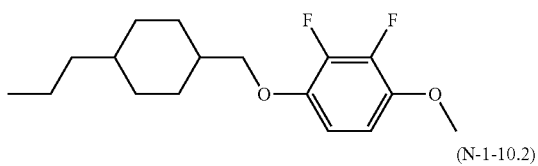
(N-1-10.1)

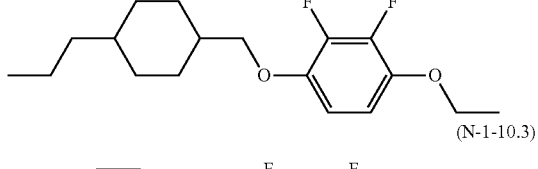
(N-1-10.2)

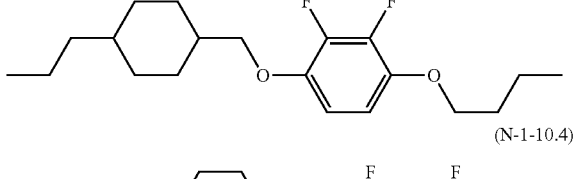
(N-1-10.3)

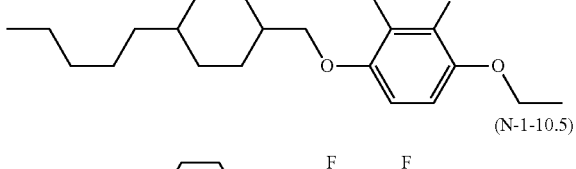
(N-1-10.4)

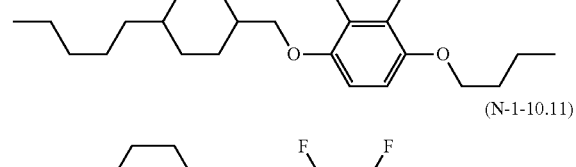
(N-1-10.5)

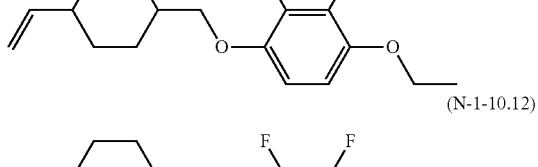
(N-1-10.11)

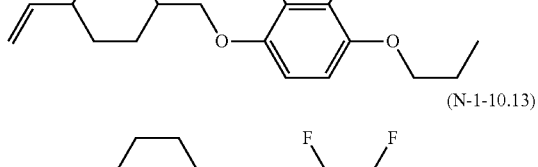
(N-1-10.12)

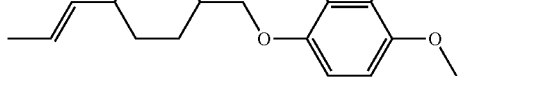
(N-1-10.13)

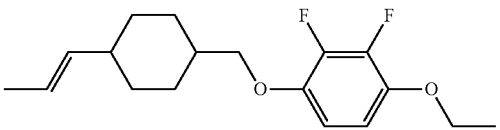
(N-1-10.14)

The compounds represented by the formulae (N-1-10.1), (N-1-10.2), (N-1-10.13), and (N-1-10.14) may be used solely or may be used as a combination, and based on the total amount of the composition of the present invention, the lower limit of the preferred content of the sole compound or these compounds may be 5%, 10% 13%, 15%, 17%, or 20%. Based on the total amount of the composition of the present invention, the upper limit of the preferred content thereof may be 35%, 30%, 28%, 25%, 23%, 20%, 18%, 15%, or 13%.

The compound represented by the general formula (N-1-11) is the following compound:

[Chem. 122]

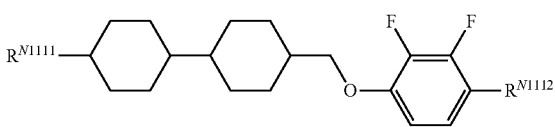
(N-1-11)

In the formula, $R^{N1111}$ and $R^{N1112}$ each independently have the same meanings as $R^{N11}$ and $R^{N12}$ in the general formula (N-1).

$R^{N1111}$ preferably represents an alkyl group having 1 to 5 carbon atoms or an alkenyl group having 2 to 5 carbon atoms, and preferably represents an ethyl group, a propyl group, a butyl group, a vinyl group, or a 1-propenyl group. $R^{N1112}$ preferably represents an alkyl group having 1 to 5 carbon atoms, an alkenyl group having 4 to 5 carbon atoms, or an alkoxy group having 1 to 4 carbon atoms, and preferably represents an ethoxy group, a propoxy group, or a butoxy group.

The compound represented by the general formula (N-1-11) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of Δε is important, the content of the compound is preferably large; in the case where the solubility at a low temperature is important, a high effect may be obtained by setting the content thereof to a small value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-11) may be 5%, 10%, 13%, 15%, 17%, or 20%. Based on the total amount of the composition of the present invention, the upper limit of the preferred content thereof may be 35%, 30%, 28%, 25%, 23%, 20%, 18%, 15%, or 13%.

Moreover, the compound represented by the general formula (N-1-11) is preferably a compound selected from the group of compounds represented by the formulae (N-1-11.1) to (N-1-11.14), preferably compounds represented by the formulae (N-1-11.1) to (N-1-11.14), and preferably compounds represented by the formulae (N-1-11.2) and (N-1-11.4).

[Chem. 123]

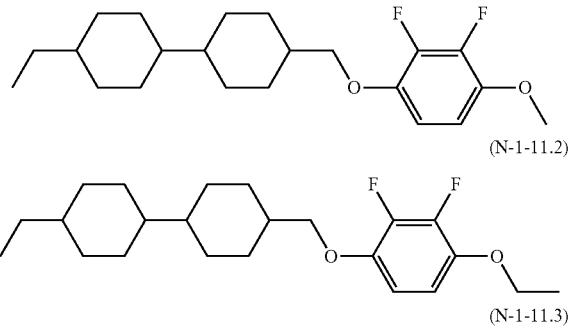

(N-1-11.1)

(N-1-11.2)

(N-1-11.3)

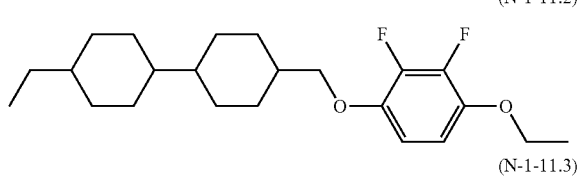

(N-1-11.4)

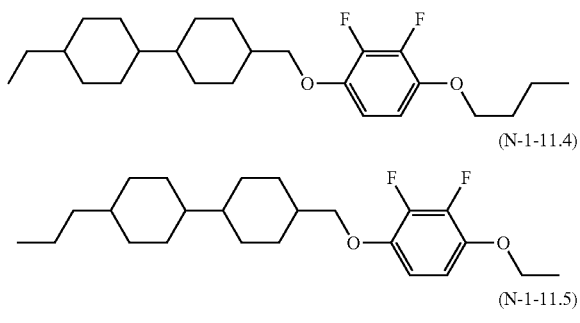

(N-1-11.5)

(N-1-11.11)

(N-1-11.12)

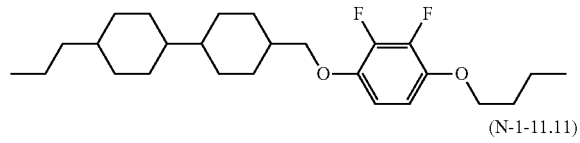

(N-1-11.13)

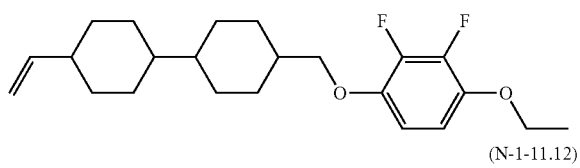

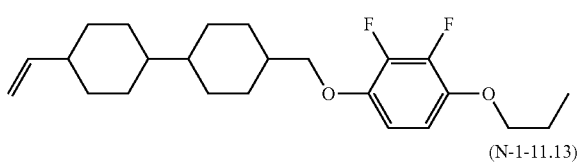

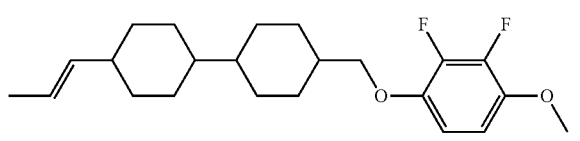

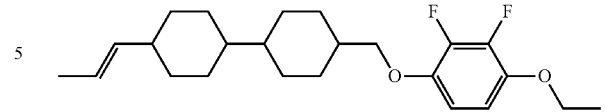

(N-1-11.14)

The compounds represented by the formulae (N-1-11.2) and (N-1-11.4) may be used solely or may be used as a combination, and based on the total amount of the composition of the present invention, the lower limit of the preferred content of the sole compound or these compounds may be 5%, 10%, 13%, 15%, 17%, or 20%. Based on the total amount of the composition of the present invention, the upper limit of the preferred content thereof may be 35%, 30%, 28%, 25%, 23%, 20%, 18%, 15%, or 13%.

The compound represented by the general formula (N-1-12) is the following compound:

[Chem. 124]

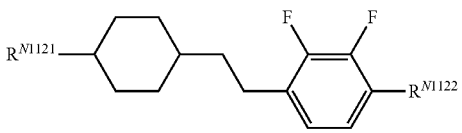

(N-1-12)

In the formula, $R^{N1121}$ and $R^{N1122}$ each independently have the same meanings as $R^{N11}$ and $R^{N12}$ in the general formula (N-1).

$R^{N1121}$ preferably represents an alkyl group having 1 to 5 carbon atoms or an alkenyl group having 2 to 5 carbon atoms, and preferably represents an ethyl group, a propyl group, or a butyl group. $R^{N1122}$ preferably represents an alkyl group having 1 to 5 carbon atoms, an alkenyl group having 4 to 5 carbon atoms, or an alkoxy group having 1 to 4 carbon atoms, and preferably represents an ethoxy group, a propoxy group, or a butoxy group.

The compound represented by the general formula (N-1-12) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of Δε is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-12) may be 5%, 10%, 13%, 15%, 17%, or 20%. Based on the total amount of the composition of the present invention, the upper limit of the preferred content thereof may be 35%, 30%, 28%, 25%, 23%, 20%, 18%, 15%, or 13%.

The compound represented by the general formula (N-1-13) is the following compound:

[Chem. 125]

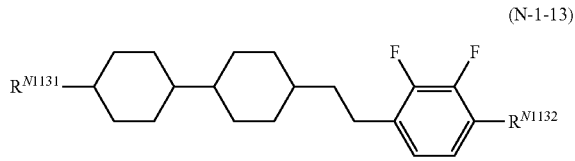

(N-1-13)

In the formula, $R^{N1131}$ and $R^{N1132}$ each independently have the same meanings as $R^{N11}$ and $R^{N12}$ in the general formula (N-1).

$R^{N1131}$ preferably represents an alkyl group having 1 to 5 carbon atoms or an alkenyl group having 2 to 5 carbon atoms, and preferably represents an ethyl group, a propyl group, or a butyl group. $R^{N1132}$ preferably represents an alkyl group having 1 to 5 carbon atoms, an alkenyl group having 4 to 5 carbon atoms, or an alkoxy group having 1 to 4 carbon atoms, and preferably represents an ethoxy group, a propoxy group, or a butoxy group.

The compound represented by the general formula (N-1-13) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of $\Delta\varepsilon$ is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-13) may be 5%, 10%, 13%, 15%, 17%, or 20%. Based on the total amount of the composition of the present invention, the upper limit of the preferred content thereof may be 35%, 30%, 28%, 25%, 23%, 20%, 18%, 15%, or 13%.

The compound represented by the general formula (N-1-14) is the following compound:

[Chem. 126]

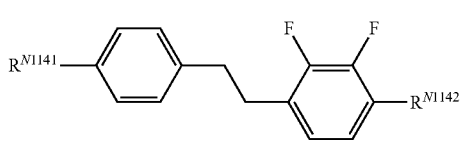

(N-1-14)

In the formula, $R^{N1141}$ and $R^{N1142}$ each independently have the same meanings as $R^{N11}$ and $R^{N12}$ in the general formula (N-1).

$R^{N1141}$ preferably represents an alkyl group having 1 to 5 carbon atoms or an alkenyl group having 2 to 5 carbon atoms, and preferably represents an ethyl group, a propyl group, or a butyl group. $R^{N1142}$ preferably represents an alkyl group having 1 to 5 carbon atoms, an alkenyl group having 4 to 5 carbon atoms, or an alkoxy group having 1 to 4 carbon atoms, and preferably represents an ethoxy group, a propoxy group, or a butoxy group.

The compound represented by the general formula (N-1-14) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of $\Delta\varepsilon$ is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-14) may be 5%, 10%, 13%, 15%, 17%, or 20%. Based on the total amount of the composition of the present invention, the upper limit of the preferred content thereof may be 35%, 30%, 28%, 25%, 23%, 20%, 18%, 15%, or 13%.

The compound represented by the general formula (N-1-15) is the following compound:

[Chem. 127]

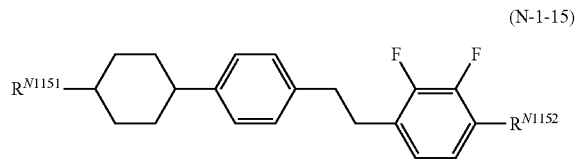

(N-1-15)

In the formula, $R^{N1151}$ and $R^{N1152}$ each independently have the same meanings as $R^{N11}$ and $R^{N12}$ in the general formula (N-1).

$R^{N1151}$ preferably represents an alkyl group having 1 to 5 carbon atoms or an alkenyl group having 2 to 5 carbon atoms, and preferably represents an ethyl group, a propyl group, or a butyl group. $R^{N1152}$ preferably represents an alkyl group having 1 to 5 carbon atoms, an alkenyl group having 4 to 5 carbon atoms, or an alkoxy group having 1 to 4 carbon atoms, and preferably represents an ethoxy group, a propoxy group, or a butoxy group.

The compound represented by the general formula (N-1-15) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of Δε is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-15) may be 5%, 10%, 13%, 15%, 17%, or 20%. Based on the total amount of the composition of the present invention, the upper limit of the preferred content thereof may be 35%, 30%, 28%, 25%, 23%, 20%, 18%, 15%, or 13%.

The compound represented by the general formula (N-1-16) is the following compound:

[Chem. 128]

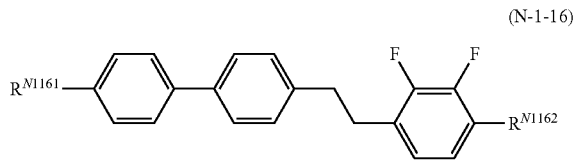

(N-1-16)

In the formula, $R^{N1161}$ and $R^{N1162}$ each independently have the same meanings as $R^{N11}$ and $R^{N12}$ in the general formula (N-1).

$R^{N1161}$ preferably represents an alkyl group having a 1 to 5 carbon atoms or an alkenyl group having 2 to 5 carbon atoms, and preferably represents an ethyl group, a propyl group, or a butyl group. $R^{N1162}$ preferably represents an alkyl group having 1 to 5 carbon atoms, an alkenyl group having 4 to 5 carbon atoms, or an alkoxy group having 1 to 4 carbon atoms, and preferably represents an ethoxy group, a propoxy group, or a butoxy group.

The compound represented by the general formula (N-1-16) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of Δε is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-16) may be 5%, 10%, 13%, 15%, 17%, or 20%. Based on the total amount of the composition of the present invention, the upper limit of the preferred content thereof may be 35%, 30%, 28%, 25%, 23%, 20%, 18%, 15%, or 13%.

The compound represented by the general formula (N-1-17) is the following compound:

[Chem. 129]

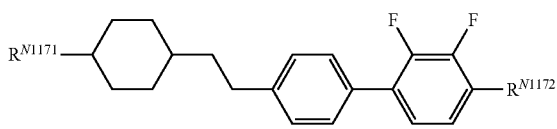

(N-1-17)

In the formula, $R^{N1171}$ and $R^{N1172}$ each independently have the same meanings as $R^{N11}$ and $R^{N12}$ in the general formula (N-1).

$R^{N1171}$ preferably represents an alkyl group having 1 to 5 carbon atoms or an alkenyl group having 2 to 5 carbon atoms, and preferably represents an ethyl group, a propyl group, or a butyl group. $R^{N1172}$ preferably represents an alkyl group having 1 to 5 carbon atoms, an alkenyl group having 4 to 5 carbon atoms, or an alkoxy group having 1 to 4 carbon atoms, and preferably represents an ethoxy group, a propoxy group, or a butoxy group.

The compound represented by the general formula (N-1-17) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of Δε is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-17) may be 5%, 10%, 13%, 15%, 17%, or 20%. Based on the total amount of the composition of the present invention, the upper limit of the preferred content thereof may be 35%, 30%, 28%, 25%, 23%, 20%, 18%, 15%, or 13%.

The compound represented by the general formula (N-1-18) is the following compound:

[Chem. 130]

(N-1-18)

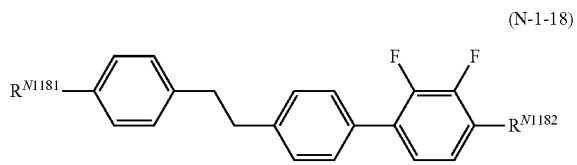

In the formula, $R^{N1181}$ and $R^{N1182}$ each independently have the same meanings as $R^{N11}$ and $R^{N12}$ in the general formula (N-1).

$R^{N1181}$ preferably represents an alkyl group having 1 to 5 carbon atoms or an alkenyl group having 2 to 5 carbon atoms, and preferably represents a methyl group, an ethyl group, a propyl group, or a butyl group. $R^{N1182}$ preferably represents an alkyl group having 1 to 5 carbon atoms, an alkenyl group having 4 to 5 carbon atoms, or an alkoxy group having 1 to 4 carbon atoms, and preferably represents an ethoxy group, a propoxy group, or a butoxy group.

The compound represented by the general formula (N-1-18) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of Δε is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-18) may be 5%, 10%, 13%, 15%, 17%, or 20%. Based on the total amount of the composition of the present invention, the upper limit of the preferred content thereof may be 35%, 30%, 28%, 25%, 23%, 20%, 18%, 15%, or 13%.

Moreover, the compound represented by the general formula (N-1-18) is preferably a compound selected from the group of compounds represented by the formulae (N-1-18.1) to (N-1-18.5), preferably compounds represented by the formulae (N-1-18.1) to (N-1-18.3), and preferably compounds represented by the formulae (N-1-18.2) and (N-1-18.3).

[Chem. 131]

(N-1-18.1)

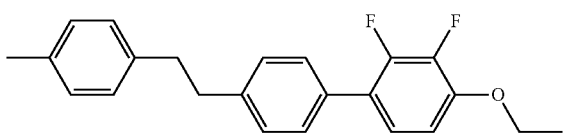

(N-1-18.2)

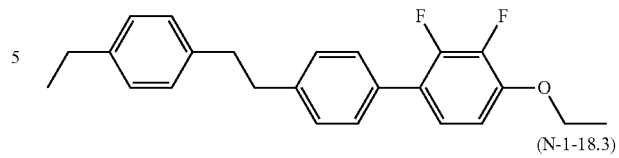

(N-1-18.3)

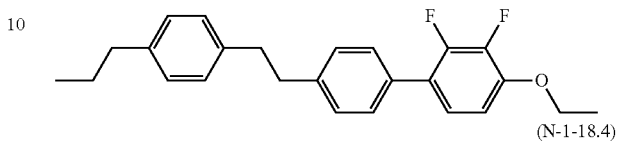

(N-1-18.4)

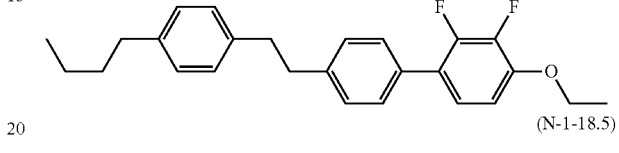

(N-1-18.5)

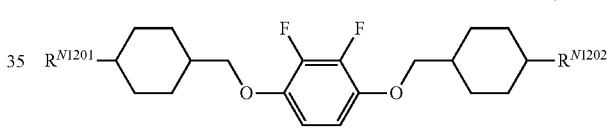

The compound represented by the general formula (N-1-20) is the following compound:

[Chem. 132]

(N-1-20)

$R^{N1201}$ ... $R^{N1202}$

In the formula, $R^{N1201}$ and $R^{N1202}$ each independently have the same meanings as $R^{N11}$ and $R^{N12}$ in the general formula (N-1).

$R^{N1201}$ and $R^{N1202}$ each independently preferably represent an alkyl group having 1 to 5 carbon atoms or an alkenyl group having 2 to 5 carbon atoms, and preferably represent an ethyl group, a propyl group, or a butyl group.

The compound represented by the general formula (N-1-20) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of Δε is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-20) may be 5%, 10%, 13%, 15%, 17%, or 20%. Based on the total amount of the composition of the present invention, the upper limit of the preferred content thereof may be 35%, 30%, 28%, 25%, 23%, 20%, 18%, 15%, or 13%.

The compound represented by the general formula (N-1-21) is the following compound:

[Chem. 133]

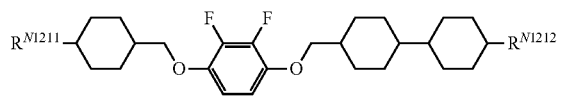

(N-1-21)

In the formula, $R^{N1211}$ and $R^{N1212}$ each independently have the same meanings as $R^{N11}$ and $R^{N12}$ in the general formula (N-1).

$R^{N1211}$ and $R^{N1212}$ each independently preferably represent an alkyl group having 1 to 5 carbon atoms or an alkenyl group having 2 to 5 carbon atoms, and preferably represent an ethyl group, a propyl group, or a butyl group.

The compound represented by the general formula (N-1-21) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of Δε is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-21) may be 5%, 10%, 13%, 15%, 17%, or 20%. Based on the total amount of the composition of the present invention, the upper limit of the preferred content thereof may be 35%, 30%, 28%, 25%, 23%, 20%, 18%, 15%, or 13%.

The compound represented by the general formula (N-1-22) is the following compound:

[Chem. 134]

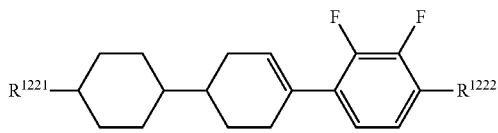

(N-1-22)

In the formula, $R^{N1221}$ and $R^{N1222}$ each independently have the same meanings as $R^{N11}$ and $R^{N12}$ in the general formula (N-1).

$R^{N1221}$ and $R^{N1222}$ each independently preferably represent an alkyl group having 1 to 5 carbon atoms or an alkenyl group having 2 to 5 carbon atoms, and preferably represent an ethyl group, a propyl group, or a butyl group.

The compound represented by the general formula (N-1-22) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of Δε is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a large value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-1-22) may be 1%, 5%, 10%, 13%, 15%, 17%, or 20%. Based on the total amount of the composition of the present invention, the upper limit of the preferred content thereof may be 35%, 30%, 28%, 25%, 23%, 20%, 18%, 15%, 13%, 10%, or 5%.

Moreover, the compound represented by the general formula (N-1-22) is preferably a compound selected from the group of compounds represented by the formulae (N-1-22.1) to (N-1-22.12), preferably compounds represented by the formulae (N-1-22.1) to (N-1-22.5), and preferably compounds represented by the formulae (N-1-22.1) to (N-1-22.4).

[Chem. 135]

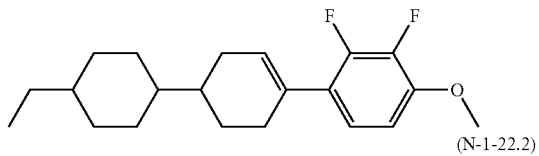

(N-1-22.1)

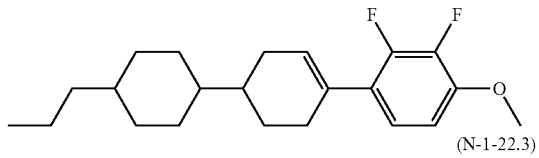

(N-1-22.2)

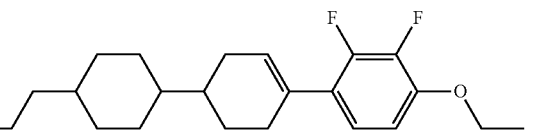

(N-1-22.3)

-continued (N-1-22.4)
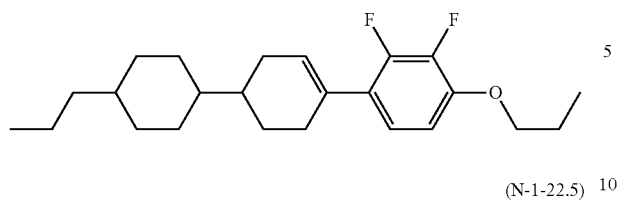

(N-1-22.5)

(N-1-22.6)

(N-1-22.11)

(N-1-22.12)
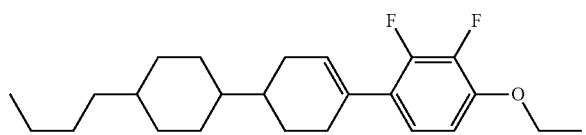

The compound represented by the general formula (N-2) is preferably a compound selected from the group of compounds represented by the following general formulae (N-2-1) to (N-2-3).

The compound represented by the general formula (N-2-1) is the following compound:

[Chem. 136]

(N-2-1)
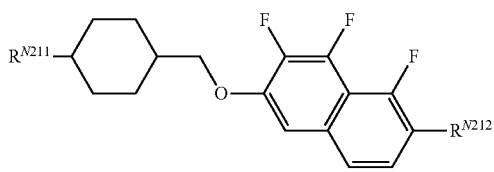

In the formula, $R^{N211}$ and $R^{N212}$ each independently have the same meanings as $R^{N21}$ and $R^{N22}$ in the general formula (N-2).

The compound represented by the general formula (N-2-2) is the following compound:

[Chem. 137]

(N-2-2)
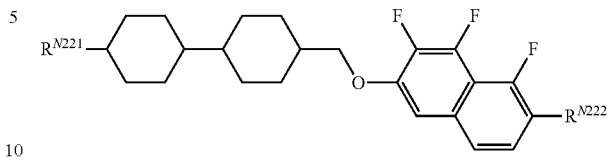

In the formula, $R^{N221}$ and $R^{N222}$ each independently have the same meanings as $R^{N21}$ and $R^{N22}$ in the general formula (N-2).

The compound represented by the general formula (N-2-3) is the following compound:

[Chem. 138]

(N-2-3)
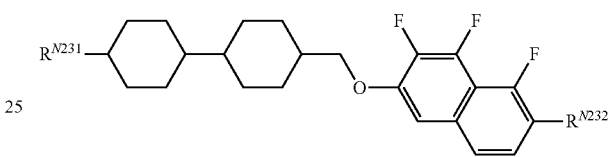

In the formula, $R^{N231}$ and $R^{N232}$ each independently have the same meanings as $R^{N21}$ and $R^{N22}$ in the general formula (N-2).

The compound represented by the general formula (N-3) is preferably a compound selected from the group of compounds represented by the general formula (N-3-2):

[Chem. 139]

(N-3-2)
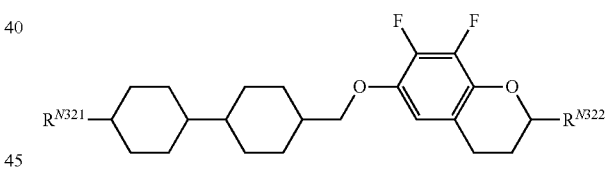

In the formula, $R^{N321}$ and $R^{N322}$ each independently have the same meanings as $R^{N31}$ and $R^{N32}$ in the general formula (N-3).

$R^{N321}$ and $R^{N322}$ each preferably represent an alkyl group having 1 to 5 carbon atoms or an alkenyl group having 2 to 5 carbon atoms, and preferably represent a propyl group or a pentyl group.

The compound represented by the general formula (N-3-2) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the improvement of Δε is important, the content of the compound is preferably large; in the case where the solubility at a low temperature is important, a high effect may be obtained by setting the content thereof to a large value; and in the case where $T_{NI}$ is important, a high effect may be obtained by setting the content thereof to a small value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (N-3-2) may be 3%, 5%, 10%, 13%, 15%, 17%, 20%, 23%, 25%, 27%, 30%, 33%, or 35%. Based on the total amount of the composition of the present invention, the upper limit of the preferred content thereof may be 50%, 40%, 38%, 35%, 33%, 30%, 28%, 25%, 23%, 20%, 18%, 15%, 13%, 10%, 8%, 7%, 6%, or 5%.

Moreover, the compound represented by the general formula (N-3-2) is preferably a compound selected from the group of compounds represented by the formulae (N-3-2.1) to (N-3-2.3).

ylene group (in which one of —$CH_2$— or two or more of —$CH_2$— that are not adjacent to each other present in the group may be replaced by —O—), (b) a 1,4-phenylene group (in which one of —CH= or two or more of —CH= that are not adjacent to each other present in the group may be replaced by —N=), and (c) a naphthalene-2,6-diyl group, a 1,2,3,4-tetrahydronaphthalene-2,6-diyl group, or a decahydronaphthalene-2,6-diyl group (in which one of —CH= or two or more of —CH= that are not adjacent to each other present in the naphthalene-2,6-diyl group or the 1,2,3,4-tetrahydronaphthalene-2,6-diyl group may be replaced by —N=), the group (a), the group (b) and the group (c) may be each independently substituted with a cyano group, a fluorine atom, or a chlorine atom, $Z^{L1}$ and $Z^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N— N=CH—, —CH=CH—, —CF=CF—, or —C≡C—,

[Chem. 140]

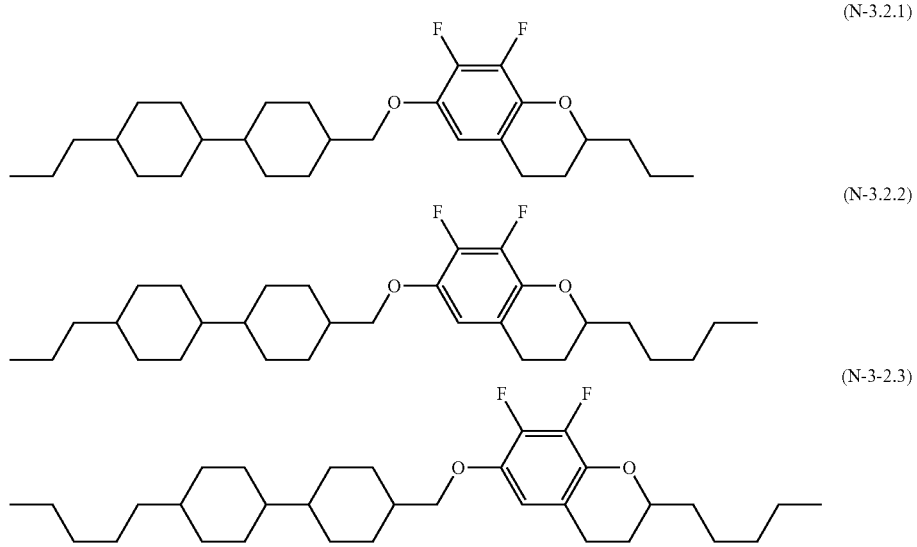

The liquid crystal composition according to the present invention preferably contains one kind or two or more kinds of compounds represented by the general formula (L) in addition to the compounds represented by the first monomer and the second monomer. The compound represented by the general formula (L) corresponds to a compound that is dielectrically nearly neutral (i.e., a value of Δε of −2 to 2).

[Chem. 141]

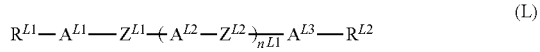

In the formula, $R^L1$ and $R^{L2}$ each independently represent an alkyl group having 1 to 8 carbon atoms, in which one or non-adjacent two or more of —$CH_2$— in the alkyl group each independently may be substituted with —CH=CH—, —C≡C—, —O—, —CO—, —COO—, or —OCO—;

$n^{L1}$ represents 0, 1, 2, or 3;

$A^{L1}$, $A^{L2}$, and $A^{L3}$ each independently represent a group selected from the group consisting of (a) a 1,4-cyclohexin the case where $n^{L1}$ is 2 or 3, and a plurality of $A^{L2}$ are present, these may be the same as or different from each other; in the case where $n^{L1}$ is 2 or 3, and a plurality of $Z^{L2}$ are present, these may be the same as or different from each other; and compounds represented by the general formulae (N-1), (N-2), and (N-3) are excluded.

The compound represented by the general formula (L) may be used solely or as a combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kind of the compound used may be, for example, one kind in one embodiment of the present invention. Alternatively, the kinds thereof may be two kinds, three kinds, four kinds, five kinds, six kinds, seven kinds, eight kinds, nine kinds, or ten kinds in other embodiments of the present invention.

In the composition of the present invention, the content of the compound represented by the general formula (L) is necessarily controlled appropriately in accordance with the demanded capabilities, such as the solubility at a low temperature, the transition temperature, the electric reliability, the birefringence, the process adaptability, the drop marks, the burn-in, and the dielectric anisotropy.

Based on the total amount of the composition of the present invention, the lower limit of the preferred content of the compound represented by the formula (L) may be 1%, 10%, 20%, 30%, 40%, 50%, 55%, 60%, 65%, 70%, 75%, or 80%. The upper limit of the preferred content thereof may be 95%, 85%, 75%, 65%, 55%, 45%, 35%, or 25%.

In the case where it is demanded that the viscosity of the composition of the present invention is kept low, and a composition having a high response speed is provided, it is preferred that the lower limit is high, and the upper limit is high. Moreover, in the case where it is demanded that Tni of the composition of the present invention is kept high, and a composition having good temperature stability is provided, it is preferred that the lower limit is high, and the upper limit is high. Furthermore, in the case where it is demanded that the dielectric anisotropy is increased for keeping the driving voltage low, it is preferred that the lower limit is low, and the upper limit is low.

In the case where the reliability is important, both $R^{L1}$ and $R^{L2}$ are preferably alkyl groups; in the case where the decrease of the volatility of the compound is important, both of them are preferably alkoxy group; and in the case where the decrease of the viscosity is important, at least one of them is preferably an alkenyl group.

The number of a halogen atom present in the molecule is preferably 0, 1, 2, or 3, preferably 0 or 1, and in the case where the compatibility with the other liquid crystal molecules is important, preferably 1.

In the case where the cyclic structure, to which $R^{L1}$ or $R^{L2}$ is bonded, is a phenyl group (i.e., an aromatic group), $R^{L1}$ and $R^{L2}$ each independently preferably represent a linear alkyl group having 1 to 5 carbon atoms, a linear alkoxy group having 1 to 4 carbon atoms, or an alkenyl group having 4 to 5 carbon atoms, and in the case where the cyclic structure, to which $R^{L1}$ or $R^{L2}$ is bonded, is a saturated cyclic structure, such as cyclohexane, pyrane, or dioxane, $R^{L1}$ and $R^{L2}$ each independently preferably represent a linear alkyl group having 1 to 5 carbon atoms, a linear alkoxy group having 1 to 4 carbon atoms, or a linear alkenyl group having 2 to 5 carbon atoms. For stabilizing the nematic phase, the total number of the carbon atom and the oxygen atom if any is preferably 5 or less, and the group is preferably linear.

The alkenyl group is preferably selected from groups represented by any of the formulae (R1) to (R5). (The black dot in each formula represents a carbon atom in the cyclic structure.)

[Chem. 142]

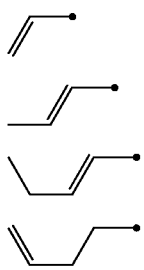

(R1)

(R2)

(R3)

(R4)

-continued

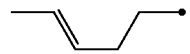

(R5)

$n^{L1}$ is preferably 0 in the case where the response speed is important, preferably 2 or 3 for improving the upper limit temperature of the nematic phase, and preferably 1 for balancing these factors. Moreover, the compounds having different values are preferably combined for satisfying the characteristics demanded in the composition.

In the case where Δn is demanded to be increased, $A^{L1}$, $A^{L2}$, and $A^{L3}$ each preferably represent an aromatic group, and in the case where the response speed is demanded to be increased, each preferably represent an aliphatic group, each independently preferably represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 1,4-cyclohexenylene group, a 1,4-bicyclo[2.2.2]octylene group, a pyperidin-1,4-diyl group, a naphthalen-2,6-diyl group, a decahydronaphthalen-2,6-diyl group, or a 1,2,3,4-tetrahydronaphthalen-2,6-diyl group, more preferably represent the following structures:

[Chem. 143]

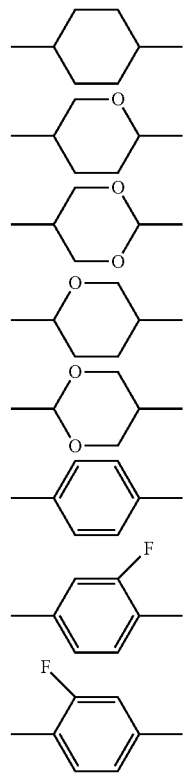

and more preferably represent a trans-1,4-cyclohexylene group or a 1,4-phenylene group.

$Z^{L1}$ and $Z^{L2}$ are preferably single bond in the case where the response speed is important.

The number of a halogen atom in the molecule of the compound represented by the general formula (L) is preferably 0 or 1. The halogen atom is preferably a fluorine atom or a chlorine atom, and more preferably a fluorine atom.

The compound represented by the general formula (L) is preferably a compound selected from the group of compounds represented by the following general formulae (L-1) to (L-7).

The compound represented by the general formula (L-1) is the following compound:

[Chem. 144]

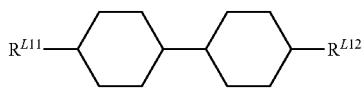

(L-1)

In the formula, $R^L11$ and $R^{L12}$ each independently have the same meanings as $R^{L1}$ and $R^{L2}$ in the general formula (L).

$R^{L11}$ and $R^{L12}$ each preferably represent a linear alkyl group having 1 to 5 carbon atoms, a linear alkoxy group having 1 to 4 carbon atoms, or an alkenyl group having 2 to 5 carbon atoms.

The compound represented by the general formula (L-1) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

Based on the total amount of the composition of the present invention, the lower limit of the preferred content of the compound may be 1%, 2%, 3%, 5%, 7%, 10%, 15%, 20%, 25%, 30%, 35%, 40%, 45%, 50%, or 55%. Based on the total amount of the composition of the present invention, the upper limit of the preferred content thereof may be 95%, 90%, 85%, 80%, 75%, 70%, 65%, 60%, 55%, 50%, 45%, 40%, 35%, 30%, or 25%.

In the case where it is demanded that the viscosity of the composition of the present invention is kept low, and a composition having a high response speed is provided, it is preferred that the lower limit is high, and the upper limit is high. Moreover, in the case where it is demanded that Tni of the composition of the present invention is kept high, and a composition having good temperature stability is provided, it is preferred that the lower limit is intermediate, and the upper limit is intermediate. Furthermore, in the case where it is demanded that the dielectric anisotropy is increased for keeping the driving voltage low, it is preferred that the lower limit is low, and the upper limit is low.

The compound represented by the general formula (L-1) is preferably a compound selected from the group of compounds represented by the general formula (L-1-1):

[Chem. 145]

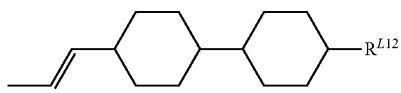

(L-1-1)

In the formula, $R^{L12}$ has the same meaning as in the general formula (L-1).

The compound represented by the general formula (L-1-1) is preferably a compound selected from the group of compounds represented by the formulae (L-1-1.1) to (L-1-1.3), preferably the compounds represented by the formulae (L-1-1.2) or (L-1-1.3), and preferably a compound represented by the formula (L-1-1.3).

[Chem. 146]

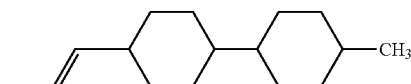

(L-1-1.1)

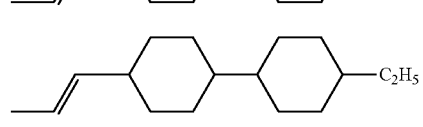

(L-1-1.2)

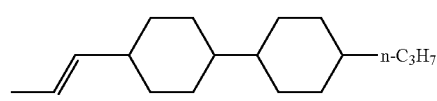

(L-1-1.3)

Based on the total amount of the composition of the present invention, the lower limit of the preferred content of the compound represented by the formula (L-1-1.3) may be 1%, 2%, 3%, 5%, 7%, or 10%. Based on the total amount of the composition of the present invention, the upper limit of the preferred content thereof may be 20%, 15%, 13%, 10%, 8%, 7%, 6%, 5%, or 3%.

The compound represented by the general formula (L-1) is preferably a compound selected from the group of compounds represented by the general formula (L-1-2):

[Chem. 147]

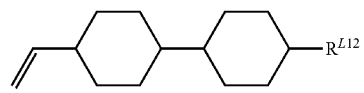

(L-1-2)

In the formula, $R^{L12}$ has the same meaning as in the general formula (L-1).

Based on the total amount of the composition of the present invention, the lower limit of the preferred content of the compound represented by the formula (L-1-2) may be 1%, 5%, 10%, 15%, 17%, 20%, 23%, 25%, 27%, 30%, or 35%. Based on the total amount of the composition of the present invention, the upper limit of the preferred content thereof may be 60%, 55%, 50%, 45%, 42%, 40%, 38%, 35%, 33%, or 30%.

Moreover, the compound represented by the general formula (L-1-2) is preferably a compound selected from the group of compounds represented by the formulae (L-1-2.1) to (L-1-2.4), and preferably the compounds represented by the formulae (L-1-2.2) to (L-1-2.4). In particular, the compound represented by the formula (L-1-2.2) is preferred for improving the response speed of the composition of the present invention. Furthermore, in the case where a high Tni is demanded rather than the response speed, the compound represented by the formula (L-1-2.3) or (L-1-2.4) is preferably used. The content of the compounds represented by the formulae (L-1-2.3) and (L-1-2.4) is preferably not 30% by mass or more for improving the solubility at a low temperature.

[Chem. 148]

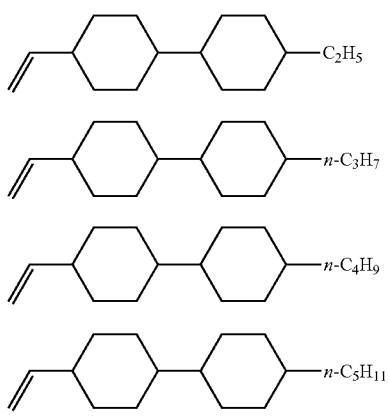

(L-1-2.1)
(L-1-2.2)
(L-1-2.3)
(L-1-2.4)

Based on the total amount of the composition of the present invention, the lower limit of the preferred content of the compound represented by the formula (L-1-2.2) may be 10%, 15%, 18%, 20%, 23%, 25%, 27%, 30%, 33%, 35%, 38%, or 40%. Based on the total amount of the composition of the present invention, the upper limit of the preferred content thereof may be 60%, 55%, 50%, 45%, 43%, 40%, 38%, 35%, 32%, 30%, 27%, 25%, or 22%.

Based on the total amount of the composition of the present invention, the lower limit of the preferred total content of the compound represented by the formula (L-1-1.3) and the compound represented by the formula (L-1-2.2) may be 10%, 15%, 20%, 25%, 27%, 30%, 35%, or 40%. Based on the total amount of the composition of the present invention, the upper limit of the preferred content thereof may be 60%, 55%, 50%, 45%, 43%, 40%, 38%, 35%, 32%, 30%, 27%, 25%, or 22%.

The compound represented by the general formula (L-1) is preferably a compound selected from the group of compounds represented by the general formula (L-1-3):

[Chem. 149]

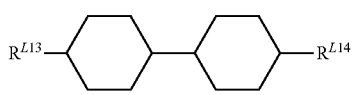

(L-1-3)

In the formula, $R^{L13}$ and $R^{L14}$ each independently represent an alkyl group having 1 to 8 carbon atoms or an alkoxy group having 1 to 8 carbon atoms.

$R^{L13}$ and $R^{L14}$ each preferably represent a linear alkyl group having 1 to 5 carbon atoms, a linear alkoxy group having 1 to 4 carbon atoms, or a linear alkenyl group having 2 to 5 carbon atoms.

Based on the total amount of the composition of the present invention, the lower limit of the preferred content of the compound represented by the formula (L-1-3) may be 1%, 5%, 10%, 13%, 15%, 17%, 20%, 23%, 25%, or 30%. Based on the total amount of the composition of the present invention, the upper limit of the preferred content thereof may be 60%, 55%, 50%, 45%, 40%, 37%, 35%, 33%, 30%, 27%, 25%, 23%, 20%, 17%, 15%, 13%, or 10%.

Moreover, the compound represented by the general formula (L-1-3) is preferably a compound selected from the group of compounds represented by the formulae (L-1-3.1) to (L-1-3.13), and preferably the compounds represented by the formula (L-1-3.1), (L-1-3.3), or (L-1-3.4). In particular, the compound represented by the formula (L-1-3.1) is preferred for improving the response speed of the composition of the present invention. Furthermore, in the case where a high Tni is demanded rather than the response speed, the compounds represented by the formulae (L-1-3.3), (L-1-3.4), (L-1-3.11), and (L-1-3.12) are preferably used. The total content of the compounds represented by the formulae (L-1-3.3), (L-1-3.4), (L-1-3.11), and (L-1-3.12) is preferably not 20% or more for improving the solubility at a low temperature.

[Chem. 150]

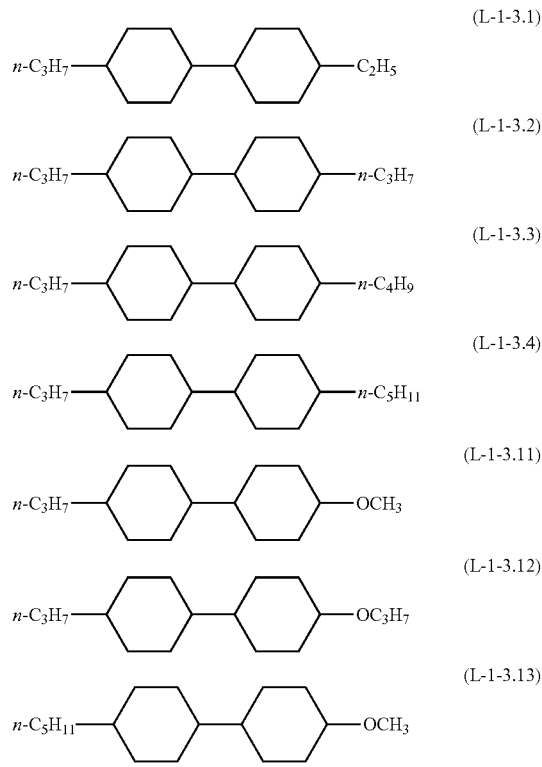

(L-1-3.1)
(L-1-3.2)
(L-1-3.3)
(L-1-3.4)
(L-1-3.11)
(L-1-3.12)
(L-1-3.13)

Based on the total amount of the composition of the present invention, the lower limit of the preferred content of the compound represented by the formula (L-1-3.1) may be 1%, 2%, 3%, 5%, 7%, 10%, 13%, 15%, 18%, or 20%. Based on the total amount of the composition of the present invention, the upper limit of the preferred content thereof may be 20%, 17%, 15%, 13%, 10%, 8%, 7%, or 6%.

The compound represented by the general formula (L-1) is preferably a compound selected from the group of compounds represented by the general formula (L-1-4) and/or (L-1-5):

[Chem. 151]

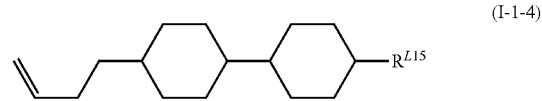

(I-1-4)

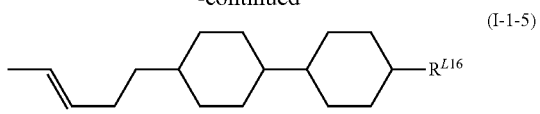

(I-1-5)

In the formula, $R^{L15}$ and $R^{L16}$ each independently represent an alkyl group having 1 to 8 carbon atoms or an alkoxy group having 1 to 8 carbon atoms.

$R^{L15}$ and $R^{L16}$ each preferably represent a linear alkyl group having 1 to 5 carbon atoms, a linear alkoxy group having 1 to 4 carbon atoms, or a linear alkenyl group having 2 to 5 carbon atoms.

Based on the total amount of the composition of the present invention, the lower limit of the preferred content of the compound represented by the formula (L-1-4) may be 1%, 5%, 10%, 13%, 15%, 17%, or 20%. Based on the total amount of the composition of the present invention, the upper limit of the preferred content thereof may be 25%, 23%, 20%, 17%, 15%, 13%, or 10%.

Based on the total amount of the composition of the present invention, the lower limit of the preferred content of the compound represented by the formula (L-1-5) may be 1%, 5%, 10%, 13% 15%, 17%, or 20%. Based on the total amount of the composition of the present invention, the upper limit of the preferred content thereof may be 25%, 23%, 20%, 17%, 15%, 13%, or 10%.

Moreover, the compound represented by the general formulae (L-1-4) and (L-1-5) is preferably a compound selected from the group of compounds represented by the formulae (L-1-4.1) to (L-1-5.3), and preferably the compounds represented by the formula (L-1-4.2) or (L-1-5.2).

[Chem. 152]

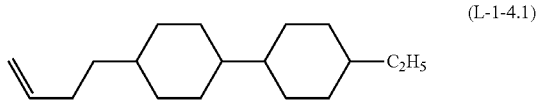
(L-1-4.1)

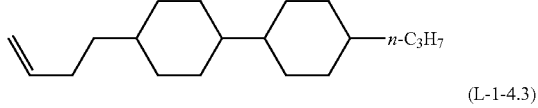
(L-1-4.2)

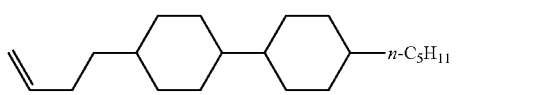
(L-1-4.3)

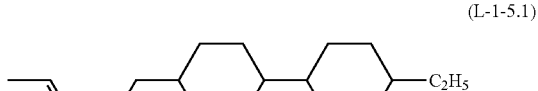
(L-1-5.1)

(L-1-5.2)

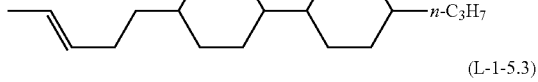
(L-1-5.3)

Based on the total amount of the composition of the present invention, the lower limit of the preferred content of the compound represented by the formula (L-1-4.2) may be 1%, 2%, 3%, 5%, 7%, 10%, 13%, 15%, 18%, or 20%. Based on the total amount of the composition of the present invention, the upper limit of the preferred content thereof may be 20%, 17%, 15%, 13%, 10%, 8%, 7%, or 6%.

Two or more kinds of compounds selected from the group of compounds represented by the formulae (L-1-1.3), (L-1-2.2), (L-1-3.1), (L-1-3.3), (L-1-3.4), (L-1-3.11), and (L-1-3.12) are preferably combined, and two or more kinds of compounds selected from the group of compounds represented by the formulae (L-1-1.3), (L-1-2.2), (L-1-3.1), (L-1-3.3), (L-1-3.4), and (L-1-4.2) are preferably combined. Based on the total amount of the composition of the present invention, the lower limit of the preferred total content of these compounds may be 1%, 2%, 3%, 5%, 7%, 10%, 13%, 15%, 18%, 20%, 23%, 25%, 27%, 30%, 33%, or 35%. Based on the total amount of the composition of the present invention, the upper limit of the preferred content thereof may be 80%, 70%, 60%, 50%, 45%, 40%, 37%, 35%, 33%, 30%, 28%, 25%, 23%, or 20%. In the case where the reliability of the composition is important, two or more kinds of compounds selected from the group of compounds represented by the formulae (L-1-3.1), (L-1-3.3), and (L-1-3.4) are preferably combined, and in the case where the response speed of the composition is important, two or more kinds of compounds selected from the group of compounds represented by the formulae (L-1-1.3) and (L-1-2.2) are preferably combined.

The compound represented by the general formula (L-1) is preferably a compound selected from the group of compounds represented by the general formula (L-1-6):

[Chem. 153]

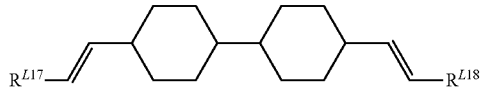
(L-1-6)

In the formula, $R^{L17}$ and $R^{L18}$ each independently represent a methyl group or a hydrogen atom.

Based on the total amount of the composition of the present invention, the lower limit of the preferred content of the compound represented by the formula (L-1-6) may be 1%, 5%, 10%, 15%, 17%, 20%, 23%, 25%, 27%, 30%, or 35%. Based on the total amount of the composition of the present invention, the upper limit of the preferred content thereof may be 60%, 55%, 50%, 45%, 42%, 40%, 38%, 35%, 33%, or 30%.

Moreover, the compound represented by the general formula (L-1-6) is preferably a compound selected from the group of compounds represented by the formulae (L-1-6.1) to (L-1-6.3)

[Chem. 154]

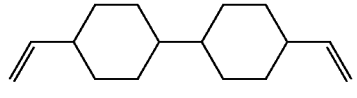
(L-1-6.1)

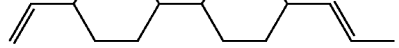
(L-1-6.2)

-continued (L-1-6.3)

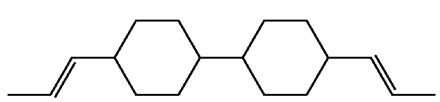

The compound represented by the general formula (L-2) is the following compound:

[Chem. 155]

(L-2)

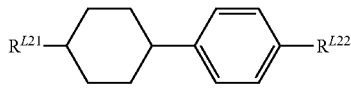

In the formula, $R^{L21}$ and $R^{L22}$ each independently have the same meanings as $R^{L1}$ and $R^{L2}$ in the general formula (L).

$R^{L21}$ preferably represents an alkyl group having 1 to 5 carbon atoms or an alkenyl group having 2 to 5 carbon atoms, and $R^{L22}$ preferably represents an alkyl group having 1 to 5 carbon atoms, an alkenyl group having 4 to 5 carbon atoms, or an alkoxy group having 1 to 4 carbon atoms.

The compound represented by the general formula (L-1) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the case where the solubility at a low temperature is important, a high effect may be obtained by setting the content thereof to a large value, and on the other hand, in the case where the response speed is important, a high effect may be obtained by setting the content thereof to a small value. Moreover, in the case where the drop marks and the burn-in characteristics are improved, the range of the content thereof is preferably set to the intermediate.

Based on the total amount of the composition of the present invention, the lower limit of the preferred content of the compound represented by the formula (L-2) may be 1%, 2%, 3%, 5% 7%, or 10%. Based on the total amount of the composition of the present invention, the upper limit of the preferred content thereof may be 20%, 15%, 13%, 10%, 8%, 7%, 6%, 5%, or 3%.

Moreover, the compound represented by the general formula (L-2) is preferably a compound selected from the group of compounds represented by the formulae (L-2.1) to (L-2.6), and preferably the compounds represented by the formulae (L-2.1), (L-2.3), (L-2.4), and (L-2.6).

[Chem. 156]

(L-2.1)

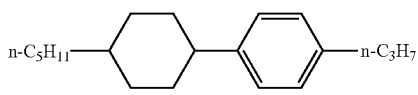

(L-2.2)

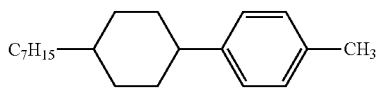

(L-2.3)

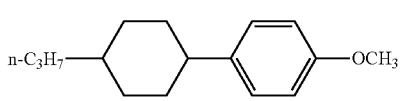

(L-2.4)

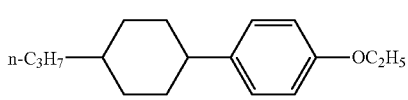

(L-2.5)

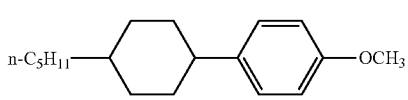

(L-2.6)

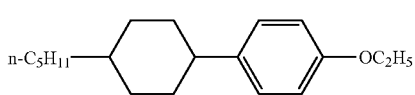

The compound represented by the general formula (L-3) is the following compound:

[Chem. 157]

(L-3)

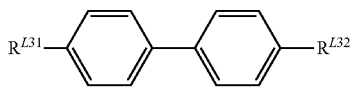

In the formula, $R^{L31}$ and $R^{L32}$ each independently have the same meanings as $R^{L1}$ and $R^{L2}$ in the general formula (L).

$R^{L31}$ and $R^{L32}$ each preferably represent an alkyl group having 1 to 5 carbon atoms, an alkenyl group having 4 to 5 carbon atoms, or an alkoxy group having 1 to 4 carbon atoms.

The compound represented by the general formula (L-3) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

Based on the total amount of the composition of the present invention, the lower limit of the preferred content of the compound represented by the formula (L-3) may be 1%, 2%, 3%, 5%, 7%, or 10%. Based on the total amount of the composition of the present invention, the upper limit of the preferred content thereof may be 20%, 15%, 13%, 10%, 8%, 7%, 6%, 5%, or 3%.

In the case where a high birefringence is obtained, a high effect may be obtained by setting the content thereof to a large value, and on the other hand, in the case where a high Tni is important, a high effect may be obtained by setting the content thereof to a small value. Moreover, in the case where the drop marks and the burn-in characteristics are improved, the range of the content thereof is preferably set to the intermediate.

Moreover, the compound represented by the general formula (L-3) is preferably a compound selected from the group of compounds represented by the formulae (L-3.1) to (L-3.7), and preferably the compounds represented by the formulae (L-3.2) to (L-3.7).

[Chem. 158]

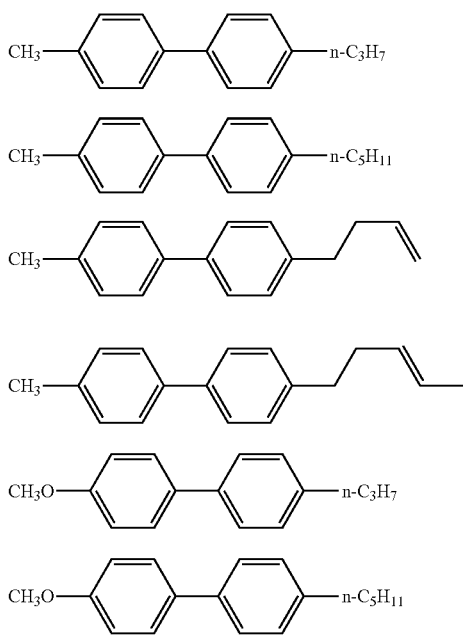

(L-3.1)
(L-3.2)
(L-3.3)
(L-3.4)
(L-3.6)
(L-3.7)

The compound represented by the general formula (L-4) is the following compound:

[Chem. 159]

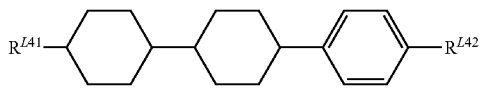

(L-4)

In the formula, $R^{L41}$ and $R^{L42}$ each independently have the same meanings as $R^{L1}$ and $R^{L2}$ in the general formula (L).

$R^{L41}$ preferably represents an alkyl group having 1 to 5 carbon atoms or an alkenyl group having 2 to 5 carbon atoms, and $R^{L42}$ preferably represents an alkyl group having 1 to 5 carbon atoms, an alkenyl group having 4 to 5 carbon atoms, or an alkoxy group having 1 to 4 carbon atoms.

The compound represented by the general formula (L-4) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the composition of the present invention, the content of the compound represented by the general formula (L-4) is necessarily controlled appropriately in accordance with the demanded capabilities, such as the solubility at a low temperature, the transition temperature, the electric reliability, the birefringence, the process adaptability, the drop marks, the burn-in, and the dielectric anisotropy.

Based on the total amount of the composition of the present invention, the lower limit of the preferred content of the compound represented by the formula (L-4) may be 1%, 2%, 3%, 5%, 7%, 10%, 14%, 16%, 20%, 23%, 26%, 30%, 35%, or 40%. Based on the total amount of the composition of the present invention, the upper limit of the preferred content of the compound represented by the formula (L-4) may be 50%, 40%, 35%, 30%, 20%, 15%, 10%, or 5%.

The compound represented by the general formula (L-4) is preferably, for example, the compounds represented by the formulae (L-4.1) to (L-4.3).

[Chem. 160]

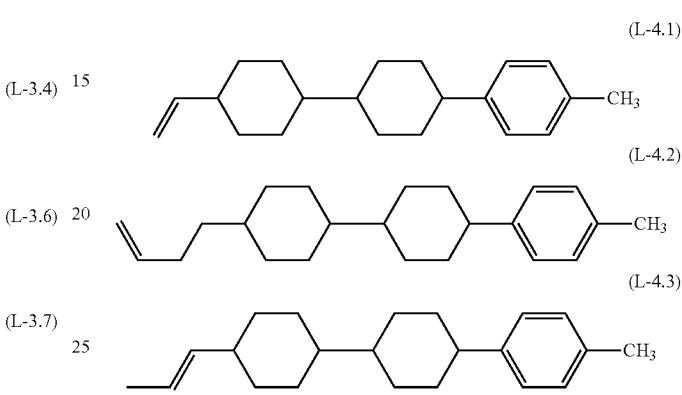

(L-4.1)
(L-4.2)
(L-4.3)

In accordance with the demanded capabilities, such as the solubility at a low temperature, the transition temperature, the electric reliability, and the birefringence, the compound represented by the formula (L-4.1) may be contained, the compound represented by the formula (L-4.2) may be contained, both the compounds represented by the formulae (L-4.1) and (L-4.2) may be contained, and all the compounds represented by the formulae (L-4.1) to (L-4.3) may be contained. Based on the total amount of the composition of the present invention, the lower limit of the preferred content of the compound represented by the formula (L-4.1) or (L-4.2) may be 3%, 5%, 7%, 9%, 11%, 12%, 13%, 18%, or 21%. The upper limit of the preferred content thereof may be 45%, 40%, 35%, 30%, 25%, 23%, 20%, 18%, 15%, 13%, 10%, or 8%.

In the case where both the compounds represented by the formulae (L-4.1) and (L-4.2) are contained, based on the total amount of the composition of the present invention, the lower limit of the preferred content of the compounds may be 15%, 19%, 24%, or 30%. The upper limit of the preferred content thereof may be 45%, 40%, 35%, 30%, 25%, 23%, 20%, 18%, 15%, or 13%.

The compound represented by the general formula (L-4) is preferably, for example, the compounds represented by the formulae (L-4.4) to (L-4.6), and preferably the compound represented by the formula (L-4.4).

[Chem. 161]

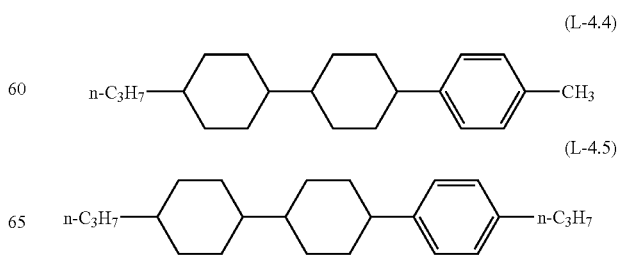

(L-4.4)
(L-4.5)

-continued (L-4.6)

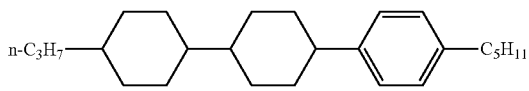

In accordance with the demanded capabilities, such as the solubility at a low temperature, the transition temperature, the electric reliability, and the birefringence, the compound represented by the formula (L-4.4) may be contained, the compound represented by the formula (L-4.5) may be contained, and both the compounds represented by the formulae (L-4.4) and (L-4.5) may be contained.

Based on the total amount of the composition of the present invention, the lower limit of the preferred content of the compound represented by the formula (L-4.4) or (L-4.5) may be 3%, 5%, 7%, 9%, 11%, 12%, 13%, 18%, or 21%. The preferred upper limit thereof may be 45%, 40%, 35%, 30%, 25%, 23%, 20%, 18%, 15%, 13%, 10%, or 8%.

In the case where both the compounds represented by the formulae (L-4.4) and (L-4.5) are contained, based on the total amount of the composition of the present invention, the lower limit of the preferred content of the compounds may be 15%, 19%, 24%, or 30%. The preferred upper limit thereof may be 45%, 40%, 35%, 30%, 25%, 23%, 20%, 18%, 15%, or 13%.

The compound represented by the general formula (L-4) is preferably the compounds represented by the formulae (L-4.7) to (L-4.10), and particularly preferably the compound represented by the formula (L-4.9).

[Chem. 162]

(L-4.7)

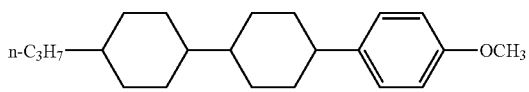
(L-4.8)

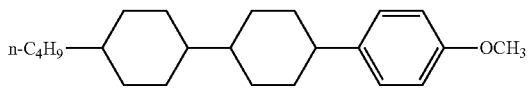
(L-4.9)

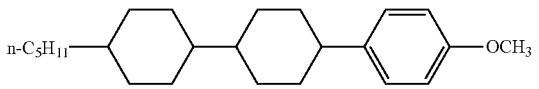
(L-4.10)

The compound represented by the general formula (L-5) is the following compound:

[Chem. 163]

(L-5)

In the formula, $R^{L51}$ and $R^{L52}$ each independently have the same meanings as $R^{L1}$ and $R^{L2}$ in the general formula (L).

$R^{L51}$ preferably represents an alkyl group having 1 to 5 carbon atoms or an alkenyl group having 2 to 5 carbon atoms, and $R^{L52}$ preferably represents an alkyl group having 1 to 5 carbon atoms, an alkenyl group having 4 to 5 carbon atoms, or an alkoxy group having 1 to 4 carbon atoms.

The compound represented by the general formula (L-5) may be used solely, or two or more of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

In the composition of the present invention, the content of the compound represented by the general formula (L-5) is necessarily controlled appropriately in accordance with the demanded capabilities, such as the solubility at a low temperature, the transition temperature, the electric reliability, the birefringence, the process adaptability, the drop marks, the burn-in, and the dielectric anisotropy.

Based on the total amount of the composition of the present invention, the lower limit of the preferred content of the compound represented by the formula (L-5) may be 1%, 2%, 3%, 5%, 7%, 10%, 14%, 16%, 20%, 23%, 26%, 30%, 35%, or 40%. Based on the total amount of the composition of the present invention, the upper limit of the preferred content of the compound represented by the formula (L-5) may be 50%, 40%, 35%, 30%, 20%, 15%, 10%, or 5%.

The compound represented by the general formula (L-5) is preferably the compounds represented by the formulae (L-5.1) and (L-5.2), and particularly preferably the compound represented by the formula (L-5.1).

Based on the total amount of the composition of the present invention, the lower limit of the preferred content of the compounds may be 1%, 2%, 3%, 5%, or 7%. The upper limit of the preferred content of the compounds may be 20%, 15%, 13%, 10%, or 9%.

[Chem. 164]

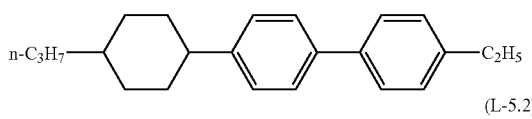
(L-5.1)

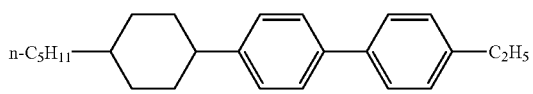
(L-5.2)

The compound represented by the general formula (L-5) is preferably the compounds represented by the formulae (L-5.3) and (L-5.4).

Based on the total amount of the composition of the present invention, the lower limit of the preferred content of the compounds may be 1%, 2%, 3%, 5%, or 7%. The upper limit of the preferred content of the compounds may be 20%, 15%, 13%, 10%, or 9%.

[Chem. 165]

(L-5.3)

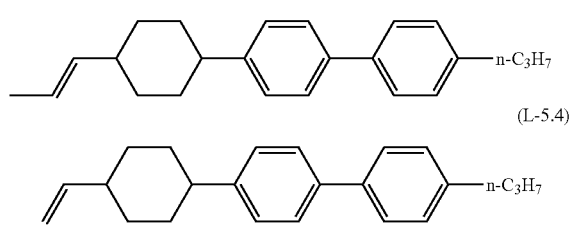

(L-5.4)

The compound represented by the general formula (L-5) is preferably the compounds represented by the formulae (L-5.5) to (L-5.7), and particularly preferably the compound represented by the formula (L-5.7).

Based on the total amount of the composition of the present invention, the lower limit of the preferred content of the compounds may be 1%, 2%, 3%, 5%, or 7%. The upper limit of the preferred content of the compounds may be 20%, 15%, 13%, 10%, or 9%.

[Chem. 166]

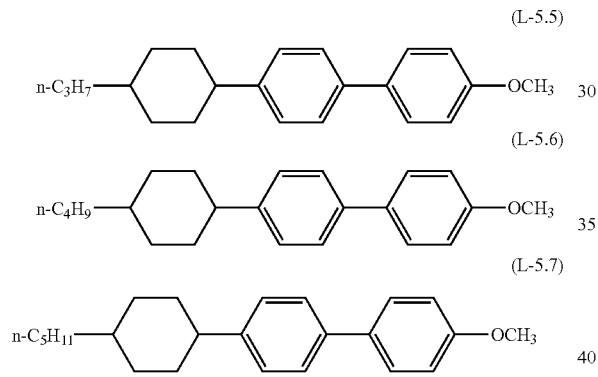

(L-5.5)

(L-5.6)

(L-5.7)

The compound represented by the general formula (L-6) is the following compound:

[Chem. 167]

(L-6)

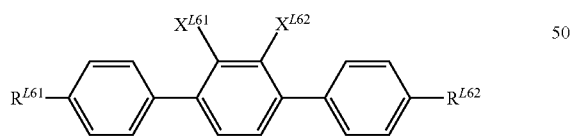

In the formula, $R^{L61}$ and $R^{L62}$ each independently have the same meanings as $R^{L}1$ and $R^{L2}$ in the general formula (L); and $X^{L61}$ and $X^{L62}$ each independently represent a hydrogen atom or a fluorine atom.

$R^{L61}$ and $R^{L62}$ each independently preferably represent an alkyl group having 1 to 5 carbon atoms or an alkenyl group having 2 to 5 carbon atoms, and it is preferred that one of $X^{L61}$ and $X^{L62}$ represents a fluorine atom, and the other thereof represents a hydrogen atom.

The compound represented by the general formula (L-6) may be used solely, or two or more kinds of the compounds may be used in combination. The kinds of the compounds capable of being used in combination are not particularly limited, and the compounds may be used as an appropriate combination in accordance with the demanded capabilities, such as the solubility at a low temperature, the transition temperature, the electric reliability, and the birefringence. The kinds of the compound used may be, for example in one embodiment of the present invention, one kind, two kinds, three kinds, four kinds, or five or more kinds.

Based on the total amount of the composition of the present invention, the lower limit of the preferred content of the compound represented by the formula (L-6) may be 1%, 2%, 3%, 5%, 7%, 10%, 14%, 16%, 20%, 23%, 26%, 30%, 35%, or 40%. Based on the total amount of the composition of the present invention, the upper limit of the preferred content of the compound represented by the formula (L-6) may be 50%, 40%, 35%, 30%, 20%, 15%, 10%, or 5%. The content thereof is preferably large in the case where the increase of Δn is important, and the content thereof is preferably small in the case where the deposition at a low temperature is important.

The compound represented by the general formula (L-6) is preferably the compounds represented by the formulae (L-6.1) to (L-6.9).

[Chem. 168]

(L-6.1)

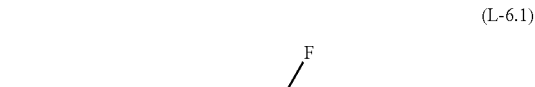

(L-6.2)

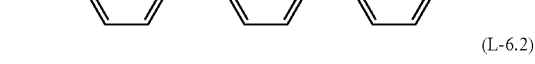

(L-6.3)

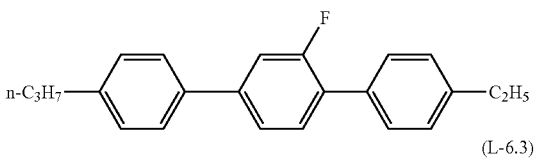

(L-6.4)

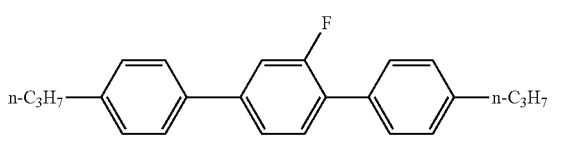

(L-6.5)

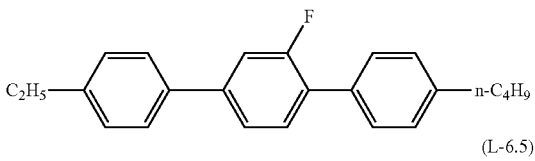

(L-6.6)

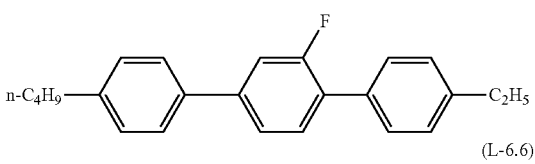

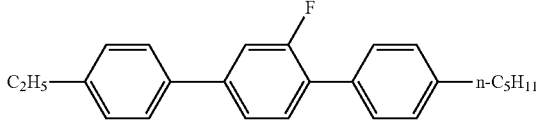

(L-6.7)

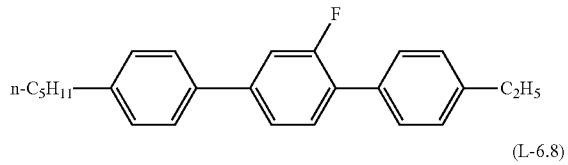

(L-6.8)

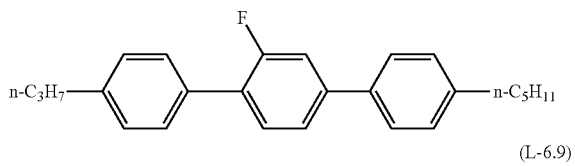

(L-6.9)

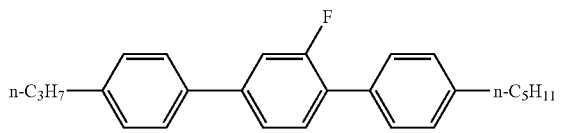

The kinds of the compounds capable of being used in combination are not particularly limited, and from one to three kinds of these compounds are preferably contained, and from one to four kinds thereof are more preferably contained. Moreover, a broad molecular weight distribution of the selected compounds is effective for the solubility, and therefore, for example, one kind selected from the compounds represented by the formula (L-6.1) and (L-6.2), one kind selected from the compounds represented by the formula (L-6.4) and (L-6.5), one kind selected from the compounds represented by the formula (L-6.6) and (L-6.7), and one kind selected from the compounds represented by the formula (L-6.8) and (L-6.9) are preferably appropriately combined. Among these, the compounds represented by the formulae (L-6.1), (L-6.3), (L-6.4), (L-6.6), and (L-6.9) are preferably contained.

Moreover, the compound represented by the general formula (L-6) is preferably the compounds represented by the formulae (L-6.10) to (L-6.17), and particularly preferably the compound represented by the formula (L-6.11).

[Chem. 169]

(L-6.10)

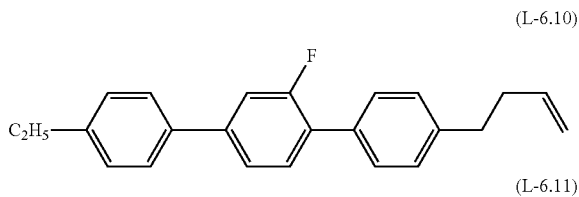

(L-6.11)

(L-6.13)

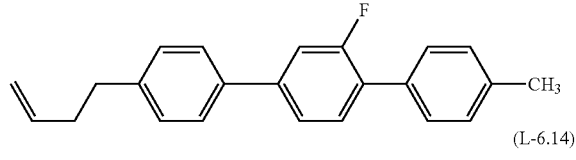

(L-6.14)

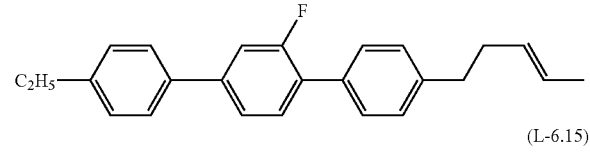

(L-6.15)

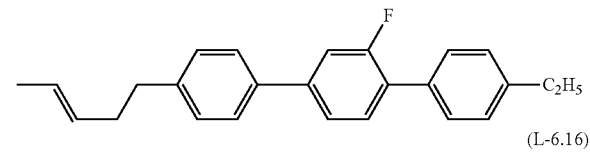

(L-6.16)

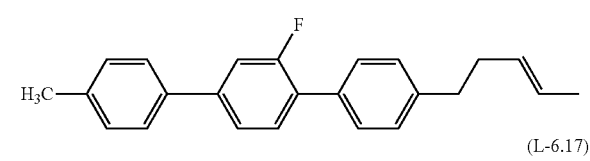

(L-6.17)

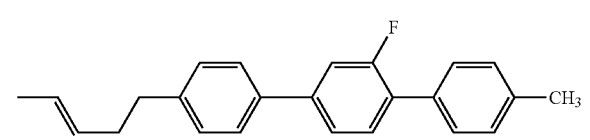

Based on the total amount of the composition of the present invention, the lower limit of the preferred content of the compounds may be 1%, 2%, 3%, 5%, or 7%. The upper limit of the preferred content of the compounds may be 20%, 15%, 13%, 10%, or 9%.

The compound represented by the general formula (L-7) is the following compound:

[Chem. 170]

(L-7)

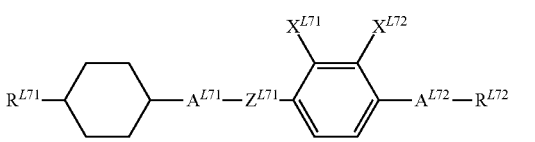

In the formula, $R^{L71}$ and $R^{L72}$ each independently have the same meanings as $R^L1$ and $R^{L2}$ in the general formula (L); $A^{L71}$ and $A^{L72}$ each independently have the same meanings as $A^{L2}$ and $A^{L3}$ in the general formula (L), in which hydrogen atoms on $A^{L71}$ and $A^{L72}$ each independently may be replaced by a fluorine atom; $Z^{L71}$ has the same meaning as $Z^{L2}$ in the general formula (L); and $X^{L71}$ and $X^{L72}$ each independently represent a hydrogen atom or a fluorine atom.

In the formula, $R^{L71}$ and $R^{L72}$ each independently preferably represent an alkyl group having 1 to 5 carbon atoms, an alkenyl group having 2 to 5 carbon atoms, or an alkoxy group having 1 to 4 carbon atoms; $A^{L71}$ and $A^{L72}$ each independently preferably represent a 1,4-cyclohexylene group or a 1,4-phenylene group, in which hydrogen atoms on $A^{L71}$ and $A^{L72}$ each independently may be replaced by a (L-6.12)

fluorine atom; $Z^{L71}$ preferably represents a single bond or —COO—, and preferably a single bond; and $X^{L71}$ and $X^{L72}$ each preferably represent a hydrogen atom.

The kinds of the compounds capable of being used in combination are not particularly limited, and the compounds may be appropriately combined in accordance with the demanded capabilities, such as the solubility at a low temperature, the transition temperature, the electric reliability, and the birefringence. The kinds of the compound used may be, for example in one embodiment of the present invention, one kind, two kinds, three kinds, or four kinds.

In the composition of the present invention, the content of the compound represented by the general formula (L-7) is necessarily controlled appropriately in accordance with the demanded capabilities, such as the solubility at a low temperature, the transition temperature, the electric reliability, the birefringence, the process adaptability, the drop marks, the burn-in, and the dielectric anisotropy.

Based on the total amount of the composition of the present invention, the lower limit of the preferred content of the compound represented by the formula (L-7) may be 1%, 2%, 3%, 5%, 7%, 10%, 14%, 16%, or 20%. Based on the total amount of the composition of the present invention, the upper limit of the preferred content of the compound represented by the formula (L-7) may be 30%, 25%, 23%, 20%, 18%, 15%, 10%, or 5%.

In the case where an embodiment where the composition of the present invention has a high Tni is demanded, the content of the compound represented by the formula (L-7) is preferably large, and in the case where an embodiment with a low viscosity is demanded, the content thereof is preferably small.

Moreover, the compound represented by the general formula (L-7) is preferably the compounds represented by the formulae (L-7.1) to (L-7.4), and preferably the compound represented by the formula (L-7.2).

[Chem. 171]

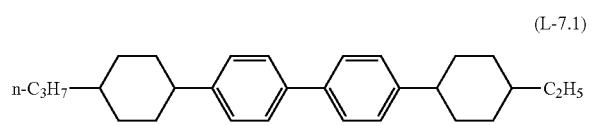
(L-7.1)

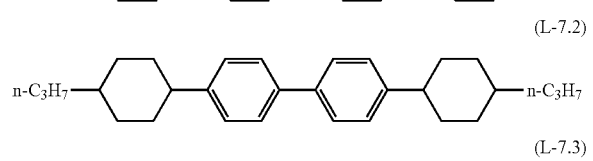
(L-7.2)
(L-7.3)

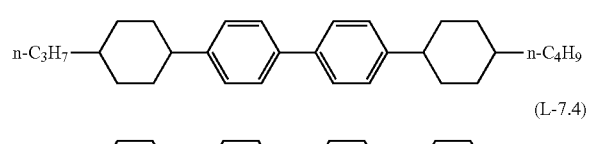
(L-7.4)

Moreover, the compound represented by the general formula (L-7) is preferably the compounds represented by the formulae (L-7.11) to (L-7.13), and preferably the compound represented by the formula (L-7.11).

[Chem. 172]

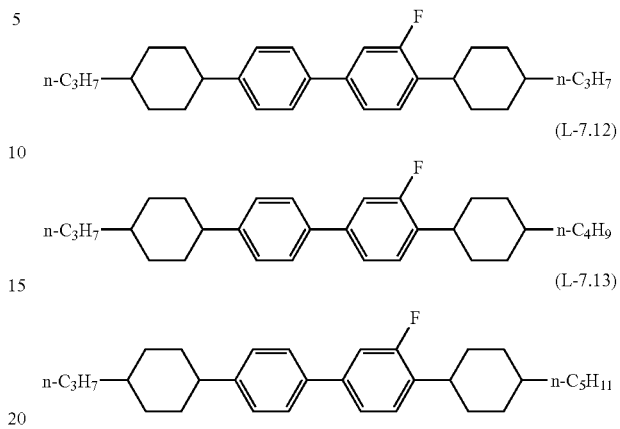
(L-7.11)
(L-7.12)
(L-7.13)

Moreover, the compound represented by the general formula (L-7) is preferably the compounds represented by the formulae (L-7.21) to (L-7.23). The compound represented by the formula (L-7.21) is preferable.

[Chem. 173]

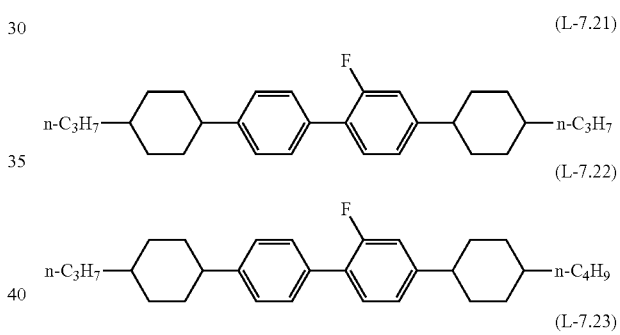
(L-7.21)
(L-7.22)

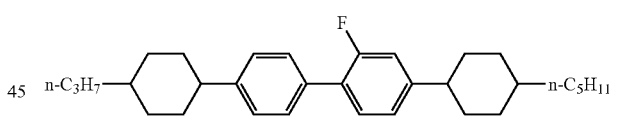
(L-7.23)

Moreover, the compound represented by the general formula (L-7) is preferably the compounds represented by the formulae (L-7.31) to (L-7.34), and preferably the compound represented by the formula (L-7.31) and/or (L-7.32).

[Chem. 174]

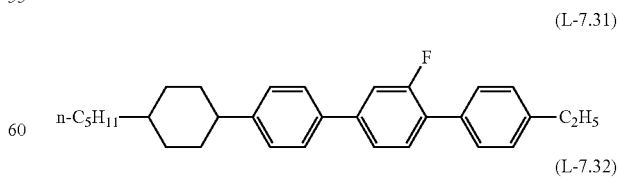
(L-7.31)
(L-7.32)

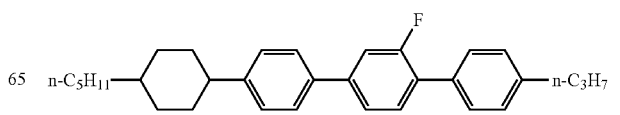

-continued (L-7.33)
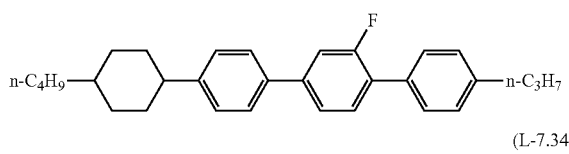

(L-7.34)
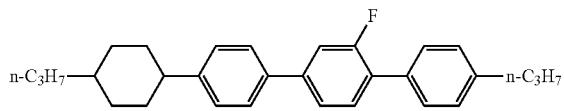

-continued (L-7.44)
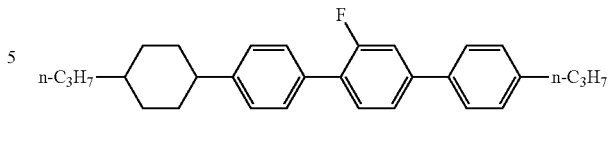

Moreover, the compound represented by the general formula (L-7) is preferably the compounds represented by the formulae (L-7.51) to (L-7.53).

[Chem.176]

(L-7.51)
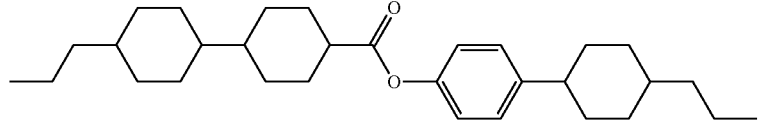

(L-7.52)
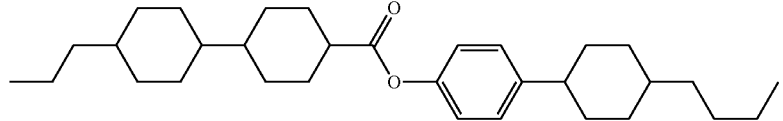

(L-7.53)
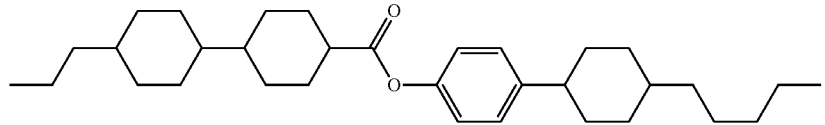

Moreover, the compound represented by the general formula (L-7) is preferably the compounds represented by the formulae (L-7.41) to (L-7.44), and preferably the compound represented by the formula (L-7.41) and/or (L-7.42).

[Chem. 175]

(L-7.41)
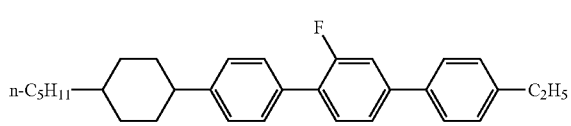

(L-7.42)
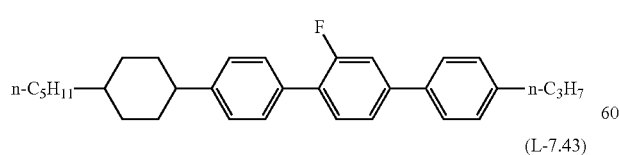

(L-7.43)
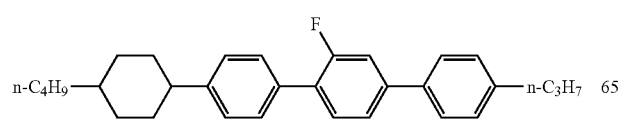

The liquid crystal composition of the present invention may contain, in addition to the compounds described above, common nematic liquid crystal, smectic liquid crystal, cholesteric liquid crystal, an antioxidant, a UV absorber, a photostabilizer, an infrared absorber, etc.

Examples of the antioxidant include hindered phenols represented by the general formula (H—1) to the general formula (H—4).

[Chem. 177]

(H-1)
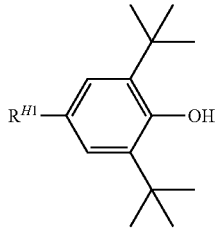

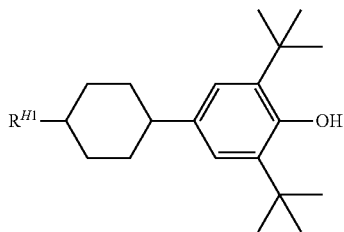
(H-2)

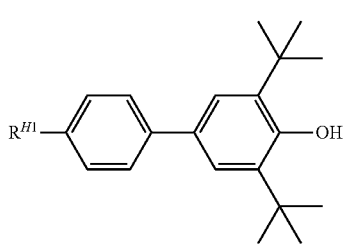
(H-3)

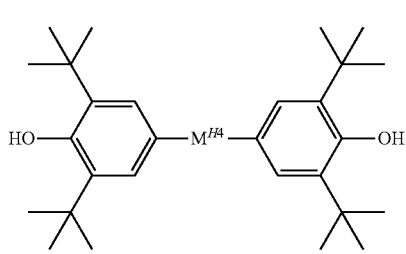
(H-4)

In the general formula (H—1) to the general formula (H—4), $R^{H1}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms. One —CH$_2$— or two or more non-adjacent —CH$_2$— present in the group may each independently be substituted with —O— or —S—, and one or two or more hydrogen atoms present in the group may each independently be substituted with a fluorine atom or a chlorine atom. More specifically, an alkyl group having 2 to 7 carbon atoms, an alkoxy group having 2 to 7 carbon atoms, an alkenyl group having 2 to 7 carbon atoms, or an alkenyloxy group having 2 to 7 carbon atoms is preferable. An alkyl group having 3 to 7 carbon atoms or an alkenyl group having 2 to 7 carbon atoms is more preferable.

In general formula (H—4), $M^{H4}$ represents an alkylene group having 1 to 15 carbon atoms (one or more —CH$_2$— in the alkylene group may each be substituted with —O—, —CO—, —COO—, or —OCO— so long as oxygen atoms are not directly adjacent to each other), —OCH$_2$—, —CH$_2$O—, —COO—, —OCO—, —CF$_2$O—, —OCF$_2$—, —CF$_2$CF$_2$—, —CH=CH—COO—, —CH=CH—OCO—, —COO—CH=CH—, —OCO—CH=CH—, —CH=CH—, —C≡C—, a single bond, a 1,4-phenylene group (any hydrogen atom in the 1,4-phenylene group may be substituted with a fluorine atom), or a trans-1,4-cyclohexylene group, but preferably represents an alkylene group having 1 to 14 carbon atoms. Considering volatility, the number of carbon atoms is preferably large. Considering viscosity, the number of carbon atoms is preferably not excessively large. Thus, the number of carbon atoms is more preferably 2 to 12, more preferably 3 to 10, more preferably 4 to 10, more preferably 5 to 10, and more preferably 6 to 10.

In the general formula (H—1) to the general formula (H—4), one —CH= or two or more non-adjacent —CH= in the 1,4-phenylene group may each be substituted with —N=. Hydrogen atoms in the 1,4-phenylene group may each independently be substituted with a fluorine atom or a chlorine atom.

In the general formula (H—1) to the general formula (H—4), one —CH$_2$— or two or more non-adjacent —CH$_2$— in the 1,4-cyclohexylene group may each be substituted with —O— or —S—. In the 1,4-cyclohexylene group, hydrogen atoms may each independently be substituted with a fluorine atom or a chlorine atom.

Specific examples include, for example, the formula (H—11) to the formula (H—15).

[Chem. 178]

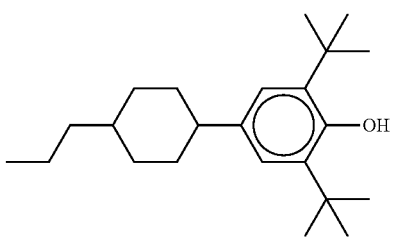
(H-11)

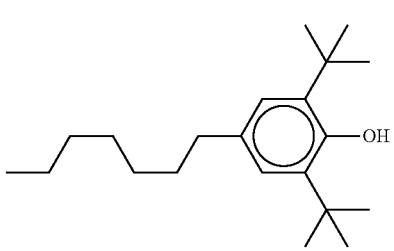
(H-12)

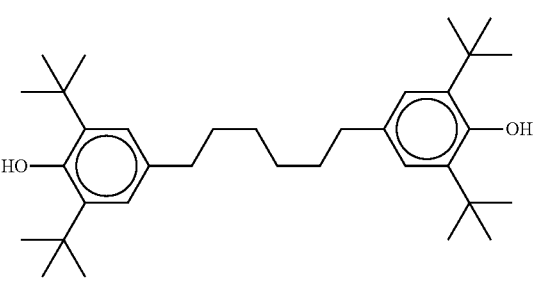
(H-13)

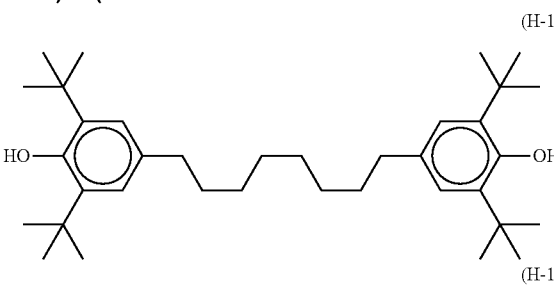
(H-14)

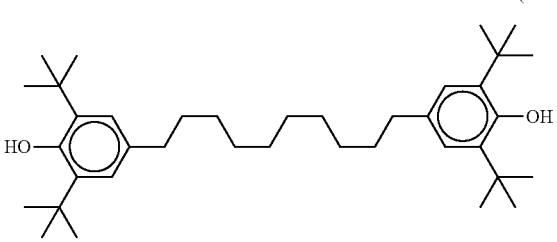
(H-15)

When the liquid crystal composition of the present invention contains an antioxidant, the content thereof is preferably 10 ppm by mass or more, preferably 20 ppm by mass or more, and preferably 50 ppm by mass or more. The upper limit when the antioxidant is contained is 10000 ppm by mass, but is preferably 1000 ppm by mass, preferably 500 ppm by mass, and preferably 100 ppm by mass.

The liquid crystal composition of the present invention has a dielectric anisotropy (Δε) at 20° C. of −2.0 to −8.0, preferably −2.0 to −6.0, more preferably −2.0 to −5.0, and particularly preferably −2.5 to −5.0.

The refractive index anisotropy (Δn) of the liquid crystal composition of the present invention at 20° C. is 0.08 to 0.14, but is more preferably 0.09 to 0.13, and particularly preferably 0.09 to 0.12. More specifically, in order to comply with a small cell gap, it is preferably 0.10 to 0.13, and in order to comply with a large cell gap, it is preferably 0.08 to 0.10.

The viscosity of the liquid crystal composition of the present invention at 20° C. is 10 to 50 mPa·s, but is preferably 10 to 45 mPa·s, preferably 10 to 40 mPa·s, preferably 10 to 35 mPa·s, preferably 10 to 30 mPa·s, more preferably 10 to 25 mPa·s, and particularly preferably 10 to 22 mPa·s.

The rotational viscosity ($\gamma_1$) of the liquid crystal composition of the present invention at 20° C. is 50 to 160 mPa·s, but is preferably 55 to 160 mPa·s, preferably 60 to 160 mPa·s, preferably 60 to 150 mPa·s, preferably 60 to 140 mPa·s, preferably 60 to 130 mPa·s, preferably 60 to 125 mPa·s, more preferably 60 to 120 mPa·s, more preferably 60 to 115 mPa·s, more preferably 60 to 110 mPa·s, and particularly preferably 60 to 100 mPa·s.

The nematic phase-isotropic liquid phase transition temperature ($T_{ni}$) of the liquid crystal composition of the present invention is 60° C. to 120° C., but is preferably 70° C. to 100° C. and particularly preferably 70° C. to 85° C.

For example, when the entire liquid crystal composition according to the present invention exhibits negative dielectric anisotropy, the liquid crystal composition preferably includes the first and second monomers, one kind or two or more kinds of compounds selected from the compounds represented by the general formulae (N-1), (N-2), and (N-3), and the compound represented by the general formula (L).

Among the entire liquid crystal composition according to the present invention, it is preferable that the upper limit of the proportion of the components composed only of one kind or two or more kinds of the first monomer, one kind or two or more kinds of the second monomer, and the compounds represented by the general formula (N-1), the general formula (N-2), the general formula (N-3), and the general formula (L) is 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, or 84% by mass.

Moreover, among the entire liquid crystal composition according to the present invention, it is preferable that the lower limit of the proportion of the components composed only of one kind or two or more kinds of the first monomer, one kind or two or more kinds of the second monomer, and the compounds represented by the general formula (N-1), the general formula (N-2), the general formula (N-3), and the general formula (L) is 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, 98% by mass, or 99% by mass.

Among the entire liquid crystal composition according to the present invention, it is preferable that the upper limit of the proportion of the components composed only of one kind or two or more kinds of the first monomer, one kind or two or more kinds of the second monomer, and the compounds represented by the general formula (N-1a), the general formula (N-1b), the general formula (N-1c), the general formula (N-1d), the general formula (N-1e), and the general formula (L) is 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, or 84% by mass.

Moreover, among the entire liquid crystal composition according to the present invention, it is preferable that the lower limit of the proportion of the components composed only of one kind or two or more kinds of the first monomer, one kind or two or more kinds of the second monomer, and the compounds represented by the general formula (N-1a), the general formula (N-1b), the general formula (N-1c), the general formula (N-1d), the general formula (N-1e), and the general formula (L) is 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, 98% by mass, or 99% by mass.

Among the entire liquid crystal composition according to the present invention, it is preferable that the upper limit of the proportion of the components composed only of one kind or two or more kinds of the first monomer, one kind or two or more kinds of the second monomer, and the compounds represented by the general formula (N-1a), the general formula (N-1b), the general formula (N-1c), the general formula (N-1d), the general formula (N-1e), and the general formula (L) is 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, or 85% by mass.

Moreover, among the entire liquid crystal composition according to the present invention, it is preferable that the lower limit of the proportion of the components composed only of one kind or two or more kinds of the first monomer, one kind or two or more kinds of the second monomer, and the compounds represented by the general formula (N-1a), the general formula (N-1b), the general formula (N-1c), the general formula (N-1d), the general formula (N-1e), and the general formula (L) is 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, or 98% by mass.

Among the entire liquid crystal composition according to the present invention, it is preferable that the upper limit of the proportion of the components composed only of one kind or two or more kinds of the first monomer, one kind or two or more kinds of the second monomer, and the compounds represented by the general formula (N-1a), the general formula (N-1b), the general formula (N-1c), the general formula (N-1d), the general formula (N-1e), and the general formula (L) is 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, or 85% by mass.

Moreover, among the entire liquid crystal composition according to the present invention, it is preferable that the lower limit of the proportion of the components composed only of one kind or two or more kinds of the first monomer, one kind or two or more kinds of the second monomer, and the compounds represented by the general formula (N-1a), the general formula (N-1b), the general formula (N-1c), the general formula (N-1d), the general formula (N-1e), and the general formula (L) is 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, or 98% by mass.

Among the entire liquid crystal composition according to the present invention, it is preferable that the upper limit of the proportion of the components composed only of one kind or two or more kinds of the first monomer, one kind or two or more kinds of the second monomer, and the compounds represented by the general formula (N-1a), the general formula (N-1b), the general formula (N-1c), the general formula (N-1d), the general formula (N-1e), and the general formula (L) is 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, or 85% by mass.

Moreover, among the entire liquid crystal composition according to the present invention, it is preferable that the lower limit of the proportion of the components composed only of one kind or two or more kinds of the first monomer, one kind or two or more kinds of the second monomer, and the compounds represented by the general formula (N-1a), the general formula (N-1b), the general formula (N-1c), the general formula (N-1d), the general formula (N-1e), and the general formula (L) is 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, or 98% by mass.

In addition, in the liquid crystal composition according to the present invention, in the case where the alignment property is important, the composition essentially includes eleven kinds or two or more kinds of the first monomer and one kind or two or more kinds of the second monomer, and preferably includes the general formula (N-1-1), the general formula (N-1-2), the general formula (N-1-3), or the general formula (N-1-4).

In addition, in the liquid crystal composition according to the present invention, in the case where the response speed is important, the composition essentially includes one kind or two or more kinds of the first monomers and one kind or two or more kinds of the second monomers, and preferably includes the general formula (N-1-10) or the general formula (N-1-11).

In addition, in the liquid crystal composition according to the present invention, in the case where the alignment property is important, the composition essentially includes eleven kinds or two or more kinds of the first monomer and one kind or two or more kinds of the second monomer, and preferably includes the general formula (N-1-1), the general formula (N-1-2), the general formula (N-1-3), or the general formula (N-1-4).

In addition, in the liquid crystal composition according to the present invention, in the case where the response speed is important, the composition essentially includes one kind or two or more kinds of the first monomers and one kind or two or more kinds of the second monomers, and preferably includes the general formula (N-1-10) or the general formula (N-1-11).

In addition, in the liquid crystal composition according to the present invention, in the case where the alignment property is important, the composition essentially includes one kind or two or more kinds of the first monomer and one kind or two or more kinds of the second monomer, and preferably includes the general formula (N-1-1), the general formula (N-1-2), the general formula (N-1-3), or the general formula (N-1-4).

In addition, in the liquid crystal composition according to the present invention, in the case where the response speed is important, the composition essentially includes one kind or two or more kinds of the first monomers and one kind or two or more kinds of the second monomers, and preferably includes the general formula (N-1-10) or the general formula (N-1-11).

Among the entire liquid crystal composition according to the present invention, it is preferable that the upper limit of the proportion of the components composed only of the general formula (N-1-4), the general formula (N-1b), the general formula (N-1c), the general formula (N-1d), the general formula (N-1e), and the general formula (L) is 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, or 84% by mass.

Moreover, among the entire liquid crystal composition according to the present invention, it is preferable that the lower limit of the proportion of the components composed only of the compounds represented by the general formula (N-1-4), the general formula (N-1b), the general formula (N-1c), the general formula (N-1d), the general formula (N-1e), and the general formula (L) is 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, or 98% by mass.

Among the entire liquid crystal composition according to the present invention, it is preferable that the upper limit of the proportion of the components composed only of the general formula (N-1a), the general formula (N-1b), the general formula (N-1c), the general formula (N-1d), the general formula (N-1e), the general formula (L-1), the general formula (L-3), the general formula (L-4), the general formula (L-5), and the general formula (L-6) is 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, 84% by mass, 83% by mass, 82% by mass, 81% by mass, or 80% by mass.

Moreover, among the entire liquid crystal composition according to the present invention, it is preferable that the lower limit of the proportion of the components composed only of the compounds represented by the general formula (N-1a), the general formula (N-1b), the general formula (N-1c), the general formula (N-1d), the general formula (N-1e), the general formula (L-1), the general formula (L-3), the general formula (L-4), the general formula (L-5), and the general formula (L-6) is 68% by mass, 70% by mass, 71% by mass, 73% by mass, 75% by mass, 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, or 98% by mass.

A liquid crystal display element that uses the liquid crystal composition of the present invention has a notable feature, i.e., high-speed response. Furthermore, a satisfactory tilt angle is obtained, there are no or very little unreacted polymerizable compound, and the voltage holding ratio (VHR) is high. Thus, issues such as alignment defects and display defects do not arise or are satisfactorily suppressed. Since the tilt angle and the residual amount of the polymerizable compound can be controlled easily, the energy cost for production is easily optimized and reduced. Thus, the liquid crystal display element is optimum for improving the production efficiency and for mass production.

A liquid crystal display element that uses the liquid crystal composition of the present invention is particularly useful in active matrix-driving liquid crystal display elements and can be used in liquid crystal display elements of PSA mode, PSVA mode, VA mode, PS-IPS mode, or PS-FFS mode.

The liquid crystal display element according to the present invention preferably includes a first substrate and a second substrate disposed opposite to each other, a common electrode provided on the first substrate or the second substrate, a pixel electrode provided on the first substrate or the second substrate and having a thin film transistor, and a liquid crystal layer including a liquid crystal composition provided between the first substrate and the second substrate. If necessary, an alignment film for controlling the alignment direction of the liquid crystal molecules may be provided on the opposite surface side of at least one of the first substrate and/or the second substrate so as to come into contact with the liquid crystal layer. As the alignment film, a vertical alignment film and a horizontal alignment film can be appropriately selected together with the driving mode of the liquid crystal display element, and a known alignment film such as a rubbing alignment film (for example, polyimide) or a photo alignment film (for example, a decomposition type polyimide) can be used. Further, a color filter may be provided as appropriate on the first substrate or the second substrate, and a color filter may be provided on the pixel electrode or the common electrode.

Two substrates of a liquid crystal cell used in the liquid crystal display element according to the present invention can be formed of flexible transparent material such as glass or plastic. One of the substrates may be formed of a non-transparent material such as silicon. A transparent substrate that has a transparent electrode layer can be obtained by, for example, sputtering indium tin oxide (ITO) on a transparent substrate such as a glass plate.

A color filter can be manufactured by a pigment dispersing method, a printing method, an electrodeposition method, a dyeing method, or the like. For example, according to a method for manufacturing a color filter by a pigment dispersing method, a curable color composition for a color filter is applied to the transparent substrate, patterning is performed, and the composition is cured under heating or irradiation with light. This process is performed for each of three colors, red, green and blue, to manufacture pixel portions for a color filter. In addition, pixel electrodes that include active elements, such as TFTs, thin-film diodes, metal-insulator-metal resistive elements, etc., can be formed on the substrate.

It is preferable that the first substrate and the second substrate face each other so that the common electrode and the pixel electrode layer are inside.

The distance between the first substrate and the second substrate may be adjusted via a spacer. In this case, the adjustment is preferably made so that the thickness of the light control layer is 1 to 100 m. The thickness is more preferably 1.5 to 10 m. When a polarizer is used, the product of the refractive index anisotropy Δn of the liquid crystal and the cell thickness d is preferably adjusted to maximize the contrast. When two polarizers are provided, the polarizing axis of each polarizer can be adjusted to improve the viewing angle and contrast. Moreover, a retardation film can be used to widen the viewing angle. Examples of the spacer include glass particles, plastic particles, alumina particles, and photoresist materials. Then a sealing agent such as an epoxy-based thermosetting composition is screen-printed onto the substrate while leaving a liquid crystal injection inlet, the substrates are bonded to each other, and the sealing agent is cured under heating.

Examples of the method for injecting the liquid crystal composition into a gap between the two substrates include a common vacuum injection method and an ODF method.

A second aspect of the present invention is a liquid crystal display element, wherein the liquid crystal display element includes: a first substrate and a second substrate disposed opposite to each other; a liquid crystal layer filled between the first substrate and the second substrate; on the first substrate, an electrode layer having a plurality of gate bus lines and data bus lines arranged in a matrix, a thin film transistor provided in an intersection portion between the gate bus line and the data bus line, and a pixel electrode driven by the thin film transistor per each pixel; a common electrode formed on the first substrate or the second substrate; and a resin component obtained by curing a polymerizable compound having two or more kinds of biphenyl skeletons between the first substrate and the second substrate, and has no alignment film on at least one substrate surface.

In order to obtain satisfactory liquid crystal alignment performance, an appropriate polymerization rate is desirable. Thus, the method for polymerizing the polymerizable compound or the polymerizable monomer and the spontaneous orientation monomer contained in the liquid crystal composition of the present invention is preferably a polymerization method that involves applying an active energy ray, such as an ultraviolet ray or an electron beam singly or in combination or sequentially. When ultraviolet rays are used, a polarized light source or an unpolarized light source may be used. When polymerization is conducted by having the liquid crystal composition interposed between the two substrates, at least the irradiation-side substrate must have transparency appropriate for the active energy ray. Alternatively, after a particular part only is polymerized through a mask under irradiation with light, the conditions such as an electric field, a magnetic field, a temperature, etc., may be changed to change the alignment state of the unpolymerized portion, and then an active energy ray may be applied to conduct polymerization. In particular, in conducting ultraviolet ray exposure, it is preferable to apply an AC electric field to the liquid crystal composition during ultraviolet ray exposure. The AC electric field applied is preferably AC having a frequency of 10 Hz to 10 kHz and more preferably 60 Hz to 10 kHz. The voltage is selected depending on the desired pretilt angle of the liquid crystal display element. In other words, the pretilt angle of the liquid crystal display element can be controlled by adjusting the voltage applied. In a PSVA-mode liquid crystal display element, the pretilt angle is preferably controlled to 80 DD to 89.9 DD from the viewpoints of alignment stability and contrast.

There are no particular restrictions on the temperature at the time of irradiation with an active energy ray such as an ultraviolet ray or electron beam used in polymerizing polymerizable compounds contained in the liquid crystal composition of the present invention. For example, when the liquid crystal composition of the present invention is applied to a liquid crystal display element including a substrate having an alignment film, the temperature during irradiation is preferably within a temperature range at which the liquid crystal state of the liquid crystal composition is maintained. Polymerization is preferably conducted at a temperature near room temperature, i.e., typically 15° C. to 35° C.

On the other hand, when the liquid crystal composition of the present invention is applied to a liquid crystal display element including a substrate not having an alignment film, for example, the temperature range may be wider than a temperature range during irradiation applied to a liquid crystal display element having a substrate having the alignment film.

Examples of the lamp used to generate an ultraviolet ray include a metal halide lamp, a high-pressure mercury lamp, and an ultra-high-pressure mercury lamp. The ultraviolet ray applied is preferably an ultraviolet ray in the wavelength range outside the absorption wavelength range of the liquid crystal composition. If needed, some part of the ultraviolet ray may be cut before use. The intensity of the ultraviolet ray applied is preferably 0.1 mW/cm$^2$ to 100 W/cm$^2$ and more preferably 2 mW/cm$^2$ to 50 W/cm$^2$. The amount of energy of the ultraviolet ray applied can be appropriately adjusted but is preferably 10 mJ/cm$^2$ to 500 J/cm$^2$ and more preferably 100 mJ/cm$^2$ to 200 J/cm$^2$. In applying the ultraviolet ray, the intensity may be varied. The time for applying the ultraviolet ray is appropriately selected based on the intensity of the ultraviolet ray applied, but is preferably 10 to 3600 seconds and more preferably 10 to 600 seconds.

EXAMPLES

The present invention will be described in further detail with reference to examples below, but the present invention is not limited to these examples. Note that "%" for the compositions of Examples and Comparative Examples below denotes "% by mass". In Examples, the following abbreviations are used to describe compounds.

The properties measured in Examples are as follows.

$T_{ni}$: nematic phase-isotropic liquid phase transition temperature (° C.)

Δn: refractive index anisotropy at 20° C.

η: viscosity at 20° C. (mPa·s)

$γ_1$: rotational viscosity at 20° C. (mPa·s)

Δε: dielectric anisotropy at 20° C.

$K_{33}$: elastic modulus $K_{33}$ at 20° C. (PN)

In Examples, the following abbreviations are used to describe compounds.

(Side Chain)

-n —$C_nH_{2n+1}$ a linear alkyl group having n carbon atoms n- $C_nH_{2n+1}$— a linear alkyl group having n carbon atoms —On —$OC_nH_{2n+1}$ a linear alkoxy group having n carbon atoms nO— $C_nH_{2n+1}$O— a linear alkoxy group having n carbon atoms

—V—CH=CH$_2$

V—CH$_2$=CH—

—V1 —CH=CH—CH$_3$

1V—CH$_3$—CH=CH—

-2V—CH$_2$—CH$_2$—CH=CH$_2$

V2- CH$_2$=CH—CH$_2$—CH$_2$—

-2V1 —CH$_2$—CH$_2$—CH=CH—CH$_3$

1V2- CH$_3$—CH=CH—CH$_2$—CH$_2$—

(Linking Group)

—CFFO— —CF$_2$—O—

—OCFF— —O—CF$_2$—

-1O— —CH$_2$—O—

—O1- —O—CH$_2$—

—COO— —COO—

—OCO— —OCO—

<Cyclic Structure>

[Chem. 179]

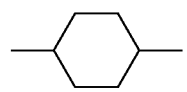 Cy

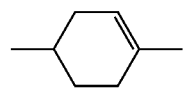 Cy1

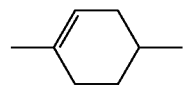 Cy2

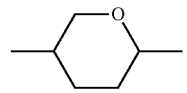 Py

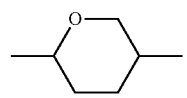 Py'

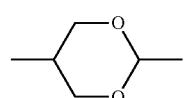 Oc

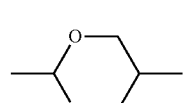 Oc'

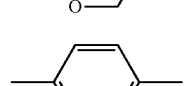 Ph

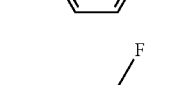 Ph1

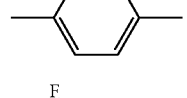 Ph2

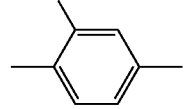 Ph3

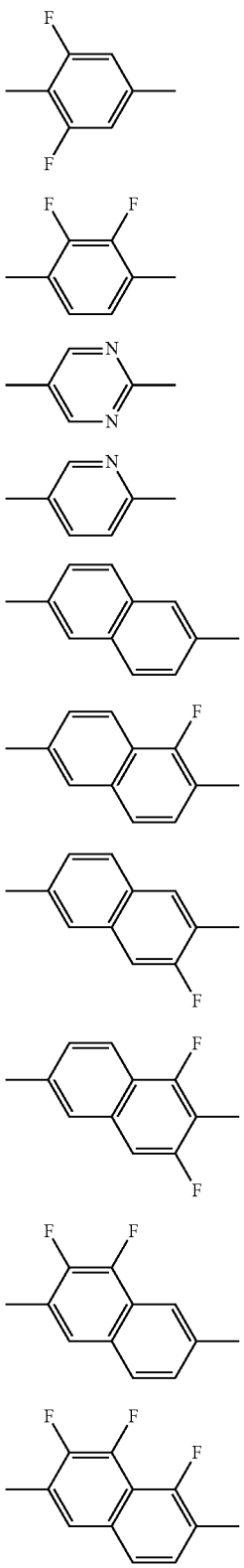

(Evaluation Test for Low Temperature Storage Stability)

The liquid crystal composition was filtered through a membrane filter (manufactured by Agilent Technologies, PTFE 13 m-0.2 m), and allowed to stand for 15 minutes under vacuum reduced pressure conditions to remove dissolved air. This was weighed in an amount of 0.5 g in a vial that had been washed with acetone and sufficiently dried, and allowed to stand in an environment of −20° C. for 20 days. Then, the presence or absence of precipitation was observed visually, and the results were determined in the following 4 grades.

A: No deposition can be observed.
B: Deposited after 2 weeks.
C: Deposited after 1 week.
D: Deposition can be observed.

(Evaluation Test for Vertical Alignment 1)

A first substrate having a transparent electrode layer composed of a common electrode having a uniform entire surface and a color filter layer and having no alignment film (a common electrode substrate) and a second substrate having a pixel electrode layer containing a transparent pixel electrode driven by an active element and having no alignment film (pixel electrode substrate) were produced. The liquid crystal composition was dropped on the first substrate, and held with the second substrate, and the sealing material was cured under a condition of 110° C. for 2 hours under normal pressure, so as to provide a liquid crystal cell having a cell gap of 3.2 m (without an insulating film). The alignment unevenness such as vertical alignment and drop marks herein was observed using a polarizing microscope and evaluated by the following four grades.

A: Uniform vertical alignment was observed over the entire surface.
B: Alignment defects were observed slightly, which was an allowable level.
C: Alignment defects were observed, which was an unallowable level.
D: Alignment defects were significantly severe.

(Evaluation Test for Vertical Alignment 2)

A first substrate having a transparent electrode layer composed of a common electrode patterned on an insulating layer and a color filter layer and having no alignment film (a common electrode substrate) and a second substrate having a pixel electrode layer containing a transparent pixel electrode driven by an active element and having no alignment film (pixel electrode substrate) were produced. The liquid crystal composition was dropped on the first substrate, and held with the second substrate, and the sealing material was cured under a condition of 110° C. for 2 hours under normal pressure, so as to provide a liquid crystal cell having a cell gap of 3.2 m (with an insulating film). The alignment unevenness such as vertical alignment and drop marks herein was observed using a polarizing microscope and evaluated by the following four grades. Observation was carried out by using the polarizing microscope and evaluated by the following four grades.

A: Uniform vertical alignment was observed over the entire surface.
B: Alignment defects were observed slightly, which was an allowable level.
C: Alignment defects were observed, which was an unallowable level.
D: Alignment defects were significantly severe.

(Evaluation Method for Liquid Crystal Burn-in (Pretilt Angle Change with Time))

First, a polyimide alignment film inducing vertical alignment was applied to an ITO coated substrate, and then a The evaluations of "low temperature storage stability", "vertical alignment", "burn-in test (pretilt angle change with time)" and "reliability" in Examples and Comparative Examples were carried out by the following method.

liquid crystal composition was injected into a liquid crystal cell (cell gap 3.5 μm) containing the ITO coated substrate subjected to rubbing treatment of the polyimide alignment film by a vacuum injection method. Thereafter, the liquid crystal cell to which the liquid crystal composition was injected was applied with a voltage of 10 V at a frequency of 100 Hz, and then irradiated with an ultraviolet ray using a high-pressure mercury lamp through a filter that cuts off an ultraviolet ray of 325 nm or less. At this time, the illuminance measured under the condition of a center wavelength of 365 nm was adjusted to 100 mW/cm$^2$, and the light was irradiated with an ultraviolet ray having the integrated light quantity of 10 J/cm$^2$. The ultraviolet irradiation condition was set as irradiation condition 1.

Under this irradiation condition 1, a pretilt angle is given to the liquid crystal molecules in the liquid crystal cell.

Then, by using a fluorescent UV lamp, the illuminance measured at a central wavelength of 313 nm was adjusted to 3 mW/cm$^2$, and further the light was irradiated with an ultraviolet ray having the integrated light quantity of 20 J/cm$^2$ to obtain a liquid crystal display element. The ultraviolet irradiation condition was set as irradiation condition 2. By irradiation condition 2, the residual amount of the polymerizable compound in the unreacted liquid crystal cell that has not reacted under irradiation condition 1 is reduced.

After irradiation with ultraviolet rays, a display defect (burn-in) was evaluated by a change in pretilt angle.

First, the pretilt angle of the liquid crystal display element was measured to obtain a pretilt angle (initial). The liquid crystal display element was irradiated with a backlight for 10 hours while applying a rectangular wave of 30 V at a frequency of 100 Hz. Thereafter, the pretilt angle was measured to obtain a pretilt angle (after the test). A value obtained by subtracting the pretilt angle (after the test) from the measured pretilt angle (initial) was defined as a pretilt angle change amount (=absolute value of pretilt angle change) [ ].

The pretilt angle was measured using an OPTIPRO manufactured by Shintech. The magnitude of the voltage of 30V is several times larger than the normal driving voltage, which is an acceleration test.

When the pretilt angle change amount is closer to 0 [0], there is less possibility that a display failure due to a change in the pretilt angle will occur. In this study, the change amount of 1.3 [0] or less was set as the allowable limit range for display unevenness.

(Preparation and Evaluation Results of Liquid Crystal Composition)

In this example, the first monomer represented by the following formulae (P-1) to (P-35) was used.

[Chem. 180]

(P-1)

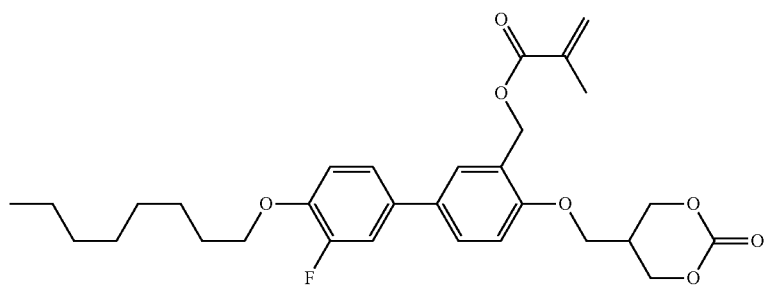

[Chem. 181]

(P-2)

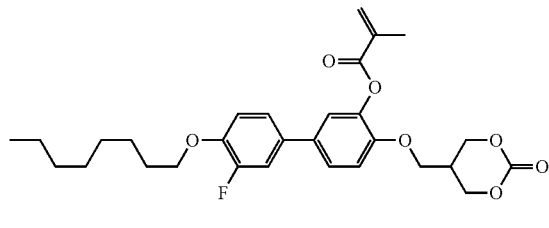

(P-3)

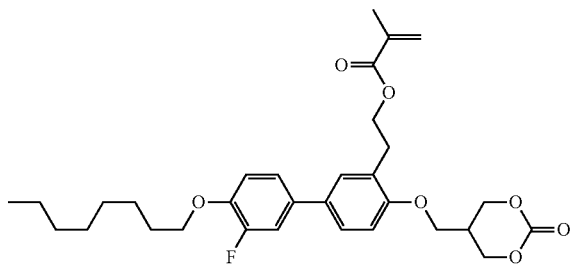

(P-4)

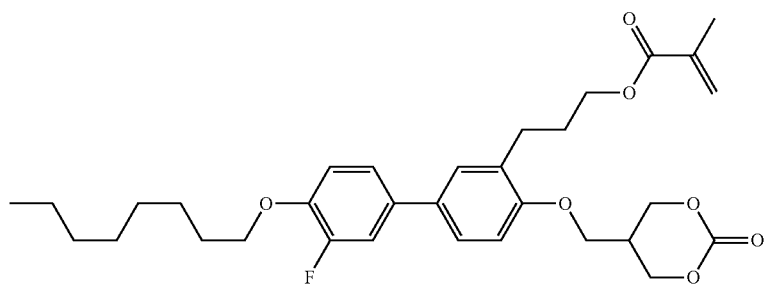

-continued
(P-5)
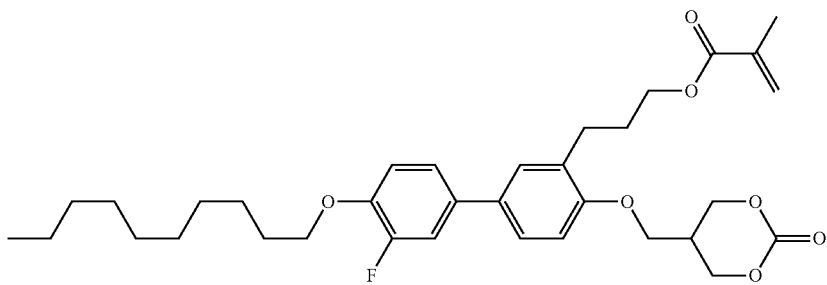
(P-6)
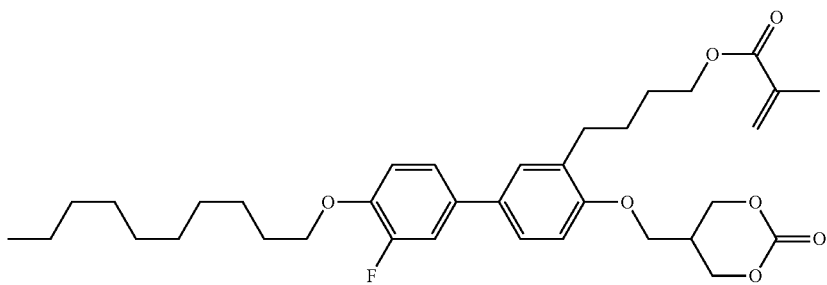
[Chem. 182]
(P-7)
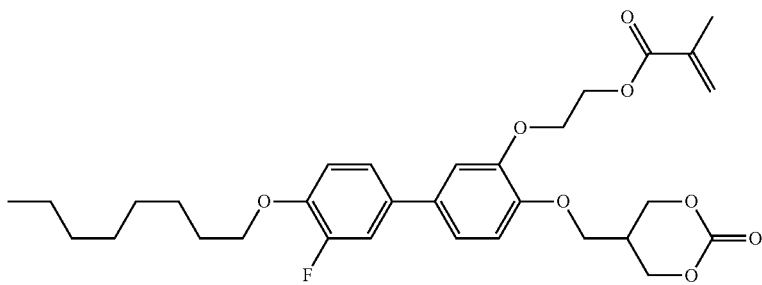
(P-8)
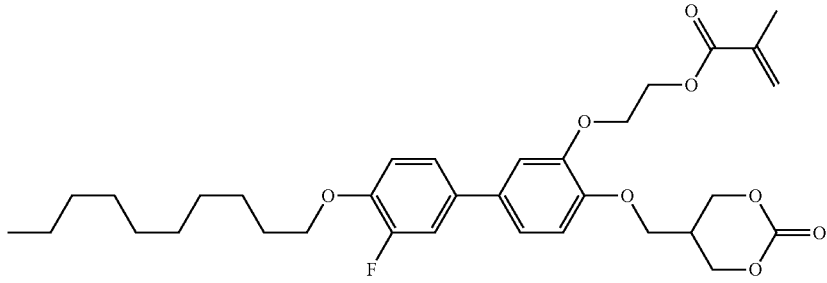
(P-9)
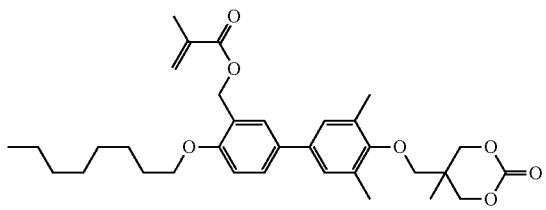
(P-10)
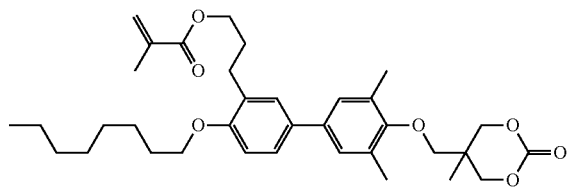

(P-11)
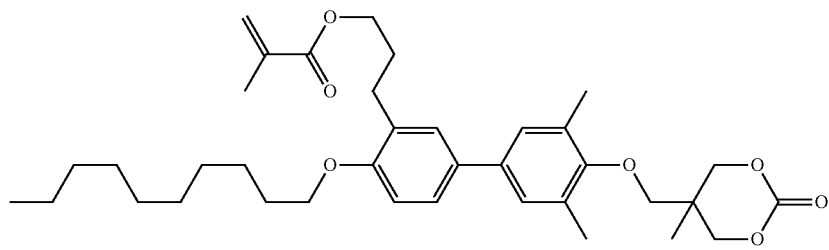
(P-12)
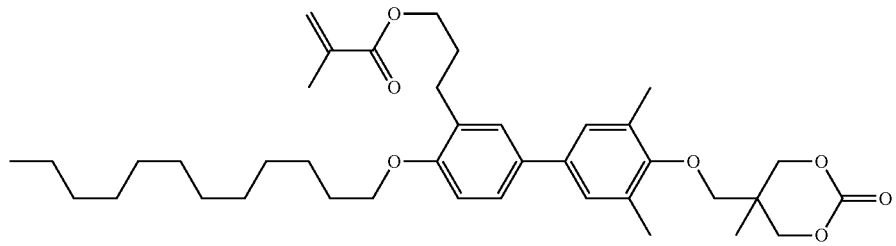
[Chem. 183]
(P-13)
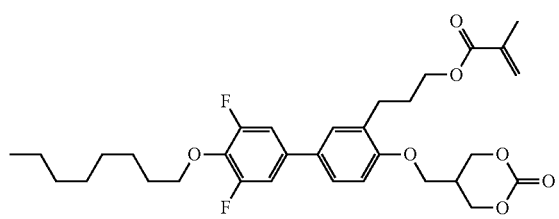
(P-14)
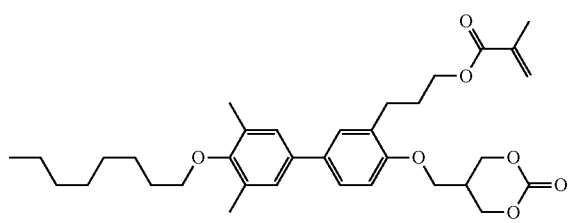
(P-15)
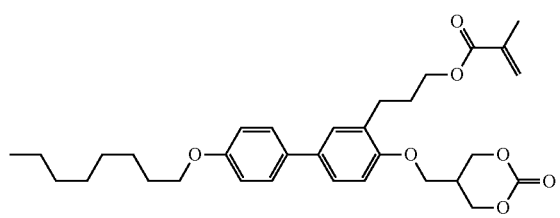
(P-16)
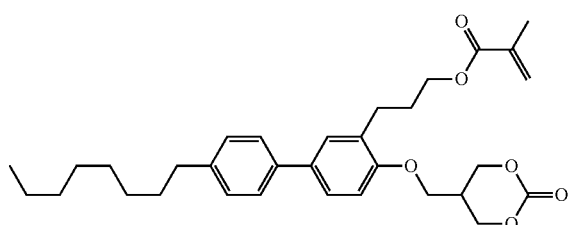
(P-17)
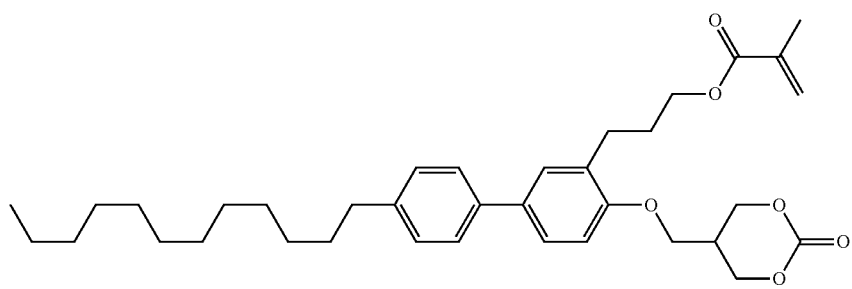
(P-18)
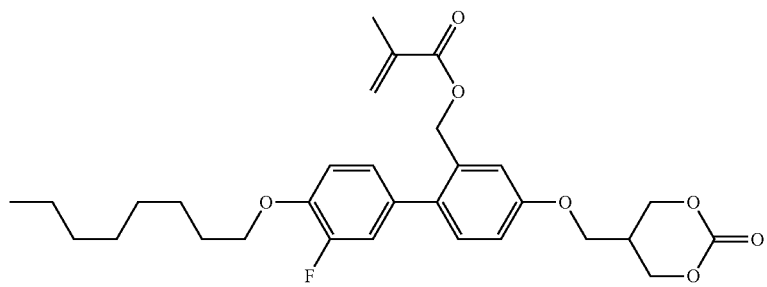

[Chem. 184]
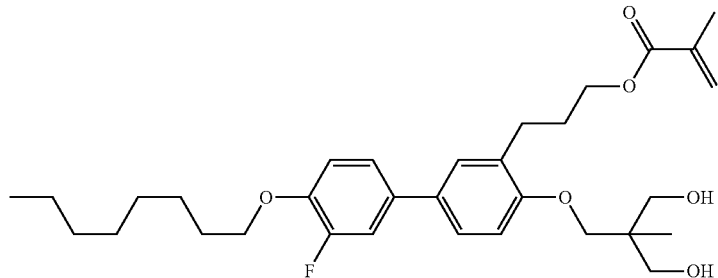
(P-19)
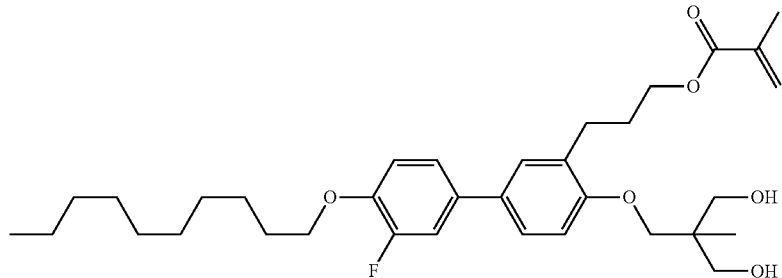
(P-20)
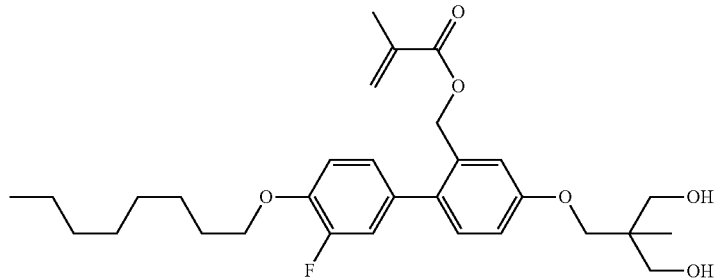
(P-21)
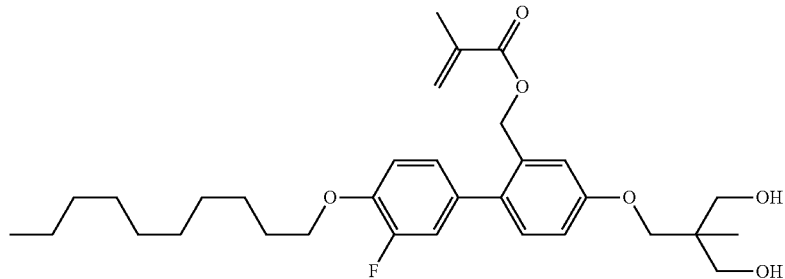
(P-22)
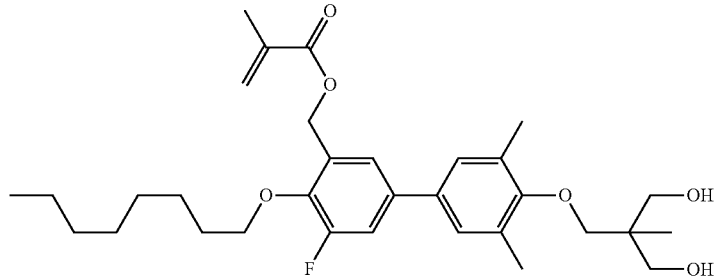
(P-23)

-continued
(P-24)
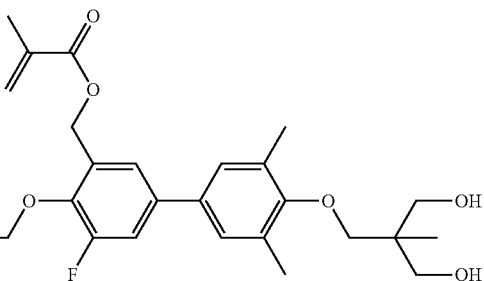
[Chem. 185]
(P-25)
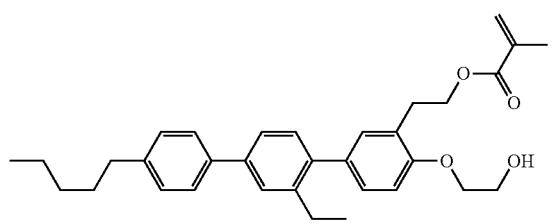
(P-26)
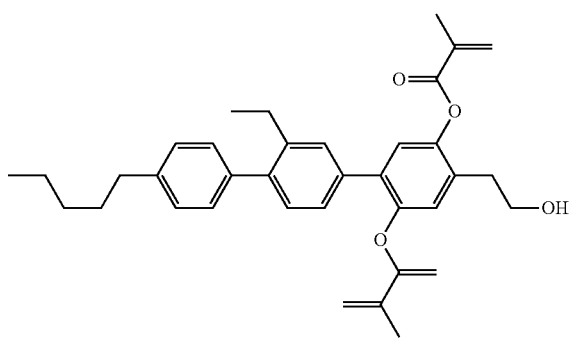
(P-27)
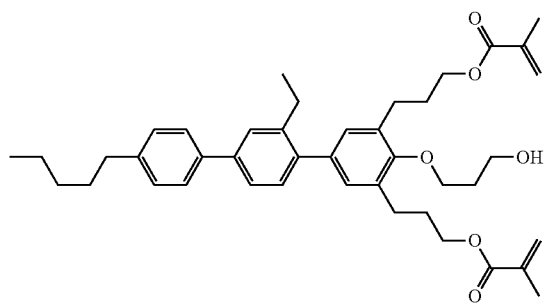
(P-28)
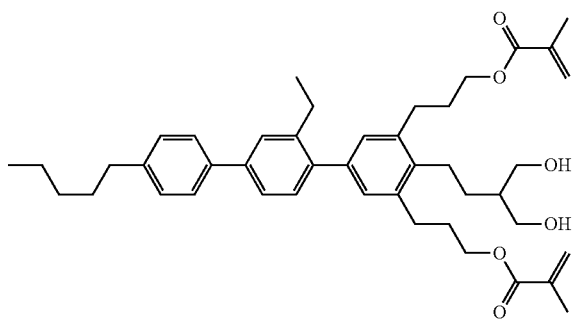
(P-29)
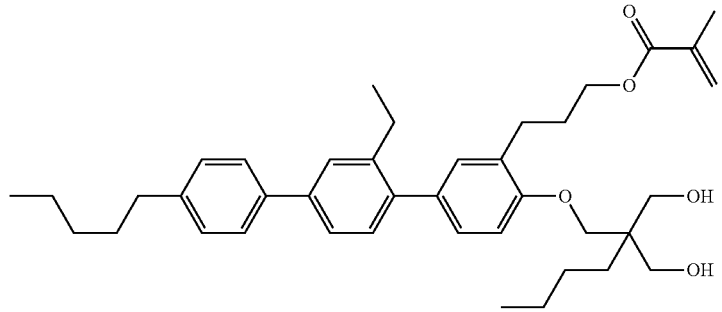
[Chem. 186]
(P-30)
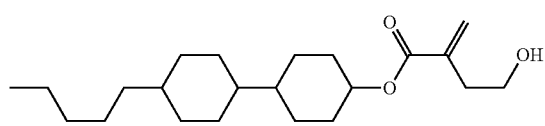
(P-31)
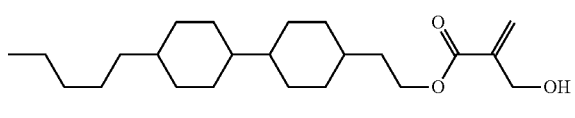

-continued
(P-32)
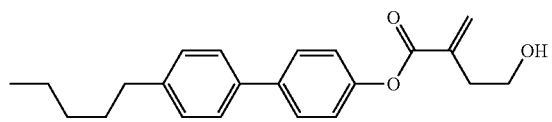
(P-33)
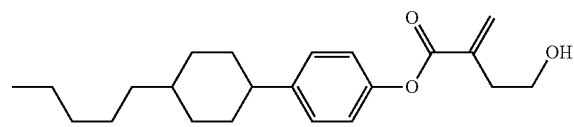
(P-34)
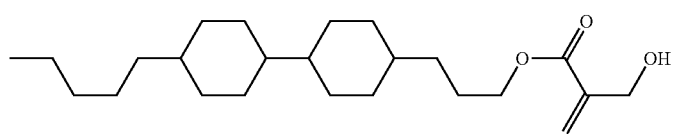
(P-35)
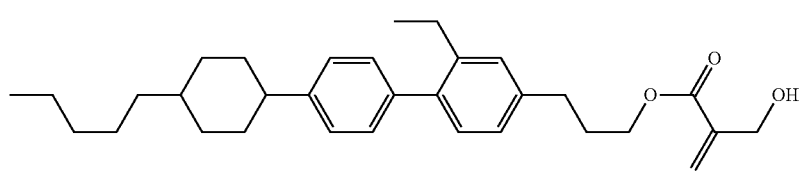
[Chem. 186]
(P-36)
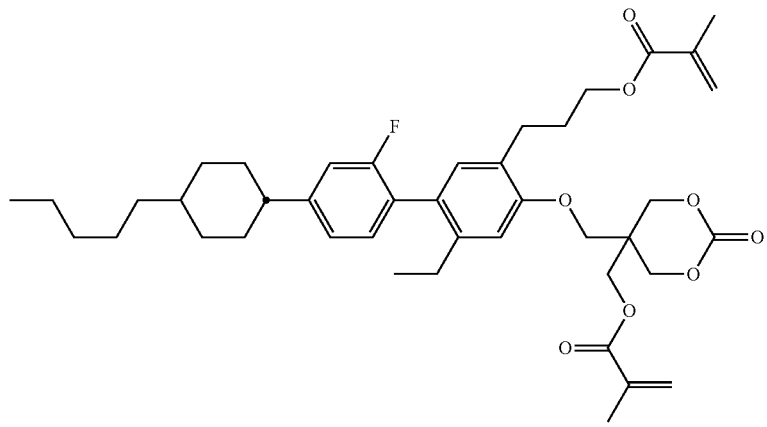
(P-37)
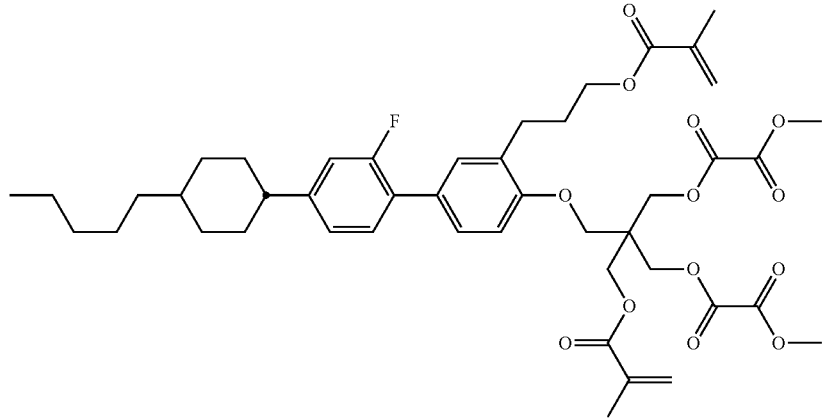

(P-38)

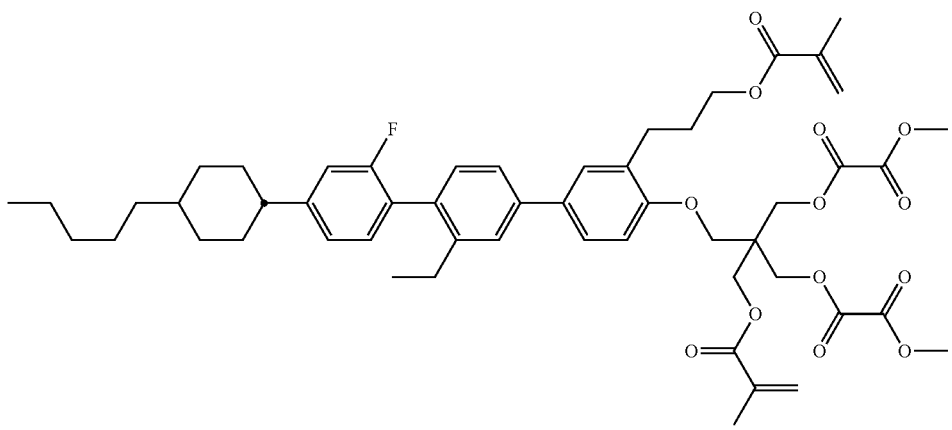

(P-39)

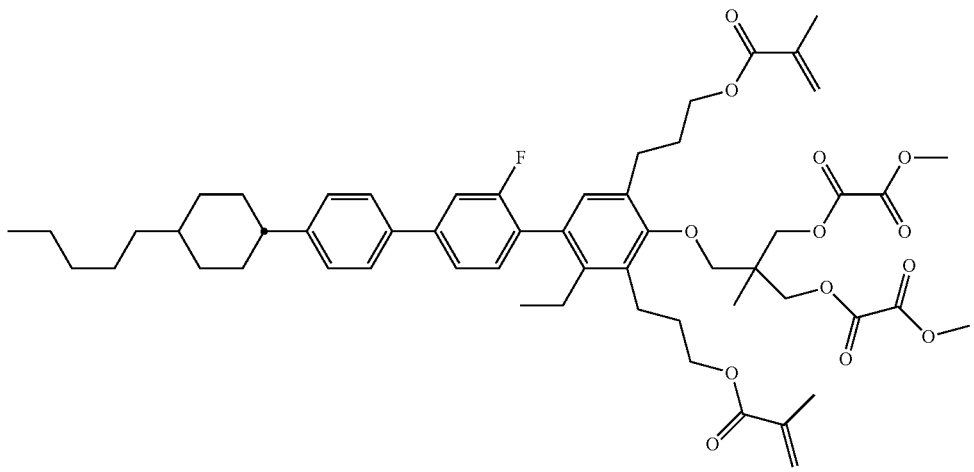

Comparative Example 1, Examples 1 to 3

A liquid crystal composition of the following LC-A was prepared, and its physical properties were measured.

The components of the liquid crystal composition and the results of its physical properties were as shown in Table 1.

TABLE 1

|  | LC-A |
| --- | --- |
| 3-Cy-Cy-2 | 17.5 |
| 3-Cy-Cy-4 | 3 |
| 3-Cy-Ph-O1 | 15 |
| 3-Ph-Ph-1 | 9 |
| 3-Cy-Ph-Ph-2 | 8 |
| 3-Cy-1O-Ph5-O1 | 7.5 |
| 3-Cy-Cy-1O-Ph5-O2 | 17 |
| 2-Cy-Ph-Ph5-O2 | 6.5 |
| 3-Cy-Ph-Ph5-O2 | 8 |
| 3-Cy-Ph-Ph5-O4 | 8.5 |
| Total (%) | 100 |
| TNI [° C.] | 75.4 |
| Δn | 0.111 |
| γ1 [mPa · s] | 118 |
| Δε | −3.1 |

As Example 1, a liquid crystal composition LC-1 was prepared by adding 1.50 parts by weight of a compound represented by Formula (P-1) and 0.50 parts by weight of a compound represented by Formula (XX-5), with regard to 100 parts by weight of a liquid crystal composition LC-A. As Example 2, a liquid crystal composition LC-2 was prepared by adding 1.50 parts by weight of a compound represented by Formula (P-1) and 1.00 part by weight of a compound represented by Formula (XX-5), with regard to 100 parts by weight of a liquid crystal composition LC-A. As Example 3, a liquid crystal composition LC-3 was prepared by adding 1.50 parts by weight of a compound represented by Formula (P-1) and 1.50 parts by weight of a compound represented by Formula (XX-5), with regard to 100 parts by weight of a liquid crystal composition LC-A. As Example 4, a liquid crystal composition LC-4 was prepared by adding 0.50 parts by weight of a compound represented by Formula (P-1) and 1.50 parts by weight of a compound represented by Formula (XX-5), with regard to 100 parts by weight of a liquid crystal composition LC-A. Further, as Comparative Example 1, a liquid crystal composition LC-5 was prepared by adding 1.50 parts by weight of a compound represented by Formula (P-1) and 0.30 parts by weight of a compound represented by Formula (XX-5), with regard to 100 parts by weight of a liquid crystal composition LC-A.

TABLE 2

|  | Liquid Crystal Composition LC-A | Compound (P-1) | Compound (XX-5) |
|---|---|---|---|
| Example 1 | LC-1 | 100 | 1.50 | 0.50 |
| Example 2 | LC-2 | 100 | 1.50 | 1.00 |
| Example 3 | LC-3 | 100 | 1.50 | 1.50 |
| Example 4 | LC-4 | 100 | 0.50 | 1.50 |
| Comparative Example 1 | LC-5 | 100 | 1.50 | 0.30 |

The results of low temperature storage stability, vertical alignment (1), vertical alignment (2), and pretilt angle change amount were as shown in Table 3.

TABLE 3

|  |  | Low Temperature Storage Stability | Vertical Alignment (1) | Vertical Alignment (2) | Pretilt Angle Change Amount (°) |
|---|---|---|---|---|---|
| Example 1 | LC-1 | A | A | A | 1.0 |
| Example 2 | LC-2 | A | A | A | 0.6 |
| Example 3 | LC-3 | B | A | B | 0.4 |
| Example 4 | LC-4 | A | B | B | 0.3 |
| Comparative Example 1 | LC-5 | A | A | A | 2.0 |

Examples 1 to 4 showed a pretilt angle change amount sufficiently smaller than that of Comparative Example 1, and it was confirmed that there were little display unevenness and burn-in. In Examples 1 to 4, the amount of the second monomer (XX-5) added is larger than that in Comparative Example 1, so that the strength of the polymer is increased and the stability is considered to be excellent. In Examples 1 to 3, the ratio of the first monomer (P-1) to the second monomer (XX-5) is sufficient, so that the vertical alignment is considered high.

Comparative Example 2, Examples 5 to 8

A liquid crystal composition of the following LC-B was prepared, and its physical properties were measured. The components of the liquid crystal composition and the results of its physical properties were as shown in Table 4.

TABLE 4

|  | LC-B |
|---|---|
| 3-Cy-Cy-2 | 11.5 |
| 3-Cy-Cy-4 | 12.5 |
| 3-Cy-Cy-5 | 3 |
| 3-Cy-Cy-V1 | 10 |
| 3-Cy-Ph-O1 | 4.5 |
| 1V2-Ph-Ph-1 | 2 |
| 3-Cy-Ph-Ph-1 | 9 |
| 3-Cy-Ph-Ph-2 | 5.5 |
| 3-Cy-Ph-Ph5-O2 | 10 |
| 3-Ph-Ph5-O2 | 12 |
| 3-Cy-Ph5-O2 | 7 |
| 3-Cy-Cy-Ph5-O2 | 10 |
| 2O-Y-O5 | 3 |
| Total (%) | 100 |
| TNI [° C.] | 75.2 |
| Δn | 0.111 |
| γ1 [mPa·s] | 138 |
| Δε | −3.42 |

As Example 5, a liquid crystal composition LC-6 was prepared by adding 1.00 part by weight of a compound represented by Formula (P-26) and 0.50 parts by weight of a compound represented by Formula (XX-2), with regard to 100 parts by weight of a liquid crystal composition LC-B. As Example 6, a liquid crystal composition LC-7 was prepared by adding 1.00 part by weight of a compound represented by Formula (P-26) and 1.00 part by weight of a compound represented by Formula (XX-2), with regard to 100 parts by weight of a liquid crystal composition LC-B. As Example 7, a liquid crystal composition LC-8 was prepared by adding 1.00 part by weight of a compound represented by Formula (P-26) and 1.50 parts by weight of a compound represented by Formula (XX-2), with regard to 100 parts by weight of a liquid crystal composition LC-B. As Example 8, a liquid crystal composition LC-9 was prepared by adding 0.50 parts by weight of a compound represented by Formula (P-26) and 1.50 parts by weight of a compound represented by Formula (XX-2), with regard to 100 parts by weight of a liquid crystal composition LC-B. Further, as Comparative Example 2, a liquid crystal composition LC-10 was prepared by adding 0.50 parts by weight of a compound represented by Formula (P-26) and 0.30 parts by weight of a compound represented by Formula (XX-2), with regard to 100 parts by weight of a liquid crystal composition LC-B.

TABLE 5

|  | Liquid Crystal Composition LC-B | Compound (P-26) | Compound (XX-2) |
|---|---|---|---|
| Example 5 | LC-6 | 100 | 1.00 | 0.50 |
| Example 6 | LC-7 | 100 | 1.00 | 1.00 |
| Example 7 | LC-8 | 100 | 1.00 | 1.50 |
| Example 8 | LC-9 | 100 | 0.50 | 1.50 |
| Comparative Example 2 | LC-10 | 100 | 0.50 | 0.30 |

The results of low temperature storage stability, vertical alignment (1), vertical alignment (2), and pretilt angle change amount are shown below.

TABLE 6

|  |  | Low Temperature Storage Stability | Vertical Alignment (1) | Vertical Alignment (2) | Pretilt Angle Change Amount (°) |
|---|---|---|---|---|---|
| Example 5 | LC-6 | A | A | A | 0.8 |
| Example 6 | LC-7 | A | A | A | 0.4 |
| Example 7 | LC-8 | B | A | B | 0.2 |
| Example 8 | LC-9 | A | B | B | 0.2 |
| Comparative Example 2 | LC-10 | A | A | A | 1.5 |

Examples 5 to 7 showed a pretilt angle change amount sufficiently smaller than that of Comparative Example 2, and it was confirmed that there were little display unevenness and burn-in. In Examples 5 to 7, the amount of the second monomer (R-1) added is larger than that in Comparative Example 2, so that the strength of the polymer is increased and the stability is considered to be excellent. In Examples 4 to 6, the ratio of the first monomer (Formula (P-26)) to the second monomer (Formula (XX-2)) is sufficient, so that the vertical alignment is considered high.

Example 9 to Example 29

Liquid crystal compositions were prepared by adding a compound represented by Formula (P-2), Formula (P-4), Formula (P-5), Formula (P-6), Formula (P-13), Formula (P-14), or Formula (P-15) as the first monomer and the second monomer (XX-5), with regard to 100 parts by weight of a liquid crystal composition LC-A to provide Example 9 to Example 29. The ratio of each example is shown in the following table.

TABLE 7

|  | Liquid Crystal Composition | % by weight | First Monomer | | Second Monomer | |
|---|---|---|---|---|---|---|
|  |  |  | Compound 1 | % by mass | Compound 2 | % by mass |
| Example 9 | LC-A | 100 | (P-2) | 1.2 | (XX-5) | 0.6 |
| Example 10 | LC-A | 100 | (P-2) | 1.2 | (XX-5) | 0.9 |
| Example 11 | LC-A | 100 | (P-2) | 1.2 | (XX-5) | 1.6 |
| Example 12 | LC-A | 100 | (P-4) | 1.5 | (XX-5) | 0.6 |
| Example 13 | LC-A | 100 | (P-4) | 1.5 | (XX-5) | 0.9 |
| Example 14 | LC-A | 100 | (P-4) | 1.5 | (XX-5) | 1.6 |
| Example 15 | LC-A | 100 | (P-5) | 1.2 | (XX-5) | 0.6 |
| Example 16 | LC-A | 100 | (P-5) | 1.2 | (XX-5) | 0.9 |
| Example 17 | LC-A | 100 | (P-5) | 1.2 | (XX-5) | 1.6 |
| Example 18 | LC-A | 100 | (P-6) | 0.6 | (XX-5) | 0.6 |
| Example 19 | LC-A | 100 | (P-6) | 0.6 | (XX-5) | 0.9 |
| Example 20 | LC-A | 100 | (P-6) | 0.6 | (XX-5) | 1.6 |
| Example 21 | LC-A | 100 | (P-13) | 1.2 | (XX-5) | 0.6 |
| Example 22 | LC-A | 100 | (P-13) | 1.2 | (XX-5) | 0.9 |
| Example 23 | LC-A | 100 | (P-13) | 1.2 | (XX-5) | 1.6 |
| Example 24 | LC-A | 100 | (P-14) | 1.2 | (XX-5) | 0.6 |
| Example 25 | LC-A | 100 | (P-14) | 1.2 | (XX-5) | 0.9 |
| Example 26 | LC-A | 100 | (P-14) | 1.2 | (XX-5) | 1.6 |
| Example 27 | LC-A | 100 | (P-15) | 1.2 | (XX-5) | 0.6 |
| Example 28 | LC-A | 100 | (P-15) | 1.2 | (XX-5) | 0.9 |
| Example 29 | LC-A | 100 | (P-15) | 1.2 | (XX-5) | 1.6 |

The results of low temperature storage stability, vertical alignment (1), vertical alignment (2), and pretilt angle change amount are shown below.

TABLE 8

|  | Low Temperature Storage Stability | Vertical Alignment (1) | Vertical Alignment (2) | Pretilt Angle Change Amount (°) |
|---|---|---|---|---|
| Example 9 | A | A | A | 1.0 |
| Example 10 | A | A | A | 0.7 |
| Example 11 | A | A | B | 0.4 |
| Example 12 | A | A | A | 1.1 |
| Example 13 | A | A | A | 0.8 |
| Example 14 | A | A | B | 0.5 |
| Example 15 | A | A | A | 0.8 |
| Example 16 | A | A | A | 0.5 |
| Example 17 | A | A | B | 0.3 |
| Example 18 | A | A | A | 0.4 |
| Example 19 | A | A | A | 0.2 |
| Example 20 | A | B | B | 0.1 |
| Example 21 | A | A | A | 1.0 |
| Example 22 | A | A | A | 0.7 |
| Example 23 | A | A | B | 0.4 |
| Example 24 | A | A | A | 1.0 |
| Example 25 | A | A | A | 0.7 |
| Example 26 | A | A | B | 0.3 |
| Example 27 | A | A | A | 0.9 |
| Example 28 | A | A | A | 0.8 |
| Example 29 | A | A | A | 0.4 |

Examples 9 to 29 showed a pretilt angle change amount sufficiently smaller than that of Comparative Example, and it was confirmed that there were little display unevenness and burn-in. In Examples 9 to 29, the amount of the second monomer (XX-5) added is larger than that in Comparative Example 2, so that the strength of the polymer is increased and the stability is considered to be excellent.

Example 30 to Example 36

Liquid crystal compositions were prepared by adding 1.00 part, by weight of a compound represented by Formula (P-20), Formula (P-25), Formula (P-27), Formula (P-28), Formula (P-29), Formula P-33), or Formula (P-35) as the first monomer and 0.50 parts by weight of the second monomer (XX-2), with regard to 100 parts by weight of a liquid crystal composition LC-B to provide Example 30 to Example 36. The ratio of each example is shown in the following table.

TABLE 9

|  | Liquid Crystal Composition | % by weight | First Monomer | | Second Monomer | |
|---|---|---|---|---|---|---|
|  |  |  | Compound 1 | Added Amount (%) | Compound 2 | Added Amount (%) |
| Example 30 | LC-B | 100 | (P-20) | 1.0 | (XX-2) | 0.5 |
| Example 31 | LC-B | 100 | (P-25) | 1.0 | (XX-2) | 0.5 |
| Example 32 | LC-B | 100 | (P-27) | 1.0 | (XX-2) | 0.5 |
| Example 33 | LC-B | 100 | (P-28) | 1.0 | (XX-2) | 0.5 |
| Example 34 | LC-B | 100 | (P-29) | 1.0 | (XX-2) | 0.5 |
| Example 35 | LC-B | 100 | (P-33) | 1.0 | (XX-2) | 0.5 |
| Example 36 | LC-B | 100 | (P-35) | 1.0 | (XX-2) | 0.5 |

The results of low temperature storage stability, vertical alignment (1), vertical alignment (2), and pretilt angle change amount are shown below.

TABLE 10

|  | Low Temperature Storage Stability | Vertical Alignment (1) | Vertical Alignment (2) | Pretilt Angle Change Amount (°) |
|---|---|---|---|---|
| Example 30 | A | A | A | 0.8 |
| Example 31 | A | A | A | 0.9 |
| Example 32 | A | A | A | 0.7 |

TABLE 10-continued

|  | Low Temperature Storage Stability | Vertical Alignment (1) | Vertical Alignment (2) | Pretilt Angle Change Amount (°) |
|---|---|---|---|---|
| Example 33 | A | A | A | 0.8 |
| Example 34 | A | A | A | 1.0 |
| Example 35 | A | A | A | 1.1 |
| Example 36 | A | A | A | 1.1 |

In Examples 30 to 36, it was confirmed that a pretilt change amount was sufficiently smaller than that of the comparative example. It is thought that the increase in the amount of the second monomer increases the strength of the polymer, provides excellent stability and improved tilt angle stability.

Example 37 to Example 45

Liquid crystal compositions were prepared by adding compounds represented by Formula (P-1), and Formula (P-4), Formula (P-5), or Formula (P-26) as the first monomer and compounds represented by Formula (XX-5) and Formula (XX-1), Formula (XX-7), or Formula (XX-15) as the second monomer, with regard to 100 parts by weight of a liquid crystal composition LC-A to provide Example 37 to Example 45. The ratio of each example is shown in the following table.

TABLE 11

|  | Liquid Crystal Composition | % by weight | First Monomer Compound 1 | Added Amount (%) | Compound 2 | Added Amount (%) | Second Monomer Compound 1 | Added Amount (%) | Compound 2 | Added Amount (%) |
|---|---|---|---|---|---|---|---|---|---|---|
| Example 37 | LC-A | 100 | (P-1) | 1.0 | (P-4) | 0.2 | (XX-5) | 0.3 | (XX-1) | 0.5 |
| Example 38 | LC-A | 100 | (P-1) | 1.0 | (P-5) | 0.4 | (XX-5) | 0.3 | (XX-7) | 0.3 |
| Example 39 | LC-A | 100 | (P-1) | 1.0 | (P-26) | 1.0 | (XX-5) | 0.3 | (XX-15) | 0.5 |
| Example 40 | LC-A | 100 | (P-1) | 1.2 | (P-4) | 0.2 | (XX-5) | 0.3 | (XX-1) | 0.2 |
| Example 41 | LC-A | 100 | (P-1) | 1.2 | (P-5) | 0.4 | (XX-5) | 0.3 | (XX-7) | 0.4 |
| Example 42 | LC-A | 100 | (P-1) | 1.2 | (P-26) | 1.0 | (XX-5) | 0.3 | (XX-15) | 0.7 |
| Example 43 | LC-A | 100 | (P-1) | 1.5 | (P-4) | 0.2 | (XX-5) | 0.3 | (XX-1) | 0.5 |
| Example 44 | LC-A | 100 | (P-1) | 1.5 | (P-5) | 0.4 | (XX-5) | 1.5 | (XX-7) | 0.5 |
| Example 45 | LC-A | 100 | (P-1) | 1.5 | (P-26) | 1.0 | (XX-5) | 1.5 | (XX-15) | 0.5 |

The results of low temperature storage stability, vertical alignment (1), vertical alignment (2), and pretilt angle change amount are shown below.

TABLE 12

|  | Low Temperature Storage Stability | Vertical Alignment (1) | Vertical Alignment (2) | Pretilt Angle Change Amount (°) |
|---|---|---|---|---|
| Example 37 | A | A | A | 0.8 |
| Example 38 | A | A | A | 1.1 |
| Example 39 | A | A | A | 1.1 |
| Example 40 | A | A | A | 1.1 |
| Example 41 | A | A | A | 1.0 |
| Example 42 | A | A | A | 1.1 |
| Example 43 | A | A | A | 1.0 |
| Example 44 | A | A | A | 0.5 |
| Example 45 | A | A | A | 0.6 |

In Examples 37 to 45, it was confirmed that a pretilt change amount was sufficiently smaller than that of the comparative example. It is thought that the increase in the amount of the second monomer increases the stability of the polymer, provides improved tilt angle stability.

In Examples 37 to 45, the low temperature storage stability, vertical alignment, and pretilt change amount were evaluated in the case where two kinds of the first monomers and two kinds of the second monomers were used. It was confirmed that a pretilt change amount was sufficiently smaller than that of the comparative example. It was confirmed that the pretilt change amount which was sufficiently smaller than that of the comparative example was also exhibited even when two kinds of monomers were added. It was also confirmed that the low temperature storage stability was improved by adding a polymerizable compound. When the solubility of the first monomer and the second monomer in the liquid crystal is low, the concentration of one component may be lowered, and further, a different spontaneous orientation monomer may be added to improve the vertical alignment.

Further, in place of the liquid crystal compositions LC-A and LC-B, compositions composed of compounds and mixing ratios as shown below were prepared, and the prepared liquid crystal compositions were designated as LC-C to LC-H.

TABLE 13

|  | LC-C | LC-D | LC-E | LC-F | LC-G | LC-H |
|---|---|---|---|---|---|---|
| 3-Ph-Ph-1 | 11 | 13 | 8 | 12.5 |  |  |
| 3-Cy-1O-Ph5-O1 |  | 16 |  | 6 |  |  |

TABLE 13-continued

|  | LC-C | LC-D | LC-E | LC-F | LC-G | LC-H |
|---|---|---|---|---|---|---|
| 3-Cy-1O-Ph5-O2 |  |  |  | 6.5 |  |  |
| 3-Cy-Ph-O1 |  | 14 |  |  | 7 |  |
| 3-Cy-Ph-O2 |  |  | 14 |  |  |  |
| 2-Cy-Cy-1O-Ph5-O2 |  |  |  | 15 |  |  |
| 3-Cy-Cy-1O-Ph5-O2 | 16 |  | 21 | 2 |  |  |
| 2-Cy-Ph-Ph5-O2 | 6 |  | 6 | 6 | 8.5 | 3 |
| 3-Cy-Ph-Ph5-O2 | 7 |  | 8 |  | 8.5 | 8.5 |
| 3-Cy-Ph-Ph5-O3 |  |  |  | 7 |  |  |
| 3-Cy-Ph-Ph5-O4 | 6 |  | 12 | 9 |  |  |
| 3-Cy-Cy-2 | 24 | 21 | 17 | 18 | 23.5 | 8 |
| 3-Cy-Cy-4 | 7 |  |  | 7.5 | 10 | 7.5 |
| 3-Cy-Ph5-O2 | 7 |  |  |  | 13 | 7 |
| 5-Cy-Ph5-O2 | 7 |  |  |  |  |  |
| 3-Ph-Ph5-O2 |  | 14 |  |  |  | 16 |
| 3-Cy-Cy-Ph5-O2 |  |  |  |  |  | 10 |
| 4-Cy-Cy-Ph5-O2 |  |  |  |  | 9 |  |
| 5-Cy-Cy-Ph5-O2 |  |  |  |  | 5 | 8 |
| 3-Cy-Cy-Ph-1 | 3 | 10 |  |  |  |  |
| 3-Cy-Ph-Ph-1 | 3 |  |  |  |  |  |
| 3-Cy-Ph-Ph-2 | 3 | 10 |  | 6 |  |  |

TABLE 13-continued

|  | LC-C | LC-D | LC-E | LC-F | LC-G | LC-H |
|---|---|---|---|---|---|---|
| 5-Cy-Ph-Ph-2 |  | 16 |  | 4.5 |  |  |
| 3-Ph-Ph5-Ph-2 |  |  |  |  | 7.5 | 8 |
| 4-Ph-Ph5-Ph-2 |  |  |  |  | 8 |  |
| 3-Cy-Cy-V |  |  |  |  |  | 14.5 |
| 3-Cy-Cy-V-1 |  |  |  |  |  | 9.5 |
| Total (%) | 100 | 100 | 100 | 100 | 100 | 100 |
| TNI [° C.] | 77 | 77 | 75.9 | 75.5 | 75.3 | 74.4 |
| Δn | 0.112 | 0.112 | 0.109 | 0.102 | 0.106 | 0.107 |
| γ1 [mPa·s] | −3 | −3 | −2.9 | −2.6 | −2.67 | −2.87 |
| Δε | 110 | 110 | 124 | 87 | 93 | 79 |

The compounds represented by Formula (P-1), (P-2), (P-3), (P-7), (P-15), (P-28), or (P-32) as the first monomer and the compounds represented by Formula (XX-1), (XX-2), (XX-5), (XX-7), and (XX-15) as the second monomer were mixed with each of the liquid crystal compositions LC-C to LC-H at an appropriate concentration, and the alignment test was evaluated in the same manner as described above. As a result, it was confirmed that the alignment property was improved in comparison with the comparative example.

Example 46 to Example 53

A liquid crystal composition of the following LC-A was prepared, and its physical properties were measured. The components of the liquid crystal composition and the results of its physical properties were as shown in Tables 14 and 15.

Liquid crystal compositions were prepared by adding compounds represented by Formula (P-36), Formula (P-37), Formula (P-38), Formula (P-39) or Formula (P-40) as the first monomer and compounds represented by Formula (XX-5) or Formula (XX-21) as the second monomer, with regard to 100 parts by weight of a liquid crystal composition LC-A to provide Example 46 to Example 53. The ratio of each example is shown in the following table.

TABLE 14

|  |  |  | First Monomer | | | | Second Monomer | | | |
|---|---|---|---|---|---|---|---|---|---|---|
|  | Liquid Crystal Composition | % by weight | Compound 1 | Added Amount (%) | Compound 2 | Added Amount (%) | Compound 1 | Added Amount (%) | Compound 2 | Added Amount (%) |
| Example 46 | LC-A | 100 | (P-36) | 0.2 | (P-37) | 0.4 | (XX-5) | 0.6 | (XX-21) |  |
| Example 47 | LC-A | 100 | (P-36) | 0.2 | (P-37) | 0.4 | (XX-5) | 0.3 | (XX-21) | 0.3 |
| Example 48 | LC-A | 100 | (P-36) | 0.2 | (P-38) | 0.4 | (XX-5) | 0.6 | (XX-21) |  |
| Example 49 | LC-A | 100 | (P-36) | 0.2 | (P-38) | 0.4 | (XX-5) | 0.3 | (XX-21) | 0.15 |
| Example 50 | LC-A | 100 | (P-39) | 0.5 |  |  | (XX-5) | 0.3 | (XX-21) |  |
| Example 51 | LC-A | 100 | (P-39) | 0.7 |  |  | (XX-5) | 0.45 | (XX-21) |  |
| Example 52 | LC-A | 100 | (P-40) | 0.5 |  |  | (XX-5) | 0.6 | (XX-21) |  |
| Example 53 | LC-A | 100 | (P-40) | 0.5 |  |  | (XX-5) | 0.3 | (XX-21) | 0.3 |

The results of low temperature storage stability, vertical alignment (1), vertical alignment (2), and pretilt angle change amount are shown below.

TABLE 15

|  | Low Temperature Storage Stability | Vertical Alignment (1) | Vertical Alignment (2) | Pretilt Angle Change Amount (°) |
|---|---|---|---|---|
| Example 46 | A | A | A | 0.5 |
| Example 47 | A | A | A | 0.4 |
| Example 48 | A | A | A | 0.5 |
| Example 49 | A | A | A | 0.7 |
| Example 50 | A | A | A | 0.8 |
| Example 51 | A | A | A | 0.8 |
| Example 52 | A | A | A | 0.5 |
| Example 53 | A | A | A | 0.5 |

In Examples 46 to 53, it was confirmed that a pretilt change amount was sufficiently smaller than that of the comparative example. It is thought that the increase in the amount of the second monomer increases the stability of the polymer, provides improved tilt angle stability.

In Examples 46 to 53, the low temperature storage stability, vertical alignment, and pretilt change amount were evaluated in the case where two kinds of the first monomers and two kinds of the second monomers were used. It was confirmed that a pretilt change amount was sufficiently smaller than that of the comparative example. It was confirmed that the pretilt change amount which was sufficiently smaller than that of the comparative example was also exhibited even when two kinds of monomers were added. It was also confirmed that the low temperature storage stability was improved by adding a polymerizable compound. When the solubility of the first monomer and the second monomer in the liquid crystal is low, the concentration of one component may be lowered, and further, a different spontaneous orientation monomer may be added to improve the vertical alignment.

Moreover, the cell obtained by enclosing the liquid crystal composition containing the first monomer and the second monomer was set in a polarizing microscope in which a polarizer and an analyzer were arranged orthogonally, and the transmitted light was observed. When the liquid crystal molecules are vertically aligned, the light cannot be transmitted through the action of the polarizing plate, and the cell is displayed in black. When the above samples were evaluated by this test method, it was confirmed that no alignment unevenness occurred in all the samples and uniform vertical alignment was exhibited.

Further, when the pretilt angle generated by the polymerization by ultraviolet light irradiation was evaluated, it was confirmed that an appropriate tilt angle was given to all the samples. It has been confirmed that the liquid crystal display element using these has a sufficiently fast response since a sufficient pretilt angle is given.

Also, in this evaluation, in order to evaluate the polymer stability of each monomer in a state where the initial pretilt angle was constant, a substrate with a polyimide alignment film that induces vertical alignment was used when the pretilt angle change amount was confirmed. It was also confirmed that the same results were obtained when a liquid crystal cell having a cell gap of 3.2 m was used, which was composed of a first substrate having no alignment film (common electrode substrate) and a second substrate having no alignment film (pixel electrode substrate), and obtained by dropping a liquid crystal composition onto the first substrate, and holding the liquid crystal composition with the second substrate, and curing the sealing material.

In addition, it is considered that the pretilt change with time in the present invention is affected by the hardness of the polymer film, and a harder polymer film is formed by preparing the polymer film under the conditions of the present invention.

The invention claimed is:

1. A liquid crystal composition, comprising:
   at least one first monomer having a first mesogenic skeleton, at least one polymerizable group represented by the general formula (PG1) linked to the first mesogenic skeleton, and at least one polar group linked to the mesogenic skeleton or the polymerizable group; and
   at least one second monomer having a second mesogenic skeleton and a polymerizable group represented by the general formula (PG2) linked to the second mesogenic skeleton, and having a chemical structure different from that of the first monomer, in an amount of more than 0.4% by mass:
   wherein the at least one polar group is represented by general formula (K):

 (PG1)

 (PG2)

wherein
P$^{11}$ and P$^{21}$ each independently represent a group represented by any of the following formulae (R-I) to (R-IX):

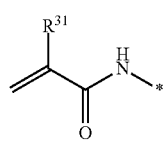 (R-I)

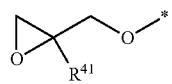 (R-II)

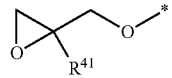 (R-III)

 (R-IV)

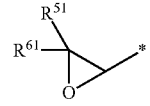 (R-V)

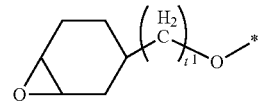 (R-VI)

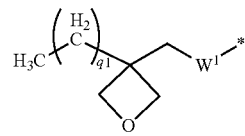 (R-VII)

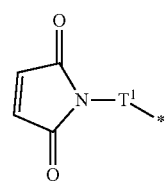 (R-VIII)

HS—* (R-IX)

wherein
R$^{21}$, R$^{31}$, R$^{41}$, R$^{51}$ and R$^{61}$ each independently represent a hydrogen atom, an alkyl group having 1 to 5 carbon atoms, or a halogenated alkyl group having 1 to 5 carbon atoms; W$^1$ is a single bond, —O—, or a methylene group; T$^1$ is a single bond or —COO—; p$^1$, t$^1$ and q$^1$ are each independently 0, 1, or 2; and one or more hydrogen atoms of the polymerizable group P$^{11}$ may be substituted with the polar group, or the polar group may have a polymerizable group represented by the general formula (PG1) as a substituent;

S$^{11}$ and S$^{21}$ each independently represent a single bond or an alkylene group having 1 to 15 carbon atoms, and one —CH$_2$— or two or more —CH$_2$— that are not adjacent to each other in the alkylene group each may be substituted with the polar group, —O—, —OCO—, or —COO— so long as oxygen atoms are not directly adjacent to each other, and * in the above chemical formulae represents a bonding site:

 (K)

wherein S$^{ik}$ represents a single bond or an alkylene group having 1 to 15 carbon atoms, and one —CH$_2$— or two or more —CH$_2$— that are not adjacent to each other in the alkylene group may be substituted with —O—, —OCO—, or —COO— so long as oxygen atoms are not directly adjacent to each other, and K$^{ik}$ is represented by formulae (K-1), (P-K-3) or (P-K-4):

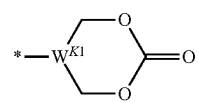 (K-1)

-continued

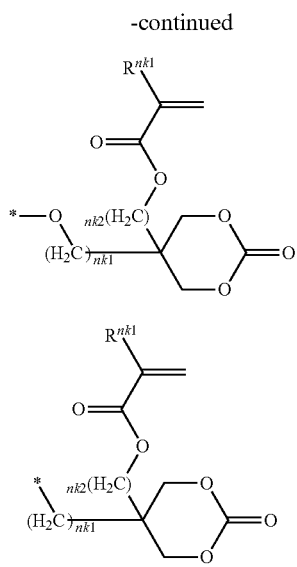

(P-K-3)

(P-K-4)

wherein in the formulae (K-1)
$W^{K1}$ represents a methine group, $\equiv C-CH_3$, $\equiv C-C_2H_5$, $\equiv C-C_3H_7$, $\equiv C-C_4H_9$, $\equiv C-C_5H_{11}$, $\equiv C-C_6H_{13}$, or a nitrogen atom;
wherein in the formulae (P-K-3) or (P-K-4) $R^{nk1}$ represents a hydrogen atom or an alkyl group having 1 to 5 carbon atoms, and $n^{k1}$ and $n^{k2}$ independently represent an integer of 0 to 8;
wherein one or more hydrogen atoms of $S^{ik}$ or $K^{ik}$ may be substituted with a polymerizable group represented by the general formula (PG1);
* in the above chemical formulae represents a bonding site.

2. The liquid crystal composition according to claim 1, wherein the first monomer comprises the polar group represented by general formula (K) and the second monomer does not comprise a polar group represented by the general formula (K).

3. The liquid crystal composition according to claim 1, wherein a content mass ratio of the first monomer to the second monomer (first monomer/second monomer) is 0.5 to 10.

4. The liquid crystal composition according to claim 1, wherein the first mesogenic skeleton is represented by the general formula (Me1):

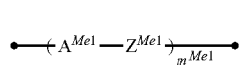

(Me1)

wherein in the general formula (Me1),
$Z^{Me1}$ represents a single bond, —CH=CH—, —CF=CF—, —C≡C—, —COO—, —OCO—, —OCOO—, —OOCO—, —CF$_2$O—, —OCF$_2$—, —CH=CHCOO—, —OCOCH=CH—, —CH$_2$—CH$_2$COO—, —OCOCH$_2$—CH$_2$—, —CH=C(CH$_3$)COO—, —OCOC(CH$_3$)=CH—, —CH$_2$—CH(CH$_3$)COO—, —OCOCH(CH$_3$)—CH$_2$—, —OCH$_2$CH$_2$O—, or an alkylene group having 2 to 20 carbon atoms, and one —CH$_2$— or two or more —CH$_2$— that are not adjacent to each other in the alkylene group may be substituted with —O—, —COO—, or —OCO—;

$A^{Me1}$ represents a divalent 6-membered ring aromatic group, a divalent 6-membered ring heteroaromatic group, a divalent 6-membered ring aliphatic group, or a divalent 6-membered heteroaliphatic group, and the hydrogen atom in these cyclic structures may be substituted with a halogen atom or —S$^{11}$—P$^{11}$ and a polar group, and in the case where a plurality of each of $Z^{Me1}$ and $A^{Me1}$ are present, these may be the same as or different from each other,
$m^{Me1}$ represents an integer of 1 to 5, and in the formula (Me1), the black dot at the left end and the black dot at the right end represent a bonding site.

5. The liquid crystal composition according to claim 1, wherein the content of the first monomer is 0.2 to 5.0% by mass.

6. The liquid crystal composition according to claim 1, wherein the content of the second monomer is more than 0.4 to 3.0% by mass.

7. The liquid crystal composition according to claim 1, wherein the second monomer is one polymerizable compound selected from the group consisting of polymerizable compounds represented by the following general formulae (RM-1) and (RM-2):

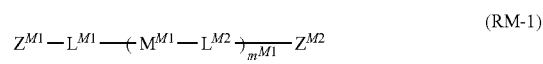

(RM-1)

in the general formula (RM-1), $Z^{M1}$ and $Z^{M2}$ are represented by the following formulae:

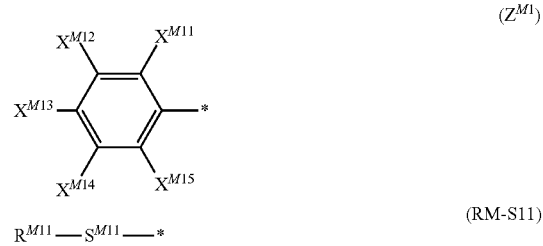

($Z^{M1}$)

(RM-S11)

wherein in the formula ($Z^{M1}$), $X^{M11}$ to $X^{M15}$ each independently represent one kind or two or more kinds selected from the group consisting of an alkyl group having 1 to 15 carbon atoms, —CF$_3$, a fluorine atom, an alkoxy group having 1 to 15 carbon atoms, and a chlorine atom, or a group represented by the formula (RM-S11), but at least one of $X^{M11}$ to $X^{M15}$ represents the formula (RM-S11):

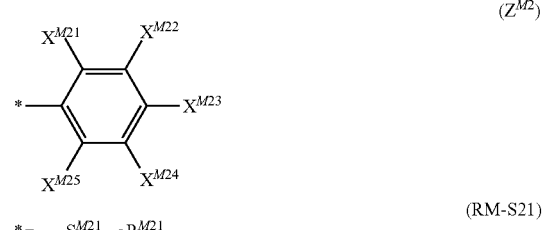

($Z^{M2}$)

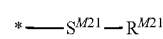

(RM-S21)

wherein in the formula ($Z^{M2}$), $X^{M21}$ to $X^{M25}$ each independently represent one kind or two or more kinds selected from the group consisting of an alkyl group having 1 to 15 carbon atoms, —CF$_3$, a fluorine atom, an alkoxy group having 1 to 15 carbon atoms, and a chlorine atom, or a group represented by the formula (RM-S21), but at least one of $X^{M21}$ to $X^{M21}$ represents the formula (RM-S21);

wherein in the formula (RM-S11) and the formula (RM-S21), $S^{M11}$ and $S^{M21}$ each independently represent an alkylene group having 1 to 12 carbon atoms or a single bond, and —CH$_2$— in the alkylene group may be replaced by —O—, —COO—, —OCO—, or —OCOO—, in which oxygen atoms are not directly bonded to each other;

$R^{M11}$ and $R^{M21}$ each independently represent any one of the above formulae (R-I) to (R-IX);

$L^{M1}$ and $L^{M2}$ each independently represent a single bond, —O—, —CH$_2$—, —OCH$_2$—, —CH$_2$O—, —CO—, —C$_2$H$_4$—, —COO—, —OCO—, —CH=CH—COO—, —COO—CH=CH—, —OCO—CH=CH—, —CH=CH—OCO—, —COOC$_2$H$_4$—, —OCOC$_2$H$_4$—, —C$_2$H$_4$OCO—, —C$_2$H$_4$COO—, —OCOCH$_2$—, —CH$_2$COO—, —CH=CH—, —CF=CH—, —CH=CF—, —CF=CF—, —CF$_2$—, —CF$_2$O—, —OCF$_2$—, —CF$_2$CH$_2$—, —CH$_2$CF$_2$—, —CF$_2$CF$_2$— or —C≡C—, and in a case where a plurality of $L^{M2}$ are present, they may be the same as or different from each other;

$M^{M1}$ represents a 1,4-phenylene group, a 1,4-cyclohexylene group, or a naphthalene-2,6-diyl group, and the hydrogen atom contained in these groups may be substituted with a fluorine atom, a chlorine atom, an alkyl group having 1 to 8 carbon atoms, a halogenated alkyl group, a halogenated alkoxy group, an alkoxy group, a nitro group, or the following group:

\*—$S^{M1}$—$R^{M1}$ wherein $S^{M1}$ represents an alkylene group having 1 to 12 carbon atoms or a single bond, and —CH$_2$— in the alkylene group may be replaced by an oxygen atom, —COO—, —OCO—, or —OCOO—, in which oxygen atoms are not directly bonded to each other;

$R^{M1}$ represents any one of the above formulae (R-I) to (R-IX);

and in a case where a plurality of $M^{M1}$ are present, they may be the same as or different from each other;

$m^{M1}$ represents 0, 1, or 2;

in a case where a plurality of $S^{M11}$, $S^{M21}$, $S^{M1}$, $R^{M11}$, $R^{M21}$ and/or $R^{M1}$ are present, they may be the same as or different from each other; and \* in the above chemical formulae represents a bonding site;

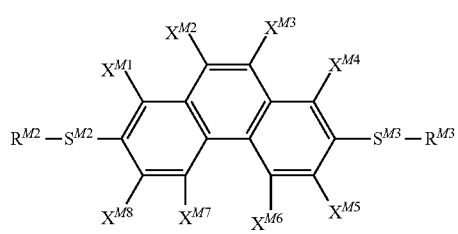

(RM-2)

in the general formula (RM-2), $X^{M1}$ to $X^{M8}$ each independently represent a hydrogen atom or a fluorine atom;

$S^{M2}$ and $S^{M3}$ each independently represent an alkylene group having 1 to 12 carbon atoms or a single bond, and —CH$_2$— in the alkylene group may be replaced by an oxygen atom, —COO—, —OCO—, or —OCOO—, in which oxygen atoms are not directly bonded to each other; and $R^{M2}$ and $R^{M3}$ represents any one of the above formulae (R-I) to (R-IX).

8. The liquid crystal composition according to claim 1, further comprising a compound selected from the group consisting of compounds represented by the general formulae (N-1), (N-2), and (N-3):

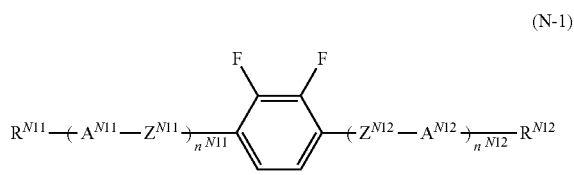

(N-1)

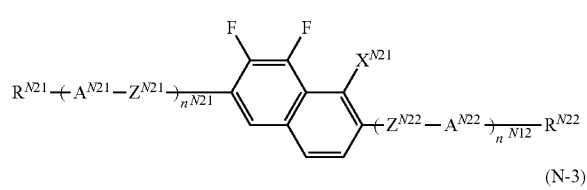

(N-2)

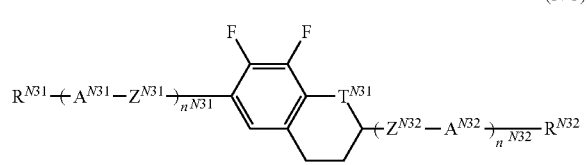

(N-3)

wherein $R^{N11}$, $R^{N12}$, $R^{N21}$, $R^{N22}$, $R^{N31}$, and $R^{N32}$ each independently represent an alkyl group having 1 to 8 carbon atoms, and one or non-adjacent two or more —CH$_2$— in the alkyl group may be each independently substituted with —CH=CH—, —C≡C—, —O—, —CO—, —COO—, or —OCO—;

$A^{N11}$, $A^{N12}$, $A^{N21}$, $A^{N22}$, $A^{N31}$, and $A^{N32}$ each independently represent a group selected from the group consisting of: (a) 1,4-cyclohexylene group (one —CH$_2$— or two or more —CH$_2$— that are not adjacent to each other present in this group may be replaced by —O—); (b) 1,4-phenylene group (one —CH= or two or more —CH= that are not adjacent to each other present in this group may be replaced by —N=); (c) naphthalene-2,6-diyl group, 1,2,3,4-tetrahydronaphthalene-2,6-diyl group, or decahydronaphthalene-2,6-diyl group (one —CH= or two or more —CH= that are not adjacent to each other present in naphthalene-2,6-diyl group or 1,2,3,4-tetrahydronaphthalene-2,6-diyl group may be replaced by —N=); and (d) 1,4-cyclohexenylene group, and the groups (a), (b), (c) and (d) may be each independently substituted with a cyano group, a fluorine atom, or a chlorine atom;

$Z^{N11}$, $Z^{N12}$, $Z^{N21}$, $Z^{N22}$, $Z^{N31}$, and $Z^{N32}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—;

$X^{N21}$ represents a hydrogen atom or a fluorine atom;

$T^{N31}$ represents —CH$_2$— or an oxygen atom;

$n^{N11}$, $n^{N12}$, $n^{N21}$, $n^{N22}$, $n^{N31}$ and $n^{N32}$ each independently represent an integer of 0 to 3, but $n^{N11}+n^{N12}$, $n^{N21}+n^{N22}$ and $n^{N31}+n^{N32}$ are each independently 1, 2, or 3, and in a case where a plurality of $A^{N11}$ to $A^{N32}$, $Z^{N11}$ to $Z^{N32}$ are present, they may be the same as or different from each other.

9. The liquid crystal composition according to claim 1, further comprising a compound represented by the general formula (L):

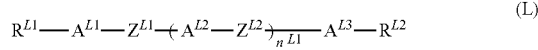
(L)

wherein
$R^{L1}$ and $R^{L2}$ each independently represent an alkyl group having 1 to 8 carbon atoms, and one or non-adjacent two or more —CH$_2$— in the alkyl group may be each independently substituted with —CH=CH—, —C≡C—, —O—, —CO—, —COO—, or —OCO—;
$n^{L1}$ represents 0, 1, 2, or 3;
$A^{L1}$, $A^{L2}$, and $A^{L3}$ each independently represent a group selected from the group consisting of: (a) a 1,4-cyclohexylene group (one —CH$_2$— or two or more —CH$_2$— that are not adjacent to each other present in this group may be replaced by —O—); (b) a 1,4-phenylene group (one —CH= or two or more —CH= that are not adjacent to each other present in this group may be replaced by —N=); and (c) a naphthalene-2,6-diyl group, a 1,2,3,4-tetrahydronaphthalene-2,6-diyl group, or a decahydronaphthalene-2,6-diyl group (one —CH= or two or more —CH= that are not adjacent to each other present in naphthalene-2,6-diyl group or 1,2,3,4-tetrahydronaphthalene-2,6-diyl group may be replaced by —N=), and the groups (a), (b), and (c) may be each independently substituted with a cyano group, a fluorine atom, or a chlorine atom;
$Z^{L1}$ and $Z^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—;
in a case where $n^{L1}$ is 2 or 3 and a plurality of $A^{L2}$ are present, they may be the same as or different from each other, and in a case where $n^{L1}$ is 2 or 3 and a plurality of $Z^{L2}$ are present, they may be the same as or different from each other.

10. The liquid crystal composition according to claim 8, further comprising a compound represented by the general formula (L):

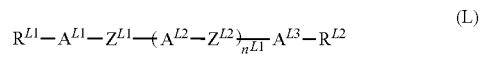
(L)

wherein
$R^{L1}$ and $R^{L2}$ each independently represent an alkyl group having 1 to 8 carbon atoms, and one or non-adjacent two or more —CH$_2$— in the alkyl group may be each independently substituted with —CH=CH—, —C≡C—, —O—, —CO—, —COO—, or —OCO—;
$n^{L1}$ represents 0, 1, 2, or 3;
$A^{L1}$, $A^{L2}$, and $A^{L3}$ each independently represent a group selected from the group consisting of: (a) a 1,4-cyclohexylene group (one —CH$_2$— or two or more —CH$_2$— that are not adjacent to each other present in this group may be replaced by —O—); (b) a 1,4-phenylene group (one —CH= or two or more —CH= that are not adjacent to each other present in this group may be replaced by —N=); and (c) a naphthalene-2,6-diyl group, a 1,2,3,4-tetrahydronaphthalene-2,6-diyl group, or a decahydronaphthalene-2,6-diyl group (one —CH= or two or more —CH= that are not adjacent to each other present in naphthalene-2,6-diyl group or 1,2,3,4-tetrahydronaphthalene-2,6-diyl group may be replaced by —N=), and the groups (a), (b), and (c) may be each independently substituted with a cyano group, a fluorine atom, or a chlorine atom;
$Z^{L1}$ and $Z^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—;
in a case where $n^{L1}$ is 2 or 3 and a plurality of $A^{L2}$ are present, they may be the same as or different from each other, and in a case where $n^{L1}$ is 2 or 3 and a plurality of $Z^{L2}$ are present, they may be the same as or different from each other, but the compounds represented by the general formulae (N-1), (N-2), and (N-3) are excluded.

\* \* \* \* \*